(12) United States Patent
Takizawa et al.

(10) Patent No.: US 7,324,148 B2
(45) Date of Patent: Jan. 29, 2008

(54) CAMERA AND IMAGE PICKUP DEVICE UNIT USED THEREFOR HAVING A SEALING STRUCTURE BETWEEN A DUST PROOFING MEMBER AND AN IMAGE PICK UP DEVICE

(75) Inventors: Hiroyuki Takizawa, Chofu (JP); Sumio Kawai, Hachioji (JP); Motoaki Kobayashi, Mitaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 708 days.

(21) Appl. No.: 10/300,688

(22) Filed: Nov. 20, 2002

(65) Prior Publication Data
US 2003/0202114 A1 Oct. 30, 2003

(30) Foreign Application Priority Data

| Apr. 26, 2002 | (JP) | 2002-126724 |
| May 20, 2002 | (JP) | 2002-145249 |
| May 20, 2002 | (JP) | 2002-145250 |
| May 20, 2002 | (JP) | 2002-145253 |
| May 20, 2002 | (JP) | 2002-145254 |
| May 27, 2002 | (JP) | 2002-153020 |
| May 27, 2002 | (JP) | 2002-153021 |

(51) Int. Cl.
*H04N 5/225* (2006.01)
(52) U.S. Cl. ...................... 348/340; 348/374
(58) Field of Classification Search ............... 348/374, 348/340; 257/433; 250/239
See application file for complete search history.

(56) References Cited

U.S. PATENT DOCUMENTS

| 4,387,973 A | * | 6/1983 | Martin ........................ 359/507 |
| 4,441,796 A | | 4/1984 | Shaw |
| 4,841,387 A | | 6/1989 | Rindfuss |
| 4,896,217 A | | 1/1990 | Miyazawa et al. |
| 4,920,420 A | | 4/1990 | Sano et al. |
| 4,929,072 A | * | 5/1990 | Fujie et al. ................. 359/507 |
| 4,998,800 A | | 3/1991 | Nishida et al. |
| 5,170,288 A | | 12/1992 | Imaizumi et al. |
| 5,227,888 A | | 7/1993 | Haga |

(Continued)

FOREIGN PATENT DOCUMENTS

JP    57-078032 A    5/1982

(Continued)

*Primary Examiner*—Ngoc-Yen Vu
*Assistant Examiner*—Richard M. Bemben
(74) *Attorney, Agent, or Firm*—Frishauf, Holtz, Goodman & Chick, P.C.

(57) ABSTRACT

A camera is provided that includes a dust-proofing member that has a substantially circular or polygonal plate-shape and that includes a transparent portion at an area having at least a predetermined length in a radial direction from the center thereof, and that is opposed to the front of an optical device at a predetermined interval. A member for vibration is arranged at a peripheral portion of the dust-proofing member and applies vibrations to the dust-proofing member. A sealing structure is arranged outside a peripheral portion of the optical device or an adjacent portion thereof, and forms a substantially sealed space portion including an air gap portion formed by opposing the optical device and the dust-proofing member, and sealing the space portion at a peripheral side of the optical device and the dust-proofing member.

34 Claims, 62 Drawing Sheets

U.S. PATENT DOCUMENTS

| | | | |
|---|---|---|---|
| 5,760,528 A | 6/1998 | Tomikawa | |
| 5,910,700 A | 6/1999 | Crotzer | |
| 5,995,279 A | 11/1999 | Ogino et al. | |
| 6,031,998 A | 2/2000 | Shono | |
| 6,078,438 A | 6/2000 | Shibata et al. | |
| 6,157,781 A * | 12/2000 | Konno et al. | 396/71 |
| 6,163,340 A | 12/2000 | Yasuda | |
| 6,564,018 B2 | 5/2003 | Melman et al. | |
| 6,583,819 B2 * | 6/2003 | Ito et al. | 348/335 |
| 6,778,325 B2 | 8/2004 | Osawa | |
| 2001/0053288 A1 | 12/2001 | Ito et al. | |
| 2001/0055072 A1* | 12/2001 | Mogamiya et al. | 348/335 |
| 2002/0171751 A1 | 11/2002 | Ohkawara | |
| 2003/0214588 A1 | 11/2003 | Takizawa et al. | |
| 2003/0218685 A1 | 11/2003 | Kawai | |
| 2004/0012714 A1* | 1/2004 | Kawai | 348/374 |
| 2004/0090549 A1 | 5/2004 | Takizawa et al. | |

FOREIGN PATENT DOCUMENTS

| | | |
|---|---|---|
| JP | 58-152201 A | 9/1983 |
| JP | 59-006399 U | 1/1984 |
| JP | 60-207107 A | 10/1985 |
| JP | 62-165127 A | 7/1987 |
| JP | 63-009970 A | 1/1988 |
| JP | 63-114166 A | 5/1988 |
| JP | 63-131498 U | 8/1988 |
| JP | 01-230016 A | 9/1989 |
| JP | 02-001699 A | 1/1990 |
| JP | 02-020971 A | 1/1990 |
| JP | 2-065369 U | 5/1990 |
| JP | 02-132860 A | 5/1990 |
| JP | 03-218670 A | 9/1991 |
| JP | 03-244281 A | 10/1991 |
| JP | 4-047769 A | 2/1992 |
| JP | 04-104918 A | 4/1992 |
| JP | 4-116478 A | 10/1992 |
| JP | 05-167051 A | 7/1993 |
| JP | 05-213286 A | 8/1993 |
| JP | 6-214142 A | 8/1994 |
| JP | 07-151946 * | 6/1995 |
| JP | 07-151946 A | 6/1995 |
| JP | 7-222068 A | 8/1995 |
| JP | 07-322153 A | 12/1995 |
| JP | 08-079633 * | 3/1996 |
| JP | 08-079633 A | 3/1996 |
| JP | 9-130654 A | 5/1997 |
| JP | 2809133 A | 7/1998 |
| JP | 10-268129 A | 10/1998 |
| JP | 11-8421 A | 1/1999 |
| JP | 11-284246 A | 10/1999 |
| JP | 2000-28887 A | 1/2000 |
| JP | 2000-29132 A | 1/2000 |
| JP | 2000-066021 A | 3/2000 |
| JP | 2000-124519 A | 4/2000 |
| JP | 2000-330054 A | 11/2000 |
| JP | 2000-350068 A | 12/2000 |
| JP | 2001-298640 A | 10/2001 |
| JP | 2001-345392 A | 12/2001 |
| JP | 2001-358974 A | 12/2001 |
| JP | 2001-359287 A | 12/2001 |
| JP | 2002-050751 A | 2/2002 |
| JP | 2002-107612 A | 4/2002 |
| JP | 2002-204379 A | 7/2002 |
| JP | 2002-229110 A | 8/2002 |
| JP | 2003-333391 A | 11/2003 |

* cited by examiner

FIG.34
FIG.35
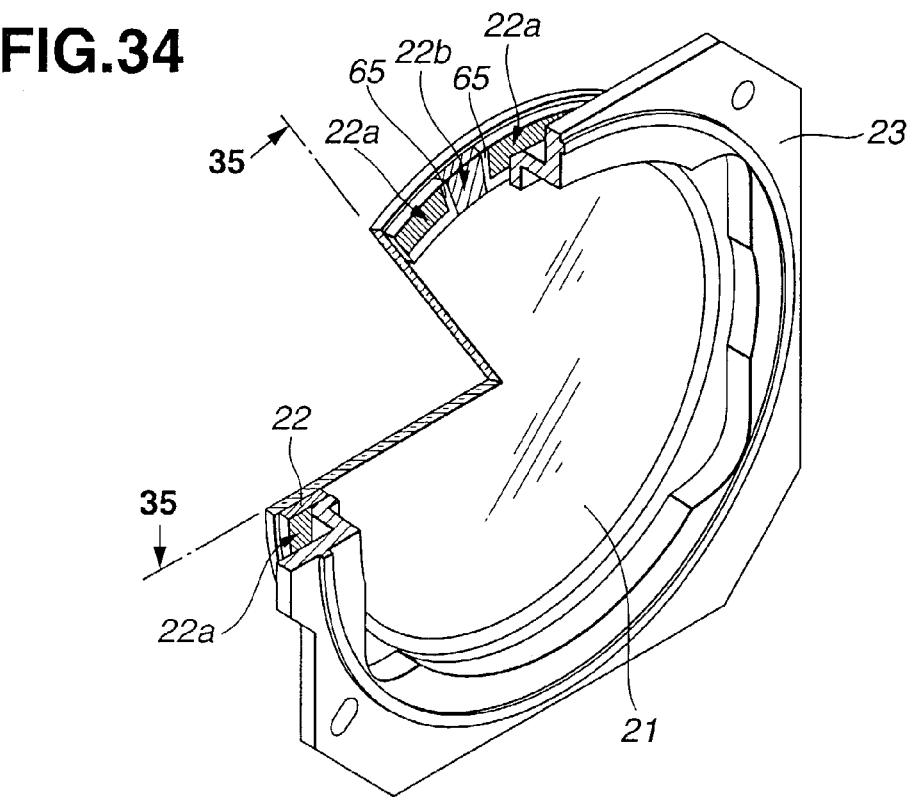
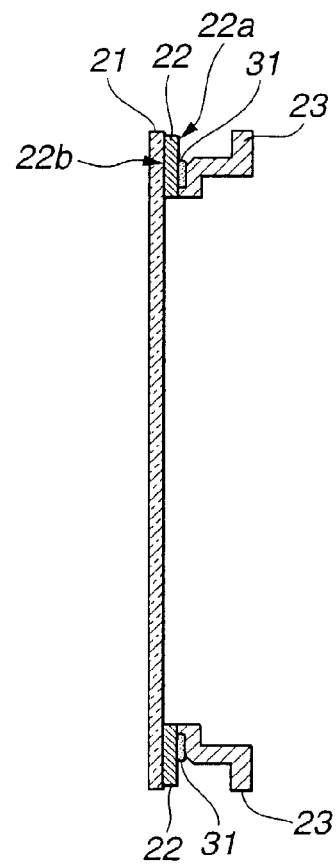

CAMERA AND IMAGE PICKUP DEVICE UNIT USED THEREFOR HAVING A SEALING STRUCTURE BETWEEN A DUST PROOFING MEMBER AND AN IMAGE PICK UP DEVICE

This application claims the benefit of Japanese Applications

No. 2002-126724 filed on Apr. 26, 2002,

No. 2002-145249 filed on May 20, 2002,

No. 2002-145250 filed on May 20, 2002,

No. 2002-145253 filed on May 20, 2002,

No. 2002-145254 filed on May 20, 2002,

No. 2002-153020 filed on May 27, 2002, and No. 2002-153021 filed on May 27, 2002, the entire contents of which are incorporated herein by reference.

BACKGROUND OF THE INVENTION

1. Field of the Invention

The present invention relates to an image pick-up device unit having an image pick-up device for obtaining an image signal corresponding to light irradiated on a photoelectrically converting surface or a camera having the image pick-up device unit, such as an interchangeable single-lens reflex digital camera. More particularly, the present invention relates to a camera having a dust-proofing construction of the image pick-up device and image pick-up device unit used for the camera.

2. Description of the Related Art

Recently, digital cameras such as a so-called digital still camera or a digital video camera (hereinafter, referred to as a digital camera or simply referred to as a camera) are generally put into practical use and are widely spread. In the digital cameras, a construction is such that a subject image formed based on beams (hereinafter, referred to as subject beams) from a subject, which is transmitted through a photographing optical system (also referred to as a photographing lens), is formed onto a photoelectrically converting surface of a solid image pick-up device such as a CCD (Charge Coupled Device, hereinafter, briefly referred to as an image pick-up device), which is arranged at a predetermined position. Further, an electrical image signal or the like indicating a desired subject image is generated by using the photoelectrically converting operation of the image pick-up device. A signal based on the image signal and the like is outputted to a predetermined display device such as an LCD (Liquid Crystal Display) and an image or the like is displayed. Another construction is such that the image signal or the like generated by the image pick-up device is recorded to a predetermined recording area of a predetermined recording medium as predetermined-format image data. Further, the image data recorded to the recording medium is read and the image data is converted to become an image signal which is optimum for displaying the image data using the display device. Thereafter, an image corresponding thereto is displayed based on the processed image signal.

In general digital cameras have an optical finder device, so that prior to a photographing operation, a desired subject as a photographing target is observed and a photographing range including the subject is set.

In general, a so-called single-lens reflex finder device is used as the optical finder device. In this single-lens reflex finder device, the advancing direction of the subject beams which are transmitted through the photographing optical system is bent by using a reflecting member arranged on the optical axis of the photographing optical system so that a subject image for observation is formed at a predetermined position. On the other hand, upon photographing operation, the reflecting member is evacuated from the optical axis of the photographing optical system, thereby guiding the subject beams onto a light receiving surface, that is, a photoelectrically converting surface and forming the subject image for photographing on the photographically converting surface.

Furthermore, recently, a so-called interchangeable lens digital camera having the single-lens reflex finder device is generally put into practical use. In the interchangeable lens digital camera, the photographing optical system is detachable to a camera main body, and a plurality of types of the photographing optical systems are selectively used in the single-camera main body by arbitrarily detaching and exchanging a desired photographing optical system in accordance with user's desire.

In the above-mentioned interchangeable lens digital camera, dust and the like floating in the air enter the camera main body upon detaching the photographing optical system from the camera main body. Various mechanisms which are mechanically operated such as a shutter and stop mechanisms are arranged in the camera main body and thus, the dust is possibly generated from the various mechanisms during the operation.

Upon detaching the photographing optical system from the camera main body, the light receiving surface (also referred to as the photoelectrically converting surface) of the image pick-up device arranged in the rear of the photographing optical system is exposed in the ambient air of the camera. Therefore, dust and the like are adhered to the photoelectrically converting surface of the image pick-up device due to electrostatic charge action and the like.

Then, for the conventional single-lens reflex digital cameras, for example, Japanese Unexamined Patent Application Publication No. 2000-29132 proposes a technology for suppressing the adhesion of dust and the like to the light receiving surface of the image pick-up device due to the electrostatic charge action.

Means disclosed in Japanese Unexamined Patent Application Publication No. 2000-29132 suppresses the adhesion of dust and the like to the light receiving surface of the image pick-up device due to the electrostatic charge action by providing a transparent electrode onto the surface of a cover member for covering the light receiving surface of the image pick-up device provided in the camera and by applying to the transparent electrode a DC voltage or an AC voltage with several kHz to 20 kHz.

The means for neutralizing charges generated to the image pick-up device disclosed in the above publication suppresses the adhesion of dust and the like to the light receiving surface of the image pick-up device due to static electricity.

On the other hand, as the image pick-up device in the conventional digital cameras, a packaged image pick-up device (e.g., referred to as a packaged CCD) is widely used. In addition to the above-mentioned image pick-up device, recently, the supply of a so-called bare CCD chip is proposed.

For example, Japanese Unexamined Patent Application Publication No. 9-130654 discloses means for shaking off dust and the like which are adhered to the photoelectrically converting surface by providing a piezoelectric element between the bare chip CCD and a substrate on which the bare chip CCD is placed and by applying a predetermined voltage to the piezoelectric element, by the reason that dust and the like are, with much possibility, adhered onto the photoelectrically converting surface in the bare chip CCD in many cases.

Further, for example, Japanese Unexamined Patent Application Publication No. 2001-298640 proposes means for removing dust and the like adhered to the surface of an optical member such as a low-pass filter arranged in front of the image pick-up device in the conventional interchangeable lens digital cameras.

The camera disclosed in Japanese Unexamined Patent Application Publication No. 2001-298640 comprises a wiper member as means for removing the dust and the like adhered to the surface of the optical member arranged in front of the image pick-up device.

The wiper member grinds the surface of the optical member such as the low-pass filter and moves on the surface, thereby shaking off dust on the surface of the optical member, thus to remove the dust and the like adhered to the surface of the optical member. The dust and the like grinded by the wiper are put into a groove portion of a camera main body, which is formed near the optical member.

However, the means disclosed in Japanese Unexamined Patent Application Publication No. 2000-29132 suppresses the adhesion of dust and the like by neutralizing charges on the electrostatic charged image pick-up device. Consequently, the means is not optimal as means for removing dust which is adhered or deposited, irrespective of the static electricity, to the photoelectrically converting surface of the image pick-up device.

Moreover, the means disclosed in Japanese Unexamined Patent Application Publication No. 9-130654 is not the best means for applying to the image pick-up device such as the packaged CCD generally used for the conventional digital cameras because the means is devised in view of the bare chip CCD.

In other words, when the means disclosed in Japanese Unexamined Patent Application Publication No. 9-130654 is applied to the general packaged CCD or the like, vibrations to the image pick-up device or the package are applied. Thus, dangerously, the vibrating action adversely influences on various mechanisms which are arranged to the image pick-up device and near it, for example, to cause deterioration or errors.

Furthermore, the means disclosed in Japanese Unexamined patent application Publication No. 2001-298640 needs a wiper member and a member such as a driving motor for driving the wiper member. The arrangement of the members requires space in the camera. Therefore, there is a problem that the camera itself is increased in size.

In addition, with the means disclosed in Japanese Unexamined Patent Application Publication No. 2001-298640, dust and the like shaken off by the wiper member are put into the groove portion formed near the optical member. Dust and the like which are put into the groove portion flow into the space of the camera main body again and might be adhered to inner members of the camera main body such as a mirror unit, a shutter unit, and a lens unit for distance measurement, or might be adhered to the optical member again.

In this case, dust and the like adhered to the member are photographed as a part of a captured image or cause inconvenience in the operation of the digital camera.

In particular, in the single-lens reflex digital cameras in which the photographing lens is interchangeable, the acquisition of a preferable result (captured image) needs the suppression of the input of dust and the like in the camera main body. Consequently, dust and the like adhered to the optical member provided in the image pick-up device must accurately be removed. However, with the above means disclosed in Japanese Unexamined Patent Application Publication No. 2001-298640, undesirably, removed dust and the like are adhered again.

SUMMARY OF THE INVENTION

Accordingly, it is a first object of the present invention to provide a digital camera and an assembly (image pick-up device unit) used for the camera that are detachable in a photographing optical system, in which the adhesion of dust and the like to a photoelectrically converting surface of an image pick-up device is substantially prevented and in which dust and the like adhered to an outer surface of a dust-proofing member for sealing and protecting the image pick-up device are surely removed.

Further, it is a second object of the present invention to provide a camera and an image pick-up device unit used for the camera in which the structure is simplified, mechanical accuracy is stably ensured, and manufacturing processing is simplified by devising the structure of a dust-proofing mechanism arranged for removing dust and the like adhered to an optical member arranged in the camera.

Furthermore, it is a third object of the present invention to provide a camera having the dust-proofing structure for preventing the adhesion of dust and the like to a photoelectrically converting surface of an image pick-up device and an image pick-up device unit used for the camera, in which the structure is simplified and the manufacturing is easy while proposing fixing means contributing to the improvement in fixing force of a dust-proofing member arranged in front of the image pick-up device and assuring a dust proofing function.

It is a fourth object of the present invention to provide a camera and an image pick-up device unit, in which the camera comprises means for removing dust and the like adhered to the surface of an optical member arranged in the camera, and whereby it is possible to suppress the re-adhesion or adhesion of dust and the like shaken off from the surface of the optical member to the surface of the optical member or to other internal constituting members. Thus, preferable photographing operation is always maintained, and a preferable photographing result is always obtained.

It is a fifth object of the present invention to provide a camera and an image pick-up device unit used for the camera, in which the camera comprises means for removing dust and the like adhered to the surface of an optical member arranged in the camera, and whereby it is possible to suppress the re-adhesion or adhesion of dust and the like shaken off from the surface of the optical member to the surface of the optical member or to other internal constituting members. Thus, preferable photographing operation is always maintained, and a preferable photographing result is always obtained.

It is a sixth object of the present invention to provide a camera using an image pick-up device unit having a dust-proofing member for sealing and protecting a photoelectrically converting surface side of an image pick-up device and a member for vibration for applying vibrations with a predetermined amplitude to the dust-proofing member, wherein the attenuation of vibrations of the dust-proofing member is suppressed with a simple structure, the vibrations of the dust-proofing member are stably assured, and dust and the like adhered to the surface of the dust-proofing member are removed easily and surely.

It is a seventh object of the present invention to provide a camera having a dust-proofing structure for preventing the adhesion of dust and the like to a photoelectrically converting surface of an image pick-up device and an image pick-up device unit used for the camera, wherein fixing means for fixing and holding without fail a dust-proofing member and a sealing structure arranged in front of the image pick-up device is proposed and the structure is simplified and the manufacturing is easy while accurately ensuring a sealing structure and a dust-proofing function.

Briefly, according to a first aspect of the invention, a camera comprises: an image pick-up device which obtains an image signal corresponding to beams irradiated onto a photoelectrically converting surface thereof; an optical device arranged on the photoelectrically converting surface side of the image pick-up device; a dust-proofing member with a circular or polygonal plate-shape as a whole, comprising a transparent portion at an area having at least a predetermined length in a radial direction from the center thereof, opposed to the front side of the optical device at a predetermined interval; a member for vibration arranged at a peripheral portion of the dust-proofing member, which applies vibrations to the dust-proofing member; a sealing structure arranged outside a peripheral portion of the optical device or an adjacent portion thereof, which seals a space portion, that is substantially sealed including a void portion formed by opposing the optical device and the dust-proofing member, on a peripheral side of the optical device and the dust-proofing member; and an image signal processing circuit which converts an image signal obtained from the image pick-up device, corresponding to an image formed onto the photoelectrically converting surface of the image pick-up device, into a signal suitable to recording.

According to a second aspect of the invention, a camera comprises: an image pick-up device which obtains an image signal corresponding to beams irradiated onto a photoelectrically converting surface thereof; a dust-proofing member with a circular or polygonal plate-shape as a whole, comprising a transparent portion at an area having at least a predetermined length in a radial direction from the center thereof, opposed to the optical device in front thereof at a predetermined interval; a member for vibration arranged at a peripheral portion of the dust-proofing member, which applies vibrations to the dust-proofing member; a sealing structure arranged outside a peripheral portion of the photoelectrically converting surface of the image pick-up device or an adjacent portion thereof, which seals a space portion, that is substantially sealed including a void portion formed by opposing the photoelectrically converting surface of the image pick-up device and the dust-proofing member, on a peripheral side of the photoelectrically converting surface of the image pick-up device and the dust-proofing member; and an image signal processing circuit which converts an image signal obtained from the image pick-up device, corresponding to an image formed onto the photoelectrically converting surface of the image pick-up device, into a signal suitable to recording.

According to a third aspect of the invention, an image pick-up device unit comprises: an image pick-up device which obtains an image signal corresponding to beams irradiated onto a photoelectrically converting surface thereof; an optical member opposed to the front side of the image pick-up device at a predetermined interval; a member for vibration arranged at a peripheral portion of the optical member, which applies vibrations to the optical member; a sealing structure arranged outside a peripheral portion of the photoelectrically converting surface of the image pick-up device to an adjacent portion thereof, which seals a space portion that is substantially sealed at a portion formed by opposing the optical member and the image pick-up device, on a peripheral side of the image pick-up device and the optical member; and a holding structure which presses a peripheral portion of the optical member so as to press and fix the optical member to the sealing structure.

The above-mentioned and other objects and benefits of the present invention will be obvious from the following detailed description.

That is, according to the present invention, in a camera, in particular, a digital camera, a camera and an assembly used for the camera (image pick-up device unit) are provided, wherein the adhesion of dust and the like onto the photoelectrically converting surface of the image pick-up device is substantially prevented and dust and the like adhered to the outer surface of the dust-proofing member for sealing and protecting the image pick-up device are surely removed.

Further, according to the present invention, a camera and an image pick-up device unit used for the camera are provided, wherein the structure is simplified, mechanical accuracy is stably ensured, and manufacturing processing is simplified by devising the structure of the dust-proofing mechanism arranged for removing dust and the like adhered to the optical member arranged in the camera.

Furthermore, according to the present invention, there are provided the camera having the dust-proofing structure for preventing the adhesion of dust and the like to the photoelectrically converting surface of the image pick-up device and the image pick-up device unit used for the camera, in which the structure is simplified and the manufacturing is easy while proposing fixing means contributing to the improvement in fixing force of the dust-proofing member arranged in front of the image pick-up device and assuring the dust-proofing function.

In addition, according to the present invention, a camera and an image pick-up device unit are provided, wherein the camera comprises means for removing dust and the like adhered to the surface of the optical member arranged in the camera, and wherein it is possible to suppress the re-adhesion of dust and the like shaken off from the surface of the optical member to the surface of the optical member and to suppress the adhesion of dust and the like to another internal member, whereby preferable photographing operation is always maintained, and whereby a preferable photographing result is always obtained.

In addition, according to the present invention, a camera and an image pick-up device unit used for the camera are provided, wherein the camera comprises means for removing dust and the like adhered to the surface of the optical member arranged in the camera, and wherein it is possible to suppress the re-adhesion of dust and the like shaken off from the surface of the optical member to the surface of the optical member and to suppress the adhesion of dust and the like to another internal member, whereby preferable photographing operation is always maintained, and whereby a preferable photographing result is always obtained.

In addition, according to the present invention, a camera using an image pick-up device unit having the dust-proofing member for sealing and protecting the photoelectrically converting surface of the image pick-up device and the member for vibration for applying vibrations with the predetermined amplitude to the dust-proofing member, and an image pick-up device unit used for the camera, are provided, wherein the attenuation of vibrations of the dust-proofing member is suppressed with the simple structure, the vibrations of the dust-proofing member are stably assured, and dust and the like adhered to the surface of the dust-proofing member are removed easily and surely.

In addition, according to the present invention, a camera having the dust-proofing structure for preventing the adhesion of dust and the like onto the photoelectrically converting surface of the image pick-up device and an image pick-up device unit used for the camera are provided, wherein the fixing means for fixing and holding the dust-proofing member and the sealing structure arranged in front of the image pick-up device without fail is proposed and the structure is simplified and the manufacturing is easy while ensuring the sealing structure and the dust-proofing function.

BRIEF DESCRIPTION OF THE DRAWINGS

FIG. 34 is a perspective view showing by extracting a part of members forming an image pick-up device unit in a camera according to a twelfth embodiment of the present invention;

FIG. 35 is a sectional view along a line 35—35 shown in FIG. 34;

DESCRIPTION OF THE PREFERRED EMBODIMENTS

First, a description is given of the schematic structure of a camera according to a first embodiment of the present invention.

Figure 1:
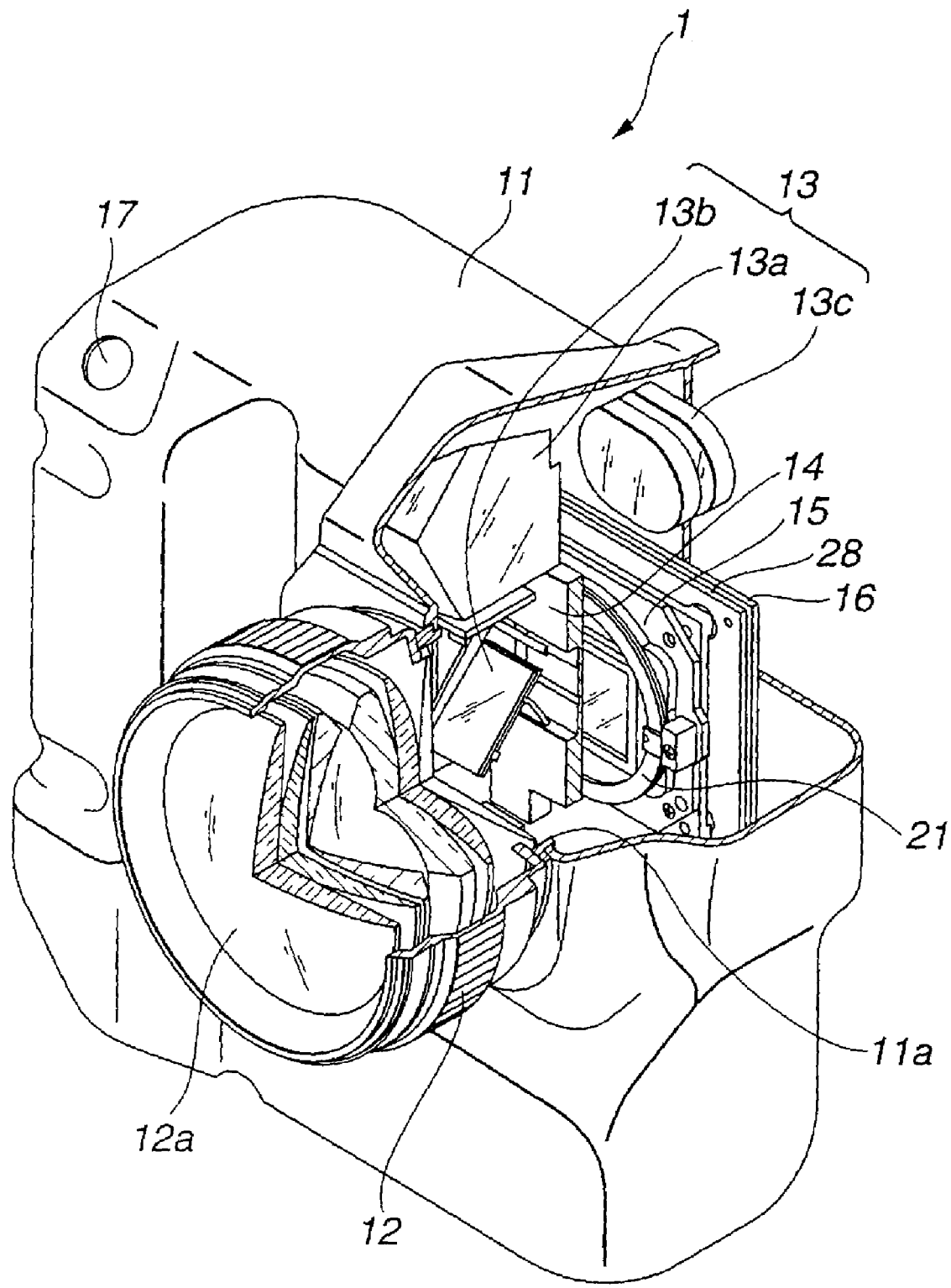
FIG. 1 is a perspective view schematically showing the internal structure of a camera by cutting off a part of the camera according to a first embodiment of the present invention.
Figure 2:
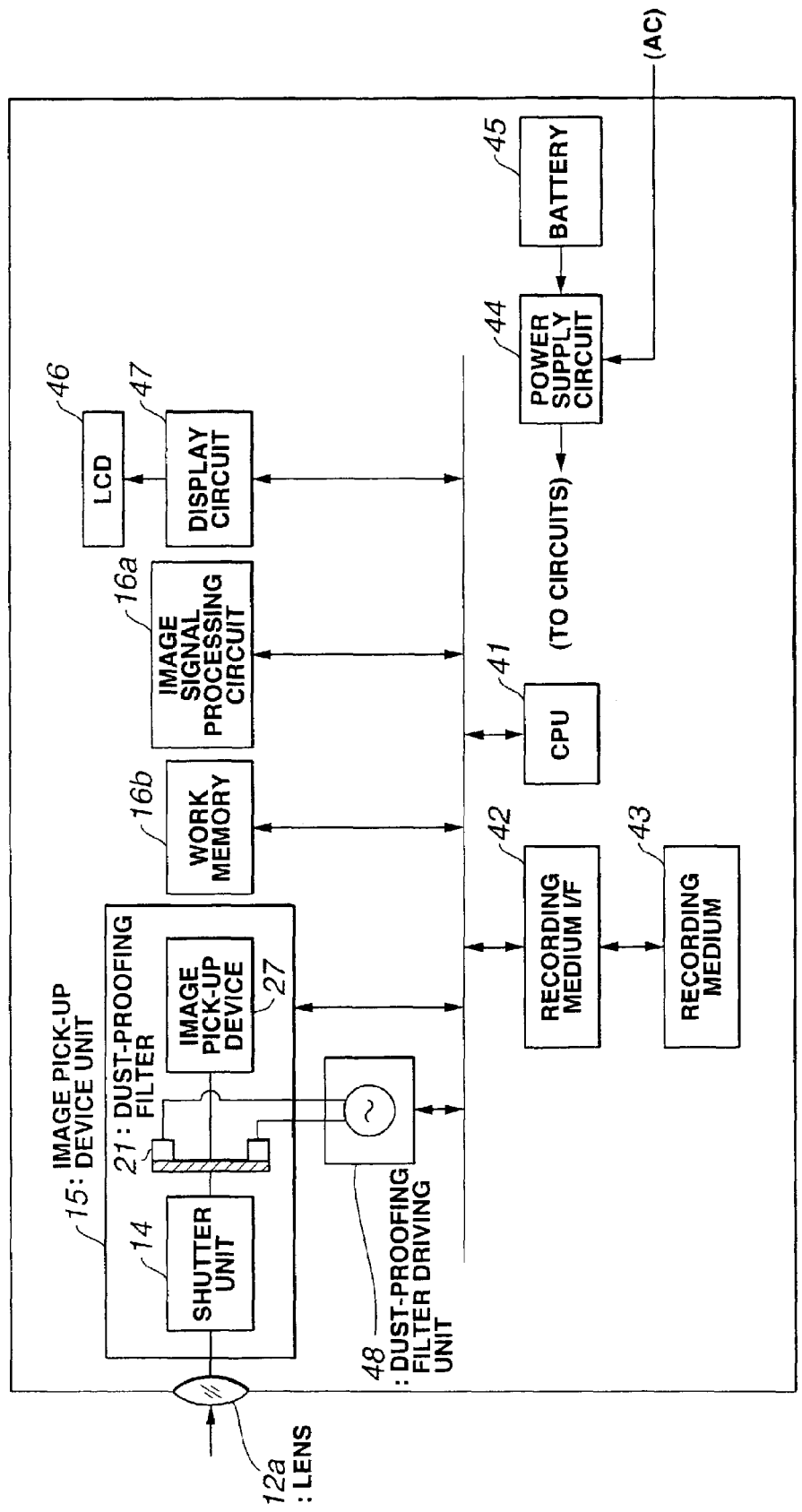
FIG. 2 is a block diagram schematically showing the main electrical structure of the camera shown in FIG. 1.

FIGS. 1 and 2 are diagrams showing the schematic structure of the camera according to the first embodiment of the present invention. FIG. 1 is a perspective view schematically showing the internal structure of a cut-off part of the camera, and FIG. 2 is a block diagram schematically mainly showing the electrical structure of the camera.

According to the first embodiment, a camera 1 comprises a camera main body unit 11 and a lens barrel 12 which are provided independently. The camera main body unit 11 and the lens barrel 12 are detachable.

The lens barrel 12 holds a photographing optical system (photographing lenses) 12a comprising a plurality of lenses and a driving mechanism of the lenses. The photographing optical system 12a comprises a plurality of optical lenses through which a subject beams are transmitted so as to form the subject image generated by the subject beams at a predetermined position (on a photoelectrically converting surface of an image pick-up device 27, which will be described later). The lens barrel 12 is projected toward the front side of the camera main body unit 11.

The lens barrel 12 is a common one used in conventional cameras. Therefore, a description of the detailed structure is omitted.

The camera main body unit 11 is a so-called single-lens reflex camera comprising various members therein, and further having in its front a photographing optical system mounting unit (referred to as a photographing lens mounting unit) 11a as a connecting member arranging detachably the lens barrel 12 for holding a photographing optical system 12a.

In other words, an opening for exposure having a predetermined diameter for guiding the subject beams into the camera main body unit 11 is formed substantially in the center in front of the camera main body unit 11. The photographing optical system mounting unit 11a is formed at a peripheral portion of the opening for exposure.

The above-mentioned photographing optical system mounting unit 11a is arranged in front of an outer-surface side of the camera main body unit 11. In addition, various operating members for operating the camera main body unit 11, e.g., a release button 17 and the like for generating an instruction signal to start the photographing operation are arranged at a predetermined position on an upper-surface portion or a back-surface portion of the outer-surface side of the camera main body unit 11. Since the operating members do not directly relate to the present invention, a description and an illustration of the operating members except for the release button 17 are omitted for the purpose of preventing the complication of the drawing.

Referring to FIG. 1, in the camera main body unit 11, various members are arranged at predetermined positions. For example, the camera main body unit 11 comprises: a finder device 13 forming a so-called observation optical system that is provided for forming a desired subject image formed by the photographing optical system 12a at a predetermined position different from that on the photoelectrically converting surface of the image pick-up device 27 (refer to FIG. 2); a shutter unit 14 having a shutter mechanism and the like for controlling an irradiation time and the like of the subject beams onto the photoelectrically converting surface of the image pick-up device 27; an image pick-up device unit 15 as an assembly of the image pick-up device 27, including the shutter unit 14, for obtaining an image signal corresponding to the subject image formed based on the subject beams which are transmitted through the photographing optical system 12a, and a dust-proofing filter 21 (which will be described in detail later) having optical members, etc., as a dust-proofing member for preventing the adhesion of dust and the like to the photoelectrically converting surface, arranged at a predetermined position in front of the photoelectrically converting surface of the image pick-up device 27; and a plurality of circuit boards (only a main circuit board 16 is illustrated in FIG. 1) such as a main circuit board 16 on which various electrical members forming an electrical circuit, e.g., an image signal processing circuit 16a (refer to FIG. 2) for various signal processing to the image signal obtained by the image pick-up device 27, are mounted.

The finder device 13 comprises a reflecting mirror 13b for bending and guiding an optical axis of the subject beams transmitted through the photographing optical system 12a to an observation optical system side, a roof prism 13a for receiving the beams outputted from the reflecting mirror 13b to form an erecting image, an ocular lens 13c for enlarging the image formed by the roof prism 13a to form an image best for observation, and the like.

The reflecting mirror 13b is movable between a position evacuated from the optical axis of the photographing optical system 12a and a predetermined position on the optical axis, and is arranged at a predetermined angle, e.g., 45° with respect to the optical axis thereof of the photographing optical system 12a in a normal status. Thus, the optical axis of the subject beams transmitted through the photographing optical system 12a is bent by the reflecting mirror 13b when the camera 1 is in the normal status, and is reflected to the roof prism 13a arranged at an upper position of the reflecting mirror 13b.

Upon executing the photographing operation of the camera 1, the reflecting mirror 13b is moved to a predetermined position evacuated from the optical axis of the photographing optical system 12a during the actual exposure operation. Consequently, the subject beams are guided to the side of the image pick-up device 27 and irradiate the photoelectrically converting surface.

The shutter unit 14 uses a focal plane type shutter mechanism, driving circuit for controlling the operation of the shutter mechanism, etc. which are similar to those generally used in the conventional cameras. Therefore, a description of the detailed structure is omitted.

As mentioned above, a plurality of circuit boards arranged in the camera 1 form various electrical circuits. Referring to FIG. 2, as the electrical structure, the camera 1 comprises a CPU 41 as a control circuit for wholly controlling the entire camera 1, the image signal processing circuit 16a for performing various signal processing such as signal processing for converting the image signal obtained by the image pick-up device 27 to a signal suitable to a recording format, a work memory 16b for temporarily recording the image signal processed by the image signal processing circuit 16a, image data, and various information in associated therewith, a recording medium 43 for recording the image data for recording in a predetermined format generated by the image signal processing circuit 16a to a predetermined area, a recording medium interface 42 for electrically connecting the recording medium 43 to the electrical circuits of the camera 1, a display unit 46 comprising a liquid crystal display device (LCD) for displaying the image, a display circuit 47 for electrically connecting the display unit 46 to the camera 1, receiving the image signal processed by the image signal processing circuit 16a, and generating an image signal optimal to display the display operation by using the display unit 46, a battery 45 comprising a secondary battery such as a dry cell, a power supply circuit 44 for receiving power from the battery 45 or from external power supply (AC) supplied by a predetermined connection cable (not shown), controlling the power to match the operation of the camera 1, and supplying electricity to the electrical circuits, a dust-proofing driving unit 48 as the electrical circuit for driving the dust-proofing filter 21 included in the image pick-up device unit 15, comprising an oscillator, and the like.

Next, a detailed description is given of the image pick-up device unit 15 in the camera 1 according to the first embodiment.

Figure 3:
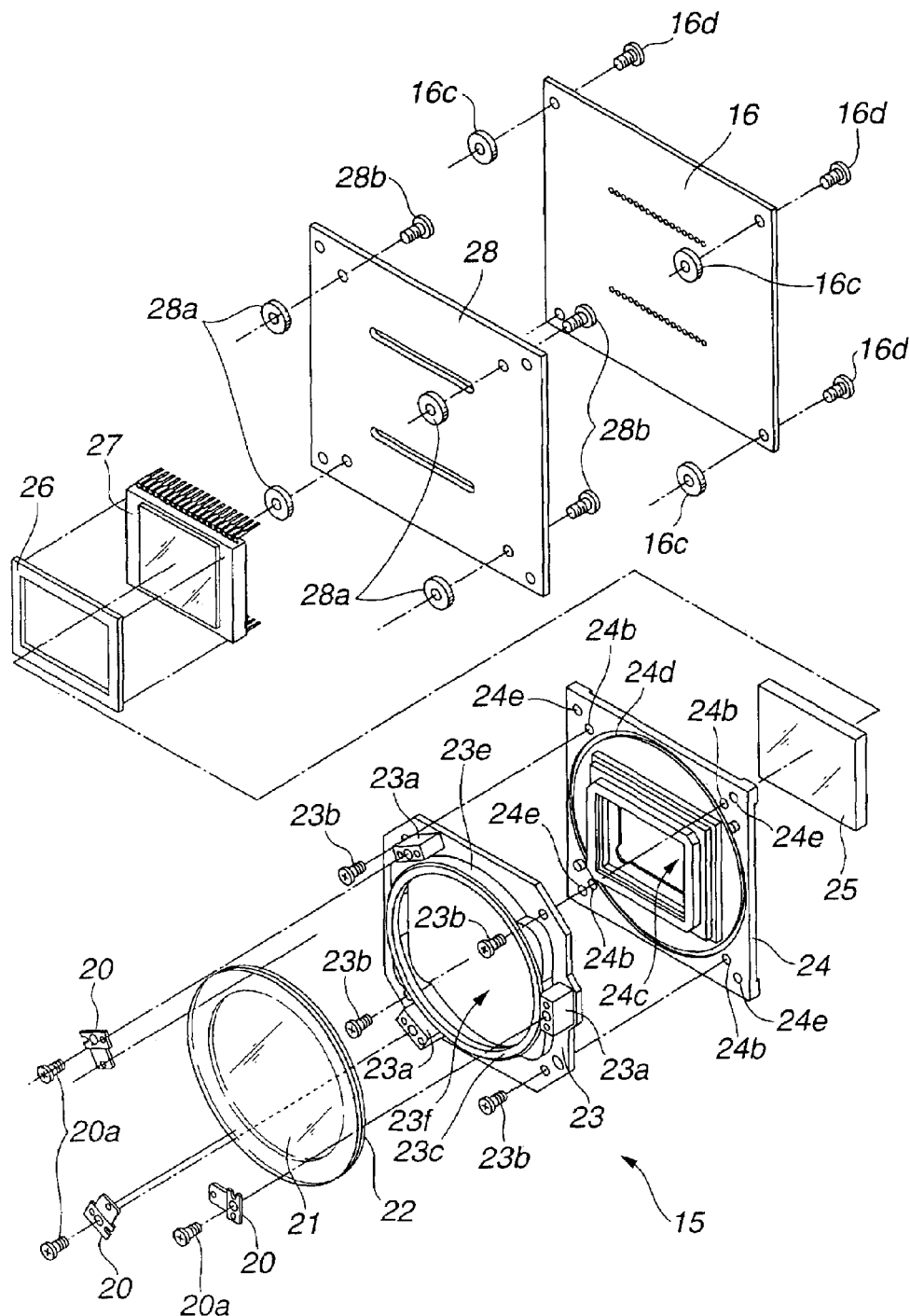
FIG. 3 is a diagram showing by extracting a part of an image pick-up device unit in the camera shown in FIG. 1 and a main-part exploded perspective view showing the disassembled image pick-up device unit.
Figure 4:
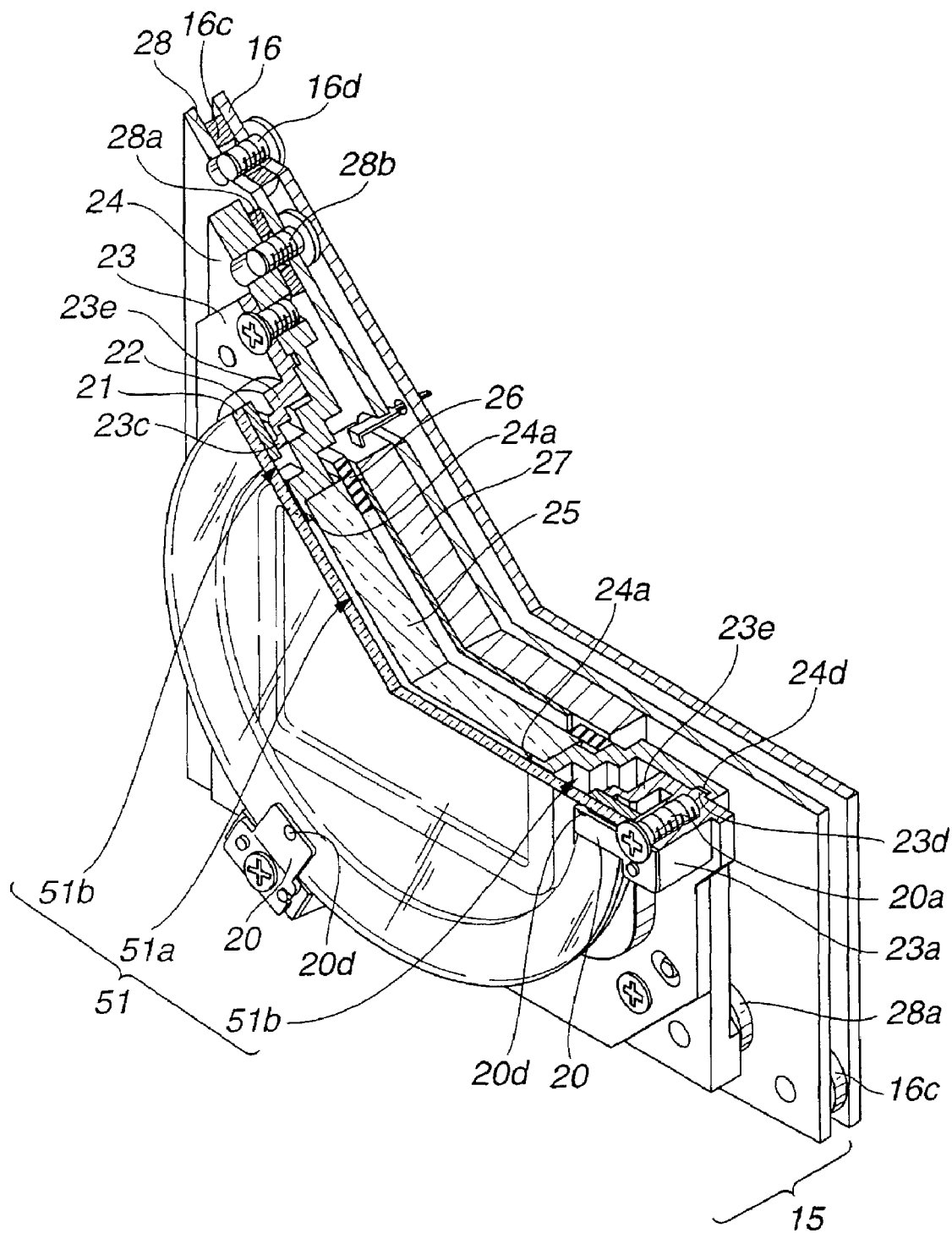
FIG. 4 is a perspective view showing a cut-off part of the assembled image pick-up device unit in the camera shown in FIG. 1.
Figure 5:
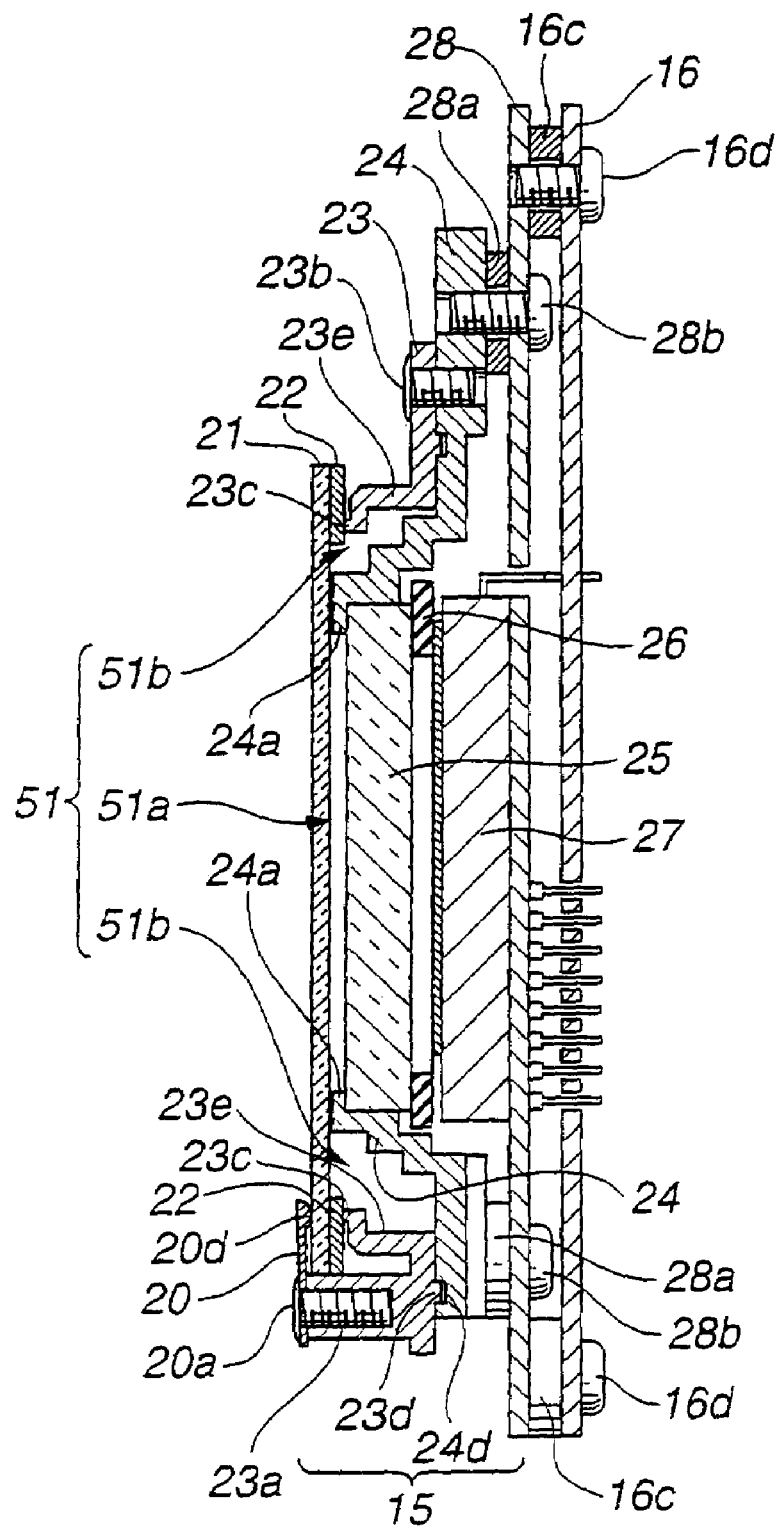
FIG. 5 is a sectional view along a cut-off plane of FIG. 4.

FIGS. 3 to 5 are diagrams showing by extracting a part of the image pick-up device unit in the camera 1 according to the first embodiment. FIG. 3 is a main-part exploded perspective view showing the schematic structure of the disassembled image pick-up device unit. FIG. 4 is a perspective view showing a cut-off part of the assembled image pick-up device unit. FIG. 5 is a sectional view along a cut-off plane.

According to the first embodiment, the image pick-up device unit 15 in the camera 1 is a unit comprising a plurality of members including the shutter unit 14 as mentioned above. However, referring to FIGS. 3 to 5, the main portion is only shown and an illustration of the shutter unit 14 is omitted.

Referring to FIGS. 3 to 5, for the purpose of showing a positional relationship of the members, being the image pick-up device 27 loaded and provided near the image pick-up device unit 15, a main circuit board 16 on which the image pick-up system electrical circuits comprising the image signal processing circuit 16a and the work memory 16b are mounted is illustrated.

The main circuit board 16 is one of main circuit boards generally used in the conventional cameras, and a detailed description thereof is omitted.

The image pick-up device unit 15 comprises: the image pick-up device 27 comprising the CCD and the like, which obtains the image signal corresponding to the light transmitted through the photographing optical system 12a and irradiated to the photoelectrically converting surface thereof; an image pick-up device fixing plate 28 comprising a thin-sheet member for fixing and supporting the image pick-up device 27; an optical low-pass filter (hereinafter, referred to as an optical LPF) 25 arranged on the side of the photoelectrically converting surface of the image pick-up device 27, as an optical device which is formed to remove high frequency components from the subject beams transmitted and irradiated through the photographing optical system 12a; a low-pass filter supporting member 26 provided in the periphery between the optical LPF 25 and the image pick-up device 27, which is made of substantially frame-shaped elastic members; an image pick-up device accommodating case member 24 (a second member which will be described later, hereinafter, referred to as a CCD case 24) which accommodates, fixes, and holds the image pick-up device 27, supports the optical LPF 25 (optical device) in contact with a peripheral portion or an adjacent portion of the optical LPF 25, and which comes into closely contact with a dust-proofing filter supporting member 23 (first member described later) constituting a part of a sealing structure at a predetermined portion; the dust-proofing filter supporting member 23 (first member) which comes into contact with a dust-proofing filter 21 (dust-proofing member) arranged in front of the CCD case 24 at a peripheral portion or an adjacent portion thereof and supports it; the dust-proofing filter 21 as an optical member and a dust-proofing member, opposed and arranged to the front of the optical LPF 25 at a predetermined position having a predetermined interval on the photoelectrically converting surface side of the image pick-up device 27, which is supported by the dust-proofing filter supporting member 23; the piezoelectric element 22 arranged to a surface opposed to the image pick-up device 27 at a peripheral portion of the dust-proofing filter 21, as a member for vibration for applying predetermined vibrations to the dust-proofing filter 21, comprising an electromechanical transducer such as piezoelectric ceramics; a pressing member 20 comprising an elastic member which airtightly joints the dust-proofing filter 21 to the dust-proofing filter supporting member 23, and the like.

The image pick-up device 27 obtains the image signal corresponding to the subject image formed onto the photoelectrically converting surface thereof by receiving the subject beams transmitted through the photographing optical system 12a onto the photoelectrically converting surface thereof and by performing photoelectrically converting processing, and uses, e.g., a CCD (Charge Coupled Device).

The image pick-up device 27 is mounted at a predetermined position on the main circuit board 16 with the image pick-up device fixing plate 28 interposed therebetween. As mentioned above, the image signal processing circuit 16a, the work memory 16b, etc. are mounted on the main circuit board 16 so that an output signal from the image pick-up device 27, that is, the image signal obtained by the photoelectrically converting processing is electrically transmitted to the image signal processing circuit 16a or the like.

The signal processing in the image signal processing circuit 16a includes various signal processing, for example, processing in which the image signal obtained from the image pick-up device 27 is converted, by the photographing optical system 12a held in the lens barrel 12 loaded to the photographing optical system mounting unit 11a, into a signal matching the recording, corresponding to the image formed onto the photoelectrically converting surface of the image pick-up device 27. The above-mentioned signal processing is the same as processing for treating a digital image signal, which is usually performed in the general digital cameras. Therefore, a detailed description of various signal processing which is usually executed in the camera 1 is omitted.

The optical LPF 25 is arranged in front of the image pick-up device 27 via the low-pass filter supporting member 26 interposed. The CCD case 24 is arranged to cover the optical LPF 25.

That is, an opening 24c which is rectangular-shaped is provided substantially in the center for the CCD case 24. The optical LPF 25 and the image pick-up device 27 are arranged from the back side of the opening 24c. Referring to FIGS. 4 and 5, a step portion 24a whose cross section is substantially L-shaped is formed at an inner peripheral portion of the back side of the opening 24c.

As mentioned above, the low-pass filter supporting member 26 made of the elastic member or the like is arranged between the optical LPF 25 and the image pick-up device 27. In the peripheral portion in front of the image pick-up device 27, the low-pass filter supporting member 26 is arranged within a valid range of the photoelectrically converting surface, in other words, at a position for evacuating the valid beams incident on the image pick-up device 27, and is abutted onto an adjacent portion of the periphery behind the optical LPF 25. The airtightness is substantially held between the optical LPF 25 and the image pick-up device 27. Thus, elastic force generated by the low-pass filter supporting member 26 acts to the optical LPF 25 in the optical axis direction.

Then, the peripheral portion in front of the optical LPF 25 airtightly comes into contact with the step portion 24a of the CCD case 24. Thus, the position of the optical LPF 25 in the optical axis direction is regulated against the elastic force which is generated by the low-pass filter supporting member 26 and which displaces the optical LPF 25 in the optical axis direction.

In other words, the optical LPF 25 inserted from the back side in the opening 24c of the CCD case 24 is subjected to the position regulation in the optical direction by using the step portion 24a. Consequently, it is possible to prevent the optical LPF 25 from breaking away from the inside of the CCD case 24 to the front side.

As mentioned above, after inserting the optical LPF 25 in the opening 24c of the CCD case 24 from the back side, the image pick-up device 27 is arranged on the back side of the optical LPF 25. In this case, the low-pass filter supporting member 26 is sandwiched between the optical LPF 25 and the image pick-up device 27 in the peripheral portion of the low-pass filter supporting member 26.

As mentioned above, the image pick-up device 27 is mounted on the main circuit board 16 via the image pick-up device fixing plate 28 interposed. The image pick-up device fixing plate 28 is fixed to a screw hole 24e from the back of the CCD case 24 via a spacer 28a interposed by a screw 28b. The main circuit board 16 is fixed to the image pick-up device fixing plate 28 via a spacer 16c interposed by a screw 16d.

In front of the CCD case 24, the dust-proofing filter supporting member 23 is fixed to the screw hole 24b of the CCD case 24 by a screw 23b. In this case, a circumferential groove 24d is substantially annularly formed at a predetermined position in front of the CCD case 24 in the peripheral side thereof, as will be described in detail in FIGS. 4 and 5. On the other hand, at a predetermined position on the back and the peripheral side of the dust-proofing filter supporting member 23, an annular convex portion 23d (not shown in FIG. 3) corresponding to the circumferential groove 24d of the CCD 24 is formed throughout the circumference with a substantially annular shape. By fitting the annular convex portion 23d to the circumferential groove 24d, the CCD case 24 is airtightly fit to the dust-proofing filter supporting member 23 in an annular area, that is, in an area in which the circumferential groove 24d and the annular convex portion 23d are formed.

The dust-proofing filter 21 is circularly or polygonally plate-shaped as a whole, and at least an area having a predetermined spread in a radial direction from the center of the dust-proofing filter 21 forms a transparent portion. The transparent portion is opposed and arranged to the front of the optical LPF 25 at a predetermined interval. The transparent portion is formed such that the valid beams incident on the photoelectrically converting surface of the image pick-up device 27 from the photographing optical system 12a (photographing lens) can be transmitted.

At a peripheral portion of one surface (back surface according to the first embodiment) of the dust-proofing filter 21, integrally therewith, the piezoelectric element 22 formed annularly and including an electromechanical transducer and the like, is integrally arranged therewith as a predetermined member for vibration for applying the vibrations to the dust-proofing filter 21, by means of adhesion using an adhesive. The piezoelectric element 22 is constituted so as to generate predetermined vibrations in the dust-proofing filter 21 by applying a predetermined driving voltage from the outside.

The dust-proofing filter 21 is fixed and held by the pressing member 20 made of the elastic member such as a plate-shaped spring so as to airtightly joint to the dust-proofing filter supporting member 23.

A circular or polygonal opening 23f is provided substantially in the center of the dust-proofing filter supporting member 23. Through the opening 23f, the subject beams which are transmitted through the photographing optical system 12a pass, and the opening 23f has a size large enough to irradiate the photoelectrically converting surface of the image pick-up device 27 at the back.

A wall portion 23e (refer to FIGS. 4 and 5) projecting in front is annularly formed at a peripheral portion of the opening 23f. Further, a supporting portion 23c is formed so that it projects towards the front side at the edge of the wall portion 23e.

A plurality of projecting portions 23a (three projecting portions according to the first embodiment) with an almost rectangular shape are formed to project toward the front side, near an outer peripheral portion in front of the dust-proofing filter supporting member 23. The projecting portion 23a is a portion formed to fix the pressing member 20 for fixing and holding the dust-proofing filter 21. The pressing member 20 is fixed by fastening means such as a fixing screw 20a to the edge of the projecting portions 23a. That is, the projecting portion 23a is a supporting member for attaching the pressing member 20.

The pressing member 20 is a member made of the elastic member such as a plate spring, and a base end portion of the pressing member 20 is fixed to the projecting portions 23a. Further, a free end portion thereof is abutted on an outer peripheral portion of the dust-proofing filter 21, thereby pressing the dust-proofing filter 21 toward the side of the dust-proofing filter supporting member 23, that is, in the optical axis direction.

In this case, a predetermined portion of the piezoelectric element 22 arranged at the outer peripheral portion at the back of the dust-proofing filter 21 is abutted to the supporting portion 23c, thereby regulating the positions of the dust-proofing filter 21 and the piezoelectric element 22 in the optical axis direction. Therefore, the dust-proofing filter 21 is fixed and held to airtightly come into contact with the dust-proofing filter supporting member 23 with the piezoelectric element 22 interposed therebetween.

In other words, the dust-proofing filter supporting member 23 is airtightly jointed to the dust-proofing filter 21 via the interposed piezoelectric element 22 by a pressing force generated by the pressing member 20.

As mentioned above, with respect to the dust-proofing filter supporting member 23 and the CCD case 24, the circumferential groove 24d and the annular convex portion 23d (refer to FIGS. 4 and 5) are airtightly fixed. Further, the dust-proofing filter supporting member 23 is airtightly jointed to the dust-proofing filter 21 via the piezoelectric element 22 interposed by the pressing force generated by the pressing member 20.

The optical LPF 25 arranged to the CCD case 24 is airtightly arranged between the peripheral portion in front of the optical LPF 25 and the step portion 24a of the CCD case 24. Further, the image pick-up device 27 is arranged at the back of the optical LPF 25 via the low-pass filter supporting member 26 interposed. The airtightness is substantially held between the optical LPF 25 and the image pick-up device 27.

Therefore, in a space formed by opposing the optical LPF 25 and the dust-proofing filter 21, a predetermined void portion 51a is formed. A space portion 51b is formed at the peripheral side of the optical LPF 25, that is, formed by the CCD case 24, the dust-proofing filter supporting member 23, and the dust-proofing filter 21. The space portion 51b is a sealed space formed to project toward the outside of the optical LPF 25 (refer to FIGS. 4 and 5). Further, the space portion 51b is set to be wider than the void portion 51a. A space containing the void portion 51a and the space portion 51b constitutes a sealing space 51 which is substantially airtightly sealed by the CCD case 24, the dust-proofing filter supporting member 23, the dust-proofing filter 21, and the optical LPF 25 as mentioned above.

As mentioned above, according to the first embodiment, the image pick-up device unit 15 in the camera is constituted by the sealing structure forming the sealing space 51 which includes the void portion 51a and substantially sealed and the sealing structure is formed in the periphery of the optical LPF 25 and the dust-proofing filter 21.

According to the first embodiment, the sealing structure further comprises the dust-proofing filter supporting member 23 as the first member for supporting the dust-proofing filter 21 in contact with the peripheral portion or the adjacent portion thereof, and the CCD case 24 as the second member which supports the optical LPF 25 in contact with area of the peripheral portion or the adjacent portion thereof and which is arranged airtightly in contact with the dust-proofing filter supporting member 23 (first member) at the predetermined portion of the CCD case 24.

According to the first embodiment, in the camera with the above-mentioned structure, the dust-proofing filter 21 is opposed at a predetermined position to the front of the image pick-up device 27, and the sealing space 51 at the periphery of the photoelectrically converting surface of the image pick-up device 27 and the dust-proofing filter 21 is sealed. Consequently, the adhesion of dust, etc. to the photoelectrically converting surface of the image pick-up device 27 is prevented.

By applying a periodic voltage to the piezoelectric element 22 arranged integrally with the periphery portion of the dust-proofing filter 21 and by applying predetermined vibrations to the dust-proofing filter 21, dust and the like to be adhered to the exposure surface in front of the dust-proofing filter 21 are removed.

Figure 6:
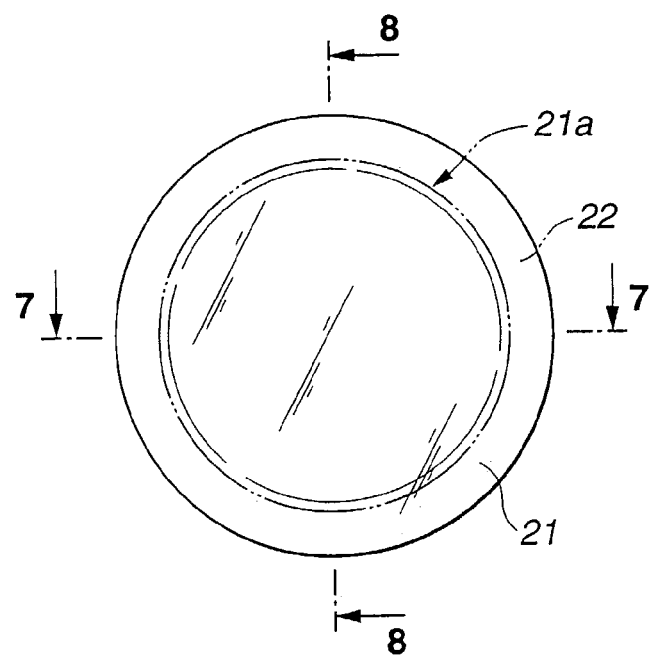
FIG. 6 is a front view showing only a dust-proofing filter and a piezoelectric element integrated to the dust-proofing filter in the image pick-up device unit in the camera shown in FIG. 1.
Figure 7:
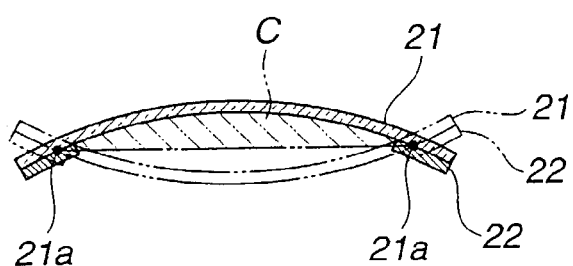
FIG. 7 is a sectional view along a cut-off line 7—7 shown in FIG. 6, showing the change in status of the dust-proofing filter and the piezoelectric element upon applying a voltage to the piezoelectric element shown in FIG. 6.
Figure 8:
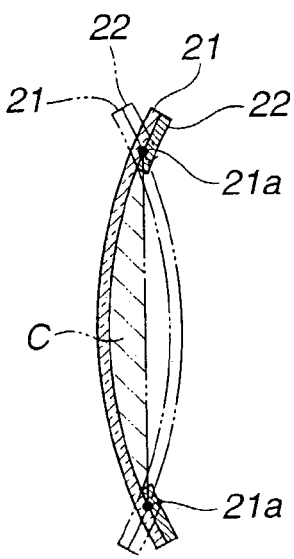
FIG. 8 is a sectional view along a cut-off line 8—8 shown in FIG. 6, showing the change in status of the dust-proofing filter and the piezoelectric element upon applying the voltage to the piezoelectric element shown in FIG. 6.

FIG. 6 is a front view showing by extracting only the dust-proofing filter 21 and the piezoelectric element 22 arranged integrally therewith in the image pick-up device unit 15 in the camera 1. FIGS. 7 and 8 shows the change in status of the dust-proofing filter 21 and the piezoelectric element 22 upon applying the driving voltage to the piezoelectric element 22 shown in FIG. 6, in which FIG. 7 is a sectional view along a line 7—7 shown in FIG. 6, and FIG. 8 is a sectional view along a line 8—8 shown in FIG. 6.

When a negative (−) voltage is applied to the piezoelectric element 22, the dust-proofing filter 21 is modified as shown by a solid line in FIGS. 7 and 8. On the other hand, when a positive (+) voltage is applied to the piezoelectric element 22, the dust-proofing filter 21 is modified as shown by a dotted line in FIGS. 7 and 8.

In this case, the amplitude is substantially equal to zero at a node position of the vibration as shown by reference symbols 21a shown in FIGS. 6 to 8. Thus, the supporting portion 23c of the dust-proofing filter supporting member 23 is abutted to a portion corresponding to the node 21a. Consequently, the dust-proofing filter 21 is efficiently supported without reducing the vibrations.

In this status, the CPU 41 controls the dust-proofing filter driving unit 48 (refer to FIG. 2) at a predetermined timing and applies the periodic voltage to the piezoelectric element 22, thereby vibrating the dust-proofing filter 21. Thus, it is possible to remove the dust and the like which are adhered to the surface of the dust-proofing filter 21.

A resonant frequency in this case is determined depending on the plate thickness, the material, and the shape of the dust-proofing filter 21. In one example shown in FIGS. 6 to 8, a first-degree vibration is generated and the present invention is not limited to this. However, a high-degree vibration may be generated.

Figure 9:
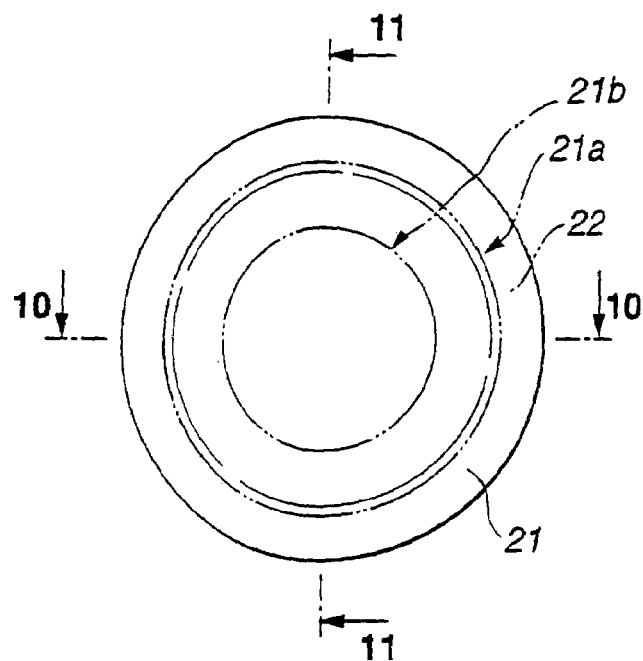
FIG. 9 is a front view showing by extracting only the dust-proofing filter and the picked-up piezoelectric element integrated to the dust-proofing filter in the image pick-up device unit in the camera shown in FIG. 1.
Figure 10:
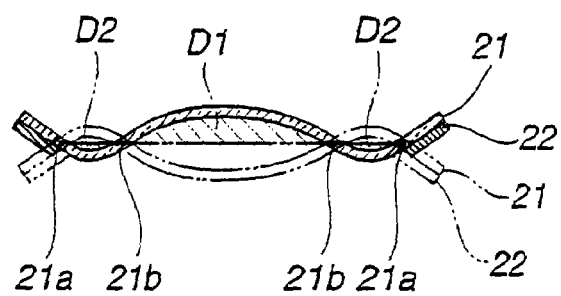
FIG. 10 is a sectional view along a cut-off line 10—10 shown in FIG. 9, showing another example of the change in status in the dust-proofing filter and the piezoelectric element upon applying the voltage to the piezoelectric element shown in FIG. 9.
Figure 11:
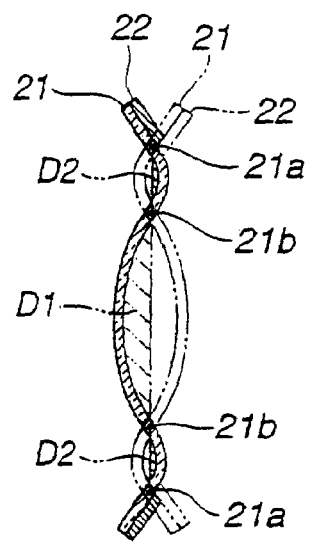
FIG. 11 is a sectional view along a cut-off line 11—11 shown in FIG. 9, showing another example of the change in status of the dust-proofing filter and the piezoelectric element upon applying the voltage to the piezoelectric element shown in FIG. 9.

In another example shown in FIGS. 9 to 11, a second-degree vibration is generated to the dust-proofing filter with the same structure as that in the one example shown in FIGS. 6 to 8.

In this case, FIG. 9 is a front view showing by extracting only the dust-proofing filter 21 and the piezoelectric element 22 integrally arranged to the dust-proofing filter 21 in the image pick-up device unit 15 in the camera 1, similarly to the example shown in FIG. 6. FIGS. 10 and 11 show the change in status of the dust-proofing filter 21 and the piezoelectric element 22 when the voltage is applied to the piezoelectric element 22 shown in FIG. 9, in which FIG. 10 is a sectional view along a line 10—10 shown in FIG. 9, and FIG. 11 is a sectional view along a line 11—11 shown in FIG. 9.

Herein, when a negative (−) voltage is applied to the piezoelectric element 22, the dust-proofing filter 21 is modified as shown by a solid line in FIGS. 10 and 11. On the other hand, when a positive (+) voltage is applied to the piezoelectric element 22, the dust-proofing filter 21 is modified as shown by a dotted line in FIGS. 10 and 11.

In this case, as shown by reference symbols 21a and 21b shown in FIGS. 9 to 11, the vibration has a two pairs of nodes. By setting the supporting portion 23c of the dust-proofing filter supporting member 23 such that it is abutted to a portion corresponding to the joint 21a, the dust-proofing filter 21 is efficiently supported without reducing the vibration similarly to the above-described example shown in FIGS. 6 to 8.

In this status, the CPU 41 controls the dust-proofing filter driving unit 48 (refer to FIG. 2) at a predetermined timing and applies the periodic voltage to the piezoelectric element 22, thereby vibrating the dust-proofing filter 21. Thus, it is possible to remove dust and the like which are adhered to the surface of the dust-proofing filter 21.

When a first-degree vibration is generated as shown in FIGS. 6 to 8, in the sealing space 51, the amplitude of the dust-proofing filter 21 generates the change in volume shown by a reference symbol C. As shown in FIGS. 9 to 11, when a second-degree vibration is generated, the change in volume in the sealing space 51 generated by the amplitude of the dust-proofing filter 21 is obtained by subtracting an area shown by a reference symbol D2×2 from an area shown by a reference symbol D1, that is, $$D1-(D2\times 2).$$

The smaller the change in volume to the sealing space 51 is, the smaller the change in inner pressure in the sealing space 51 is. Therefore, it will be understood that, the smaller the change in volume of the sealing space 51 is, the more efficient vibration can be obtained. Thus, in view of the efficiency of the electromechanical transducing, it is preferable to set the generated vibration to a high-degree vibration mode.

As mentioned above, according to the first embodiment, the sealing structure for sealing the space portion 51b at the peripheral side of the optical LPF 25 and the dust-proofing filter 21 is provided outside from the peripheral or the adjacent portion of the optical LPF 25 so as to form the sealing space 51 which is substantially sealed and includes the void portion 51a formed by opposing the optical LPF 25 (optical device) and the dust-proofing filter 21 (dust-proofing member). Therefore, in the case of ensuring a predetermined volume of the space portion, a gap between the optical LPF 25 (optical device) and the dust-proofing filter 21 (dust-proofing member) can be set to be short.

In general, if the gap between the optical LPF 25 (optical device) and the dust-proofing filter 21 (dust-proofing member) is set to be short, the volume of the void portion 51a is small. Thus, it is well known that the piezoelectric element 22 (member for vibration) causes the inner pressure of the sealing space 51 to be increased upon applying the vibrations to the dust-proofing filter 21. However, when the inner pressure of the sealing space 51 is high, the vibration of the dust-proofing filter 21 generated by the piezoelectric element 22 tends to be reduced.

On the other hand, if the gap between the optical LPF 25 (optical device) and the dust-proofing filter 21 (dust-proofing member) is set to be long, the dimension of the image pick-up device unit 15 in the optical axis direction is also increased. This causes an obstruction against making a small size of the camera 1 in the optical axis direction.

According to the first embodiment, it is possible to suppress the increase in dimension of the image pick-up device unit 15 in the optical axis direction without reducing the vibrations of the dust-proofing filter 21 generated by the piezoelectric element 22 while sufficiently assuring the volume of the sealing space 51, by providing the space portion 51b outside from the peripheral portion or the adjacent portion of the optical LPF 25. Therefore, easily, the above-described arrangement of the space portion 51b contributes to making a compact size of the camera 1 in the optical axis direction.

According to the first embodiment, in the camera 1, the dust-proofing filter supporting member 23 and the CCD case 24 are formed independently, and they almost airtightly fit to each other. However, the present invention is not limited to this. For example, the dust-proofing filter supporting member 23 and the CCD case 24 may integrally be formed as one member. A second embodiment of the present invention, which will be described hereinbelow, is described as an example thereof.

That is, the structure according to the second embodiment of the present invention is substantially the same as that according to the first embodiment. Unlike the structure of the first embodiment, in place of the dust-proofing filter supporting member (23) as the first member and the CCD case (24) as the second member according to the first embodiment, a member formed by integrating the first member and the second member is applied according to the second embodiment. Therefore, the same structure as that according to the first embodiment is not described in detail and are designated by the same reference numerals. The structure of the entire camera is not illustrated and is referred to FIGS. 1 and 2.

Figure 12:
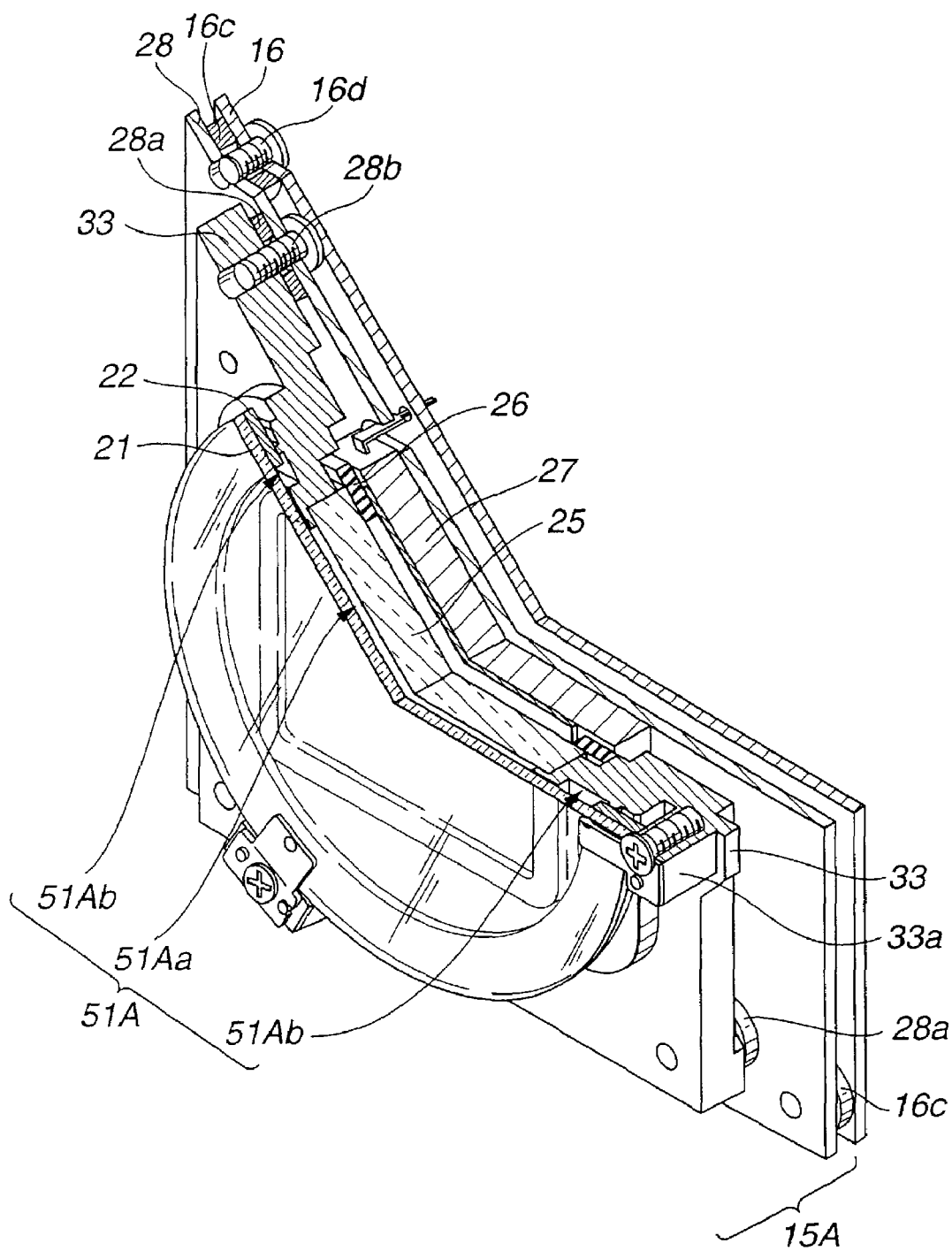
FIG. 12 is a view showing by extracting a part of an image pick-up device unit in a camera according to a second embodiment of the present invention, and is a perspective view showing a cut-off part of the assembled image pick-up device unit.
Figure 13:
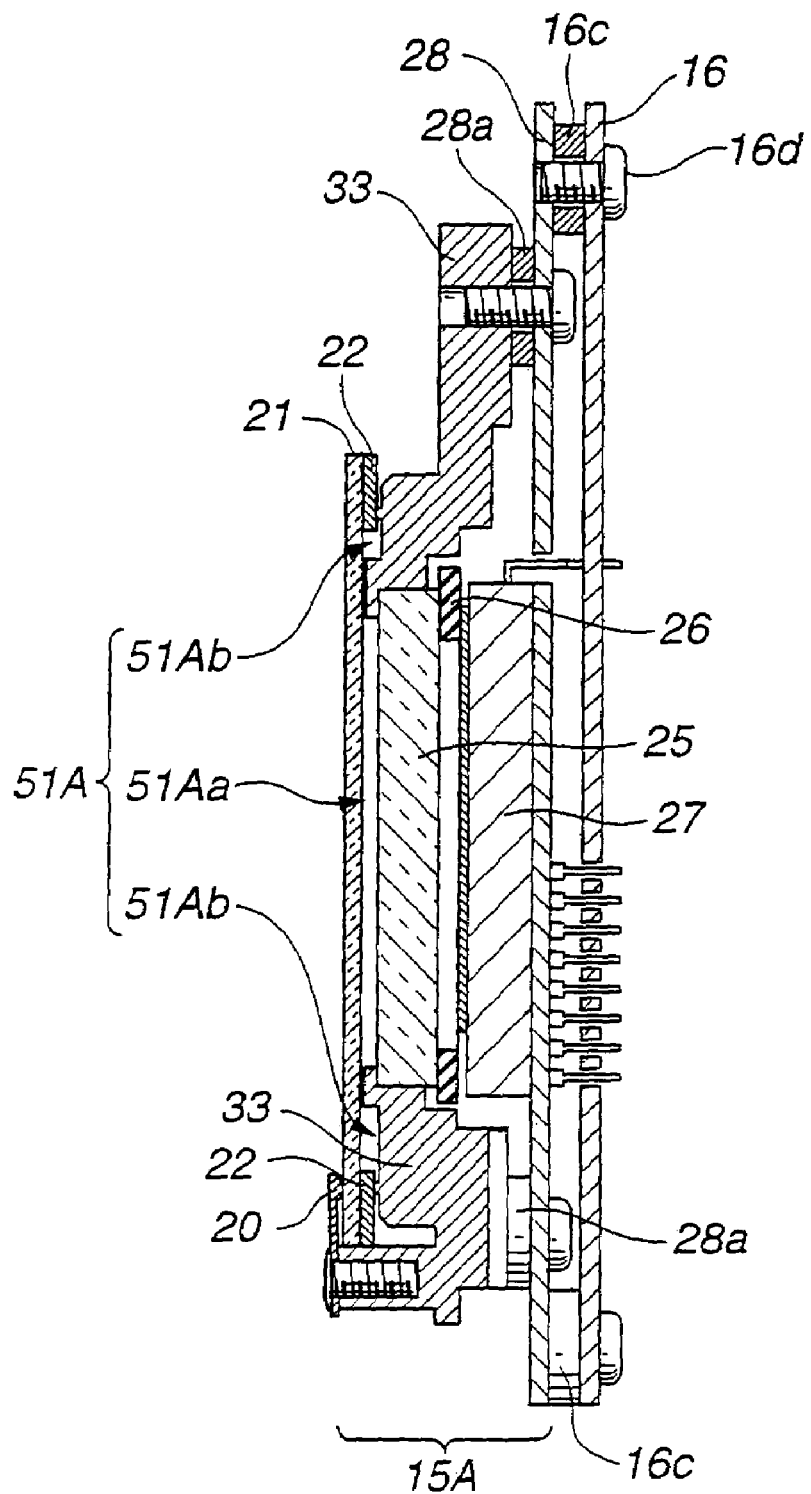
FIG. 13 is a sectional view along a cut-off plane shown in FIG. 12.

FIGS. 12 and 13 are diagrams showing by extracting a part of an image pick-up device unit in a camera according to the second embodiment of the present invention. FIG. 12 is a perspective view showing a cut-off part of the assembled image pick-up device unit, corresponding to FIG. 4 according to the first embodiment. FIG. 13 is a sectional view along a cut-off plane shown in FIG. 12, corresponding to FIG. 5 according to the first embodiment.

Referring to FIGS. 12 and 13, similarly to FIGS. 4 and 5 according to the first embodiment, only a main portion of an image pick-up device unit 15A is extracted to illustrate and the shutter unit (14) is not shown. For the purpose of showing the positional relationship of the members, the main circuit board 16 is shown together.

As mentioned above, in the image pick-up device unit 15A according to the second embodiment, in place the dust-proofing filter supporting member (23; first member) and the CCD case (24; second member) according to the first embodiment, the member formed by integrating the first member and the second member, that is, a dust-proofing filter supporting and CCD case 33 (hereinafter, briefly referred to as a CCD case) 33 is arranged.

The CCD case 33 integrally includes a first portion and a second portion. That is, the first portion functions as the dust-proofing filter supporting unit for supporting the dust-proofing filter 21 in contact with the peripheral portion or the adjacent portion of the dust-proofing filter 21. The second portion functions as the image pick-up device accommodating case unit for accommodating, fixing, and holding the image pick-up device 27 and for supporting the optical LPF 25 in contact with the peripheral portion or the adjacent portion of the optical LPF 25. Thus, the sealing structure is formed.

In the image pick-up device unit 15A of the camera according to the second embodiment, the sealing structure is formed as follows.

That is, a predetermined void portion 51Aa is formed in a space formed by opposing the optical LPF 25 and the dust-proofing filter 21. On the peripheral side of the optical LPF 25, a space portion 51Ab is formed by the CCD case 33 and the dust-proofing filter 21 to be extended towards the outside of the optical LPF 25. The space portion 51Ab is set to be wider than the void portion 51Aa. A space containing the void portion 51Aa and the space portion 51Ab corresponds to a sealing space 51A which is substantially airtightly sealed by the CCD case 33, the dust-proofing filter 21, and the optical LPF 25.

As mentioned above, in the image pick-up device unit 15A in the camera according to the second embodiment, the sealing structure includes the sealing space 51A which is formed at the periphery of the optical LPF 25 and the dust-proofing filter 21 and which is substantially sealed, including the void portion 51Aa. The sealing structure is provided at the position outside the periphery or the adjacent portion of the optical LPF 25.

Further, according to the second embodiment, the sealing structure includes the CCD case 33. The CCD case 33 integrally includes the first portion for supporting the dust-proofing filter 21 in contact with the peripheral portion or the adjacent portion of the dust-proofing filter 21 and the second portion for supporting the optical LPF 25 in contact with the peripheral portion or the adjacent portion of the optical LPF 25.

Other structures are the same as those according to the first embodiment. The same advantages as those according to the first embodiment are obtained upon removing dust and the like adhered to the surface of the dust-proofing filter 21 by applying the vibrations to the dust-proofing filter 21 by using the piezoelectric element 22.

As mentioned above, according to the second embodiment, the same advantages as those according to the first embodiment are obtained.

Simultaneously, according to the second embodiment, the sealing structure is simplified and the number of parts is reduced because the sealing structure integrally includes the first portion functioning as the dust-proofing filter supporting unit for supporting the dust-proofing filter 21 in contact with the peripheral portion or the adjacent portion of the dust-proofing filter 21 and the second portion functioning as the image pick-up device accommodating case unit for accommodating, fixing, and holding the image pick-up device 27 and for supporting the optical LPF 25 in contact with the peripheral portion and the adjacent portion of the optical LPF 25. Further, the above-mentioned sealing structure contributes to the reduction in manufacturing costs and the simplification in manufacturing processes.

The camera according to the first embodiment has the optical low-pass filter (optical LPF; optical device). However, the present invention is not limited to this and can be applied to an image pick-up device unit in a camera having no optical LPF.

In the case of a digital camera using a numerous-pixel type image pick-up device in which the number of valid pixels (the number of pixels used for formation of image data) of the image pick-up device exceeds the resolution of the lens, the image pick-up device unit is formed by excluding the optical LPF in front of the image pick-up device. The present invention can easily be applied in the above-mentioned case. According to a third embodiment, an example will be described hereinbelow.

In other words, the structure according to the third embodiment is substantially the same as that according to the second embodiment. Unlike the second embodiment, the optical LPF (25) according to the second embodiment is excluded and a CCD case 34 for supporting the dust-proofing filter 21 and for fixing and holding the image pick-up device 27 and the optical LPF (25) is used in place of the CCD case (33) for fixing and holding the image pick-up device 27 and the optical LPF (25). Other structures are the same as those according to the second embodiment. Therefore, the same structure as that according to the second embodiment is designated by the same reference numeral and is not described in detail. The structure of the entire camera is not illustrated similarly to the second embodiment and is referred to in FIGS. 1 and 2 using for the description of the first embodiment.

Figure 14:
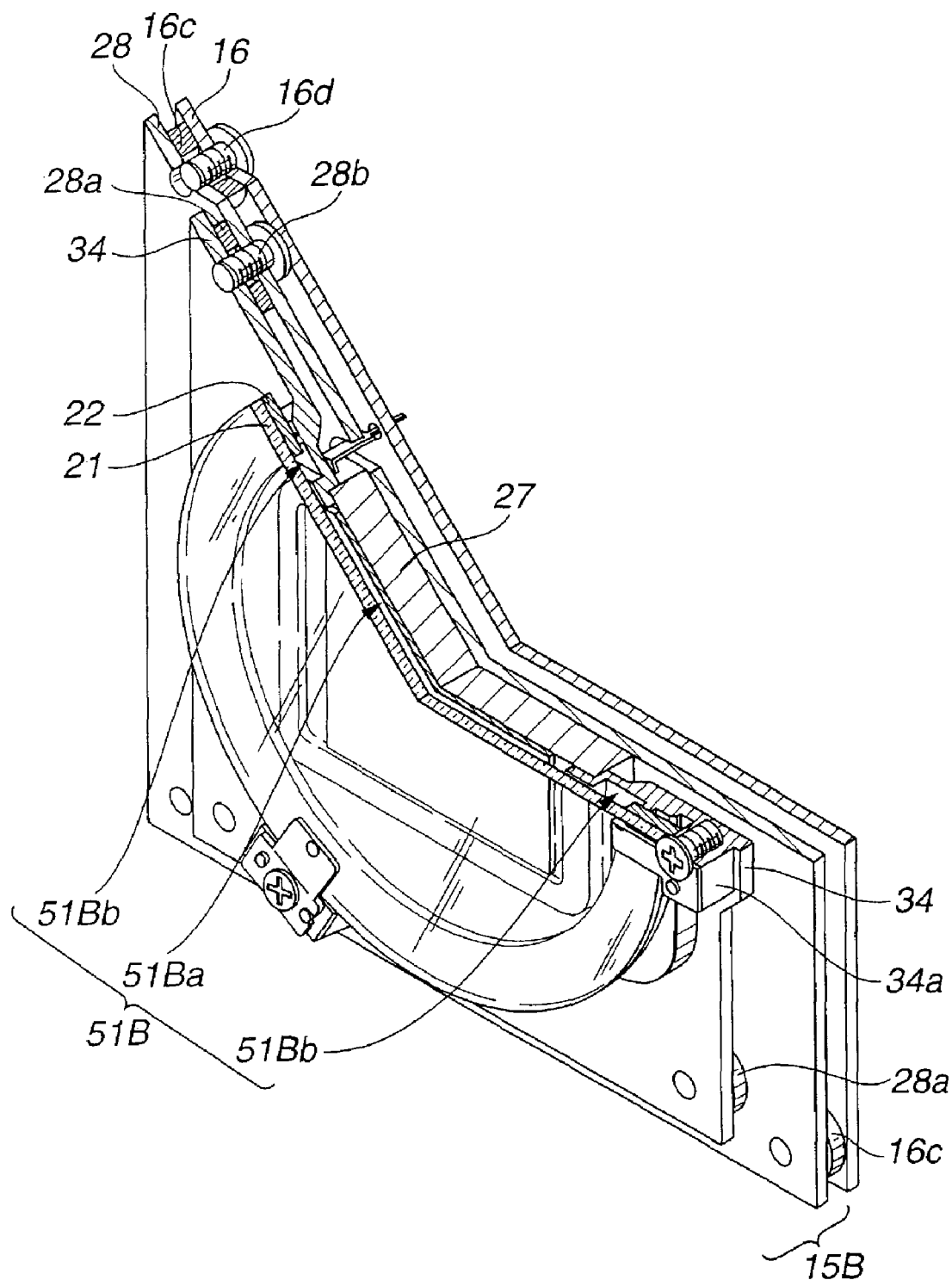
FIG. 14 is a diagram showing by extracting a part of an image pick-up device unit in a camera according to a third embodiment of the present invention, and is a perspective view showing a cut-off part of the assembled image pick-up device unit.
Figure 15:
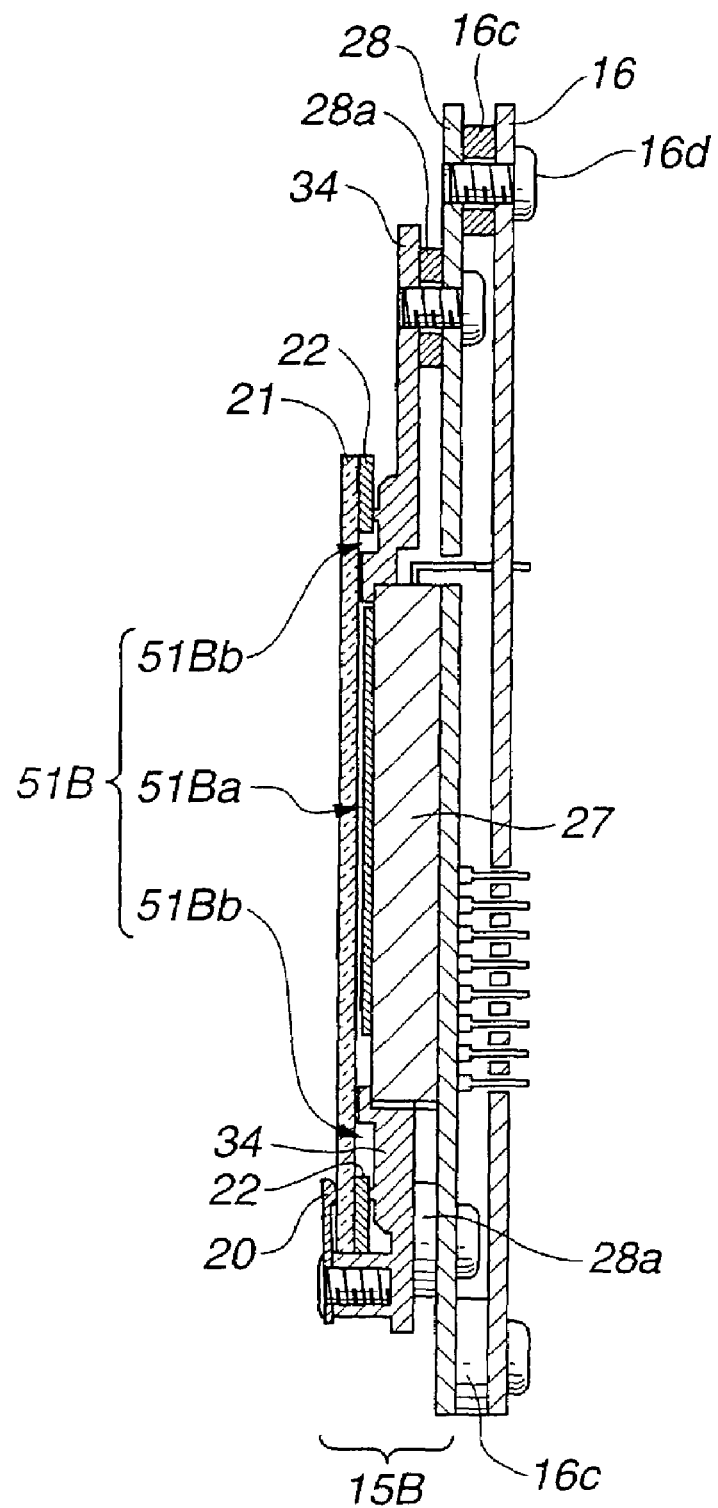
FIG. 15 is a sectional view along a cut-off plane shown in FIG. 14.

FIGS. 14 and 15 are diagrams showing by extracting a part of the image pick-up device unit in the camera according to the third embodiment of the present invention. FIG. 14 is a perspective view showing a cut-off part of the assembled image pick-up device unit, corresponding to FIG. 4 according to the first embodiment or to FIG. 12 according to the second embodiment. FIG. 15 is a sectional view along a cut-off plane shown in FIG. 14, corresponding to FIG. 5 according to the first embodiment or to FIG. 13 according to the second embodiment.

Referring to FIGS. 14 and 15, similarly to FIGS. 4 and 5 according to the first embodiment and FIGS. 12 and 13 according to the second embodiment, only a main portion of an image pick-up device unit 15B is extracted to be shown and the shutter unit (14) is not shown. Similarly, the main circuit board 16 is illustrated for the purpose of showing the positional relationship of the members.

As mentioned above, according to the third embodiment, the image pick-up device unit 15B is formed by excluding the optical LPF 25 in the camera 1 according to the first embodiment. Further, similarly to the second embodiment, the image pick-up device unit 15B comprises a dust-proofing filter supporting and CCD case (hereinafter, simply referred to a CCD case) 34, as a member formed by integrating the dust-proofing filter supporting member (23; first member) and the CCD case (24; second member) according to the first embodiment, without using both of the members.

The CCD case 34 integrally includes a first portion and a second portion. That is, the first portion functions as the dust-proofing filter supporting unit for supporting the dust-proofing filter 21 in contact with the peripheral portion or the adjacent portion of the dust-proofing filter 21. The second portion functions as the image pick-up device accommodating case unit for supporting the photoelectrically converting surface of the image pick-up device 27 in contact with the peripheral portion or the adjacent portion of the image pick-up device 27. Thus, the sealing structure is formed.

The sealing structure in the image pick-up device unit 15B in the camera is structured as follows according to the third embodiment.

That is, a predetermined void portion 51Ba is formed in a space formed by opposing the photoelectrically converting surface of the image pick-up device 27 and the dust-proofing filter 21. A space portion 51Bb includes the CCD case 34 and the dust-proofing filter 21, extending to the outside of the photoelectrically converting surface on the peripheral side of the photoelectrically converting surface of the image pick-up device 27. The space portion 51Bb is set to be wider than the void portion 51Ba. A space containing the void portion 51Ba and the space portion 51Bb forms a sealing space 51B which is substantially airtightly sealed by the CCD case 34, the dust-proofing filter 21, and the image pick-up device 27.

As mentioned above, in the image pick-up device unit 15B in the camera according to the third embodiment, the sealing structure includes the sealing space 51B which is formed at the photoelectrically converting surface of the image pick-up device 27 and at the periphery of the dust-proofing filter 21, which contains the void portion 51Ba, and which is substantially sealed. The sealing structure is provided at the position outside the periphery or adjacent portion of the photoelectrically converting surface of the image pick-up device 27.

Further, according to the third embodiment, the sealing structure includes the CCD case 34 which is formed by integrating the first portion and the second portion. That is, the first portion supports the dust-proofing filter 21 in contact with the peripheral or the adjacent portion thereof. The second portion supports the photoelectrically converting surface of the image pick-up device 27 in contact with the peripheral or the adjacent portion thereof.

According to the third embodiment, the image pick-up device unit 15B is formed by excluding the optical device as mentioned above. Therefore, the dust-proofing filter 21 has a transparent portion which is arranged and opposed to the photoelectrically converting surface of the image pick-up device 27 in front thereof at a predetermined interval.

Other structures are the same as those according to the first and second embodiments. The piezoelectric element 22 applies the vibrations to the dust-proofing filter 21, thereby obtaining the same advantages as those according to the first and second embodiments upon removing dust and the like which are adhered to the surface of the dust-proofing filter 21.

As mentioned above, according to the third embodiment, the same advantages as those according to the second embodiment are obtained in a camera which applies the image pick-up device unit excluding the optical LPF 25.

Namely, according to the third embodiment, the above-mentioned sealing structure integrally comprises the first portion and the second portion. The first portion functions as the dust-proofing filter supporting unit for supporting the dust-proofing filter 21 in contact with the peripheral or the adjacent portion thereof and the second portion functions as the image pick-up device accommodating case unit for supporting the photoelectrically converting surface of the image pick-up device 27 in contact with the peripheral or the adjacent portion thereof. Advantageously, the sealing structure is simplified and the number of members is reduced. Further, advantageously, the manufacturing process is simplified and the manufacturing cost is reduced.

According to the third embodiment, as an example, the camera is formed by excluding the low-pass filter (optical LPF; optical device) according to the first embodiment and the sealing structure comprises the CCD case (34) which integrally includes the first portion for supporting the dust-proofing filter 21 and the second portion for supporting the image pick-up device 27. However, the present invention is not limited to the example and, in the image pick-up device unit of the camera having no optical LPF, the dust-proofing filter supporting member (23) and the CCD case (24) are independently formed similarly to the first embodiment and they further are airtightly fit to each other. Next, an example of the foregoing will be described according to the fourth embodiment of the present invention.

In other words, the structure according to the fourth embodiment is substantially the same as that according to the first embodiment. However, unlike the first embodiment, the optical LPF (25) according to the first embodiment is excluded and the sealing structure includes the dust-proofing filter supporting member (23) as the first member for supporting the dust-proofing filter (21) corresponding to the removal of the optical LPF (25) in contact with the peripheral or the adjacent portion of the dust-proofing filter (21) and the CCD case (24) as the second member for supporting the image pick-up device (27) at the peripheral or the adjacent portion of the photoelectrically converting surface thereof. Therefore, the same structure as that according to the first embodiment is referred to the drawings used for the description of the first embodiment.

In this case, the sealing structure has the space portion (51*b*) extending to the outside of the photoelectrically converting surface of the image pick-up device 27, and the space portion (51*b*) is wider than the space containing the air gap portion (51*a*) formed by opposing the dust-proofing filter (21) and the image pick-up device (27), similarly to the third embodiment.

As mentioned above, according to the fourth embodiment, the same advantages as those according to the first to third embodiment are obtained.

On the other hand, in the camera according to the first embodiment, the dust-proofing filter supporting member 23 and the dust-proofing filter 21 are airtightly jointed via the piezoelectric element 22 interposed by using the pressing force of the pressing member 20 as the elastic member. However, means for airtightly jointing the dust-proofing filter supporting member 23 and the dust-proofing filter 21 is not limited to the above example. For example, in place of the pressing member 20 (elastic member), the dust-proofing filter and the dust-proofing filter supporting member may be jointed by using adhesion force which is generated by the adhesive. A fifth embodiment of the present invention described in the following is the example.

According to the fifth embodiment of the present invention, basically, the structure is substantially the same as that of the first embodiment. However, unlike the structure according to the first embodiment, in place of the pressing member 20 according to the first embodiment, the dust-proofing filter 21 and the dust-proofing filter supporting member 23 are airtightly jointed via the piezoelectric element 22 interposed by using the adhesive. In accordance therewith, the dust-proofing filter supporting member is different from that according to the first embodiment. Therefore, the same structure as that according to the first embodiment is designated by the same reference numeral and is not described in detail. The structure of the entire camera is substantially the same as that according to the first embodiment, therefore, is not illustrated, and FIGS. 1 and 2 used for the description according to the first embodiment are referred.

Figure 16:
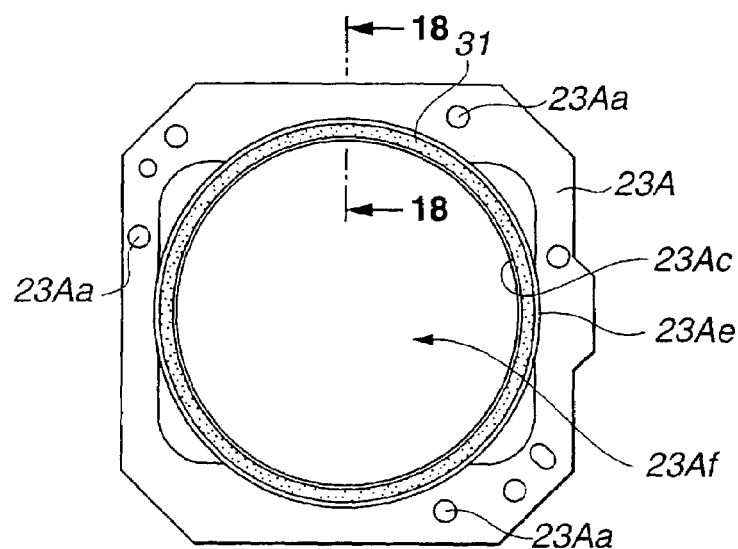
FIG. 16 is a diagram showing by extracting a part of members forming an image pick-up device unit in a camera according to a fifth embodiment of the present invention, and is a front view showing a dust-proofing filter supporting member (first member) in the members forming the image pick-up device unit.
Figure 17:
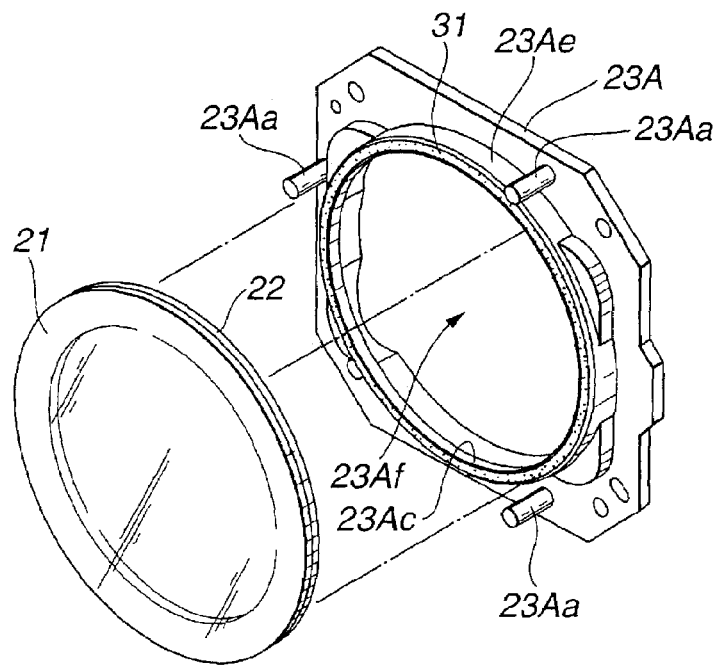
FIG. 17 is an exploded perspective view showing a dust-filter supporting member and a dust-proofing filter (dust-proofing member) in the members forming the image pick-up device unit shown in FIG. 16.
Figure 18:
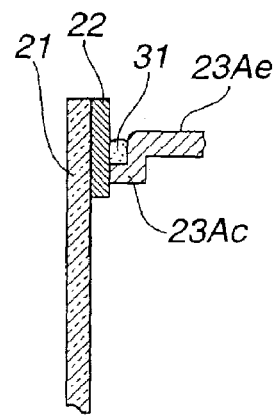
FIG. 18 is a sectional view at a position along a cut-off line 18—18 shown in FIG. 16 when the dust-proofing filter supporting unit shown in FIG. 17 is adhered to the dust-proofing filter by an adhesion.

FIGS. 16 to 18 are diagrams showing by extracting a part of members forming an image pick-up device unit in a camera according to the fifth embodiment of the present invention. FIG. 16 is a front view showing the dust-proofing filter supporting member (first member) among the members forming the image pick-up device unit. FIG. 17 is an exploded perspective view showing the dust-proofing filter supporting member and the dust-proofing filter (dust-proofing member) among the members forming the image pick-up device unit. FIG. 18 is a sectional view at a position along a line 18—18 shown in FIG. 16 when the dust-proofing filter supporting member and the dust-proofing filter are jointed by the adhesive.

In the image pick-up device unit (15) in the camera according to the fifth embodiment, as mentioned above, the dust-proofing filter 21 and a dust-proofing filter supporting member 23A are airtightly jointed via the piezoelectric element 22 interposed by using an adhesive 31.

Thus, the dust-proofing filter supporting member 23A is formed as follows. That is, similarly to the first embodiment, a circular or polygonal opening 23Af is pierced substantially in the center of the dust-proofing filter supporting member 23A. Similarly to the opening according to the first embodiment, the opening 23Af has a size large enough to pass through the subject beams transmitted through the photographing optical system (12*a*) and to irradiate the photoelectrically converting surface of the image pick-up device 27 at the back.

A wall portion 23Ae projecting on the front side is substantially annularly formed at the peripheral portion of the opening 23Af. A supporting portion 23Ac is formed at the edge portion of the wall portion 23Ae, projecting to the front side (refer to FIGS. 16 to 18).

A plurality of (three, according to the fifth embodiment) projecting portions 23Aa are formed at predetermined positions near an outer peripheral portion of the dust-proofing filter supporting member 23A, projecting to the front side thereof. The projecting portions 23Aa function as positional regulating members for positioning when the dust-proofing filter 21 is arranged to adhere to the dust-proofing filter supporting member 23A.

The dust-proofing filter 21 is adhered to the front side of the dust-proofing filter supporting member 23A via the piezoelectric element 22 interposed by the adhesive 31.

In this case, the adhesive 31 is applied in an annular area throughout the entire region excluding the supporting portion 23Ac at the edge portion of the wall portion 23Ae in the dust-proofing filter supporting member 23A. In this status, the dust-proofing filter 21 is adhered from the front side of the dust-proofing filter supporting member 23A. In this case, by moving the outer peripheral portion of the dust-proofing filter 21 along the projecting portions 23Aa in the optical axis direction, the dust-proofing filter 21 is arranged at the predetermined position of the dust-proofing filter supporting member 23A. Referring to FIG. 18, the supporting portions 23Ac are abutted against predetermined positions (portions as nodes upon vibration) of the dust-proofing filter 21 (actually, of the piezoelectric element 22).

Thus, the dust-proofing filter supporting member 23A is airtightly jointed to the dust-proofing filter 21 by the adhesive 31 in the annular area near the peripheral portion of the dust-proofing filter 21, that is, at the edge portion of the wall portion 23Ae.

Other structures are substantially the same as those according to the first embodiment. By applying the vibrations to the dust-proofing filter 21 by using the piezoelectric element 22, the same advantages as those according to the first embodiment are obtained upon removing dust and the like adhered to the surface of the dust-proofing filter 21.

As mentioned above, according to the fifth embodiment, the same advantages as those according to the first embodiment are obtained.

Further, according to the fifth embodiment, the dust-proofing filter 21 is fixed and held, and the adhesive 31 is used as means for airtightly jointing the dust-proofing filter 21 with the dust-proofing filter supporting member 23A, thereby simplifying the structure. Advantageously, the number of members is reduced. Further, advantageously, the manufacturing process is simplified and the manufacturing cost is reduced.

According to the fifth embodiment, other structures are the same as those according to the first embodiment. However, they are not limited to this and may be the same as those according to any of the second to fourth embodiments.

Namely, according to the fifth embodiment, similarly to the first embodiment, the optical LPF 25 is provided, the dust-proofing filter supporting member 23 (first member) and the CCD case 24 (second member) are independently formed, and the dust-proofing filter supporting member 23 (first member) is airtightly fit to the CCD case 24 (second member).

Meanwhile, according to the second embodiment, the optical LPF 25 is provided, and the dust-proofing filter supporter and CCD case formed by integrally including the first portion functioning as the dust-proofing filter supporting member and the second portion functioning as the CCD case is provided (refer to FIGS. 12 and 13).

In this case, it is similarly advantageous that the shape of the dust-proofing filter supporting and CCD case is the same as that of the CCD case 33 according to the second embodiment and the dust-proofing filter 21 is airtightly jointed to the CCD case 33 by using the adhesive 31.

According to the third embodiment, the optical LPF is excluded and the dust-proofing filter supporting and CCD case formed by integrally including the first portion functioning as the dust-proofing filter supporting member and the second portion functioning as the CCD case is provided (refer to FIGS. 14 and 15).

In this case, it is similarly advantageous that the shape of the dust-proofing filter supporting and CCD case is the same as the CCD case 34 according to the third embodiment and the dust-proofing filter 21 is airtightly jointed to the CCD case 34 by using the adhesive 31.

According to the fourth embodiment, the optical LPF is excluded (not shown), the dust-proofing filter supporting member (first member) and the CCD case (second member) are formed independently, and the dust-proofing filter supporting member (first member) and the CCD case (second member) are airtightly fit to each other. In this case, it is similarly advantageous that the shapes of the dust-proofing filter supporting member and the CCD case are the same as the dust-proofing filter supporting member and the CCD case according to the fourth embodiment and the dust-proofing filter 21 is airtightly jointed to the dust-proofing filter supporting member by using the adhesive 31.

According to the fifth embodiment, the image pick-up device unit is structured by independently forming the dust-proofing filter supporting member (first member) and the CCD case (second member), and it is formed by excluding the optical LPF (25). Advantageously, the fifth embodiment can be applied in entirely the same manner to a camera including the variously modified image pick-up device units. In either case, the same effectiveness can be obtained.

As mentioned above, in the image pick-up device unit in the camera according to any of the first to fifth embodiments, the piezoelectric element (member for vibration) is used to apply the predetermined vibrations to the dust-proofing filter. Thus, dust and the like adhered to the surface of the dust-proofing filter are removed.

In this case, when the dust-proofing filter is vibrated, the air at the peripheral portion is moved. The dust-proofing filter is arranged in contact with the dust-proofing filter supporting member or the combination of dust-proofing filter supporting and CCD case, thus to constitute the sealing structure which forms a predetermined sealing space.

Therefore, if the sealing space is completely airtight, air does not flow into the sealing space from the outside when the dust-proofing filter is vibrated. Thus, it is expected that the positive and negative voltage change is caused in the sealing space. The generation of vibrations while causing the change in voltage requires corresponding energy or power, and cause an obstruction against the vibration of the dust-proofing filter.

Figure 19:
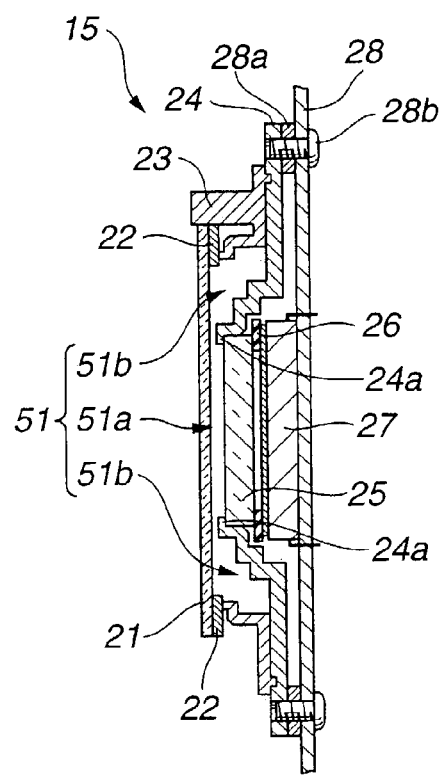
FIG. 19 is a sectional view schematically showing by extracting a part of the image pick-up device unit when forming a sealing space in which the dust-proofing filter and a predetermined member for assisting the dust-proofing filter completely seal the front side of the image pick-up device from the outside (according to the first embodiment), and showing a state in which no voltage is applied to the piezoelectric element.
Figure 20:
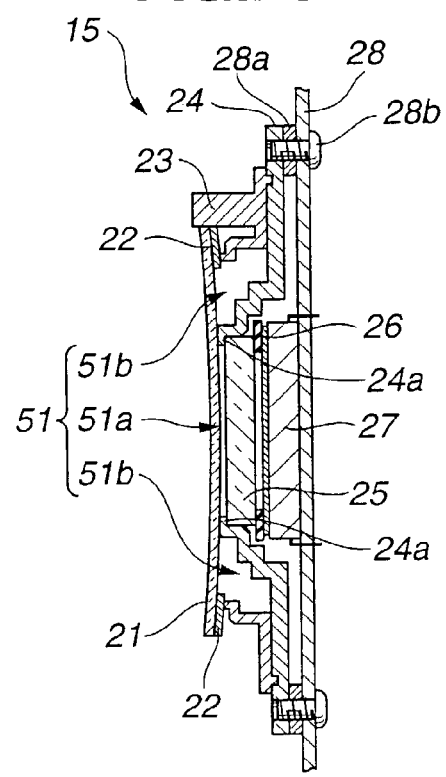
FIG. 20 is a sectional view showing a state in which a positive voltage is applied to the piezoelectric element in the image pick-up device unit shown in FIG. 19.
Figure 21:
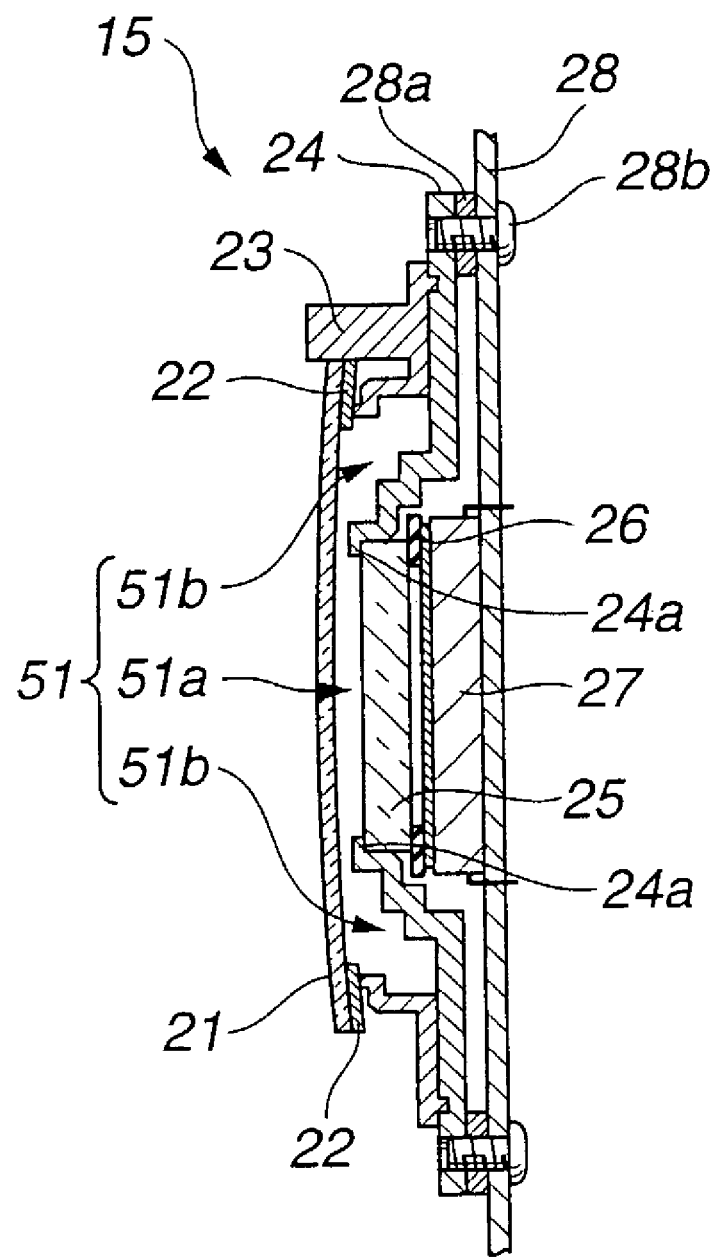
FIG. 21 is a sectional view showing a state in which a negative voltage is applied to the piezoelectric element in the image pick-up device unit shown in FIG. 19.

FIGS. 19, 20, and 21 are sectional views schematically showing by extracting a part of the image pick-up device unit upon forming the sealing space in which the front side of the image pick-up device is completely sealed from the outside by the dust-proofing filter and a predetermined member for supporting the dust-proofing filter. FIG. 19 shows a status in which the voltage is not applied to the piezoelectric element. FIG. 20 shows a status in which the positive voltage is applied to the piezoelectric element. FIG. 21 shows a status in which the negative voltage is applied to the piezoelectric element.

A description is given of the structure of the image pick-up device unit according to the first embodiment with reference to FIGS. 19 to 21 as an example.

First, when the voltage is not applied to the piezoelectric element 22 in the image pick-up device unit 15 (refer to FIG. 19), the positive (+) voltage is applied to the piezoelectric element 22, thus to enter the status shown in FIG. 20. In the status shown in FIG. 20, the dust-proofing filter 21 is bent toward the optical LPF 25. Consequently, the back side of the dust-proofing filter 21 is extremely close to the front side of the step portion 24a of the CCD case 24. Then, air in the void portion 51a between the dust-proofing filter 21 and the optical LPF 25 flows to the direction evacuating from the void portion 51a. However, the void portion 51a is completely sealed from the outside and the passage between the void portion 51a and the space portion 51b is substantially shut off by the dust-proofing filter 21. Thus, the air in the void portion 51a has no evacuating portion. Therefore, since the amount of air is not changed irrespective of the decrease in inner volume of the void portion 51a, a positive inner pressure is generated, resulting in the obstruction against the vibration of the dust-proofing filter 21.

On the other hand, the negative voltage is applied to the piezoelectric element 22 of the image pick-up device unit 15, resulting in the status shown in FIG. 21. In the status shown in FIG. 21, the dust-proofing filter 21 is bent in the direction leaving from the optical LPF 25. In this case, the sealing space 51 containing the void portion 51a and the space portion 51b between the dust-proofing filter 21 and the optical LPF 25 is completely sealed from the outside and thus no air flows in the sealing space 51. Since the amount of air is not changed irrespective of the increase in inner volume of the void portion 51a, the negative inner pressure is generated, resulting in the obstruction against the vibration of the dust-proofing filter 21.

Then, in views of the above-mentioned points, a description is given hereinbelow of various embodiments having means for reducing the inner pressure in the sealing space by flowing the air into the sealing space from the outside upon the vibration of the dust-proofing filter while keeping predetermined airtightness in the sealing space.

Figure 22:
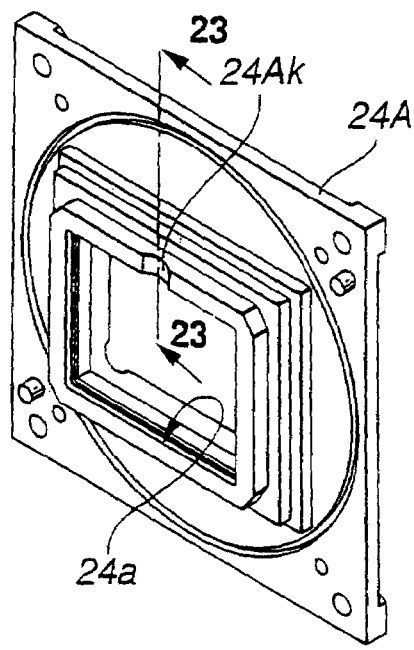
FIG. 22 is a diagram showing by extracting a part of members forming an image pick-up device unit in a camera according to a sixth embodiment of the present invention, and a perspective view showing a CCD case (second member) in the members of the image pick-up device unit.
Figure 23:
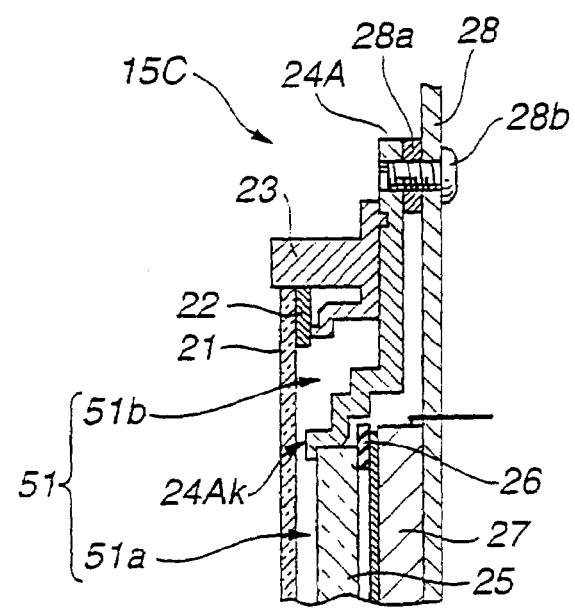
FIG. 23 is a sectional view at a position along a line 23—23 shown in FIG. 22.

FIGS. 22 and 23 are diagrams showing by extracting a part of members forming an image pick-up device unit in a camera according to the sixth embodiment of the present invention. FIG. 22 is a perspective view showing the CCD case (second member) among the members forming the image pick-up device unit. FIG. 23 is a cross-section of the image pick-up device, that is, a sectional view at a position along a line 23—23 shown in FIG. 22.

According to the sixth embodiment, the structure is substantially the same as that according to the first embodiment. Unlike the structure according to the first embodiment, a notch portion 24Ak is formed as a flow passage between the void portion 51a and the space portion 51b at a predetermined position of the CCD case 24A. Therefore, the same structure as that according to the first embodiment is designated by the same reference numeral and is not described in detail. The illustration of the structures of the entire camera and the entire image pick-up device unit is referred to FIGS. 1 to 5 used for the description of the first embodiment.

Referring to FIGS. 22 and 23, the CCD case 24A in an image pick-up device unit 15C in the camera according to the sixth embodiment is basically formed substantially similarly to the CCD case 24 according to the first embodiment.

According to the sixth embodiment, the CCD case 24A has the notch portion 24Ak with a substantially arc-shaped cross-section, which is obtained by notching a part of the step portion 24a provided to support the optical LPF 25 inside.

In other words, the step portion 24a becomes a contact surface portion which is formed such that the CCD case 24 (second member) airtightly comes into contact with the peripheral portion of the optical LPF 25, and the notch portion 24Ak is provided at a part of the contact surface.

Therefore, the notch portion 24Ak functions as the flow passage for assisting the air flow between the void portion 51a and the space portion 51b upon vibration of the dust-proofing filter 21.

That is, according to the sixth embodiment, the sealing structure formed in the image pick-up device unit 15C has the flow passage for suppressing the resistance of the air flow between the air gap space 51a as a relatively narrow space portion and the space portion 51b as a relatively large space portion in the sealing space 51 formed in the image pick-up device unit 15C at a predetermined position, namely, at a part of the step portion 24a in the CCD case 24.

Other structures are substantially the same as those according to the first embodiment.

In the image pick-up device unit 15C with the above-mentioned structure, the operation is as follows upon applying the vibrations to the dust-proofing filter 21 by using the piezoelectric element 22.

First, in a status in which no voltage is applied to the piezoelectric element 22 (the same status as that in FIG. 19), the positive voltage is applied to the piezoelectric element 22 and the dust-proofing filter 21 is bent toward the optical LPF 25 (refer to FIG. 20).

In this case, even if the back side of the dust-proofing filter 21 extremely comes into contact with the front side of the step portion 24a of the CCD case 24 (the similar status of that shown in FIG. 20), the air in the void portion 51a passes through the notch portion 24Ak provided at a part of the CCD case 24A and flows out to the space portion 51b.

Therefore, in accordance with the reduction in inner volume of the void portion 51a due to the bending of the dust-proofing filter 21, the amount of air in the void portion 51a is easily reduced. Consequently, the increase in inner pressure of the void portion 51a is suppressed.

On the other hand, the negative voltage is applied to the piezoelectric element 22 and then the dust-proofing filter 21 is bent in the direction leaving from the optical LPF 25 (refer to FIG. 21). In this case, the air in the space portion 51b flows into the void portion 51a via the notch portion 24Ak.

Thus, in accordance with the increase in inner volume of the void portion 51a due to the bending of the dust-proofing filter 21, the amount of air in the void portion 51a is easily increased. Consequently, the reduction in inner pressure of the space portion 51a is suppressed.

As mentioned above, according to the sixth embodiment, only the notch portion 24Ak is provided at a predetermined position in a part of the CCD case 24A so as to connect the void portion 51a and the space portion 51b. As a result, air in the sealing space 51 caused due to the vibrations of the dust-proofing filter 21 by using the piezoelectric element 22 easily flows and the change in inner pressure in the space is suppressed. Therefore, the obstruction against the vibration of the dust-proofing filter 21 is prevented.

According to the sixth embodiment, the same image pick-up device unit 15C as that according to the first embodiment is illustrated but the present invention is not limited to this.

In the case of the second embodiment (refer to FIGS. 12 and 13), according to the sixth embodiment, the notch portion (24Ak) as the flow passage is provided at the predetermined position of the CCD case 33, which are the dust-proofing filter supporter and CCD case, and which are formed by integrating the dust-proofing filter supporting member and the CCD case, namely, at a part of the contact surface which is formed such that the CCD case 33 (second portion of the integration) is airtightly jointed to the peripheral portion of the optical LPF 25. Thus, the same advantages are obtained in this case.

Further, in the case of the third embodiment (refer to FIGS. 14 and 15), according to the sixth embodiment, the notch portion (24Ak) as the flow passage is provided at the predetermined position of the CCD case 34, which are the dust-proofing filter supporter and CCD case, and which are formed by integrating the dust-proofing filter supporting member and the CCD case, namely, at a part of the contact surface which is formed such that the CCD case 34 (second portion of the integration) airtightly comes into contact with the peripheral portion of the photoelectrically converting surface of the image pick-up device 27. Thus, the same advantages are obtained in this case.

Furthermore, in the case of the fourth embodiment, although not shown, the notch portion (24Ak) as the flow passage is provided at the predetermined position of the CCD case, namely, at a part of the contact surface which is formed such that the CCD case (second member) airtightly comes into contact with the peripheral portion of the photoelectrically converting surface of the image pick-up device. Thus, the same advantages are obtained in this case.

As mentioned above, according to the sixth embodiment, it is possible to apply the camera having any of various image pick-up device units such as the image pick-up device unit in which both the dust-proofing filter supporting member (first member) and the CCD case (second member) are formed independently, or the image pick-up device unit in which the optical LPF (25) is excluded. In any of the examples, the same advantages are obtained.

Figure 24:
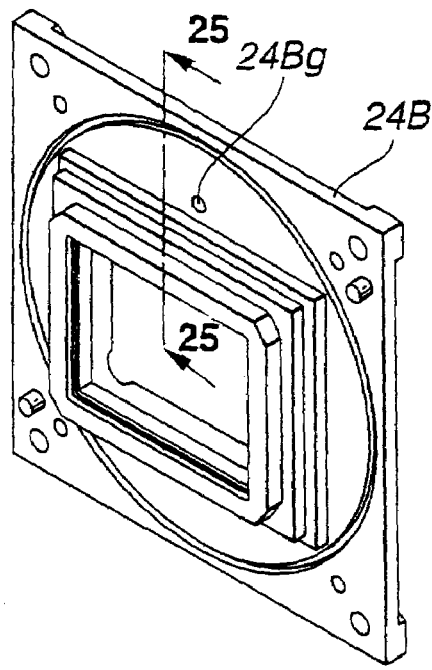
FIG. 24 is a perspective view showing by extracting a part of members forming an image pick-up device unit in a camera according to a seventh embodiment of the present invention, showing by extracting a CCD case (second member) of the members forming the image pick-up device unit.
Figure 25:
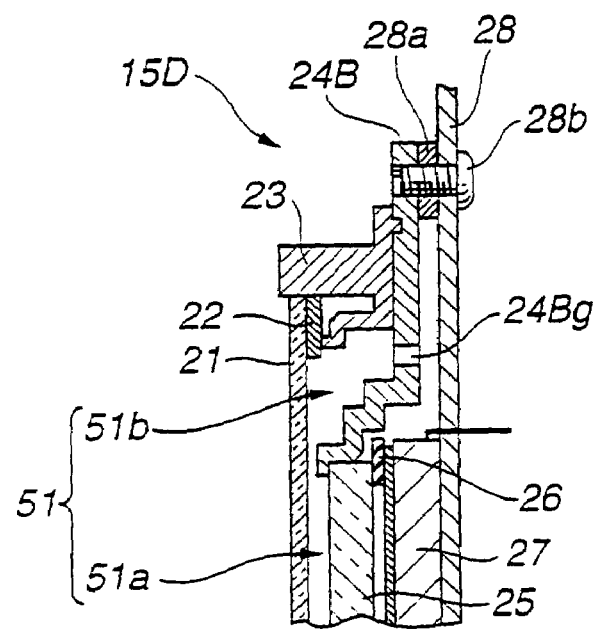
FIG. 25 is a sectional view at a position along a line 25—25 shown in FIG. 24.

FIGS. 24 and 25 are diagrams showing by extracting a part of members forming an image pick-up device unit in a camera according to a seventh embodiment. FIG. 24 is a perspective view showing a CCD case (second member) among the members forming the image pick-up device unit. FIG. 25 is a sectional view at a position along a line 25—25 shown in FIG. 24.

The structure according to the seventh embodiment is the same as that according to the first embodiment. Unlike the first embodiment, a pierced hole 24Bg as a relatively minute passage is provided for connecting the inside to the outside of the sealing space 51 at a predetermined position of the CCD case 24B. Therefore, the same structure as that according to the first embodiment is designated by the same reference numeral and a detailed description thereof is omitted. The entire camera and the components of the entire image pick-up device unit are illustrated with reference to FIGS. 1 to 5 used for the description of the first embodiment.

Referring to FIGS. 24 and 25, according to the seventh embodiment, the CCD case 24B in an image pick-up device unit 15D is basically formed in the same manner as that of the CCD case 24 according to the first embodiment.

In the CCD case 24B according to the seventh embodiment, the pierced hole 24Bg as the relatively minute passage is provided for connecting the sealing space 51b to the outside at a predetermined position of the CCD case 24B, for example, at a part of an area extending to an outer peripheral side of the optical LPF 25.

Therefore, the pierced hole 24Bg forms the passage for assisting the air flow between the space portion 51b and the outside upon the vibration of the dust-proofing filter 21. In this case, since the outside air flows into the space portion 51b via the pierced hole 24Bg, there is a danger that dust and the like included in the outside air simultaneously enter.

Then, in consideration of the foregoing, in order to prevent the flow in the sealing space 51 of dust and the like having a larger size than a predetermined size via the pierced hole 24Bg, the pierced hole 24Bg needs to be set with a relative minute size. As the size of the pierced hole 24g set in this case, it is expected that dust and the like adhered to the photoelectrically converting surface of the image pick-up device 27 and the optical device LPF 25 do not affect an adverse influence on the image displayed based on the image signal to be obtained by the image pick-up device 27.

As mentioned above, according to the seventh embodiment, the sealing structure in the image pick-up device unit 15D comprises the dust-proofing filter supporting member 23 as the first member for supporting the dust-proofing filter 21 (dust-proofing member) in contact with the peripheral portion or the adjacent portion thereof, and the CCD case 24B as the second member arranged for supporting the optical LPF 25 (optical device) in contact with the peripheral portion or the adjacent portion thereof and for airtightly coming into contact with the dust-proofing filter supporting member 23 (first member) at its predetermined portion. The CCD case 24B (second member) has the pierced hole 24Bg as the relatively minute passage for connecting the inside to the outside of the space portion 51b (sealing portion 51) at the predetermined portion thereof.

Other structures are the same as those according to the first embodiment.

In the image pick-up device unit 15D with the above-mentioned structure, the following operations are obtained upon applying the vibrations to the dust-proofing filter 21 by using the piezoelectric element 22.

First, in a status in which no voltage is applied to the piezoelectric element 22 (in the same status as that shown in FIG. 19), the positive voltage is applied to the piezoelectric element 22 and then the dust-proofing filter 21 is bent toward the optical LPF 25 (refer to FIG. 20).

In this case, the air in the sealing space 51, in particular, in the space portion 51b flows out via the pierced hole 24Bg provided at the bottom portion of the CCD case 24B.

Therefore, the reduction in inner volume of the sealing space 51, in particular, of the space portion 51a causes the easy decrease in amount of air in the sealing space 51. Thus, the increase in inner pressure of the sealing space 51A is suppressed.

On the other hand, the negative voltage is applied to the piezoelectric element 22 and then the dust-proofing filter 21 is bent in the direction leaving from the optical LPF 25 (refer to FIG. 21). In this case, the outside air flows in the sealing space 51, especially, in the space portion 51b via the pierced hole 24Bg.

Therefore, in accordance with the increase in inner volume of the sealing space 51 due to the bending of the dust-proofing filter 21, the amount of air in the sealing space 51 is easily increased. Thus, the reduction in inner pressure of the sealing space 51 is suppressed.

As mentioned above, according to the seventh embodiment, the arrangement of only the pierced hole 24Bg for connecting the sealing space 51, especially, the space portion 51b, to the outside at the predetermined position of the CCD case 24A facilitates the air flow between the sealing space 51 and the outside caused due to the vibration of the dust-proofing filter 21 generated by the piezoelectric element 22, and suppresses the change in inner pressure of the sealing space 51. Thus, the obstruction against the vibration of the dust-proofing filter 21 is suppressed.

According to the seventh embodiment, the image pick-up device unit 15D with the same structure as that according to the first embodiment is illustrated as an example but the present invention is not limited to this.

For example, according to the second embodiment (refer to FIGS. 12 and 13), the same advantages are obtained by providing the pierced hole (24Bg) as the relatively minute passage for connecting the inside to the outside of the space 51b (sealing space 51) at the predetermined position of the CCD case 33 as the dust-proofing filter supporting and CCD case formed by integrating the dust-proofing filter supporting member and the CCD case 33, namely, at a part of the area extending to the outer peripheral side of the optical LPF 25 as the bottom portion of the CCD case 33 (second member).

According to the third embodiment (refer to FIGS. 14 and 15), with the structure formed by excluding the optical LPF, the same advantages as those of the foregoing are obtained by excluding the optical LPF and by providing the pierced hole (24Bg) as the passage at the predetermined position of the CCD case 34 as the dust-proofing filter supporter and CCD case formed by integrating the dust-proofing filter supporting member and the CCD case, namely, at a part of the area extending to the outer peripheral side of the photoelectrically converting surface of the image pick-up device 27 as the bottom portion of the CCD case 34 (second member).

According to the fourth embodiment, with the structure excluding the optical LPF (not shown), the same advantages as those of the foregoing are obtained by providing the pierced hole (24Bg) as the passage at a part of the area extending the outer peripheral side of the photoelectrically converting surface of the image pick-up device 27 as the bottom portion of the CCD case (second member).

As mentioned above, according to the seventh embodiment, various modified image pick-up device units such as the image pick-up device unit having the structure formed by independently forming the dust-proofing filter supporting member (first member) and the CCD case (second member) and the image pick-up device unit having the structure excluding the optical LPF (25) can be applied to the camera. In any of the cases, the same advantages are obtained.

Figure 26:
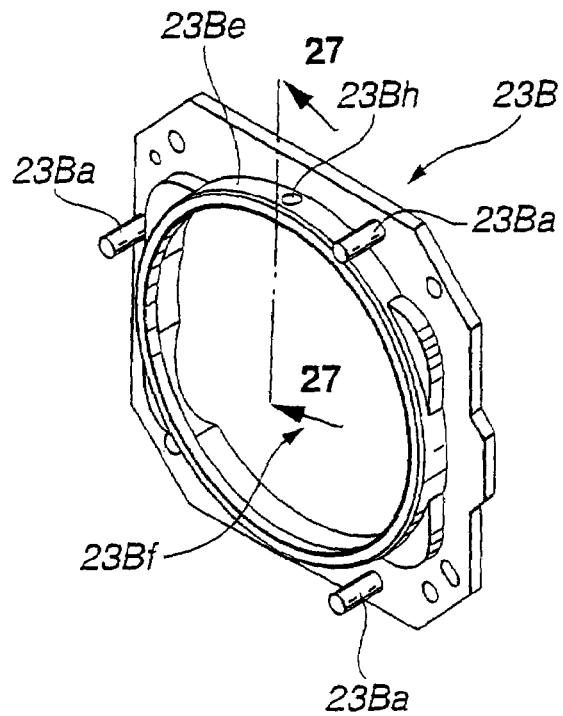
FIG. 26 is a perspective view showing by extracting a part of members forming an image pick-up device unit in a camera according to an eighth embodiment of the present invention, showing by extracting a dust-proofing supporting member (first member) of the members forming the image pick-up device unit.
Figure 27:
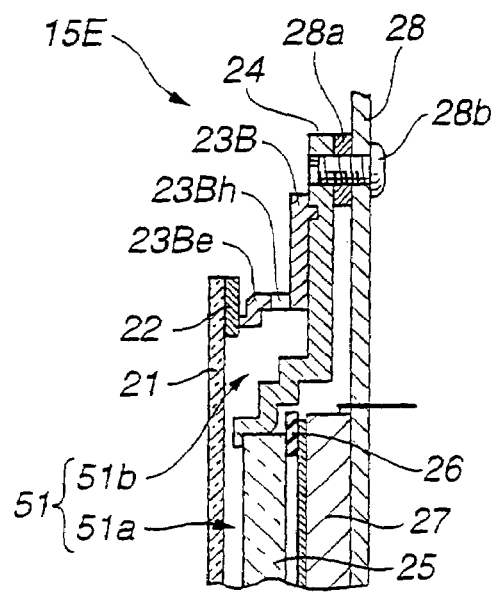
FIG. 27 is a sectional view at a position along a line 27—27 shown in FIG. 26.

FIGS. 26 and 27 are diagrams showing by extracting a part of members forming an image pick-up device unit in a camera according to the eighth embodiment of the present invention. FIG. 26 is a perspective view showing the dust-proofing filter supporting member (first member) among the members forming the image pick-up device unit. FIG. 27 is a sectional view at a position along a line 27—27 shown in FIG. 26.

According to the eighth embodiment, the basic structure is the same as that according to the first embodiment. The basic structure of the dust-proofing filter supporting member (first member) among the members forming the image pick-up device unit is the same as that of the dust-proofing filter supporting member 23A according to the fifth embodiment.

According to the eighth embodiment, a dust-proofing filter supporting member 23B has a pierced hole 23Bh as a relatively minute passage for connecting the inside to the outside of the sealing space 51 at a predetermined position. Therefore, the same structure as that according to the first embodiment is designated by the same reference numeral and a detailed description thereof is omitted. The structures of the entire camera and the image pick-up device unit are illustrated with reference to FIGS. 1 to 5 used for the description of the first embodiment. The dust-proofing filter supporting member is described with reference to FIGS. 16 to 18 used for the description of the fifth embodiment.

Referring to FIGS. 26 and 27, according to the eighth embodiment, the dust-proofing filter supporting member 23B in an image pick-up device unit 15E in a camera is basically formed in the same manner as that according to the fifth embodiment. A wall portion 23Be is formed projecting toward the front side at a peripheral portion of an opening 23Bf with a substantially annular shape.

Further, the dust-proofing filter supporting member 23B has the pierced hole 23Bh as the relatively minute passage for connecting the space portion 51b to the outside at a predetermined position of the wall portion 23Be.

The pierced hole 23Bh becomes a passage for facilitating the air flow between the space portion 51b and the outside upon the vibration of the dust-proofing filter 21. Upon using the dust-proofing filter supporting member 23B with the above-mentioned structure, the outside air flows in the space portion 51b via the pierced hole 23Bh. Thus, there is a danger that dust and the like included in the outside air simultaneously enter.

Then, in consideration of the danger, the pierced hole 23Bh needs to be set with a relatively minute size so as to prevent the flow in the sealing space 51 of dust and the like having a predetermined size via the pierced hole 23Bh. This is the same as that according to the sixth and seventh embodiments.

As mentioned above, according to the eighth embodiment, the sealing structure in the image pick-up device unit 15E comprises the dust-proofing filter supporting member 23B as the first member for supporting the dust-proofing filter 21 (dust-proofing member) in contact with the peripheral portion or the adjacent portion thereof, and the CCD case 24 as the second member arranged for supporting the optical LPF 25 (optical device) in contact with the peripheral portion or the adjacent portion thereof and for coming into closely contact with the dust-proofing filter supporting member 23B (first member) at its predetermined portion. The dust-proofing filter supporting member 23B (first member) has the pierced hole 23Bh as the relatively minute passage for connecting the inside to the outside of the space portion 51b (sealing portion 51) at the predetermined portion thereof.

Other structures are the same as those according to the first embodiment.

In the image pick-up device unit 15E with the above-mentioned structure, the following operations are obtained upon applying the vibrations to the dust-proofing filter 21 by using the piezoelectric element 22.

First, in a status in which no voltage is applied to the piezoelectric element 22 (in the same status as that shown in FIG. 19), the positive voltage is applied to the piezoelectric element 22 and then the dust-proofing filter 21 is bent toward the optical LPF 25 (refer to FIG. 20).

In this case, the air in the sealing space 51, in particular, in the space portion 51b flows out via the pierced hole 23Bg.

Therefore, the reduction in inner volume of the sealing space 51, in particular, of the space portion 51a facilitates the decrease in amount of air in the sealing space 51. Thus, the increase in inner pressure of the sealing space 51 is suppressed.

On the other hand, the negative voltage is applied to the piezoelectric element 22 and then the dust-proofing filter 21 is bent in the direction leaving from the optical LPF 25 (refer to FIG. 21). In this case, the outside air flows in the sealing space 51, especially, in the space portion 51b via the pierced hole 23Bh.

Therefore, the increase in inner volume of the sealing space 51 due to the bending of the dust-proofing filter 21 facilitates the increase in amount of air in the sealing space 51. Thus, the reduction in inner pressure of the sealing space 51 is suppressed.

As mentioned above, according to the eighth embodiment, the arrangement of only the pierced hole 23Bh for connecting the sealing space 51, especially, the space portion 51b, to the outside at the predetermined position of the dust-proofing filter supporting member 23B facilitates the air flow, between the sealing space 51 and the outside, caused due to the vibrations of the dust-proofing filter 21 generated by the piezoelectric element 22, and suppresses the change in inner pressure of the sealing space 51. Thus, the obstruction against the vibrations of the dust-proofing filter 21 is suppressed.

According to the eighth embodiment, the image pick-up device unit 15E with the same structure as that according to the first to fifth embodiments is illustrated as an example but the present invention is not limited to this.

For example, in the case of the second embodiment (refer to FIGS. 12 and 13), the same advantages are obtained by providing the pierced hole 23Bh as the relatively minute passage for connecting the inside to the outside of the space 51Ab at the predetermined position of the CCD case 33 (second member) as the dust-proofing filter supporting and CCD case formed by integrating the dust-proofing filter supporting member and the CCD case 33, namely, at the predetermined position of the substantially annular-shaped wall portion projected toward the front side at the peripheral portion of the opening of the CCD case 33.

Further, in the case of the third embodiment (refer to FIGS. 14 and 15), the same advantages as those of the foregoing are obtained by providing the pierced hole 23Bh as the relatively minute passage for connecting the space portion 51Ab to the outside at the predetermined position of the CCD case 34 as the dust-proofing filter supporting and CCD case formed by integrating the dust-proofing filter supporting member and the CCD case, namely, at the predetermined position of the substantially annular-shaped wall portion projected toward the front side at the peripheral portion of the opening of the CCD case 34 (first portion as the dust-proofing filter supporting member).

Furthermore, in the case of the fourth embodiment, although not shown, the same advantages as those of the foregoing are obtained by providing the pierced hole (23Bh) as the relatively minute passage at the predetermined position of the CCD case, namely, at the predetermined position of the substantially annular-shaped wall portion projected toward the front side of the peripheral portion of the opening of the CCD case (second member).

As mentioned above, according to the eighth embodiment, various modified image pick-up device units such as the image pick-up device unit having the structure formed by independently forming the dust-proofing filter supporting member (first member) and the CCD case (second member) and the image pick-up device unit having the structure excluding the optical LPF (25) can be applied to the camera. In any of the cases, the same advantages are obtained.

Next, a description is given of the ninth embodiment of the present invention.

Figure 28:
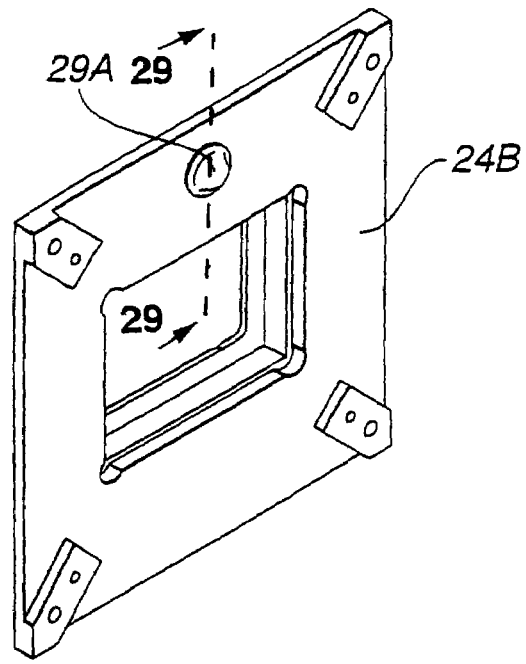
FIG. 28 is a perspective view showing by extracting a part of members forming an image pick-up device unit in a camera according to a ninth embodiment of the present invention, showing by extracting the back side of a CCD case (second member) of the members forming the image pick-up device unit.
Figure 29:
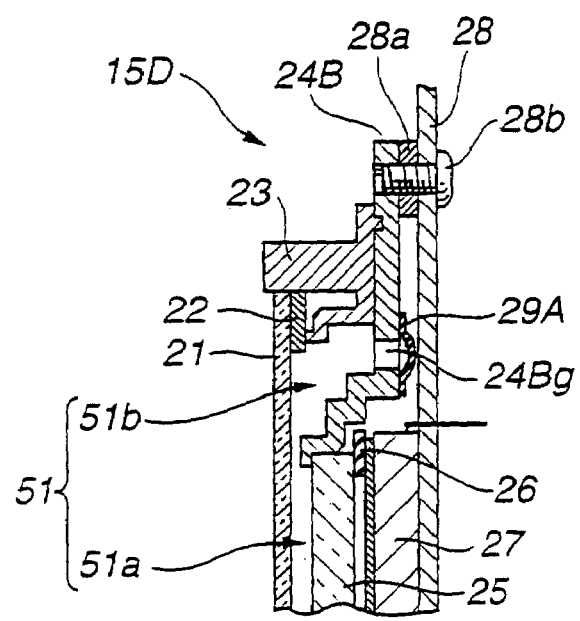
FIG. 29 is a sectional at a position along a line 29—29 shown in FIG. 28.

FIGS. 28 and 29 are diagrams showing by extracting a part of members forming an image pick-up device unit in a camera according to the ninth embodiment of the present invention. FIG. 28 is a perspective view showing the back side of the CCD case (second member) among the members forming the image pick-up device unit. FIG. 29 is a sectional view at a position along a line 29—29 shown in FIG. 28.

The basic structure according to the ninth embodiment of the present invention, is similar to that according to the seventh embodiment. Only the difference of the structure according to the ninth embodiment is that it is formed by further adding near the passage (pierced hole 24Bg) provided for connecting the inside to the outside of the sealing space 51 at a predetermined position of the CCD case 24B, a rubber cap 29A formed elastically as a sealing assisting member for airtightly covering the opening end of the passage.

Therefore, the same structure as that according to the seventh embodiment is designated by the same reference numeral and a detailed description thereof is omitted. The structures of the entire camera and image pick-up device unit are illustrated with reference to FIGS. 1 and 2 and FIGS. 3 to 5 used for the description of the first embodiment.

Referring to FIGS. 28 and 29, according to the ninth embodiment, the CCD case 24B in the image pick-up device unit 15D in the camera is formed in the similar manner of that of the CCD case 24B according to the seventh embodiment.

According to the ninth embodiment, near the pierced hole 24Bg provided at the bottom portion of the CCD case 24B, the rubber cap 29A as the sealing assisting member for airtightly covering the opening end of the pierced hole 24Bg is provided. In order to change the inner volume of the rubber cap 29A depending on the inner pressure of the sealing space 51, the rubber cap 29A is formed with its cross section that is slightly convex-shaped toward the outside in the normal status, and is further made of an elastic member having the elasticity. In addition, the rubber cap 29A has the pierced hole 24Bg which is arranged to airtightly cover its opening end for connecting it to the outside of the sealing space 51 (in particular, the space portion 51b).

Other structures are substantially the same as those according to the seventh embodiment.

As mentioned above, according to the ninth embodiment, the rubber cap 29A is airtightly provided at the outside of the opening end of the pierced hole 24Bg. Thus, upon vibrating the dust-proofing filter 21, the air including dust and the like directly do not enter the space portion 51b from the outside via the pierced hole 24Bg. Further, the inner volume of the sealing space 51 is increased by a slightly small amount and the rubber cap 29A is elastically formed. Consequently, the sealing space 51 is retracted in accordance with the change in inner pressure of the sealing space 51, thereby increasing and reducing the inner volume of the sealing space 51.

The image pick-up device unit 15D having the above-mentioned structure has the following operations upon vibration of the dust-proofing filter 21 by using the piezoelectric element 22.

First, in a status in which no voltage is applied to the piezoelectric element 22 (in the same status as that shown in FIG. 19), the positive voltage is applied to the piezoelectric element 22 and then the dust-proofing filter 21 is bent toward the optical LPF 25 (refer to FIG. 20).

In this case, the air in the sealing space 51, in particular, in the space portion 51b flows into the rubber cap 29A via the pierced hole 23Bg. Simultaneously, the rubber cap 29A increases the inner volume thereof by the extension caused depending on the inner pressure.

Therefore, the reduction in inner volume of the sealing space 51, in particular, in the space portion 51a due to the bending of the dust-proofing filter 21 decreases the amount of air in the sealing space 51. Thus, the air moves to the rubber cap 29A. The rubber cap 29A is relatively easily retracted in accordance with the change in air pressure. Thus, the increase in inner pressure of the sealing space 51 is suppressed.

On the other hand, the negative voltage is applied to the piezoelectric element 22 and then the dust-proofing filter 21 is bent in the direction leaving from the optical LPF 25 (refer to FIG. 21). In this case, the air in the rubber cap 29A flows in the sealing space 51, especially, in the space portion 51b via the pierced hole 23Bg. In this case, the rubber cap 29A is relatively easily retracted in accordance with the change in air pressure.

Therefore, the increase in inner volume of the sealing space 51 increases due to the bending of the dust-proofing filter 21. Simultaneously, the air in the rubber cap 29A moves to the sealing space 51 and the amount of air in the sealing space 51 increases. Thus, the reduction in inner pressure of the sealing space 51 is suppressed.

As mentioned above, according to the ninth embodiment, the pierced hole 24Bg for connecting the sealing space 51, especially, the space portion 51b to the outside, is provided at the predetermined position of the CCD case 24A, the opening end of the pierced hole 24Bg is airtightly covered, and the sealing assisting member (rubber cap 29A) which changes its inner volume depending on the inner pressure of the sealing space 51 is arranged. Consequently, the air between the sealing space 51 and the outside caused due to the vibrations of the dust-proofing filter 21 generated by the piezoelectric element 22 easily flows, and the change in inner pressure of the sealing space 51 is suppressed. Thus, the obstruction against the vibrations of the dust-proofing filter 21 is suppressed.

According to the ninth embodiment, the rubber cap 29A is used as the sealing assisting member for airtightly covering the opening end of the pierced hole 24Bg as an example. However, the sealing assisting member is not limited to this and, for example, it may be one described according to the tenth embodiment which will be described later.

Figure 30:
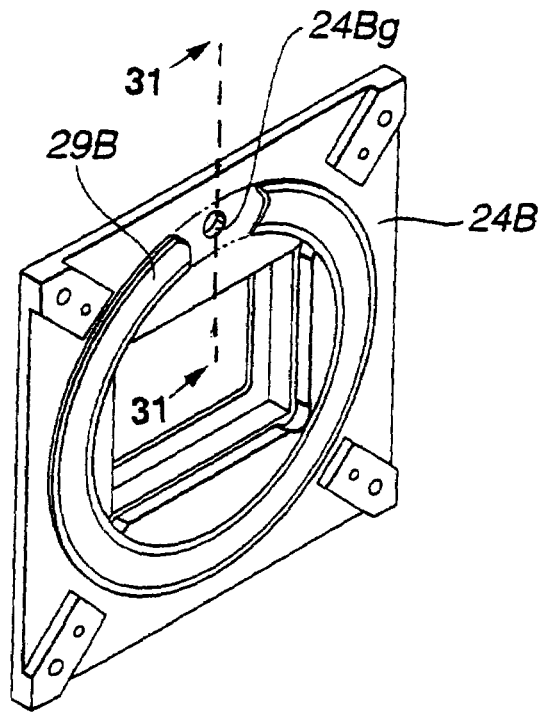
FIG. 30 is a perspective view showing by extracting a part of members forming an image pick-up device unit in a camera according to a tenth embodiment of the present invention, showing by extracting the back side of a CCD case (second member) of the members forming the image pick-up device unit.
Figure 31:
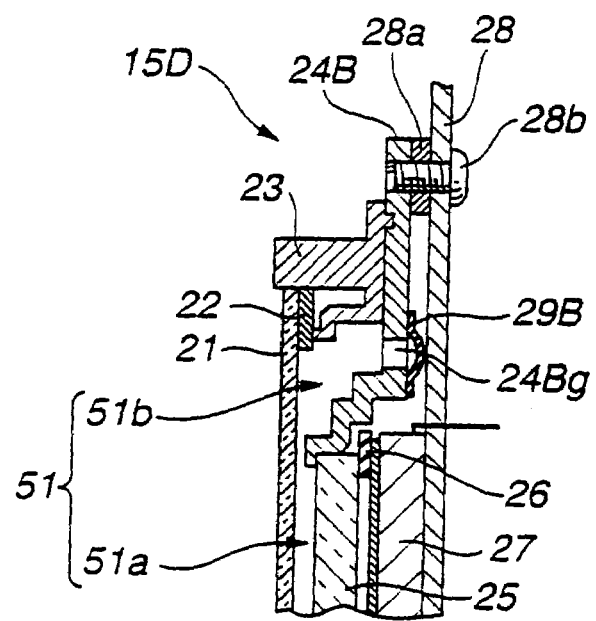
FIG. 31 is a sectional view at a position along a line 31—31 shown in FIG. 30.

FIGS. 30 and 31 are diagrams showing by extracting a part of members forming an image pick-up device unit in a camera according to the tenth embodiment of the present invention. FIG. 30 is a perspective view showing the back side of the CCD case (second member) among the members forming the image pick-up device unit. FIG. 31 is a sectional view at a position along a line 31—31 shown in FIG. 30.

The structure according to the tenth embodiment of the present invention, is similar to that according to the ninth embodiment. Only the difference of the structure according to the tenth embodiment is that it is formed by providing a rubber ring 29B, as the sealing assisting member, for airtightly covering the opening end of the passage (pierced hole 24Bg) arranged to the CCD case 24B, in place of the rubber cap 29A having the same function as that of the rubber annular 29B.

Therefore, the same structure as that according to the ninth embodiment is designated by the same reference numeral and a detailed description thereof is omitted. The structures of the entire camera and image pick-up device unit are illustrated with reference to FIGS. 1 and 2 and FIGS. 3 to 5 used for the description of the first embodiment.

According to the tenth embodiment, the rubber ring 29B made of an elastic member, etc., as the sealing assisting member, is arranged in an annular area of the peripheral portion or the adjacent portion of the optical LPF 25. In order to change the inner volume of the rubber ring 29B depending on the inner pressure of the sealing space 51, the rubber ring 29B is formed with its cross section that is slightly convex-shaped toward the outside in the normal status so as to change the inner volume of the rubber ring 29B, and is further made of an elastic member having the elasticity, with a substantially circular shape. In this case, the rubber ring 29B is arranged to the CCD case 24B so as to become airtight, excluding the pierced hole 24Bg as the passage. Incidentally, the structure removing a part of the rubber ring 29B, namely, a part of the CCD case 24B adjacent to the pierced hole 24Bg is shown in FIG. 30.

Other structures are substantially the same as those according to the ninth embodiment.

As mentioned above, according to the tenth embodiment, the rubber ring 29B is airtightly provided at the outside of the opening end of the pierced hole 24Bg of the CCD case 24B. Thus, upon vibration of the dust-proofing filter 21, the air including dust and the like directly does not enter the space portion 51b from the outside via the pierced hole 24Bg. Further, the inner volume of the sealing space 51 is increased by a slightly small amount and the rubber ring 29B is elastically formed. Consequently, the sealing space 51 is retracted in accordance with the change in inner pressure of the sealing space 51, thereby increasing and reducing the inner volume of the sealing space 51.

As mentioned above, according to the tenth embodiment, the same advantages as those according to the ninth embodiment are obtained. Further, the inner volume in the space ensured by the sealing assisting member (rubber ring 29B) can be increased.

According to the ninth and tenth embodiments, the above description is given of the image pick-up device unit 15D having the above-mentioned structure according to the first to seventh embodiments as an example. However, the present invention is not limited to this.

For example, in the case of the second embodiment (refer to FIGS. 12 and 13), the same advantages as those according to the ninth embodiment are obtained by providing the pierced hole 24Bg for connecting the outside to the sealing space 51 at the predetermined position of the CCD case 33 (second portion) as the dust-proofing filter supporting and CCD case formed by integrating the dust-proofing filter supporting member and the CCD case 33 and by providing the sealing assisting member (rubber cap 29A) for airtightly covering the opening end of the pierced hole (24Bg) and for changing the inner volume of the sealing space 51 in accordance with the inner pressure thereof.

The same advantages as those according to the tenth embodiment are obtained by airtightly arranging the (rubber ring 29B) made of the elastic member, as the sealing supporting member, at the predetermined position of (the second portion) of the CCD case 33, namely, in the annular area of the peripheral portion or the adjacent portion of the optical LPF 25, except for the pierced hole (24Bg; passage).

In the case of the third embodiment (refer to FIGS. 14 and 15), the same advantages as those according to the ninth embodiment are obtained by providing the pierced hole (24Bg) for connecting the space portion 51 to the outside at the predetermined position of the CCD case 34 (second member) as the dust-proofing filter supporting and CCD case formed by integrating the dust-proofing filter supporting member and the CCD case and the sealing assisting member (rubber cap 29A) for airtightly covering the opening end of the pierced hole (24Bg) and for changing the inner volume of the sealing space 51 in accordance with the inner pressure of the sealing space 51.

The same advantages as those according to the tenth embodiment are obtained by airtightly arranging the (rubber ring 29B) made of the elastic member, as the sealing assisting member, at the predetermined position of the CCD case 33 (second member), namely, in the annular area of the peripheral portion or the adjacent portion of the optical LPF 25, except for the pierced hole (24Bg; passage).

In the case of the fourth embodiment, the same advantages as those according to the ninth embodiment are obtained by providing the pierced hole (24Bg) for connecting the sealing space 51 to the outside at the predetermined position of the CCD case (second member) and by providing the sealing assisting member (rubber cap 29A) for airtightly covering the opening end of the pierced hole (24Bg) and for changing the inner volume of the sealing space 51 in accordance with the inner pressure of the sealing space 51.

The same advantages as those according to the tenth embodiment are obtained by airtightly arranging the (rubber ring 29B) made of the elastic member, as the sealing assisting member, at the predetermined position of the CCD case (second member), namely, in the annular area of the peripheral portion or the adjacent portion of the photoelectrically converting surface of the image pick-up device 27, except for the pierced hole (24Bg; passage).

In the image pick-up device unit 15 in the camera 1 according to the first embodiment, as mentioned above, the piezoelectric element 22 as the member for vibration for applying the vibrations to the dust-proofing filter 21 is arranged at the predetermined position of the peripheral portion of the dust-proofing filter 21 by using the adhering means such as an adhesive.

In this case, hereinbelow, a detailed description is given of the structure of the dust-proofing filter 21 (dust-proofing member) and the piezoelectric element 22 (member for vibration) in the image pick-up device unit 15.

Figure 32:
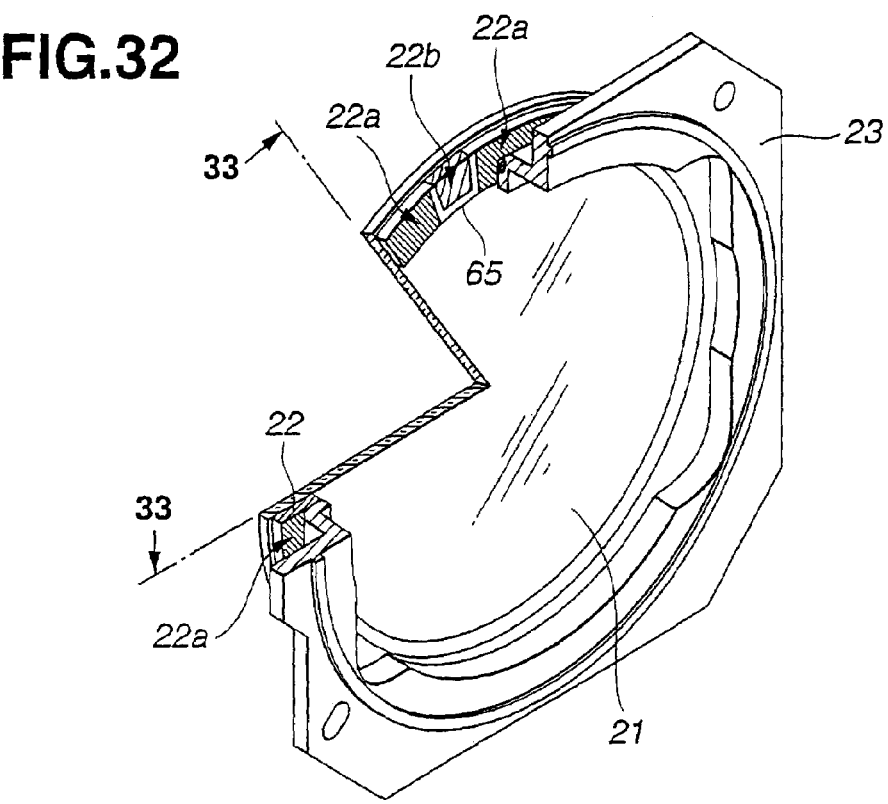
FIG. 32 is a perspective view showing by extracting a part of members forming an image pick-up device unit in a camera according to an eleventh embodiment of the present invention.
Figure 33:
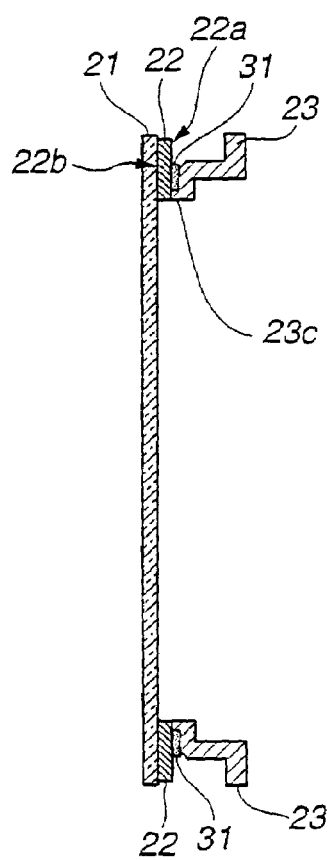
FIG. 33 is a sectional view along a line 33—33 shown in FIG. 32.

FIGS. 32 and 33 are diagrams showing by extracting a part of members forming an image pick-up device unit in a camera according to the eleventh embodiment of the present invention. FIG. 32 is a perspective view showing a cut-off part of the dust-proofing member (optical member; dust-proofing filter), the member for vibration (piezoelectric element), and the dust-proofing filter supporting member, in views of the back side (image pick-up device side). FIG. 33 is a sectional view along a line 33—33 shown in FIG. 32.

The structure of the camera according to the eleventh embodiment is the same as that according to the first embodiment. Therefore, the structures of the entire camera and image pick-up device unit are stated with reference to FIGS. 1 and 2 and FIGS. 3 to 5 used for the description of the first embodiment, and are not described in detail by using the same reference numerals.

According to the eleventh embodiment, the piezoelectric element 22 in the image pick-up device unit 15 is an electromechanical transducer in which, for example, plate-shaped piezoelectric ceramics is substantially circular-shaped. The piezoelectric element 22 has a first conductive member 22b at one surface thereof, namely, at the surface at which it is adhered to the dust-proofing filter 21, and a second conductive member 22a at another surface, namely, at the surface opposed to the surface of the dust-proofing filter 21 (surface at the back side).

A part of the first conductive member 22b is formed along the side surface of an outer edge side of the piezoelectric element 22 and, further, is formed extending to another surface. The first conductive member 22b and the second conductive member 22a are members which function as electrodes of the piezoelectric element 22.

That is, according to the eleventh embodiment, as mentioned above, the piezoelectric element 22 is adhered to the predetermined portion in the peripheral portion of the dust-proofing filter 21 by the means such as an adhesive. One surface of the piezoelectric element 22 becomes the adhering surface to the dust-proofing filter 21. Therefore, a connecting member such as a lead is not connected to the first conductive member 22b arranged to the adhering surface. In other words, the one surface of the piezoelectric surface 22 is not conductive to the first conductive member 22b.

Then, in the piezoelectric element 22, as mentioned above, a part of the first conductive member 22b is formed along the side surface on the outer edge of the piezoelectric element 22. Further, the part of the first conductive member 22b is formed extending to the surface on which the second conductive member 22a is formed. Thus, the connecting member is easily connected to the first conductive member 22b.

Corresponding thereto, the second conductive member 22a formed on another surface of the piezoelectric element 22 is formed in an area excluding the extending portion of the first conductive member 22b. An insulating portion 65 is provided between the extending portion of the first conductive member 22b and the second conductive member 22a. Thus, the extending portion of the first conductive member 22b and the second conductive member 22a are constructed not to be conductive on the other surface of the piezoelectric element 22 on which the second conductive member 22a is formed.

That is, referring to FIG. 32, the dust-proofing filter 21 is adhered to the dust-proofing filter supporting member 23 via the piezoelectric element 22 adhered to the dust-proofing filter 21 interposed, by using the adhering means such as the adhesive 31. In this case, a predetermined portion on the side where the second conductive member 22a of the piezoelectric element 22 is abutted onto the supporting portion 23c of the dust-proofing filter supporting member 23. Therefore, the supporting portion 23c of the dust-proofing filter supporting member 23 is sometimes arranged extending over the extending portion of the first conductive member 22b and the second conductive member 22a.

The dust-proofing filter supporting member 23 forms a part of the sealing structure as mentioned above. A part of the dust-proofing filter supporting member 23 is conductive. Specifically, the dust-proofing filter supporting member 23 is made of a conductive member such as metal or conductive resin, or is formed to be conductive by using means for applying a conductive coating.

In this case, the dust-proofing filter supporting member 23 may be conductive at a portion, namely, at least near a portion of the supporting portion 23c which is abutted onto the second conductive member 22a of the piezoelectric member 22.

Therefore, the extending portion of the first conductive member 22b is conductive to the second conductive member 22a by arranging the supporting portion 23c of the dust-proofing filter supporting member 23 over both the conductive members 22a and 22b. In order to prevent the conductive state of both the conductive members 22a and 22b, an insulating portion 65 is arranged.

As described above, the conductive portion of the dust-proofing filter supporting member 23 (sealing structure) is abutted onto the second conductive member 22a which is formed onto the surface of the piezoelectric element 22 (electromechanical transducer), thereby establishing the electrical connection therebetween to be conductive. Simultaneously, the above-stated insulating portion 65 disenables the conduction between the first conductive member 22b and the second conductive member 22a.

A predetermined voltage is applied to the piezoelectric element 22 by using the dust-proofing filter driving unit 48, so that the piezoelectric element 22 generates the vibrations which are applied to the dust-proofing filter 21.

In this case, the electrical connection between the first conductive member 22b and the second conductive member 22a in the piezoelectric element 22 by using the dust-proofing filter driving unit 48 enables the connection between the extending portion of the first conductive member 22b and the connecting member such as a lead from the dust-proofing filter driving unit 48. On the other hand, the dust-proofing filter supporting member 23 electrically connected to the second conductive member 22a is connected to the ground, thereby needing no connecting member such as a lead.

As described above, according to the eleventh embodiment, the same advantages as those according to the first embodiment are obtained.

Further, according to the eleventh embodiment, the piezoelectric element 22 is formed of the plate-shaped electromechanical transducer, the first conductive member 22b is arranged on the one surface of the piezoelectric element 22, and the second conductive member 22a is arranged on the other surface thereof. In addition, a part of the first conductive member 22b is formed along the side surface on the outer edge of the piezoelectric element 22 and is further extended to the surface side where the second conductive member 22a is formed.

The conductive portion is arranged to a part of the dust-proofing filter supporting member 23 and is abutted onto the second conductive member 22a of the piezoelectric element 22. In this case, the extending portion of the first conductive member 22b and the second conductive member 22a are constructed not to be conductive by providing the insulating portion 65 therebetween.

With the foregoing structure, the connecting member such as the lead is easily connected to the first conductive member 22b and the second conductive member 22a is electrically connected to the ground via the dust-proofing filter supporting member 23. Thus, the connecting means is omitted.

The arrangement of the connecting means such as the lead for connecting the piezoelectric element 22 to the dust-proofing filter driving unit 48 for driving the piezoelectric element 22 is simplified. As a result of the simplification, the working time for assembly in the manufacturing processing is reduced and the manufacturing processing such as the reduction of the working processing is simplified. This contributes to the reduction in manufacturing costs.

In addition, the dust-proofing structure formed of the dust-proofing filter 21 and the piezoelectric element 22 is simplified, thereby ensuring the stable mechanical accuracy without the variation in manufacturing.

According to the eleventh embodiment, the conductive portion of the dust-proofing filter supporting member 23 is abutted onto the second conductive member 22a of the piezoelectric element 22. However, the conductive portion of the dust-proofing filter supporting member 23 may be abutted onto the first conductive member 22b. Next, an example thereof is described according to the twelfth embodiment of the present invention.

FIGS. 34 and 35 are diagrams showing by extracting a part of members forming an image pick-up device unit in a camera according to the twelfth embodiment of the present invention. FIG. 34 is a perspective view showing by extracting a part of the dust-proofing member, the member for vibration, and the dust-proofing filter supporting member in view of the back side thereof (image pick-up device side). FIG. 35 is a sectional view along a line 35—35 shown in FIG. 34.

According to the twelfth embodiment, the structure is basically formed in the same manner as that according to the eleventh embodiment. However, unlike the eleventh embodiment, the first conductive member 22b in the piezoelectric member 22 is abutted onto the conductive portion of the dust-proofing filter supporting member 23. Therefore, other structures are not described and illustrated and are referred to those according to the first embodiment.

According to the twelfth embodiment, similarly to the piezoelectric element 22 according to the eleventh embodiment, the piezoelectric element 22 is an electromechanical transducer which is made of plate-shaped piezoelectric ceramics with a substantially circular shape.

The piezoelectric element 22 comprises the first conductive member 22b on one surface thereof (on the side of the dust-proofing filter 21) and the second conductive member 22a on another surface thereof (on the reversed side of the dust-proofing filter 21). Similarly to the eleventh embodiment, a part of the first conductive member 22b is formed along the side surface of the outer edge of the piezoelectric element 22 and is extended to another surface thereof.

Corresponding thereto, similarly to the eleventh embodiment, the second conductive member 22a formed on the other surface of the piezoelectric element 22 is formed in an area excluding the extending portion of the first conductive member 22b. The insulating portion 65 is provided between the extending portion of the first conductive member 22b and the second conductive member 22a.

According to the twelfth embodiment, the conductive portion of the dust-proofing filter supporting portion 23 having at least a conductive part forms a part of the sealing structure and is abutted onto the first conductive member 22b formed onto the piezoelectric element 22 (electromechanical transducer). Thus, the electrical connection between the conductive portion of the dust-proofing filter supporting member 23 and the first conductive member 22b is assured to be conductive therebetween. Further, the first conductive member 22b and the second conductive member 22a are constructed not to be conductive by the above-mentioned insulating portion 65. Other structures are the same as those according to the first and eleventh embodiments.

According to the twelfth embodiment, the same advantages as those according to the eleventh embodiment are obtained.

Next, a thirteenth embodiment of the present invention will be described.

Figure 36:
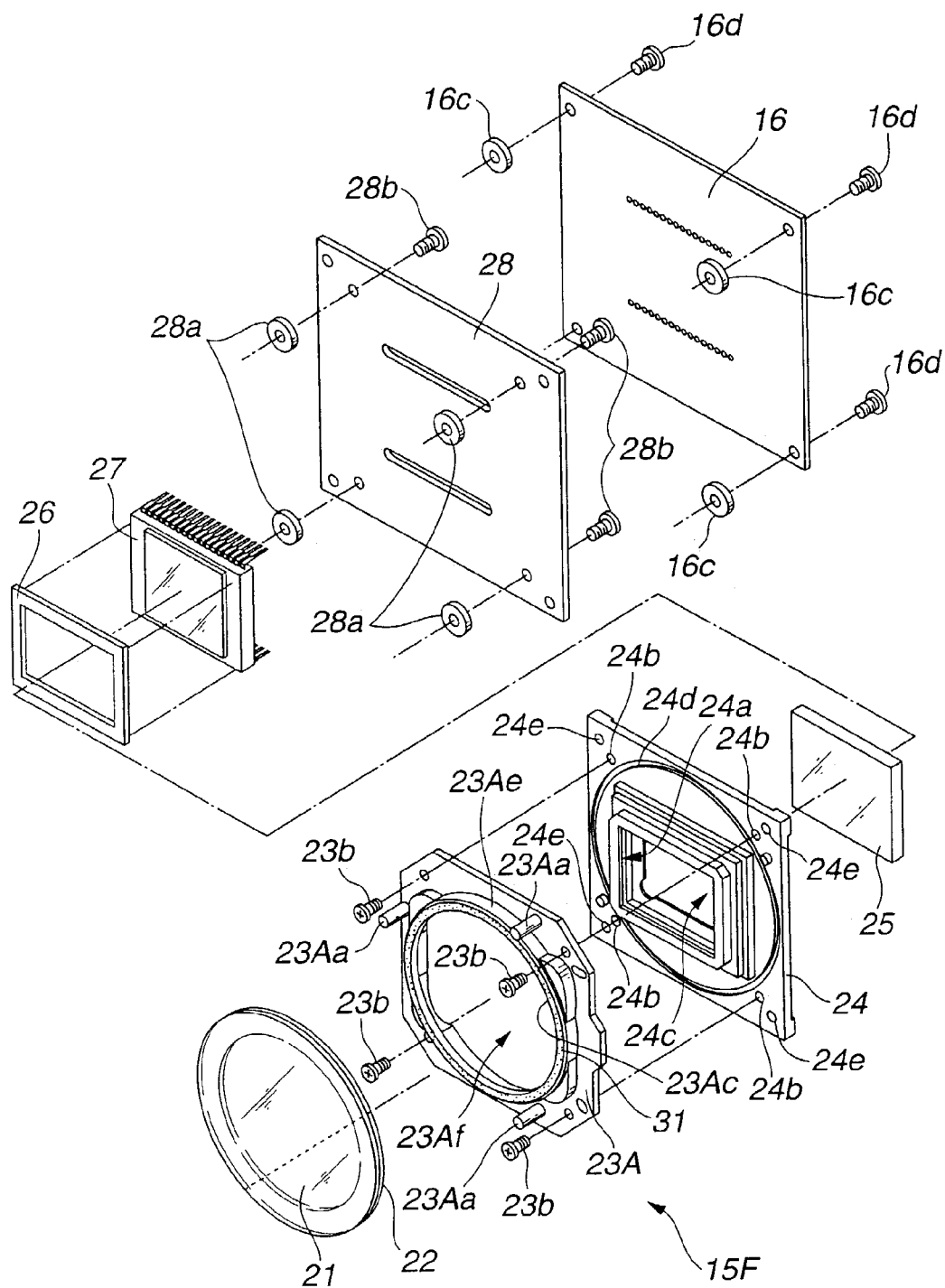
FIG. 36 is a diagram showing by extracting a part of an image pick-up device unit in a camera according to a thirteenth embodiment of the present invention, showing by extracting a main-part exploded perspective view showing the disassembled image pick-up device unit.

FIG. 36 is a main-part exploded perspective view showing a disassembled part of an image pick-up device unit in a camera according to the thirteenth embodiment of the present invention.

According to the thirteenth embodiment, the structure of the camera is basically the same as that according to the first embodiment. Therefore, the structure of the entire camera is illustrated with reference to FIGS. 1 and 2 used for the description of the first embodiment and is not described in detail by using the same reference numerals for the same structure. Further, according to the thirteenth embodiment, the image pick-up device unit in the camera is the same as that according to any of the first to fifth embodiment. Therefore, the structure of the entire image pick-up device unit is illustrated with reference to FIGS. 3 to 5, and the structure of a part of the image pick-up device unit, namely, of the dust-proofing filter supporting member and the dust-proofing filter are illustrated with reference to FIGS. 16 to 18 used for the fifth embodiment and are described by using the same reference numerals for the same structure.

According to the thirteenth embodiment, an image pick-up device unit 15F in the camera 1 comprises a plurality of members including the shutter unit 14, similarly to the above-stated embodiments. Referring to FIG. 36, only the main portion is shown and the shutter unit 14 is not shown.

Further, referring to FIG. 36, for the purpose of showing the positional relationship of the members, the members are arranged near the image pick-up device unit 15F, and the main circuit board 16 on which image pick-up system electrical circuits such as the image pick-up device 27, the image signal processing circuit 16a, and the work memory 16b are mounted is shown together. A general main circuit board used in the conventional camera is applied to the main circuit board 16, and it is not described in detail.

The image pick-up device unit 15F comprises: the image pick-up device 27 comprising the CCD and the like, which obtains the image signal corresponding to light transmitted through the photographing optical system 12a and irradiated to the photoelectrically converting surface thereof; the image pick-up device fixing plate 28 comprising a thin-sheet member for fixing and supporting the image pick-up device 27; the optical low-pass filter 25 (hereinafter, referred to as an optical LPF) arranged on the side of the photoelectrically converting surface of the image pick-up device 27, as an optical device which is formed to remove high frequency components from the subject beams transmitted and irradiated through the photographing optical system 12a; the low-pass filter supporting member 26 arranged at a peripheral portion between the optical LPF 25 and the image pick-up device 27, which is made of an almost-frame-shaped elastic member, etc.; the image pick-up device accommodating case member 24 (hereinafter, referred to as the CCD case 24) which accommodates, fixes, and holds the image pick-up device 27, supports the optical LPF 25 (optical device) to be in contact with a peripheral portion to an adjacent portion of the optical LPF 25 and which comes into closely contact with the dust-proofing filter supporting member 23A at a predetermined portion thereof, which will be described later; the dust-proofing filter supporting member 23A is arranged in front of the CCD case 24 and comes into contact with the dust-proofing filter 21 (dust-proofing member) at the peripheral portion or the adjacent portion thereof and supports it; the dust-proofing filter 21 as a dust-proofing member opposed and arranged at the predetermined position having the predetermined interval to the optical LPF 25 in front of the optical LPF 25 on the side of the photoelectrically converting surface of the image pickup device 27, which is supported by the dust-proofing filter supporting member 23A; and the piezoelectric element 22 arranged at the peripheral portion of the dust-proofing filter 21, to the surface on the opposed side of the image pick-up device 27 as a member for vibration for applying predetermined vibrations to the dust-proofing filter 21, comprising an electromechanical transducer or the like.

The dust-proofing filter 21 is airtightly jointed, fixed, and held to the dust-proofing filter supporting member 23A (one member forming the sealing structure) by the adhesive 31. In this case, the dust-proofing filter 21 is adhered and fixed to the dust-proofing filter supporting member 23A at the entire circumference of the peripheral portion on one surface thereof by using the adhesive 31.

An opening 23Af with a circular or polygon shape is pierced near almost the center of the dust-proofing filter supporting member 23A. The subject beams transmitted through the photographing optical system 12a pass through the opening 23Af and are set with a size enough to irradiate the photoelectrically converting surface of the image pick-up device 27 on which the beams are set at the back side.

A wall portion 23Ae projecting toward the front side is formed at the peripheral portion of the opening 23Af with a substantially annular shape. A supporting portion 23Ac is formed to further be projected toward the front side (refer to FIGS. 36 and 16 to 18).

A plurality of projecting portions 23Aa (three projecting portions according to the thirteenth embodiment) are formed to be projected toward the front side, near an outer peripheral portion in front of the dust-proofing filter supporting member 23A. The projecting portions 23Aa function as position regulating members for positioning upon adhering and arranging the dust-proofing filter 21 to the dust-proofing filter supporting member 23A.

The dust-proofing filter 21 is adhered to the piezoelectric member 22 in front of the dust-proofing filter supporting member 23A by using the adhesive 31 (refer to FIG. 18).

In this case, the adhesive 31 is applied all over the end side of the wall portion 23Ae of the dust-proofing filter supporting member 23A, that is, at the entire circumference of the annular area. In this status, the dust-proofing filter 21 is adhered from the front side of the dust-proofing filter supporting member 23A. In this case, the dust-proofing filter 21 is arranged at a predetermined position of the dust-proofing filter supporting member 23A by moving the outer circumferential portion of the dust-proofing filter 21 along the projecting portions 23Aa in the optical axis direction.

The supporting portion 23Ac is abutted onto a predetermined position (portion as a node upon vibration) of the dust-proofing filter 21 (actually, the piezoelectric element 22).

Therefore, the dust-proofing filter supporting member 23A is airtightly jointed, is fixed to, and is held to the dust-proofing filter 21 by the adhesive 31 in an annular area near the peripheral portion of the dust-proofing filter 21, that is, at the end portion of the wall portion 23Ae.

Other structures are substantially the same as those according to the first to fifth embodiments.

As mentioned above, the circumferential groove 24d is airtightly fit to an annular convex portion, with respect to the dust-proofing filter supporting portion 23A and the CCD case 24. The dust-proofing filter supporting member 23A is airtightly jointed to the dust-proofing filter 21 by adhering force of the adhesive 31 via the piezoelectric element 22 interposed. The optical LPF 25 arranged at the CCD case 24 is constructed to be airtight between the peripheral portion in front and the step portion 24a of the CCD case 24.

Further, the image pick-up device 27 is arranged at the back side of the optical LPF 25 via the low-pass filter supporting member 26 interposed and thus the airtightness is held between the optical LPF 25 and the image pick-up device 27.

With the above-described structure, therefore, a predetermined air gap portion is formed in a space in which the optical LPF 25 is opposed to the dust-proofing filter 21. At the same time, a predetermined space portion is formed at the peripheral portion of the optical LPF 25 by the CCD case 24, the dust-proofing filter supporting member 23A, and the dust-proofing filter 21. The predetermined space is a sealed space formed to be projected to the outside of the optical LPF 25.

In this case, the space portion is set to be wider than the above-stated air gap portion. The space containing the air gap portion and the space portion forms a sealing space which is airtightly sealed by the CCD case 24, the dust-proofing filter supporting member 23A, the dust-proofing filter 21, and the optical LPF 25.

According to the thirteenth embodiment, the image pick-up device unit 15F in the camera forms the sealing structure which forms the sealing space which is substantially sealed, including the air gap portion formed to the peripheral portion of the optical LPF 25 and the dust-proofing filter 21. The sealing structure is arranged at the peripheral portion of the optical LPF 25 or the outside the adjacent portion thereof.

Further, according to the thirteenth embodiment, the sealing structure comprises the dust-proofing filter supporting member 23A for supporting the dust-proofing filter 21 in contact with the peripheral portion or the adjacent portion thereof and the CCD case 24 arranged for supporting the optical LPF 25 in contact with the peripheral portion or the adjacent thereof and for coming into closely contact with the dust-proofing filter supporting member 23A at the predetermined portion thereof.

According to the thirteenth embodiment, in the camera 1 with the foregoing structure, the dust-proofing filter 21 is opposed to the predetermined position in front of the image pick-up device 27, and the sealing space is formed at the photoelectrically converting surface of the image pick-up device 27 and the peripheral portion of the dust-proofing filter 21. Consequently, the adhesion of dust and the like to the photoelectrically converting surface of the image pick-up device 27 is prevented.

Dust and the like adhered to the exposed surface in front of the dust-proofing filter 21 are removed by applying a periodic voltage to the piezoelectric element 22 arranged integrally with the peripheral portion of the dust-proofing filter 21 and by thus applying predetermined vibrations to the dust-proofing filter 21.

In this case, the operations upon vibration of the dust-proofing filter 21 by using the piezoelectric element 22 are the same as those according to the first embodiment described with reference to FIGS. 6 to 11.

As mentioned above, according to the thirteenth embodiment, the same advantages as those according to the first embodiment are obtained.

Further, according to the thirteenth embodiment, the adhesive 31 is used as the means for fixing and holding the dust-proofing filter 21 and for airtightly jointing the dust-proofing filter 21 and the dust-proofing filter supporting member 23A. Thus, the structure is easily simplified and this contributes to the reduction in number of members. Furthermore, this contributes to the simplification of the manufacturing processing and the reduction in manufacturing costs.

In the camera 1 according to the thirteenth embodiment, the dust-proofing filter supporting member 23A and the CCD case 24 are independently formed and they are airtightly fit to each other. However, the present invention is not limited to this and, advantageously, the dust-proofing filter supporting member 23A and the CCD case 24 are integrally formed as a single member.

In addition, according to the thirteenth embodiment, the dust-proofing filter 21 is adhered and fixed to the dust-proofing filter supporting member 23A by using the adhesive 31. In this case, the dust-proofing filter 21 is adhered and fixed to the dust-proofing filter supporting member 23A (sealing structure) at the entire peripheral portion on one surface thereof by using the adhesive 31.

As mentioned above, upon adhering and fixing the dust-proofing filter 21 to the dust-proofing filter supporting member 23A, the dust-proofing filter 21 is fixed to the entire peripheral portion of the dust-proofing filter 21, thereby establishing accurate adhesion and fixing. Consequently, a preferable sealing status is ensured.

On the other hand, the vibrations are applied to the dust-proofing filter 21 by using the piezoelectric element 22. As a result of the vibrating action, dust and the like adhered to the outer surface of the dust-proofing filter 21 is removed.

According to the thirteenth embodiment, when the entire circumference of the peripheral portion of the dust-proofing filter 21 is adhered and fixed to the dust-proofing filter supporting member 23A, the vibrations are attenuated by vibrating the dust-proofing filter 21 using the operation of the piezoelectric element 22 in some cases.

For example, means is considered as one for suppressing the attenuation of the vibrations while ensuring the adhering force between the dust-proofing filer supporting member 23A and the dust-proofing filter 21 according to the fourteenth embodiment.

That is, according to the fourteenth embodiment of the present invention, a portion of the adhesive 31 adhering between the dust-proofing filter 21 and the dust-proofing filter supporting member 23A is fixed at a plurality of predetermined positions at the peripheral portion of the dust-proofing filter 21.

Figure 37:
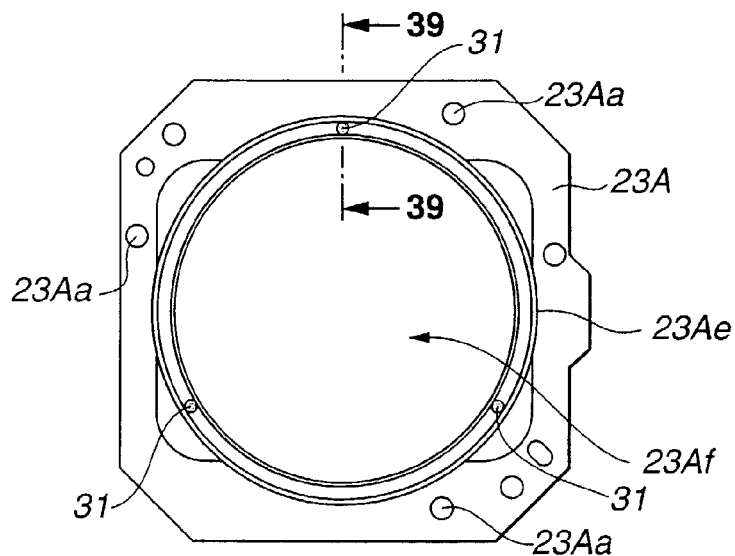
FIG. 37 is a diagram showing by extracting a part of the image pick-up device unit in a camera according to a fourteenth embodiment of the present invention, showing by extracting a front view showing a dust-proofing filter supporting member of the image pick-up device unit.
Figure 38:
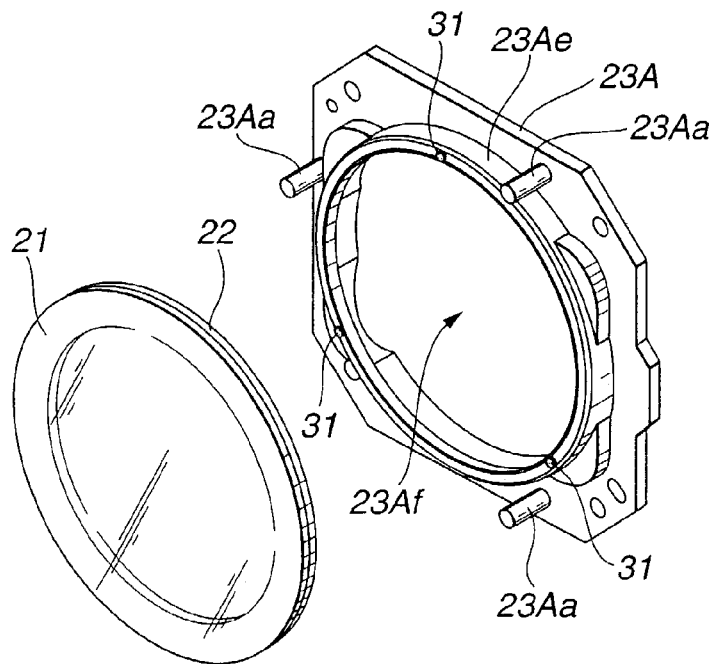
FIG. 38 is an exploded perspective view showing a dust-proofing supporting member and a dust-proofing filter of the image pick-up device unit shown in FIG. 37.
Figure 39:
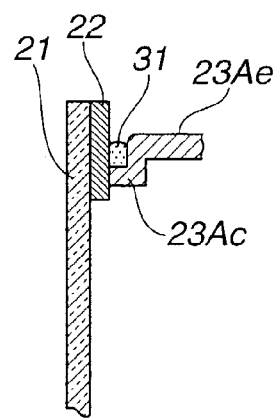
FIG. 39 is a sectional view at a position along a line 39—39 shown in FIG. 37.

FIGS. 37 to 39 are diagrams showing by extracting a part of an image pick-up device unit according to the fourteenth embodiment of the present invention. FIG. 37 is a front view showing the dust-proofing filter supporting member in the members forming the image pick-up device unit. FIG. 38 is an exploded perspective view showing the dust-proofing filter supporting member and the dust-proofing filter (dust-proofing member) among the members forming the image pick-up device unit. FIG. 39 is a main-part sectional view showing an adhering state of the dust-proofing filter supporting member and the dust-proofing filter by using the adhesive at a position along a line 39—39 shown in FIG. 37.

Basically, the structure according to the fourteenth embodiment is formed in the same manner as that according to the thirteenth embodiment. Unlike the structure according to the thirteenth embodiment, an applying portion of the adhesive 31 is provided so as to adhere and fix the dust-proofing filter 21 to the dust-proofing filter supporting member 23A. Therefore, only the different portion from that according the thirteenth embodiment is shown and the same structure is designated by the same reference numeral and is not described. Further, the structure of the entire camera is neither described nor shown (refer to FIGS. 1, 2, and 36).

According to the fourteenth embodiment, the dust-proofing filter (dust-proofing member) is adhered and fixed to the dust-proofing filter supporting member 23A forming a part of the sealing structure at a plurality of the peripheral portions of the dust-proofing filter 21.

That is, referring to FIGS. 37 and 38, the adhesive 31 is applied to three predetermined portions near the supporting portions 23Ac of the dust-proofing filter supporting member 23A. In this case, the dust-proofing filter 21 is adhered to the supporting portions 23Ac in front of the dust-proofing filter supporting member 23A. Thus, the dust-proofing filter 21 is adhered and fixed to the dust-proofing filter supporting member 23A at a plurality of the peripheral portions of the dust-proofing filter 21 via the piezoelectric element 22 interposed. Other structures are the same as those according to the thirteenth embodiment.

With the above-described structure according to the fourteenth embodiment, the same advantages as those according to the thirteenth embodiment are obtained. Further, the dust-proofing filter 21 is accurately adhered and fixed to the dust-proofing filter supporting member 23A and the adhering portions are restricted to several portions. Consequently, as compared with the case of adhering the dust-proofing filter supporting member 23A to the entire circumference of the peripheral portion of the dust-proofing filter 21, the attenuation of the vibrations of the dust-proofing filter 21 can be suppressed. Therefore, the vibrating action of the dust-proofing filter 21 can be ensured without fail.

According to the fourteenth embodiment, the three adhering portions are set. However, the present invention is not limited to this and, advantageously, a plurality of adhering portions may be used. Preferably, in view of assuring the adhering force is minimum and necessary, the number of the adhering portions is at least three or more.

According to the example in the thirteenth and fourteenth embodiments, the supporting portions 23Ac of the dust-proofing filter supporting member 23A are abutted onto the predetermined positions of the piezoelectric element 22.

However, upon applying the vibrations to the dust-proofing filter 21 by the operation of the piezoelectric element 22, the resonant frequency of the vibrations is varied depending on the shape, size, plate thickness, and the material of the dust-proofing filter 21 as mentioned above.

Further, as described above, preferably, the supporting portions 23Ac of the dust-proofing filter supporting member 23A are abutted onto the portions as vibration nodes of the dust-proofing filter 21.

Then, according to the fifteenth embodiment of the present invention, the portions as the vibration nodes of the dust-proofing filter 21 are not the portions to which the piezoelectric element 22 is arranged but predetermined positions on the surface of the dust-proofing filter 21.

Figure 40:
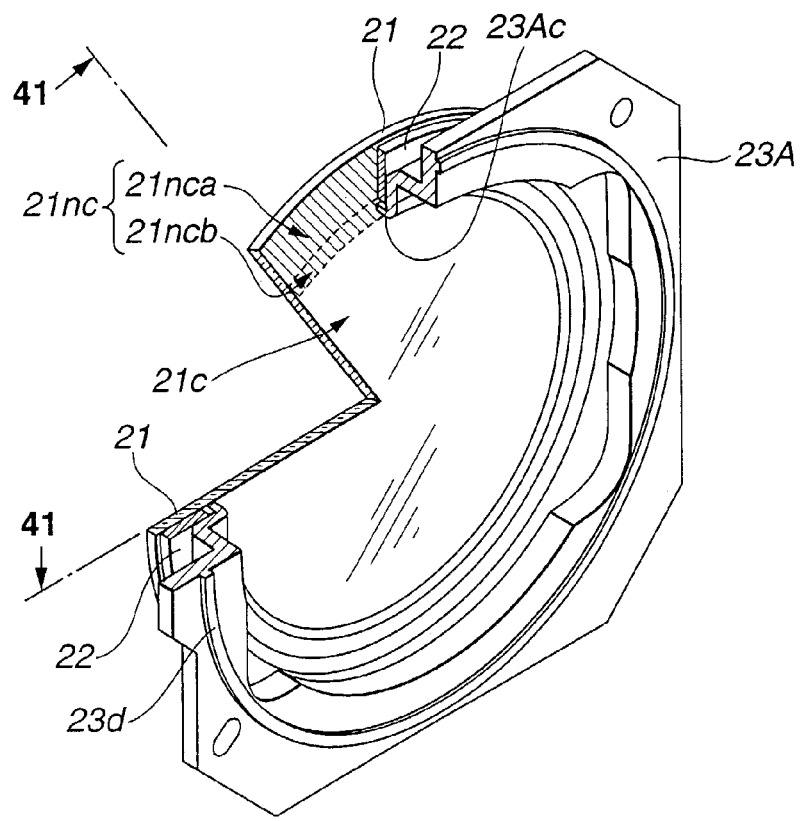
FIG. 40 is a diagram showing by extracting a part of an image pick-up device unit in a camera according to a fifteenth embodiment of the present invention, specifically, a perspective view showing the adhesion of a dust-proofing filter to a dust-proofing supporting member in the image pick-up device unit.
Figure 41:
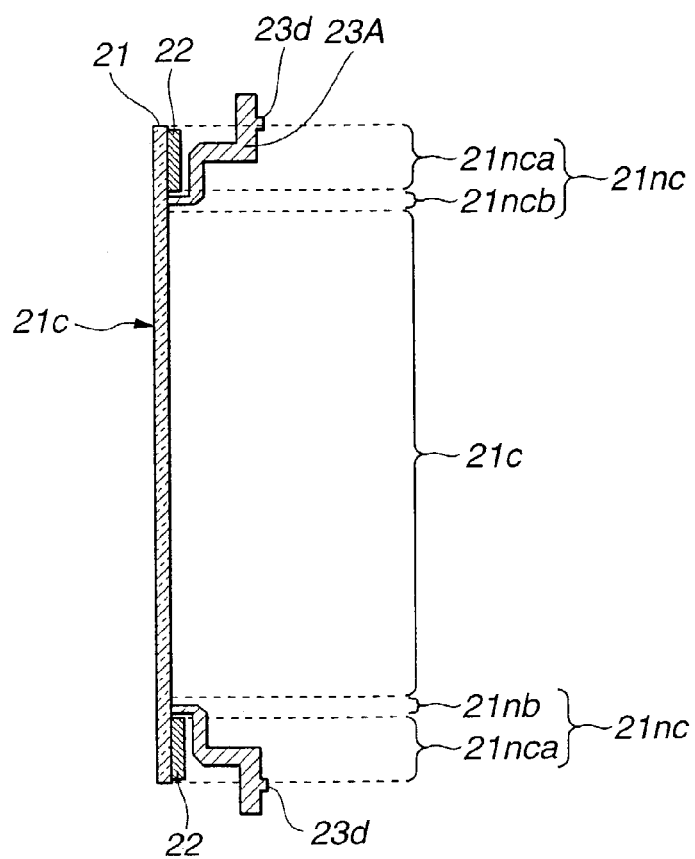
FIG. 41 is a sectional view along a line 41—41 shown in FIG. 40.

FIGS. 40 and 41 are diagrams showing by extracting a part of an image pick-up device unit in a camera according to the fifteenth embodiment of the present invention. FIG. 40 is a perspective view showing in a state in which the dust-proofing filter is adhered to the dust-proofing filter supporting member among the members forming the image pick-up device unit. FIG. 41 is a sectional view along a line 41—41 shown in FIG. 40.

According to the fifteenth embodiment, basically, the structure is formed in the same manner as that according to the thirteenth and fourteenth embodiments. The contact position between the dust-proofing filter 21 and the dust-proofing filter supporting member 23A is different from that according to the thirteenth and fourteenth embodiments upon adhering and fixing the dust-proofing filter 21 to the dust-proofing filter supporting member 23A. Therefore, only the different portion from that according to the thirteenth and fourteenth embodiments is shown, and the same structure is designated by the same reference numeral and is not described. Further, the structure of the entire camera is neither shown nor described (refer to FIGS. 1, 2, and 36).

According to the fifteenth embodiment, the supporting portion 23Ac of the dust-proofing filter supporting member 23A directly is abutted onto the surface of the dust-proofing filter 21. Corresponding thereto, the piezoelectric element 22 is adhered to the surface of the peripheral portion of the dust-proofing filter 21 so as to avoid the supporting portion 23Ac.

The subject beams transmitted through the photographing optical system 12a are incident on the dust-proofing filter 21. After that, the beams reach the photoelectrically converting surface of the image pick-up device 27 and form the subject image thereon. In other words, the dust-proofing filter 21 is arranged on an optical path of the beams contributing to the formation of the subject image.

In consideration of the foregoing, at the surface of the dust-proofing filter 21, so-called coating processing is generally performed, that is, the formation of various thin films such as (a reflection preventing film or electrostatic charge preventing film) for preventing the reflection or the electrostatic charge, and (an infrared cut-off film or ultraviolet cut-off film) for preventing the absorption and the transmission of the infrared or the ultraviolet.

In this case, as the coating processing for the dust-proofing filter 21, various processing formats are considered, for example, processing for forming, as a single member, a thin film having a function of any of the above various thin films, processing for forming a thin film multi-functioned by laminating a plurality of thin films among the various thin films, and processing for forming a thin film multi-functioned among the various thin films.

Herein, the reflection preventing film (refereed to as an AR coating) suppresses a reflection ratio of the surface and improves the transmittance by evaporating a multi-layered film obtained by laminating by a thickness of a ¼-wavelength (0.1 to 0.3 μm), for example, silicon oxide ($SiO_2$),
titanate oxide ($TiO_2$), and
zinc oxide ($ZnO_2$).

The surface reflection ratio of a normal glass is approximately 4%. However, the reflection ratio is suppressed to 1% or less by applying the reflection preventing film to the surface.

As the electrostatic charge preventing film, a transparent conductive film used for the optical system is applied. The transparent conductive film has the large conductivity and the high translucency in a visible area and, mainly, a visible light average transmittance is about 80% or more and the resistivity is, in many case, about $1 \times 10^{-3}$ Ω·cm or less.

The transparent conductive film includes a metal transparent conductive film made of gold (Au), silver (Ag), platinum (Pt), etc., and an oxide semiconductor transparent conductive film made of indium oxide ($In_2O_3$),
tin oxide ($SnO_2$),
zinc oxide ($ZnO_2$),
etc.

The metal transparent conductive film has a problem on the translucency and the film intensity and therefore the optical fields mainly use the oxide semiconductor transparent conductive film.

The infrared cut-off film (referred to as an IR cut-off film) reflects infrared light (having wavelength of 670 to 680 nm or more) and transmits light in other wavelength areas.

The ultraviolet cut-off film (referred to as a UV cut-off film) reflects ultraviolet light (having wavelength of 390 to 410 nm or less) and transmits light in other wavelength areas.

When the surface of the dust-proofing filter 21 is subjected to the coating processing, the adhering force is not sufficiently assured of adhering the piezoelectric element 22 and the supporting portion 23Ac to the surface of the dust-proofing filter 21. The thin film formed by the coating processing is likely to be peeled off. In the state in which the piezoelectric element 22 and the supporting portion 23Ac are adhered, the thin film is peeled off. Further, not only the piezoelectric element 21 but also the dust-proofing filter supporting member 23A is also likely to be peeled off.

Then, according to the fifteenth embodiment, a thin-film non-forming portion 21nc (portion shown by a shaded portion in FIG. 40) is provided, that is, the thin-film non-forming portion 21nc is not subjected to the coating processing and has no thin film at a portion to which the piezoelectric element 22 and the supporting portion 23Ac are adhered. Referring to FIGS. 40 and 41, a portion shown by the reference numeral 21nca shows a portion to which the piezoelectric element 22 is adhered. As shown in FIGS. 40 and 41, the supporting portion 23Ac of the dust-proofing filter supporting member 23A is adhered to a portion shown by reference numeral 21ncb.

A thin-film forming portion 21c corresponds to a portion other than the thin-film non-forming portion 21nc on the surface of the dust-proofing filter 21, that is, a transparent portion capable of transmitting valid beams incident into the image pick-up device 27 from the photographing lens 12a with respect to the dust-proofing filter 21.

Upon adhering and fixing the dust-proofing filter supporting member 23A to the above-formed dust-proofing filter 21, the supporting portion 23Ac is abutted onto the thin-film non-forming portion 21ncb of the dust-proofing filter 21. In this state, the adhesive 31 is used to adhere and fix the dust-proofing filter supporting member 23A to the dust-proofing filter 21.

Other structures are substantially the same as those according to the thirteenth and fourteenth embodiments.

With the thus formed dust-proofing filter 21, when the dust-proofing filter supporting member 23A is directly abutted onto the surface of the dust-proofing filter 21 and is adhered thereto, the same advantages as those according to the thirteenth and fourteenth embodiments are obtained. Further, the dust-proofing filter supporting member 23A is accurately adhered and fixed to the dust-proofing filter 21.

In this case, with regard to the dust-proofing filter 21 and the dust-proofing filter supporting member 23A, similarly to the case according to the thirteenth embodiment, the dust-proofing filter 21 may be adhered and fixed to the dust-proofing filter supporting member 23A at the entire circumference of the peripheral portion thereof or, similarly to the case according to the fourteenth embodiment, the dust-proofing filter 21 may be adhered and fixed to the dust-proofing filter supporting member 23A at a plurality of positions of the peripheral portion thereof.

Next, the sixteenth embodiment of the present invention will be described.

According to the sixteenth embodiment of the present invention, basically, the structure is the same as that according to the first embodiment but a part of the image pick-up device unit is different. Therefore, the same components as those according to the first embodiment are designated by the same reference numerals and are not described, and only different components are described. The structure of the entire camera will be illustrated with reference to FIGS. 1 and 2 used for the first embodiment.

According to the sixteenth embodiment, an image pick-up device unit in a camera will be described in detail.

Figure 42:
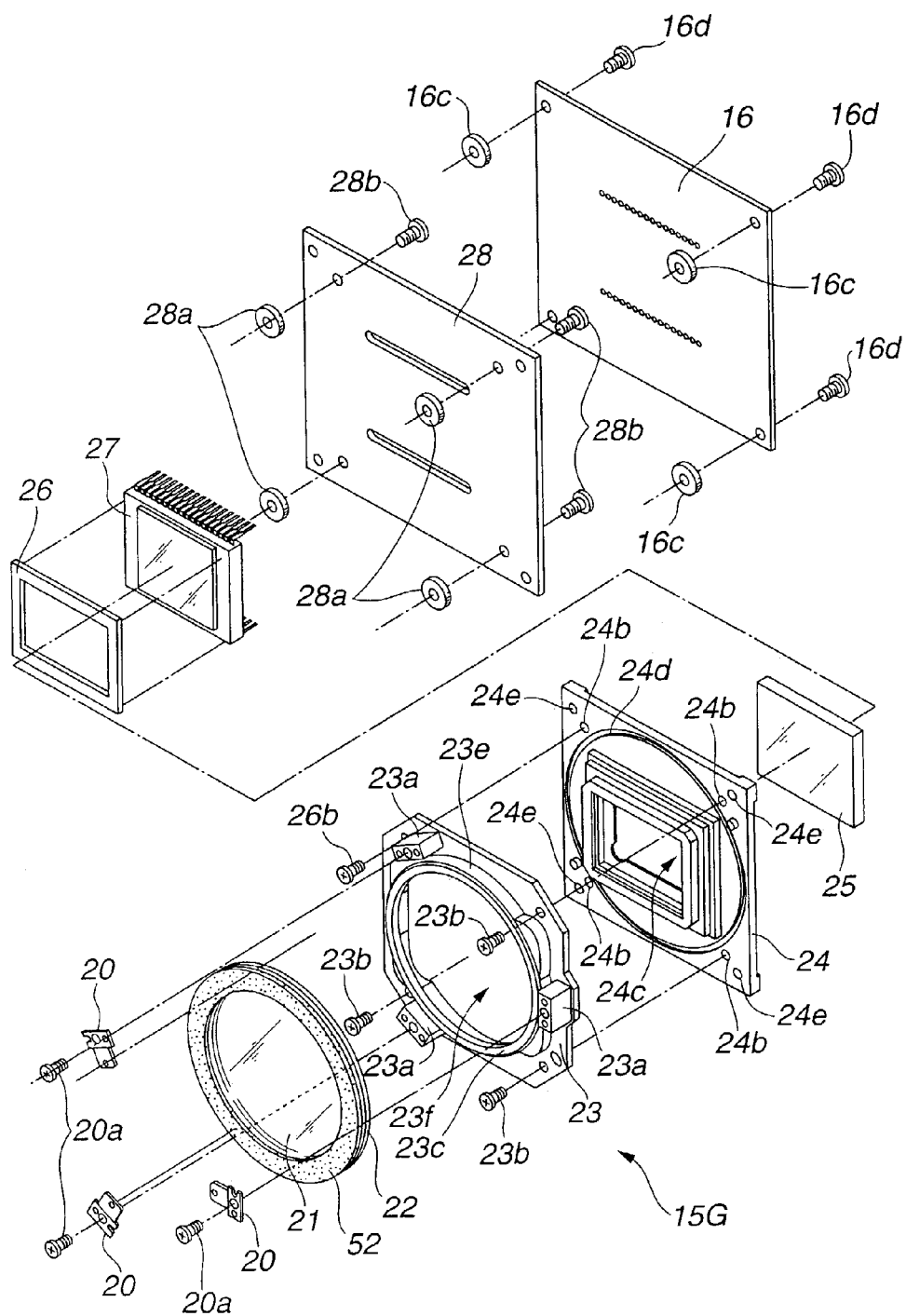
FIG. 42 is a diagram showing by extracting a part of an image pick-up device unit in a camera according to a sixteenth embodiment of the present invention, specifically, a main-part exploded perspective view showing the disassembled image pick-up device unit.
Figure 43:
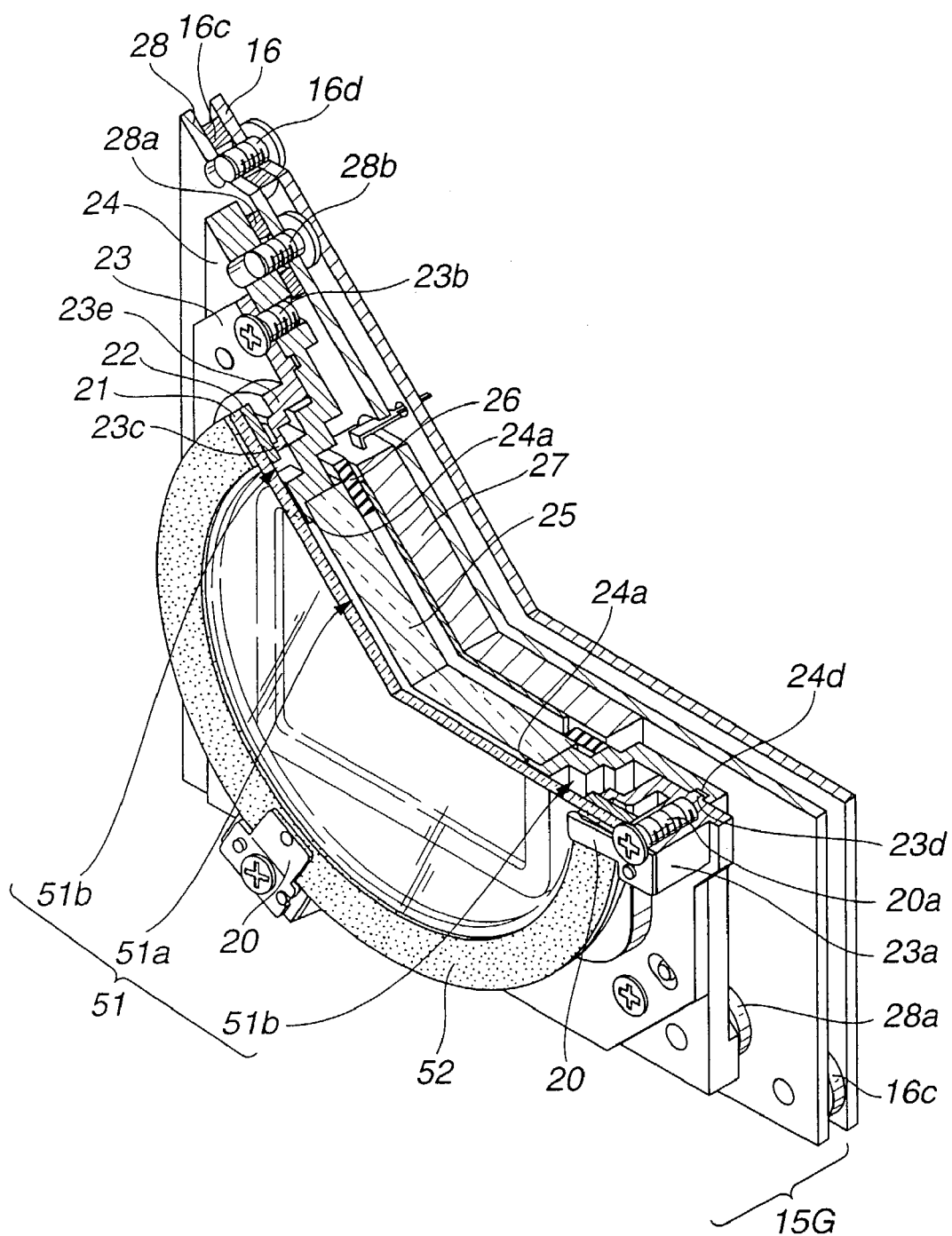
FIG. 43 is a perspective view showing a cut-off part when the image pick-up device unit shown in FIG. 42 is assembled.
Figure 44:
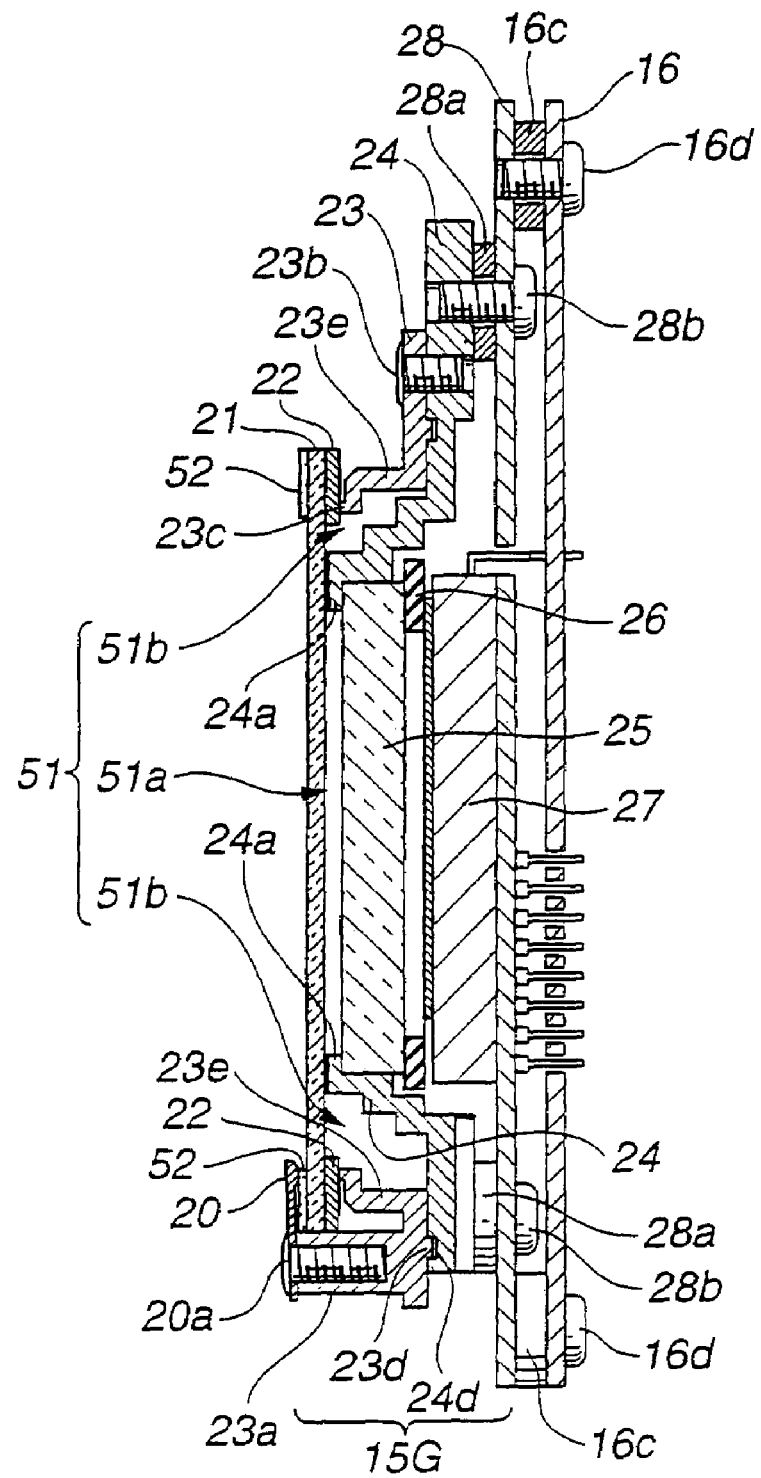
FIG. 44 is a sectional view along a cut-off plane shown in FIG. 43.

FIGS. 42 to 44 are diagrams showing by extracting a part of the image pick-up device unit in the camera according to the sixteenth embodiment. FIG. 42 is a main-part exploded perspective view showing the disassembled image pick-up device unit. FIG. 43 is a perspective view showing a cut-off part of the assembled image pick-up device unit. FIG. 44 is a sectional view along a cut-off plane shown in FIG. 43.

According to the sixteenth embodiment, an image pick-up device unit 15G in the camera 1 comprises a plurality of members containing the shutter unit 14, similarly to the above-mentioned embodiments. Therefore, only a main portion of the image pick-up device unit is illustrated in FIGS. 42 to 44 and the shutter unit 14 is not shown similarly to the first embodiment (refer to FIGS. 3 to 5).

For the purpose of showing a positional relationship of the members, referring to FIGS. 42 to 44, the members are arranged near the image pick-up device unit 15G and the main circuit board 16, on which the image pick-up system electrical circuits such as the image pick-up device 27, the image signal processing circuit 16a, and the work memory 16b are mounted, is shown together, similarly to FIGS. 3 to 5 according to the first embodiment. The main circuit board 16 is one of main circuit boards generally used for the conventional cameras, and a detailed description thereof is omitted.

The dust-proofing filter supporting member 23 is fixed to the front side of the CCD case 24 by using a screw 23b against a screw hole 24b of the CCD case 24. In this case, referring to FIGS. 42 to 44, the circumferential groove 24d is formed with a substantially annular shape at a predetermined position on the front side of the peripheral portion of the CCD case 24. On the other hand, a annular-shaped convex portion 23d (not shown in FIG. 42) corresponding to the circumferential groove 24d of the CCD case 24 is formed with the substantially annular shape all over the entire circumference at a predetermined position of the back surface at the peripheral portion of the dust-proofing filter supporting member 23. Therefore, the CCD case 24 is airtightly fit to the dust-proofing filter supporting member 23 in an annular-shaped area, namely, in an area having the circumferential groove 24d and the annular-shaped convex portion 23d by fitting the annular-shaped convex portion 23d to the peripheral portion 24d.

The dust-proofing filter 21 is wholly circular- or polygonal-shaped and has at least an area having a predetermined extensity in a radial direction from the center of the dust-proofing filter 21 as a transparent portion. The transparent portion is opposed to the front side of the optical LPF 25 at a predetermined interval.

The piezoelectric element 22, an electromechanical transducer as a predetermined member for vibration for applying the vibrations to the dust-proofing filter 21, is arranged to the peripheral portion of one surface of the dust-proofing filter 21 (according to the sixteenth embodiment, at the back, that is, the surface on the image pick-up device 27 side) by adhering means such as an adhesive so as to integrate to the dust-proofing filter 21. The piezoelectric element 22 generates predetermined vibrations of the dust-proofing filter 21 by externally applying a predetermined driving voltage. In other words, the piezoelectric element 22 as the member for vibration actively removes dust and the like adhered to the surface of the dust-proofing filter, thereby functioning as cleaning means for clearing the surface of the dust-proofing filter 21.

Further, the dust-proofing filter 21 is fixed and held by the pressing member 20 made of the elastic member such as a plate-shaped spring so as to airtightly be jointed to the dust-proofing filter supporting member 23.

An adhering member 52 such as an adhesive tape as dust collecting means is integrally arranged to the dust-proofing filter 21 at an outer peripheral portion of a reversed surface of the adhering surface of the piezoelectric element 22 (according to the sixteenth embodiment, the front side, that is, the reversed side of the image pick-up device 27, in other words, the surface on the arrangement side of the photographing lens), as another surface of the dust-proofing filter 21, or on the adjacent portion thereof, by using the adhering means such as the adhesive.

Figure 45:
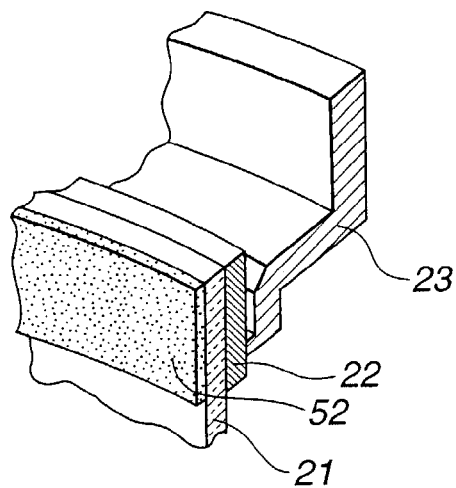
FIG. 45 is a main-part exploded perspective view including a cut-off plane when a part of the image pick-up device unit shown in FIG. 42 is cut off.

In this case, a positional relationship among the dust-proofing filter 21, the piezoelectric element 22 arranged on the one surface (back side) thereof, and the adhering member 52 arranged on the other surface (front side) is shown in the main-part enlarged perspective view of FIG. 45.

Namely, FIG. 45 is the main-part enlarged perspective view showing a cut-off part of the image pick-up device unit 15G in the camera, including a cut-off plane, according to the sixteenth embodiment, further showing the arrangement of the piezoelectric element 22 and the adhering member 52 to the dust-proofing filter 21.

As described above, the adhering member 52 arranged to the predetermined position of the dust-proofing filter 21 captures and collects dust and the like removed from the front side of the dust-proofing filter 21 by adhesive force of the adhering member 52 upon vibration of the dust-proofing filter 21 due to the operation of the piezoelectric element 22 (which will be described later).

The adhering member 52 uses an adhesive tape formed by applying to a predetermined supporter, a rubber-system, acrylic-resin-system, or silicone-system adhesive member.

The opening 23f with a circular or polygonal shape is set substantially in the center of the dust-proofing filter supporting member 23. The opening 23f is set to have a size large enough to pass through the subject beams transmitted through the photographing optical system 12a and to irradiate the photoelectrically converting surface of the image pick-up device 27 arranged at the back with the beams.

The wall portion 23e projecting to the front side is formed with a substantially annular shape at the peripheral portion of the opening 23f. The supporting portion 23c is formed projecting toward the front side on the edge side of the wall portion 23e.

On the other hand, a plurality of (according to the sixteenth embodiment, three) projecting portions 23a are formed projecting toward the front side, near an outer peripheral portion in front of the dust-proofing filter supporting member 23. The projecting portions 23a are portions formed to fix the pressing member 20 for fixing and holding the dust-proofing filter 21. The pressing member 20 is fixed by fastening means such as a fixing screw 20a to the edges of the projecting portions 23a.

The pressing member 20 is a member made of the elastic member such as a plate-shaped spring, and a basic end portion of the pressing member 20 is fixed to the projecting portions 23*a*. Further, a free end portion thereof is abutted onto an outer peripheral portion of the dust-proofing filter 21, thereby pressing the dust-proofing filter 21 toward the side of the dust-proofing filter supporting member 23, that is, in the optical axis direction.

In this case, a predetermined portion of the piezoelectric element 22 arranged at the outer peripheral portion at the back of the dust-proofing filter 21 is abutted onto the supporting portion 23*c*, thereby regulating the positions of the dust-proofing filter 21 and the piezoelectric element 22 in the optical axis direction. Therefore, the dust-proofing filter 21 is fixed and held to be airtightly jointed to the dust-proofing filter supporting member 23 with the piezoelectric element 22 interposed therebetween.

In other words, the dust-proofing filter supporting member 23 is airtightly jointed to the dust-proofing filter 21 via the interposed piezoelectric element 22 by a pressing force generated by the pressing member 20.

As mentioned above, with respect to the dust-proofing filter supporting member 23 and the CCD case 24, the circumferential groove 24*d* and the annular-shaped convex portion 23*d* (refer to FIGS. 42 to 44) are airtightly fixed. Further, the dust-proofing filter supporting member 23 is airtightly jointed to the dust-proofing filter 21 via the piezoelectric element 22 interposed by the pressing force of the pressing member 20. The optical LPF 25 arranged to the CCD case 24 is airtightly arranged between the peripheral portion in front of the optical LPF 25 and the step portion 24*a* of the CCD case 24. Further, the image pick-up device 27 is arranged at the back of the optical LPF 25 via the low-pass filter supporting member 26 interposed. If the image pick-up device 27 is arranged between the optical LPF 25 and the image pick-up device 27, the airtightness is substantially held.

Therefore, in a space formed by opposing the optical LPF 25 and the dust-proofing filter 21, the predetermined void portion 51*a* is formed as shown in FIGS. 43 and 44. Also, the space portion 51*b* is formed on the peripheral side of the optical LPF 25, that is, by the CCD case 24, the dust-proofing filter supporting member 23, and the dust-proofing filter 21. The space portion 51*b* is a sealed space formed to project toward the outside of the optical LPF 25. Further, the space portion 51*b* is set to be wider than the void portion 51*a*. A space containing the void portion 51*a* and the space portion 51*b* becomes the sealing space 51 which is substantially airtightly sealed by the CCD case 24, the dust-proofing filter supporting member 23, the dust-proofing filter 21, and the optical LPF 25 as mentioned above.

In the image pick-up device unit 15G in the camera 1 according to the sixteenth embodiment, the sealing structure constitutes the sealing space 51 which is formed at the peripheral portion of the optical LPF 25 and the dust-proofing filter 21 and which is substantially sealed, having the void portion 51*a*. The sealing structure is arranged outside from the peripheral portion or the adjacent portion of the optical LPF 25.

Further, according to the sixteenth embodiment, the sealing structure comprises the dust-proofing filter supporting member 23 as the first member for supporting the dust-proofing filter 21 in contact with the peripheral portion or an adjacent portion thereof and the CCD case 24 as the second member which supports the optical LPF 25 in contact with the peripheral portion or the adjacent portion thereof and which is arranged closely in contact with the dust-proofing filter supporting member 23 (first member) at a predetermined portion of the CCD case 24.

In the camera 1 with the above-mentioned structure, the dust-proofing filter 21 is opposed at a predetermined position in front of the image pick-up device 27, and the sealing space 51 at the periphery of the photoelectrically converting surface of the image pick-up device 27 and the dust-proofing filter 21 is sealed. Consequently, the adhesion of dust, etc. to the photoelectrically converting surface of the image pick-up device 27 is prevented.

By applying a periodic voltage to the piezoelectric element 22 arranged integrally with the periphery portion of the dust-proofing filter 21 and applying predetermined vibrations to the dust-proofing filter 21, dust and the like to be adhered to the exposure surface in front of the dust-proofing filter 21 are removed.

In this case, the operations upon vibration of the dust-proofing filter 21 by the piezoelectric element 22 are the same as those according to the first embodiment described with reference to FIGS. 6 to 11.

Generally, almost all dust and the like removed from the surface in front of the dust-proofing filter 21 falls down to the bottom side in the camera 1 due to the force of gravity. Other dust is adhered to the internal members in the camera 1 or is adhered to the surface of the dust-proofing filter 21 again.

According to the sixteenth embodiment, in view of the foregoing, the dust and the like removed from the surface of the dust-proofing filter 21 are captured and collected by adhesive force by the adhering member 52 at the outer peripheral portion of the surface in front of the dust-proofing filter 21 or at the adjacent portion thereof. Consequently, this prevents the re-adhesion of the dust and the like removed from the surface of the dust-proofing filter 21 to the surface of the dust-proofing filter 21 or other internal members.

As stated above, according to the sixteenth embodiment, the adhesion of dust and the like to the photoelectrically converting surface of the image pick-up device 27 is prevented by forming the sealing structure near the image pick-up device 27.

Among the members forming the sealing structure, the dust-proofing filter 21 is vibrated by the operation of the piezoelectric element 22, thereby removing dust and the like adhered to the surface in front of the dust-proofing filter 21 by the vibrating action.

In addition, the dust and the like removed from the surface of the dust-proofing filter 21 by the operation of the piezoelectric element 22 are captured and collected by the adhering member 52 arranged to the outer peripheral portion of the surface of the dust-proofing filter 21 or to the adjacent portion thereof. Consequently, this prevents the re-adhesion of the dust and the like to the surface of the dust-proofing filter 21 or the surface of the internal members in the camera 1.

According to the sixteenth embodiment, in the image pick-up device unit 15G in the camera 1, the vibrations are applied to the dust-proofing filter 21 by applying a periodic voltage to the piezoelectric element 22 integrated with the dust-proofing filter 21. The vibrations remove the dust and the like adhered to the surface of the dust-proofing filter 21.

The means for removing the dust and the like by applying the vibrations to the dust-proofing filter 21 is highly advantageous to remove relatively large-sized dust particles and the like. However, all the relatively small-sized dust particles and the like adhered to the surface of the dust-proofing filter 21 are not removed without fail only by using the vibrating action of the dust-proofing filter 21.

Then, according to the seventeenth embodiment of the present invention, an image pick-up device unit in a camera comprises cleaning means for actively removing dust and the like adhered to the surface of the dust-proofing filter 21 and for cleaning the surface of the dust-proofing filter 21.

Figure 46:
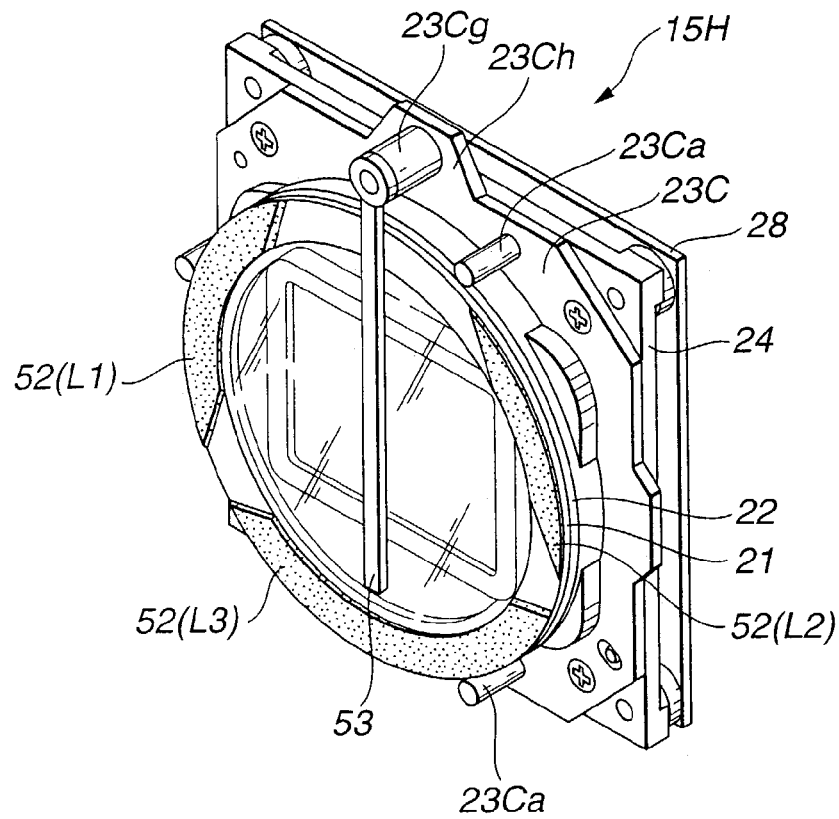
FIG. 46 is a diagram showing by extracting a part of an image pick-up device unit in a camera according to a seventeenth embodiment of the present invention, specifically, a main-part perspective view showing the assembled image pick-up device unit.
Figure 47:
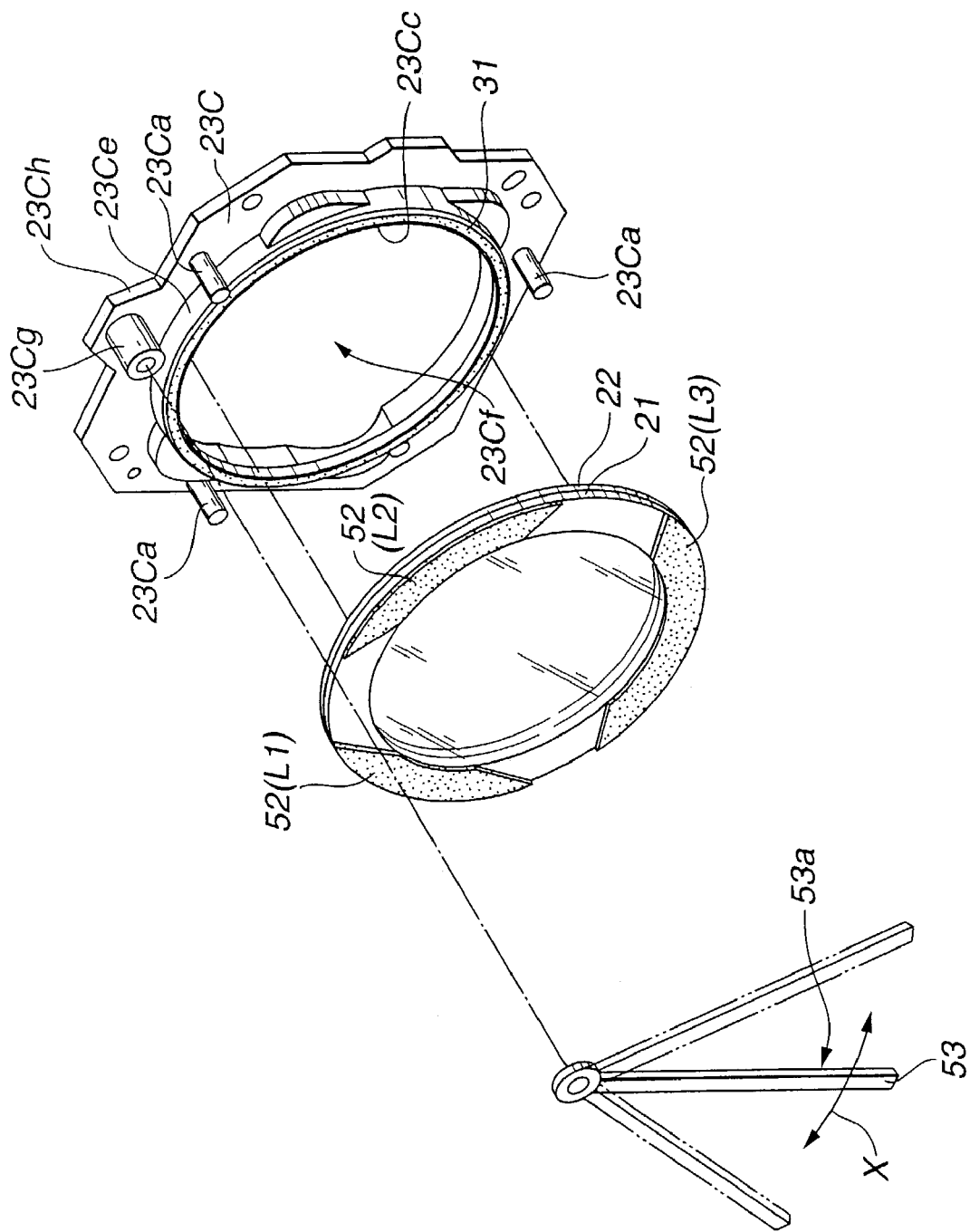
FIG. 47 is an exploded perspective view showing by extracting a dust-proofing filter supporting member and a dust-proofing filter among the members forming the image pick-up device unit shown in FIG. 46.
Figure 48:
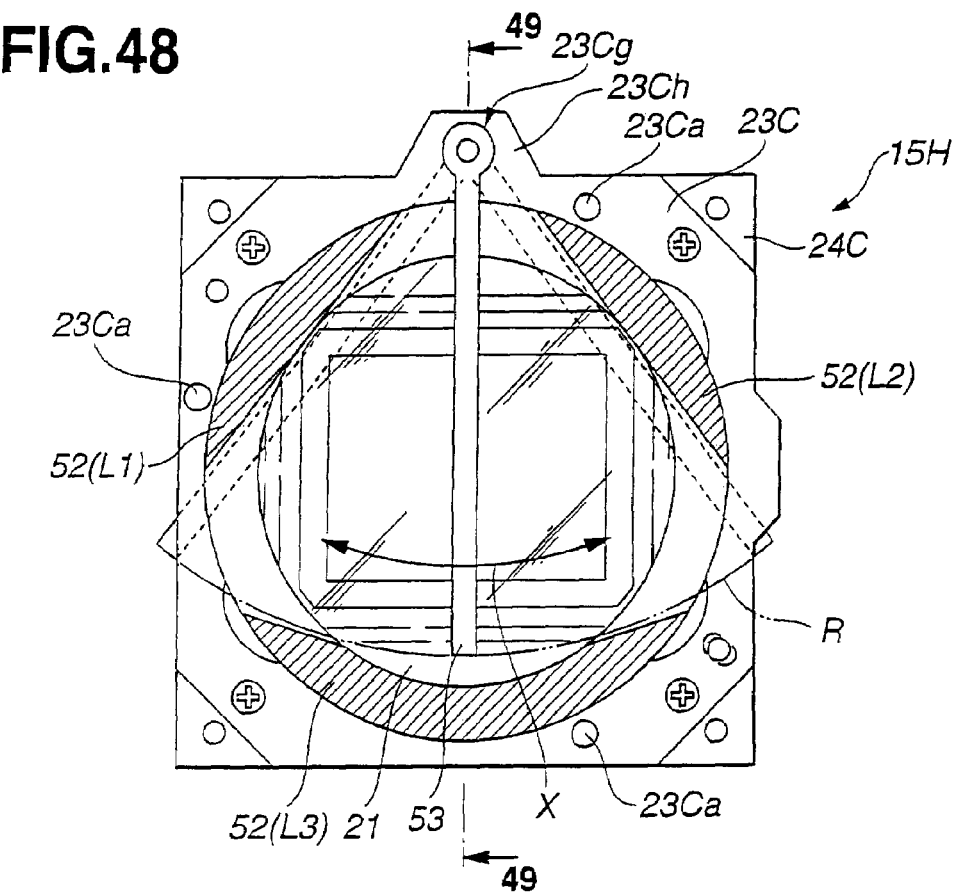
FIG. 48 is a front view showing by extracting a part of the image pick-up device unit shown in FIG. 46.
Figure 49:
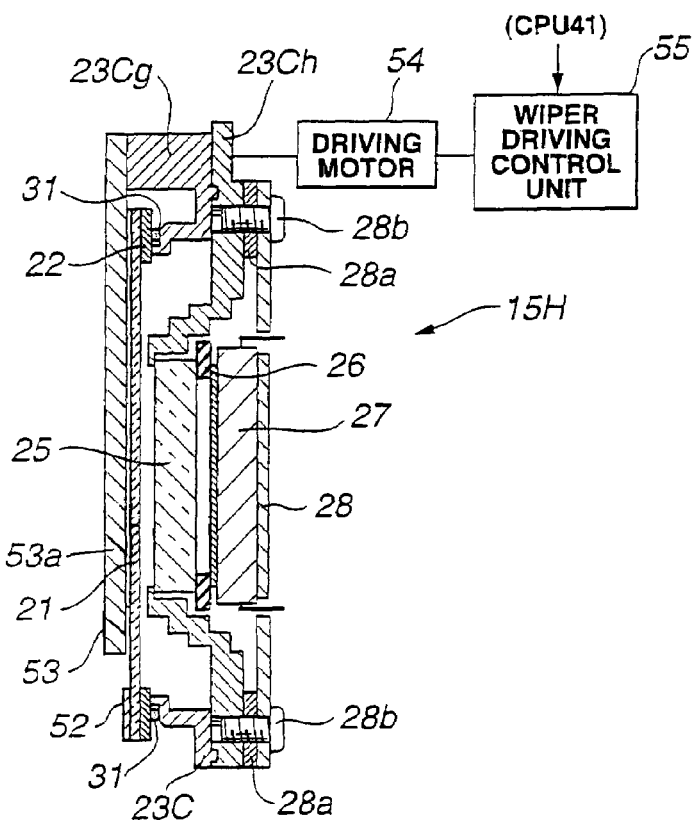
FIG. 49 is a sectional view along a line 49—49 shown in FIG. 48.

FIGS. 46 to 49 are diagrams showing by extracting a part of the image pick-up device unit in the camera according to the seventeenth embodiment of the present invention. FIG. 46 is a perspective view showing by extracting a part of the assembled image pick-up device unit. FIG. 47 is an exploded perspective view showing the dust-proofing filter supporting member and the dust-proofing filter among members forming the image pick-up device unit. FIG. 48 is a front view showing by extracting a part of the image pick-up device unit. FIG. 49 is a sectional view along a line 49—49 shown in FIG. 48.

Referring to FIGS. 46 to 48, similarly to the case according to the sixteenth embodiment, only a main portion of the image pick-up device unit is shown and the shutter unit (14) is not shown.

Basically, the structure according to the seventeenth embodiment is formed in the same manner as that according to the sixteenth embodiment. Therefore, in the following, only different portions from those according to the sixteenth embodiment are described in detail, and the same reference numerals denote the same members and are not described in detail. The structure of the entire camera is not shown because it is substantially the same as that according to the first embodiment with reference to FIGS. 1 and 2 used for the description thereof.

In the image pick-up device unit 15G in the camera 1 according to the sixteenth embodiment, the dust-proofing filter 21 and the dust-proofing filter supporting member 23 are airtightly jointed via the piezoelectric element 22 interposed by using pressing force of the pressing member 20 as the elastic member.

On the other hand, in an image pick-up device unit 15H in the camera according to the seventeenth embodiment, the dust-proofing filter 21 and the dust-proofing filter supporting member 23 are airtightly jointed via the piezoelectric element 22 interposed by using adhering force generated by the adhesive 31 (refer to FIGS. 47 and 49 and to the fifth embodiment) in place of the pressing force of the pressing member 20 (elastic member) according to the sixteenth embodiment. Therefore, corresponding thereto, the dust-proofing filter supporting member 23C according to the seventeenth embodiment is differently formed from that according to the dust-proofing filter supporting member 23C according to the sixteenth embodiment.

That is, the dust-proofing filter supporting member 23C as shown in FIGS. 46 to 49 has an opening 23Cf which is circular or polygonal near the center thereof. The subject beams transmitted through the photographing optical system (12a) pass through the opening 23Cf which is set to have a size enough for the beams to irradiate the photoelectrically converting surface of the image pick-up device 27 arranged at the back, similarly to the case according to the first embodiment.

A wall portion 23Ce projecting toward the front side is substantially annular-shaped at the peripheral portion of the opening 23Cf. Further, a supporting portion 23Cc projecting toward the front side is formed on the edge side of the wall portion 23Ce. The foregoing is substantially the same as that according to the sixteenth embodiment.

On the other hand, a plurality of (according to the seventeenth embodiment, three) projecting portions 23Ca are formed projecting toward the front side, near an outer peripheral portion in front of the dust-proofing filter supporting member 23C. The projecting portions 23Ca function as position regulating members for positioning upon adhering and arranging the dust-proofing filter 21 to the dust-proofing filter supporting member 23C.

At a predetermined position of the outer peripheral portion of the dust-proofing filter supporting member 23C, a supporting base portion 23Ch is constituted by a supporting shaft 23Cg projected in the outer edge direction of the dust-proofing filter supporting member 23C, for swingably supporting a wiper member 53 as cleaning means, which will be described later, in a predetermined direction.

The supporting shaft 23Cg is a shaft member which is projected toward the front side from the supporting base portion 23Ch and which is implanted integrally with the dust-proofing filter supporting member 23C. The wiper member 53 is arranged swingably in an arrow X direction shown in FIGS. 47 and 48 at the edge portion of the supporting shaft 23Cg.

The dust-proofing filter 21 is adhered by the adhesive 31 via the piezoelectric element 22 interposed in front of the dust-proofing filter supporting member 23C.

In this case, the adhesive 31 is applied all over the area of the wall portion 23Ce excluding the supporting portion 23Cc in the edge portion in the dust-proofing filter supporting member 23C, as an annular-shaped area. In this state, the dust-proofing filter 21 is adhered from the front side of the dust-proofing filter supporting member 23C. The dust-proofing filter 21 is arranged at the predetermined position of the dust-proofing filter supporting member 23C by moving the outer peripheral portion of the dust-proofing filter 21 along the projecting portion 23Ca in the optical direction. The supporting portion 23Cc is abutted onto a predetermined position (portion as a node upon vibration) of the dust-proofing filter 21 (actually, the piezoelectric element 22).

Therefore, the dust-proofing filter supporting member 23C is airtightly jointed to the dust-proofing filter 21 by the adhesive 31 in an annular-shaped area near the peripheral portion of the dust-proofing filter 21, that is, at the edge portion of the wall portion 23Ce.

Further, similarly to the case according to the sixteenth embodiment, the adhering member 52 as dust collecting means is arranged to the surface outer-peripheral portion in front of the dust-proofing filter 21 or to the adjacent thereto. The piezoelectric element 22 as a member for vibration and an electromechanical transducer is arranged at the peripheral portion at the back of the dust-proofing filter 21.

In addition, according to the seventeenth embodiment, as mentioned above, the image pick-up device unit comprises the wiper member 53 as the cleaning means for removing the dust and the like adhered to the surface of the dust-proofing filter 21 and for cleaning the surface of the dust-proofing filter 21.

The wiper member 53 is swingably arranged in the predetermined direction to the edge portion of the supporting shaft 23Cg implanted to the supporting base portion 23Ch of the dust-proofing filter supporting member 23C. A swinging arm portion 53a (refer to FIG. 49) of the wiper member 53 is arranged to come into contact with the surface in front of the dust-proofing filter 21. The swinging arm portion 53a moves smoothly within a predetermined range of the surface in front of the dust-proofing filter 21 by swingingly moving the wiper member 53 in the arrow X direction shown in FIGS. 47 and 48.

Corresponding thereto, the adhering member 52 arranged at the outer peripheral portion on the surface in front of the dust-proofing filter 21 or at the adjacent portion thereof is arranged in an area excluding the area in which the wiper member 53 moves smoothly. Specifically, the adhering member 52 is arranged in an area shown by reference numerals L1 to L3 in FIGS. 46 to 48. Consequently, the adhering member 52 does not become the obstruction against the smooth movement of the wiper member 53.

The wiper member 53 is driven by a driving motor 54. The driving motor 54 is controlled by a wiper driving control unit 55 controlled by the CPU 41.

Other structures are the same as those according to the sixteenth embodiment.

According to the seventeenth embodiment, with the above-stated structure, similarly to the sixteenth embodiment, the dust-proofing filter 21 is vibrated by applying a periodic voltage to the piezoelectric element 22 under the control of the dust-proofing filter driving unit 48 (refer to FIG. 2) by the CPU 41 at a predetermined timing. As a result, dust and the like adhered to the surface in front of the dust-proofing filter 21 are removed.

The dust and the like removed from the surface of the dust-proofing filter 21 are captured and collected by the adhering member 52 provided at the outer peripheral portion on the surface in front of the dust-proofing filter 21 or at the adjacent portion thereof.

In addition, the CPU 41 controls a wiper driving control unit 55 (refer to FIG. 49) and drives the driving motor 54 at a predetermined timing, thereby smoothly moving the wiper member 53 in a predetermined area on the surface in front of the dust-proofing filter 21. As a result, even relatively small-sized dust particles and the like adhered to the surface of the dust-proofing filter 21 are removed and the surface of the dust-proofing filter 21 further becomes clean.

The dust and the like removed from the surface of the dust-proofing filter 21 using the operation of the wiper member 53 are captured and collected by the adhering member 52 arranged at the outer peripheral portion on the surface in front of the dust-proofing filter 21 or at the adjacent portion thereof.

As mentioned above, almost all dust and the like are removed from the surface in front of the dust-proofing filter 21 both by using the smoothly moving operation of the wiper member 53 and the vibrating action of the dust-proofing filter 21 due to the piezoelectric element 22, and then is adhered to the adhering member 52. Thus, the front surface of the dust-proofing filter 21 is maintained clean.

According to the seventeenth embodiment, the same advantages as those according to the sixteenth embodiment are obtained. In addition, according to the seventeenth embodiment, almost all dust and the like adhered to the front surface of the dust-proofing filter 21 can be removed by providing the wiper member 53 as the cleaning means.

As described above, the adhering member 52 captures and collects substantially all dust and the like which are removed from the front surface of the dust-proofing filter 21. Therefore, it is possible to prevent the flow of dust and the like in the space of the camera main body 11 and the adhesion of the dust and the like to the surface of the dust-proofing filter 21 and another inner member.

Next, a description is given of an image pick-up device unit in a camera according to the eighteenth embodiment of the present invention.

Figure 50:
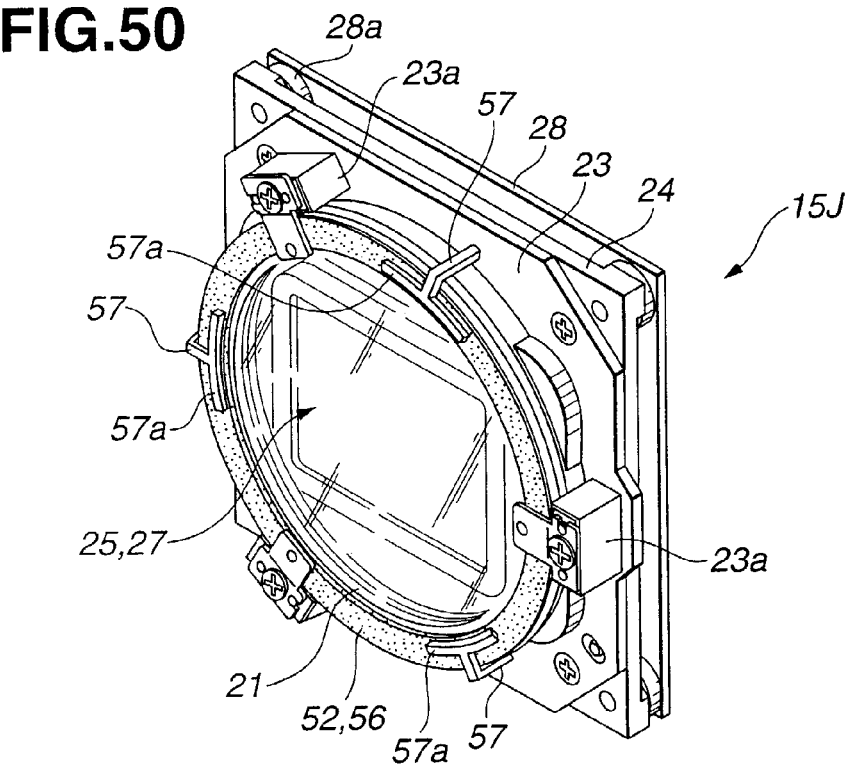
FIG. 50 is a diagram showing by extracting a part of an image pick-up device unit in a camera according to an eighteenth embodiment of the present invention, specifically, a perspective view showing the assembled image pick-up device unit.
Figure 51:
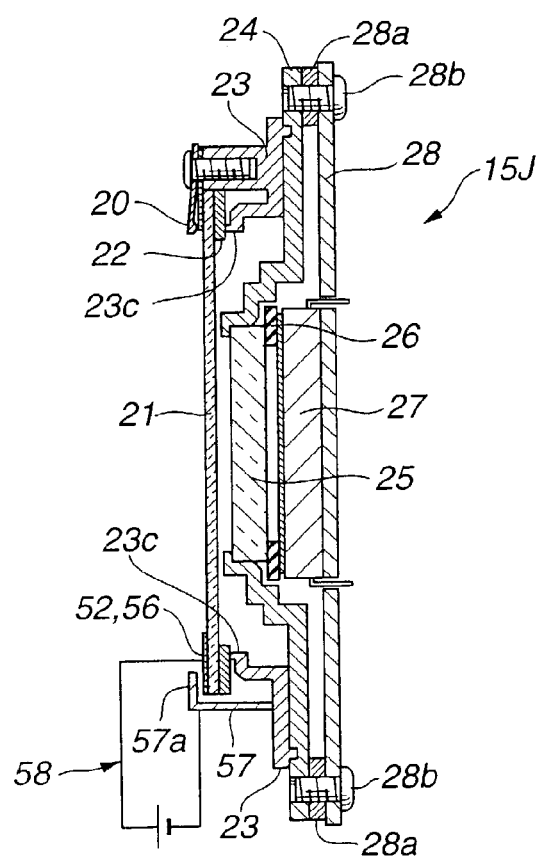
FIG. 51 is a sectional view showing by extracting a part of an image pick-up device unit shown in FIG. 50.
Figure 52:
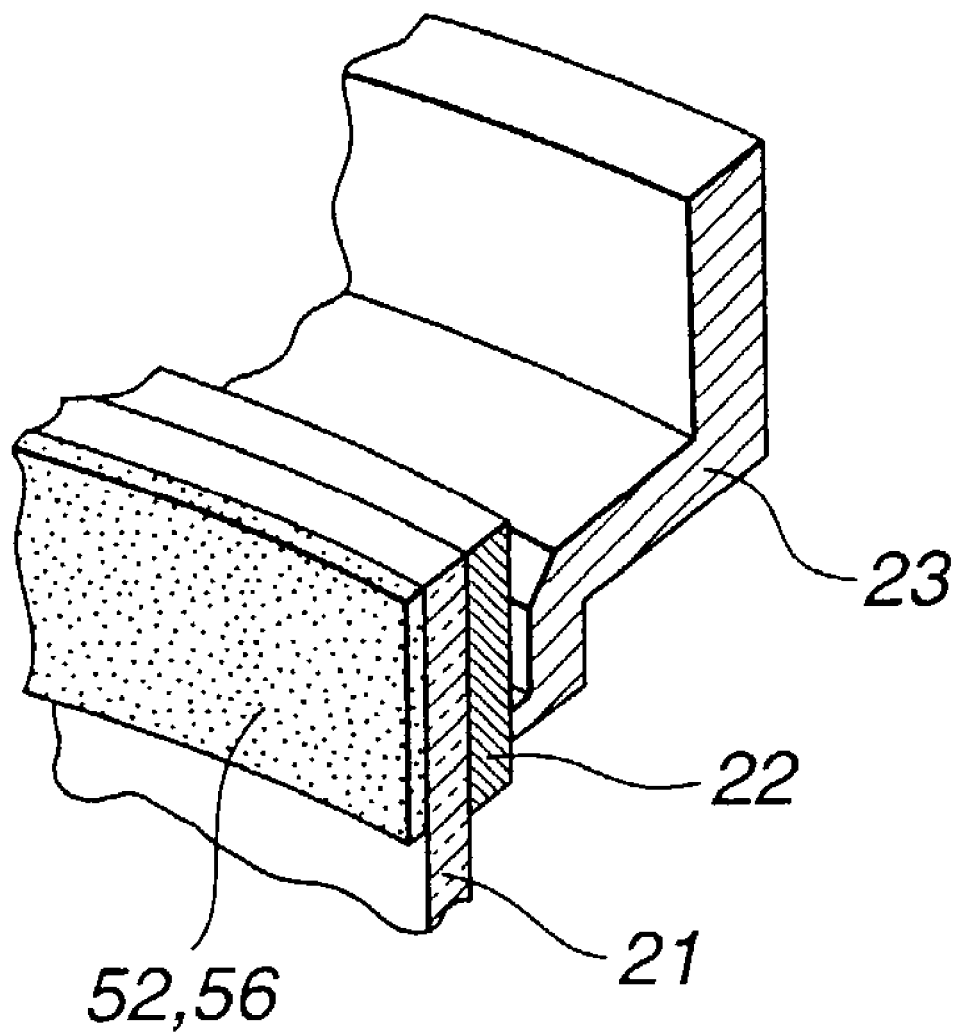
FIG. 52 is a main-part enlarged perspective view including a cut-off plane when a part of the image pick-up device unit shown in FIG. 50 is cut off.

FIGS. 50 to 52 are diagrams showing by extracting a part of the image pick-up device unit in the camera according to the eighteenth embodiment. FIG. 50 is a perspective view showing by extracting a part of the assembled image pick-up device unit. FIG. 51 is a sectional view showing by extracting a part of the image pick-up device unit. FIG. 52 is a main-part enlarged perspective view including a partial cut-off plane of the image pick-up device unit and shows each arrangement of the piezoelectric element and a dust collecting electrode to the dust-proofing filter.

Referring to FIGS. 50 and 51, similarly to the case according to the sixteenth embodiment, only a main portion of the image pick-up device unit is shown and the shutter unit (14) is not shown.

According to the eighteenth embodiment, basically, the structure is substantially the same as that according to the sixteenth embodiment. Therefore, only different components from those according to the sixteenth embodiment are described in detail. The same reference numerals denote the same components and the details are omitted. The structure of the entire camera is not illustrated because it is substantially the same to that according to the sixteenth embodiment, and is referred to FIGS. 1 and 2 described for the description thereof.

According to the eighteenth embodiment, an image pick-up device unit 15J comprises, as the dust collecting means, the adhering member 52 according to the sixteenth or seventeenth embodiment and two-step charging type electrical dust-collecting means comprising a needle-shaped electrode 57 for electrostatic charging (ionizing) of dust and the like, a dust collecting electrode 56 for absorbing and collecting the electrostatic charged (ionized) dust and the like, and a driving unit 58 for applying a predetermined voltage to the electrodes 56 and 57.

A plurality of needle-shaped electrodes 57 are fixed to a predetermined position of the dust-proofing filter supporting member 23 so that electrodes 57a are opposed to the dust collecting electrode 56 arranged to the outer peripheral portion of the front surface of the dust-proofing filter 21 or to the adjacent portion thereof. Corona discharge is caused by applying a predetermined voltage to the needle-shaped electrode 57 by using the driving unit 58, thereby charging (applying positive (+) charges to) the dust and the like near the corona discharge.

The dust collecting electrode 56 is arranged to the outer peripheral portion of the front surface of the dust-proofing filter 21 or to the adjacent portion thereof by using the adhering means such as an adhesive (refer to FIG. 52). Further, the dust collecting electrode 56 comprises a plate-shaped member having the negative electric charge that is constituted by an electrode (+) to which a predetermined voltage is applied and a set earth electrode (−).

Therefore, the dust and the like electrostatic charged by the operation of the needle-shaped electrode 57 are absorbed to the dust collecting electrode 56 by Coulomb force (the amount of electric power) in the electric field of the negative-electric-charged dust collecting electrode 56.

In the image pick-up device unit 15J according to the eighteenth embodiment, the piezoelectric element 22 as the member for vibration for applying the vibration to the dust-proofing filter 21 removes dust and the like adhered to the surface of the dust-proofing filter 21, and the removed dust and the like are electrostatic charged by the operation of the needle-shaped electrode 57. The electrostatic charged dust and the like are absorbed and collected to the dust collecting electrode 56.

In the image pick-up device unit 15J according to the eighteenth embodiment, the cleaning means for cleaning the surface of the dust-proofing filter 21 comprises the piezoelectric element 22 as the member for vibration for removing dust and the like adhered to the surface of the dust-proofing filter 21 and the two-step charging type electric dust-collecting means having the needle-shaped electrode 57, the dust collecting electrode 56, and the driving unit 58 for applying the predetermined voltage to the electrodes 56 and 57.

Other structures are the same as those according to the sixteenth embodiment.

As mentioned above, according to the eighteenth embodiment, the same advantages as those according to the sixteenth embodiment are obtained. In addition, the electrical dust-collecting means is provided. Thus, the vibrating action of the dust-proofing filter 21 using the member for vibration (piezoelectric element 22) absorbs and collects dust and the like removed from the front surface of the dust-proofing filter 21. Thus, the front surface of the dust-proofing filter 21 is always maintained clean.

Incidentally, according to the eighteenth embodiment, similarly to the case according to the first embodiment (refer to FIG. 2), the image pick-up device unit in the camera is a unit comprising a plurality of members including the shutter unit (14). However, the present invention is not limited to this and the image pick-up device unit may be constructed by omitting the shutter unit (14). In this case, the camera with the above-described functions is constructed by adopting a lens shutter method i.e., by providing the shutter unit (14) in the lens barrel (12).

Next, a description is given of an image pick-up device unit in a camera according to the nineteenth embodiment of the present invention.

According to the nineteenth embodiment, basically, the structure is substantially the same as that according to the first embodiment and only a part of the image pick-up device unit is different. Therefore, the same components as those according to the first embodiment are designated by the same reference numerals and are not described, and only the different part is described. The structure of the entire camera is referred to FIGS. 1 and 2 used for the description of the first embodiment.

Hereinbelow, a detailed description is given of the image pick-up device unit in the camera according to the nineteenth embodiment.

Figure 53:
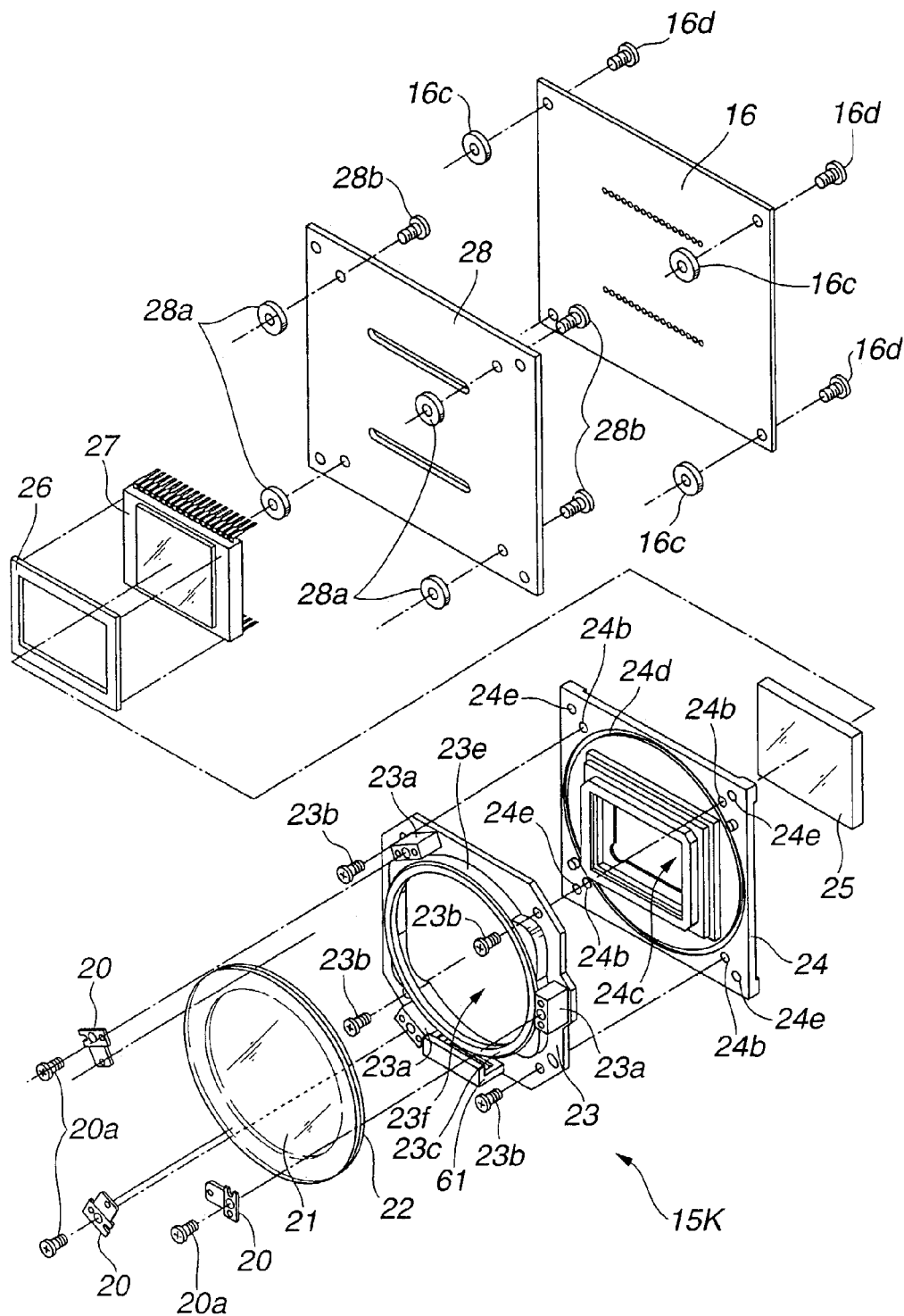
FIG. 53 is a diagram showing by extracting a part of an image pick-up device unit in a camera according to a nineteenth embodiment of the present invention, specifically, main-part exploded perspective view showing the disassembled image pick-up device unit.
Figure 54:
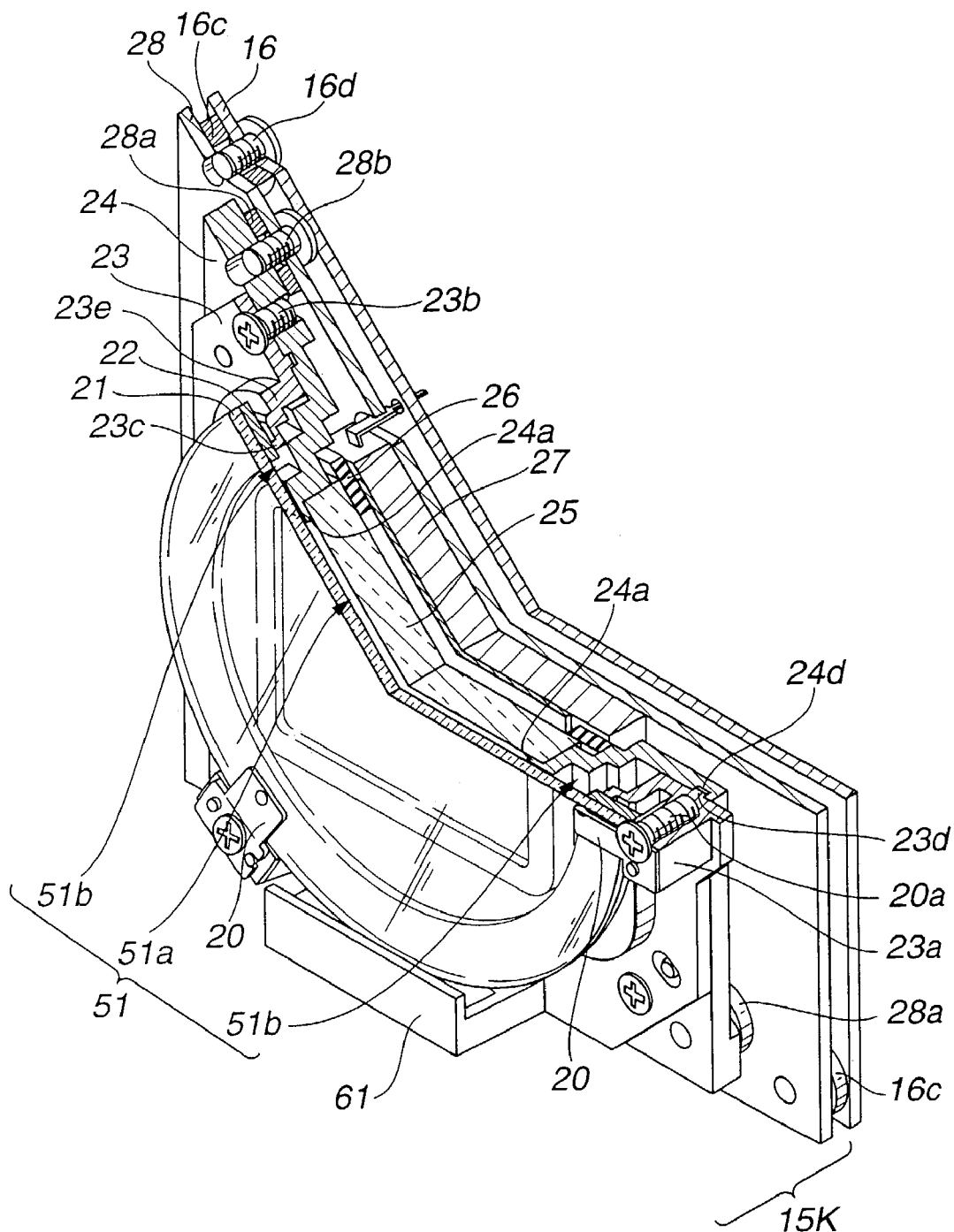
FIG. 54 is a perspective view showing a cut-off part of the image pick-up device unit shown in FIG. 53 when it is assembled.

FIGS. 53 to 57 are diagrams showing by extracting a part of the image pick-up device unit in the camera 1 according to the nineteenth embodiment. FIG. 53 is a main-part exploded perspective view showing the schematic structure of the disassembled image pick-up device unit. FIG. 54 is a perspective view showing a cut-off part of the assembled image pick-up device unit. Incidentally, the cross section along a cut-off plane in FIG. 54 is the same as that according to the first embodiment as shown in FIG. 5 and therefore FIG. 5 is referred to. It is not illustrated.

Figure 55:
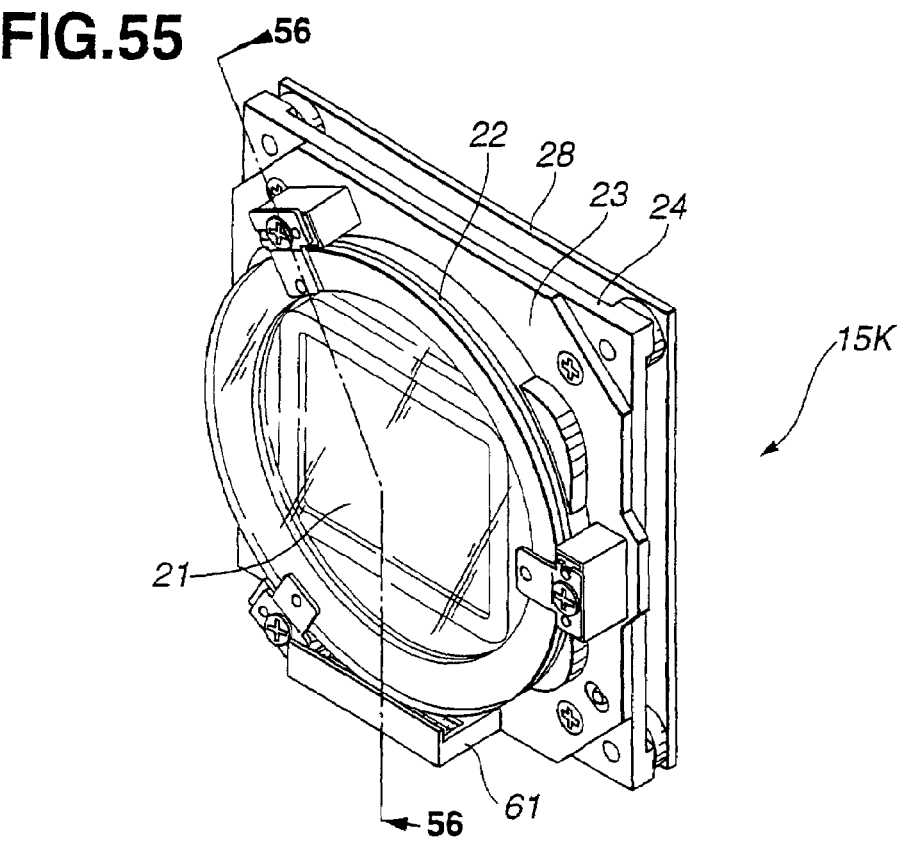
FIG. 55 is a perspective view showing an assembling state of the image pick-up device unit shown in FIG. 53.
Figure 56:
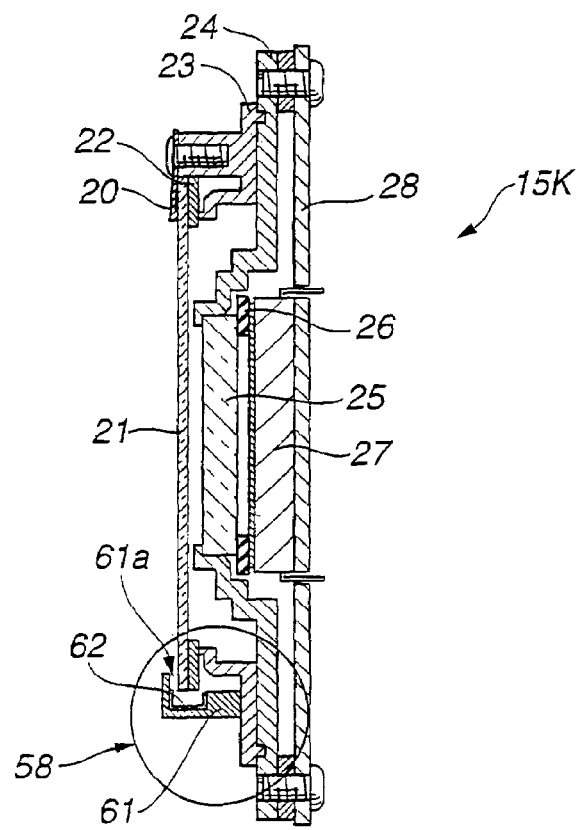
FIG. 56 is a sectional view along a line 56—56 shown in FIG. 55.
Figure 57:
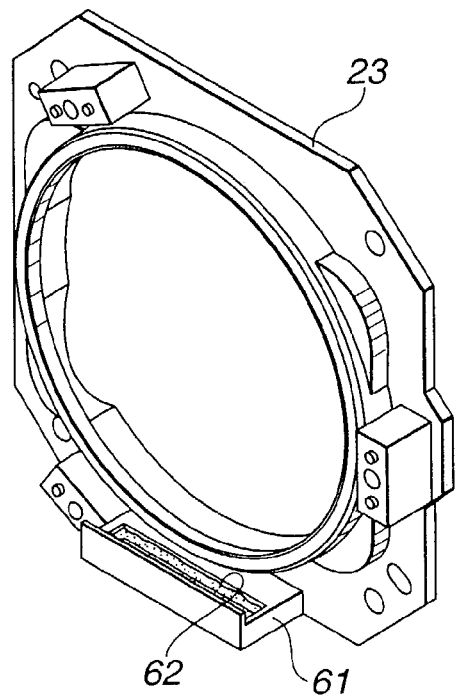
FIG. 57 is a perspective view showing by extracting only a dust-proofing filter supporting member among the members forming the image pick-up device unit shown in FIG. 53.

FIG. 55 is a perspective view showing the assembled image pick-up device unit. FIG. 56 is a sectional view along a line 56—56 in FIG. 55. FIG. 57 is a perspective view showing only the dust-proofing filter supporting member (23) among the members forming the image pick-up device unit.

According to the nineteenth embodiment, an image pick-up device unit 15K comprises a plurality of members including the shutter unit 14 similarly to the above-described embodiments. However, only a main portion is illustrated and the shutter unit 14 is not shown in FIGS. 53 to 56.

For the purpose of showing a positional relationship of the components, referring to FIGS. 53 and 54, the image pick-up device 27 is loaded while the components are provided near the image pick-up device unit 15K, and the main circuit board 16 on which image pick-up system electrical circuits including an image pick-up device, comprising the image signal processing circuit 16a and the work memory 16b, are mounted is illustrated. The main circuit board 16 is one of main circuit boards generally used for the conventional cameras, and a detailed description thereof is omitted.

In the image pick-up device unit 15K according to the nineteenth embodiment, by applying the dust-proofing filter 21 by using the operation of the piezoelectric element 22 as the cleaning means, similarly to the image pick-up device unit according to the above embodiments, dust and the like adhered to the exposure surface in front of the dust-proofing filter 21 are removed.

Generally, dust and the like removed from the surface in front of the dust-proofing filter 21 fall down to the bottom side in the main body unit 11 of the camera 1 due to the force of gravity.

A dust receiving portion (a dust-receiver) 61 is arranged at a predetermined position of the dust-proofing filter supporting member 23 to receive the dust and the like fallen down to the bottom side of the main body 11 after being removed from the dust-proofing filter 21.

Referring to FIG. 56, the dust receiving portion 61 is formed with a box-shaped cross-section having an opening 61a on one surface, and is arranged integrally with the dust-proofing filter supporting member 23 at a predetermined position near a lower edge of the dust-proofing filter supporting member 23. That is, the dust receiving portion 61 is arranged at a predetermined position on the bottom in the main body unit 11 of the camera 1.

In this case, the opening 61a of the dust receiving portion 61 is set to be directed to the dust-proofing filter 21 arranged in an upper position of the dust receiving portion 61. Thus, dust and the like fallen down from the dust-proofing filter 21 fall into the dust receiving portion 61 via the opening 61a by the operation of gravity.

Further, an adhesive 62 of a rubber system, acrylic resin system, or silicone system is arranged to an inner wall surface of the dust receiving portion 61. The adhesive 62 is set to capture and collect the dust and the like fallen down in the dust receiving portion 61 by its adhesive force. Therefore, the reflow of the dust and the like adhered to the adhesive 62 outside the dust receiving portion 61 is prevented.

As mentioned above, according to the nineteenth embodiment, the dust receiving portion 61 for receiving dust and the like fallen down by the vibrating action of the dust-proofing filter 21 using the piezoelectric element 22 is arranged at a predetermined position of the dust-proofing filter supporting member 23 in the image pick-up device unit 15K. Consequently, the dust and the like fallen down from the surface of the dust-proofing filter 21 by vibrating them are received and collected in the dust receiving portion 61.

Further, the adhesive 62 made of a predetermined material is set in the dust receiving portion 61. Therefore, the reflow of the dust and the like collected in the dust receiving portion 61 outside the dust receiving portion 61, that is, into the camera 1 is prevented. Thus, this suppresses the adhesion of dust and the like to the internal members in the camera 1 and the surface of the dust-proofing filter 21 and the surface of the dust-proofing filter 21 is always maintained clean.

According to the nineteenth embodiment, the adhesive 62 is set in the dust receiving portion 61 of the dust-proofing filter supporting member 23, thus to prevent the reflow of dust and the like captured in the dust receiving portion 61 outside the dust receiving portion 61.

On the other hand, according to the twentieth embodiment of the present invention, by devising the shape of the dust receiving portion, the flow of the dust and the like outside the dust receiving portion is suppressed without setting the adhesive therein.

Figure 58:
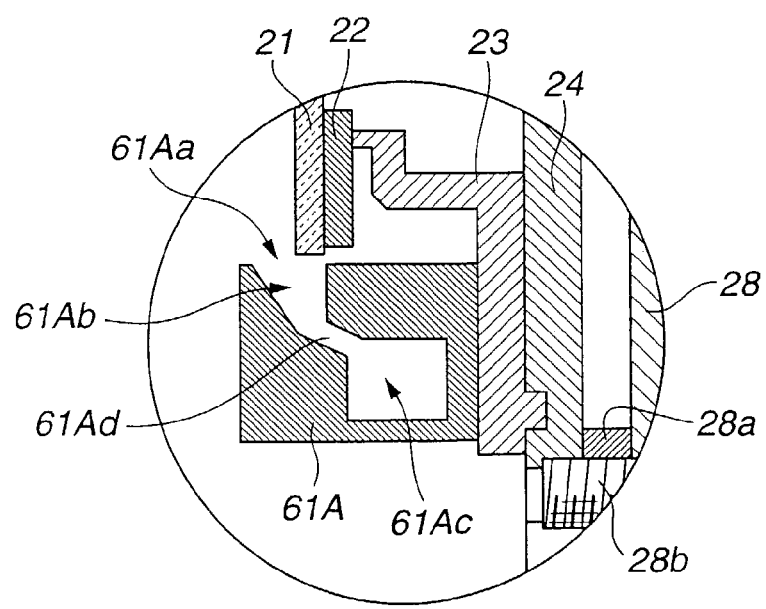
FIG. 58 is a main-part enlarged sectional view showing the enlarged structure near a dust receiving unit in the image pick-up device unit applied to a camera according to a twentieth embodiment of the present invention.

FIG. 58 is a main-part enlarged sectional view showing a main portion of an image pick-up device unit in a camera according to the twentieth embodiment of the present invention, that is, showing the structure near the dust receiving portion. FIG. 58 shows a main-part cross-section of an enlarged portion corresponding to a portion shown by reference numeral 58 shown in FIG. 56.

According to the twentieth embodiment, basically, the camera is the same as that according to the nineteenth embodiment, but is different from that in the shape of a dust receiving portion (61A). Therefore, the same members as those according to the nineteenth embodiment are designated by the same reference numerals and are not described in detail.

According to the twentieth embodiment, the dust receiving portion 61A arranged at the predetermined position of the dust-proofing filter supporting member 23 functions as a portion for receiving dust and the like fallen down from the surface of the dust-proofing filter 21 by the vibrating action of the dust-proofing filter 21 using the piezoelectric element 22, similarly to the nineteenth embodiment.

Referring to FIG. 58, in the dust receiving portion 61A, the cross section near the opening 61Aa is formed with a funnel shape. That is, a funnel-shaped portion 61Ab has a shape to easily receive dust and the like in the dust receiving portion 61A. The funnel-shaped portion 61Ab is conjoined to a hollow portion 61Ac having a cross section which is rectangular-shaped via a passage 61Ad.

The opening 61Aa is formed with a relatively wide opening to accurately receive the dust and the like fallen down from the dust-proofing filter 21. On the other hand, the passage 61Ad conjoining between the funnel-shaped portion 61Ab and the hollow portion 61Ac is formed with a relatively narrow passage so as not to reflow dust and the like in the hollow portion 61Ac outside.

The hollows portion 61Ac is formed with a relatively wide volume so as to collect too much dust and the like.

Further, the passage 61Ad is formed such that the cross section thereof has a predetermined angle in the vertical direction. That is, the arrangement position of the opening 61Aa and the arrangement position of the hollow portion 61Ac correspond to the positions shifted in the vertical direction. This is devised considering that the main body unit 11 always does not have the same position upon using and carrying the camera 1.

That is, by arranging the opening 61Aa and the hollow portion 61Ac at the positions shifted in the vertical direction, the dust and the like collected in the hollow portion 61Ac are not easily flowed out upon using or carrying the camera 1 upside down.

In the dust receiving portion 61A with the above-mentioned shape, the dust and the like entering from the opening 61Aa easily enter the inside of the hollow portion 61Ac via the passage 61Ad from the funnel-shaped portion 61Ab. On the other hand, the dust and the like entering the inside of the hollow portion 61Ac are not easily flowed out.

Other structures are the same as those according to the nineteenth embodiment.

As mentioned above, according to the twentieth embodiment, by devising the shape of the dust receiving portion 61A, the out-flow of dust and the like to the dust receiving portion 61A is easily suppressed without providing the adhesive.

According to the embodiments, the dust receiving portions 61 and 61A are arranged at the predetermined positions on the bottom of the camera 1. The arrangement positions are set in views of the position of the camera 1 and of the gravitation upon using and carrying it, and are set to receive more dust.

Therefore, the dust receiving portions 61 and 61A are arranged not only at the predetermined positions on the bottom of the camera 1 as shown according to the embodiments but also at positions near the peripheral portion of the dust-proofing filter supporting member 23, that is, at positions on both sides of the camera 1 or either side of them. Thus, the advantages for collecting dust and the like are further obtained.

Next, a description is given of an image pick-up device unit in a camera according to the twenty-first embodiment of the present invention.

Figure 59:
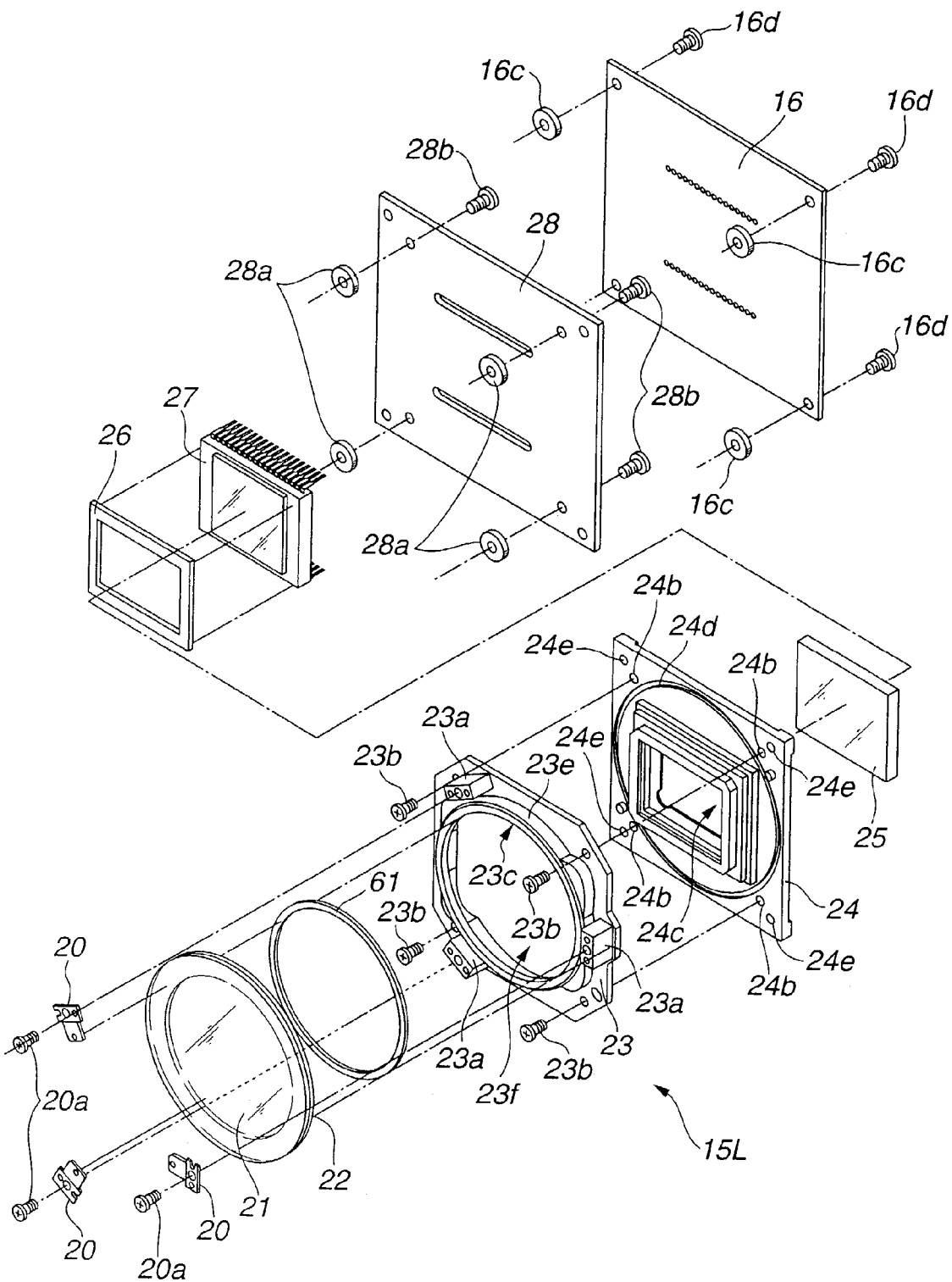
FIG. 59 is a diagram showing by extracting a part of an image pick-up device unit in a camera according to a twenty-first embodiment of the present invention, specifically, a main-part exploded perspective view showing the disassembled image pick-up device unit.
Figure 60:
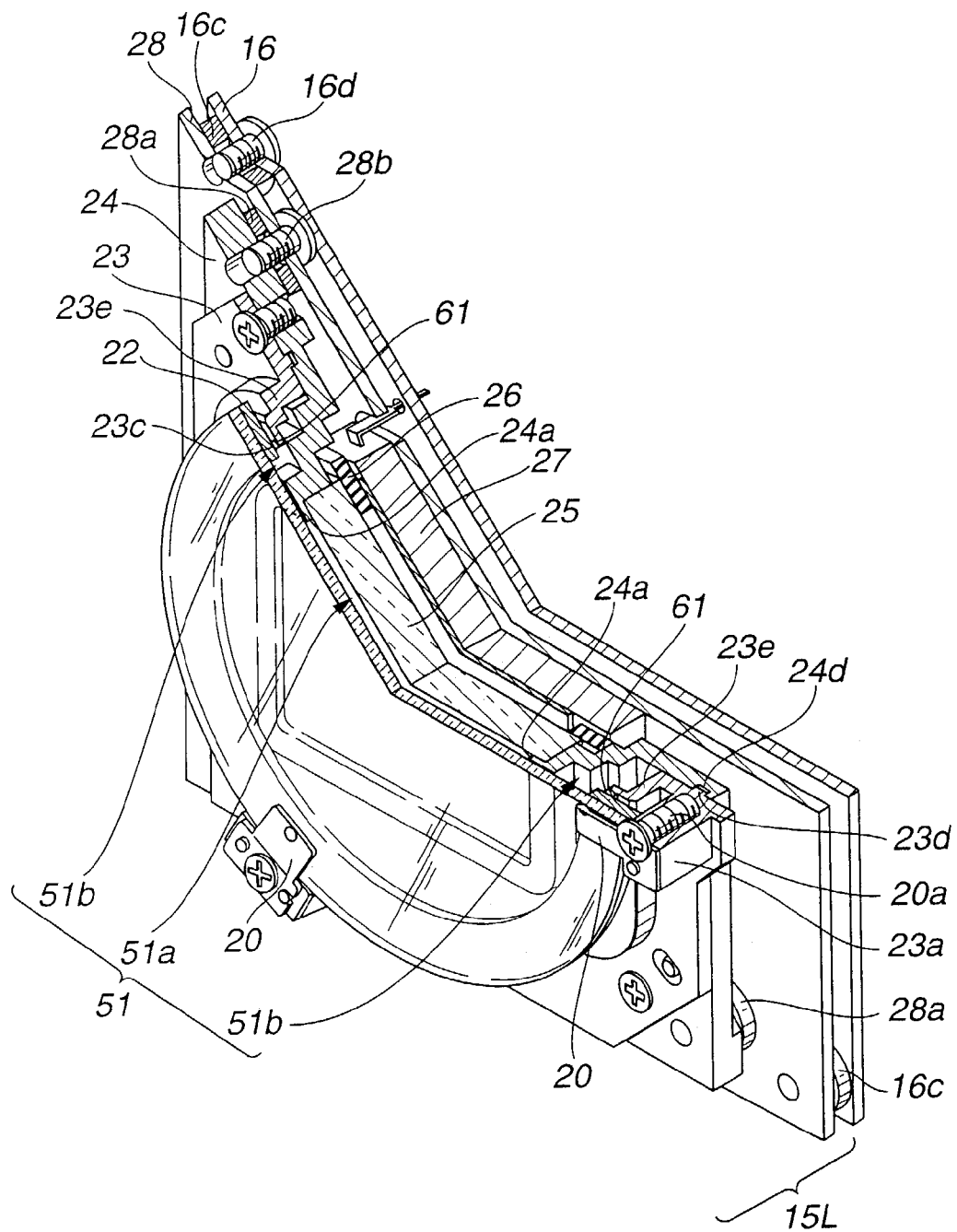
FIG. 60 is a perspective view showing a cut-off part of the image pick-up device unit shown in FIG. 59 when it is assembled.
Figure 61:
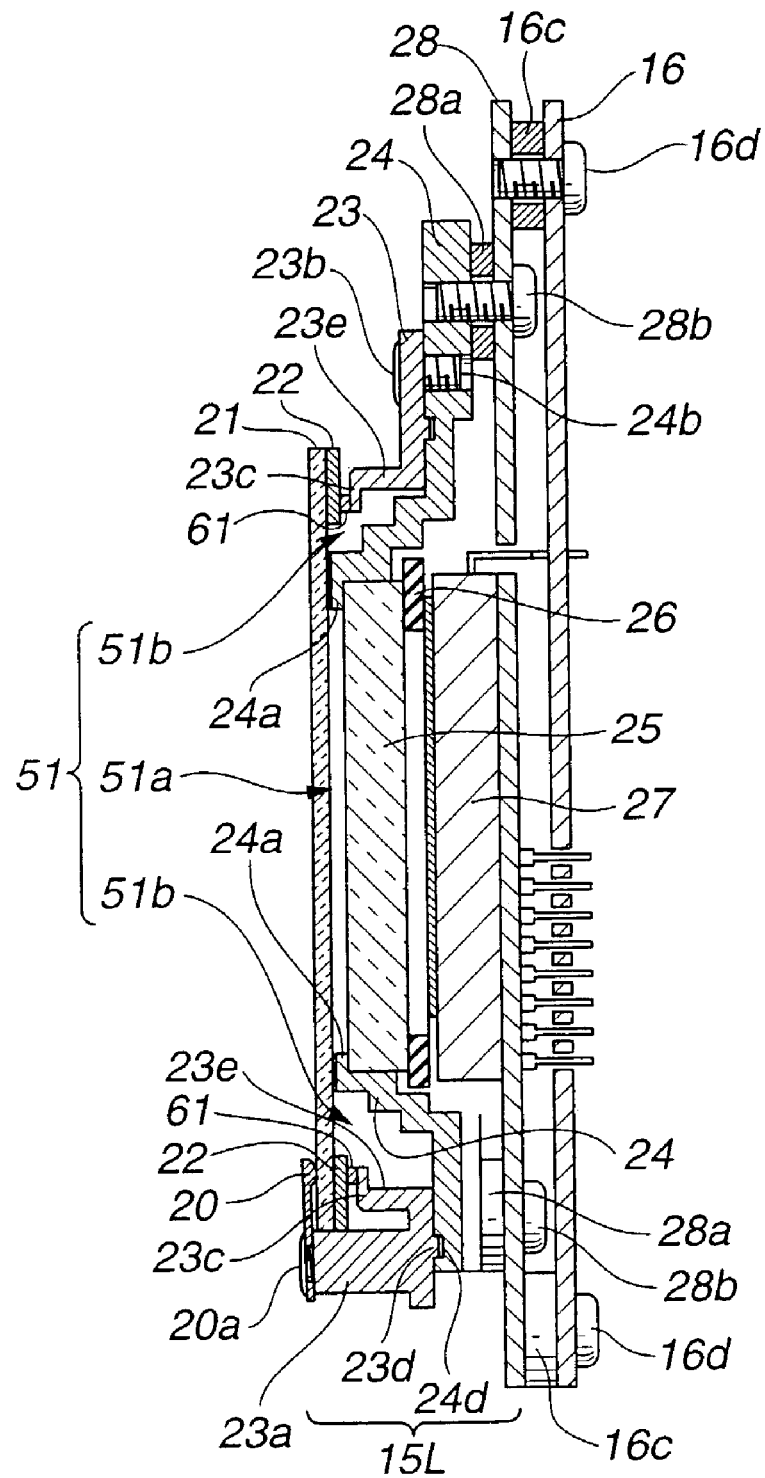
FIG. 61 is a sectional view along a cut-off plane shown in FIG. 60.

FIGS. 59 to 61 are diagrams showing by extracting a part of the image pick-up device unit in the camera according to the twenty-first embodiment of the present invention. FIG. 59 is a main-part exploded perspective view showing the disassembled image pick-up device unit. FIG. 60 is a perspective view showing a cut-off part of the assembled image pick-up device unit. FIG. 61 is a sectional view along a cut-off plane in FIG. 60.

According to the twenty-first embodiment, an image pick-up device unit 15L in a camera comprises a plurality of members including the shutter unit 14 similarly to the embodiments. Therefore, only a main portion is illustrated in FIGS. 59 to 61 and the shutter unit 14 is not described. For the purpose of showing the positional relationship of members, the main circuit board 16 arranged near the image pick-up device unit 15L is shown together. The main circuit board 16 is one of main circuit boards generally used for the conventional cameras, and a detailed description thereof is omitted.

According to the twenty-first embodiment, basically, the structure is the same as that according to the first embodiment and only a part of the image pick-up device unit is different. Therefore, the same components as those according to the first embodiment are designated by the same reference numerals and only a different portion is described. The structure of the entire camera is referred to FIGS. 1 and 2 used for the description of the first embodiment.

A detailed description is given of an image pick-up device unit 15L in a camera according to the twenty-first embodiment.

According to the twenty-first embodiment, the image pick-up device unit 15L comprises the image pick-up device unit according to the first embodiment, and a soft member 61 made of circular-shaped rubber on the supporting portion 23c as a portion at which the dust-proofing filter supporting member 23 is abutted onto the dust-proofing filter 21 (or the piezoelectric element 22) between the dust-proofing filter supporting member 23 as the main portion of the sealing structure and the dust-proofing filter 21 (or the piezoelectric element 22).

In this case, the soft member 61 provided at the edge of the supporting portion 23c of the dust-proofing filter supporting member 23 is abutted onto a predetermined portion of the piezoelectric element 22 arranged at the outer peripheral portion at the back of the dust-proofing filter 21. Thus, the positions of the dust-proofing filter 21 and the piezoelectric element 22 are regulated in the optical direction. Therefore, the dust-proofing filter 21 is fixed and held to airtightly be jointed to the dust-proofing filter supporting member 23 via the piezoelectric element 22 and the soft member 61 interposed.

In other words, the dust-proofing filter supporting member 23 is airtightly jointed to the dust-proofing filter 21 via the piezoelectric element 22 and the soft member 61 by elastic force caused by the pressing member 20.

As mentioned above, in the image pick-up device unit 15L in the camera according to the twenty-first embodiment, the sealing structure is formed to seal the sealing space 51 (space portion) containing the portion (void portion 51a) formed by opposing the image pick-up device unit 27 and the dust-proofing filter 21 and the space portion 51b which is substantially sealed at the optical LPF 25 and the dust-proofing filter 21. The sealing structure is arranged at the outside from the peripheral portion or the adjacent portion of the optical LPF 25.

That is, according to the twenty-first embodiment, the sealing structure comprises the dust-proofing filter 21, the piezoelectric element 22, the dust-proofing filter supporting member 23 for supporting the dust-proofing filter 21 in contact with the peripheral portion or the adjacent portion thereof, the CCD case 24 arranged for supporting the optical LPF 25 in contact with the peripheral portion or the adjacent portion thereof and for coming into contact with the dust-proofing filter supporting member 23 at its predetermined portion, the pressing member 20 for pressing the dust-proofing filter 21 (and the piezoelectric element 22) to the dust-proofing filter supporting member 23, and the like.

According to the twenty-first embodiment, in the camera with the foregoing structure, the dust-proofing filter 21 is opposed at the predetermined position to the front of the image pick-up device 27 so as to seal the sealing space 51 formed at the photoelectrically converting surface of the image pick-up device 27 and the peripheral portion of the dust-proofing filter 21. Thus, the adhesion of dust to the photoelectrically converting surface of the image pick-up device 27 is prevented.

Dust adhered to the exposing surface in front of the dust-proofing filter 21 is removed by applying a periodic voltage to the piezoelectric element 22 arranged integrally with the peripheral portion of the dust-proofing filter 21 and by applying a predetermined vibration to the dust-proofing filter 21.

Similarly to the above embodiments, preferably, the supporting portion 23c of the dust-proofing filter supporting member 23 is abutted on the node of the vibration of the dust-proofing filter 21. The position of the portion as the node of the vibration of the dust-proofing filter 21 is varied depending on the size (thickness dimension or diameter) of the dust-proofing filter 21 or on the size of the piezoelectric element 22 for vibrating the dust-proofing filter 21.

Therefore, according to the twenty-first embodiment, in addition to the foregoing, the soft member 61 arranged to the supporting portion 23c of the dust-proofing filter supporting member 23 is abutted onto the piezoelectric element 22. Further, the soft member 61 may be abutted onto the predetermined position on the surface of the dust-proofing filter 21 depending on various conditions.

According to the twenty-first embodiment, the same advantages as those according to the first embodiment are obtained.

Further, according to the twenty-first embodiment, the soft member 61 such as rubber is arranged to the contact portion between the dust-proofing filter supporting member 23 (main body unit of the sealing structure) and the dust-proofing filter 21 (or the piezoelectric element 22).

Therefore, with the above-described structure, the attenuation of the vibrations of the dust-proofing filter 21 is suppressed at the contact portion where the dust-proofing filter 21 or the piezoelectric element 22 comes into contact with the dust-proofing filter supporting member 23 (main body unit of the sealing structure) upon applying the vibrations to the dust-proofing filter 21 by the operation of the piezoelectric element 22.

Next, a description is given of an image pick-up device unit in a camera according to the twenty-second embodiment of the present invention.

Figure 62:
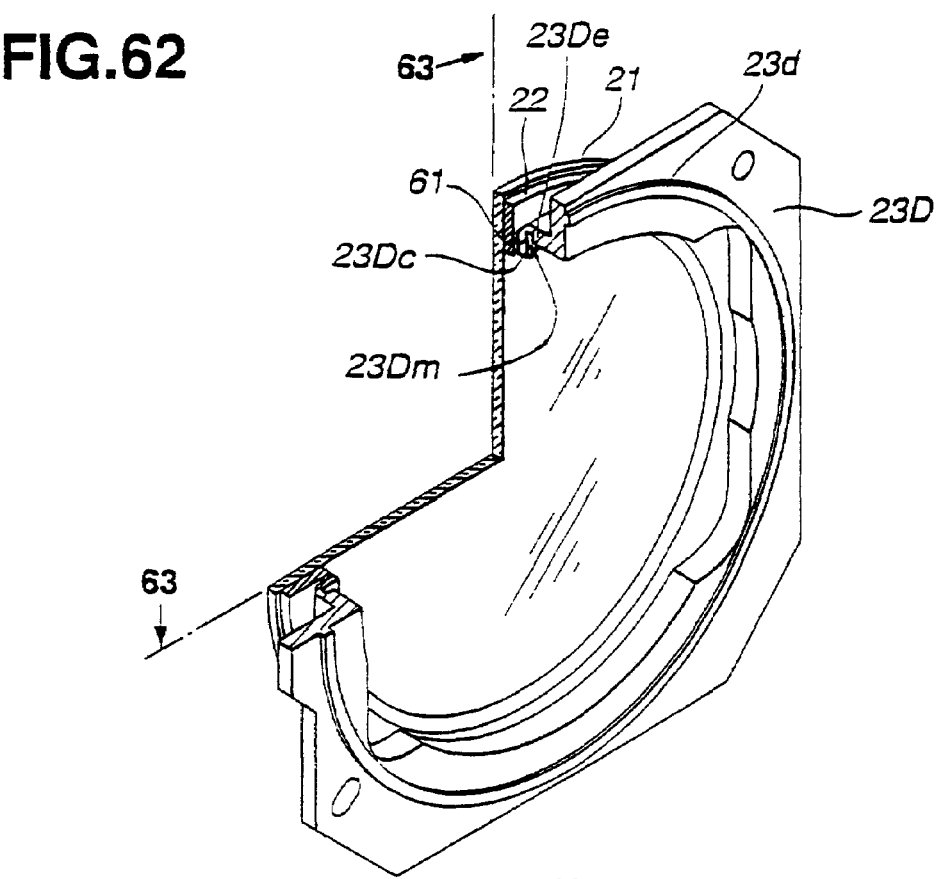
FIG. 62 is a perspective view showing a cut-off part upon assembling a part of an image pick-up device unit (main body unit of a sealing structure and a dust-proofing filter supporting member), a dust-proofing filter, and a piezoelectric element in a camera according to a twenty-second embodiment of the present invention.
Figure 63:
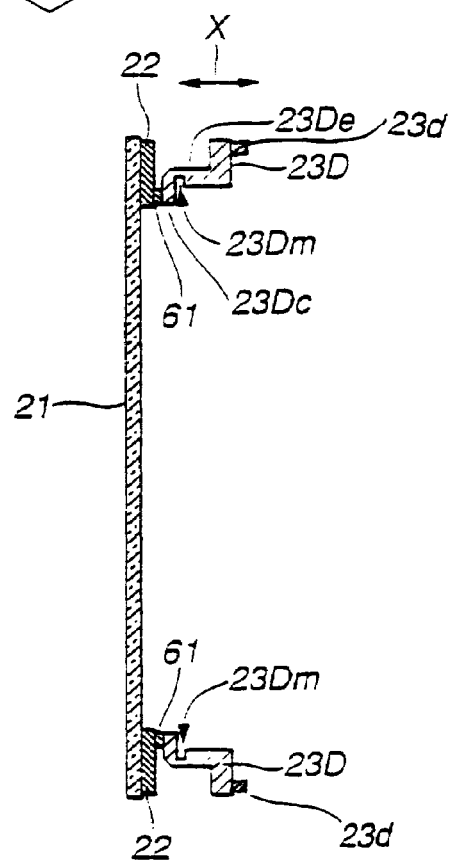
FIG. 63 is a sectional view along a line 63—63 shown in FIG. 62.

FIGS. 62 and 63 are diagrams showing by extracting a part of the image pick-up device unit in the camera according to the twenty-second embodiment of the present invention. FIG. 62 is a perspective view showing a cut-off part of the assembled main body unit of the sealing structure (dust-proofing filter supporting member), the dust-proofing filter, and the piezoelectric element among the members forming the image pick-up device unit. FIG. 63 is a sectional view along a line 63—63 shown in FIG. 62.

According to the twenty-second embodiment, basically, the structure is the same as that according to the twenty-first embodiment, and only a dust-proofing filter supporting member 23D as the main body unit of the sealing structure is different. Therefore, the same structure as that according to the twenty-first embodiment is designated by the same reference numeral and is not described. The structure of the entire camera is not illustrated and is referred to FIGS. 1 and 2 used for the description of the first embodiment.

Referring to FIGS. 62 and 63, according to the twenty-second embodiment, similarly to the twenty-first embodiment, the circular-shaped soft member 61 is arranged to the edge portion of a supporting portion 23Dc and the soft member 61 is abutted on the piezoelectric element 22.

According to the twenty-second embodiment, in the dust-proofing filter supporting member 23D, a groove portion 23Dm having a substantially C-shaped cross-section as shown in FIG. 63 is formed to the entire circumference on the inner peripheral surface of a wall portion 23De. Thus, the supporting portion 23Dc is formed with the softness in the direction of an arrow X as shown in FIG. 63.

Other structures are the same as those according to the twenty-first embodiment.

According to the twenty-second embodiment, in the image pick-up device unit, similarly to the twenty-first embodiment, the dust-proofing filter 21 is periodically vibrated by applying a predetermined periodic voltage to the piezoelectric element 22 at a predetermined timing. In this case, the dust-proofing filter 21 is vibrated, conceptually, in the direction of the arrow X as shown in FIG. 63.

According to the twenty-second embodiment, similarly to the twenty-first embodiment, the soft member 61 such as rubber is arranged to the contact portion between the dust-proofing filter supporting member 23D (main body unit of the sealing structure) and the dust-proofing filter 21 (or the piezoelectric element 22). Further, the groove portion 23Dm is formed to the predetermined position of the wall portion 23De in the dust-proofing filter supporting member 23D. Thus, the dust-proofing filter 21 (or the piezoelectric element 22) is supported against the dust-proofing filter supporting member 23D with softness and the movement of the dust-proofing filter 21 (or the piezoelectric element 22) in the direction of the arrow X as shown in FIG. 63, that is, the attenuation of the vibration is suppressed.

Next, a description is given of an image pick-up device unit in a camera according to the twenty-third embodiment of the present invention.

Figure 64:
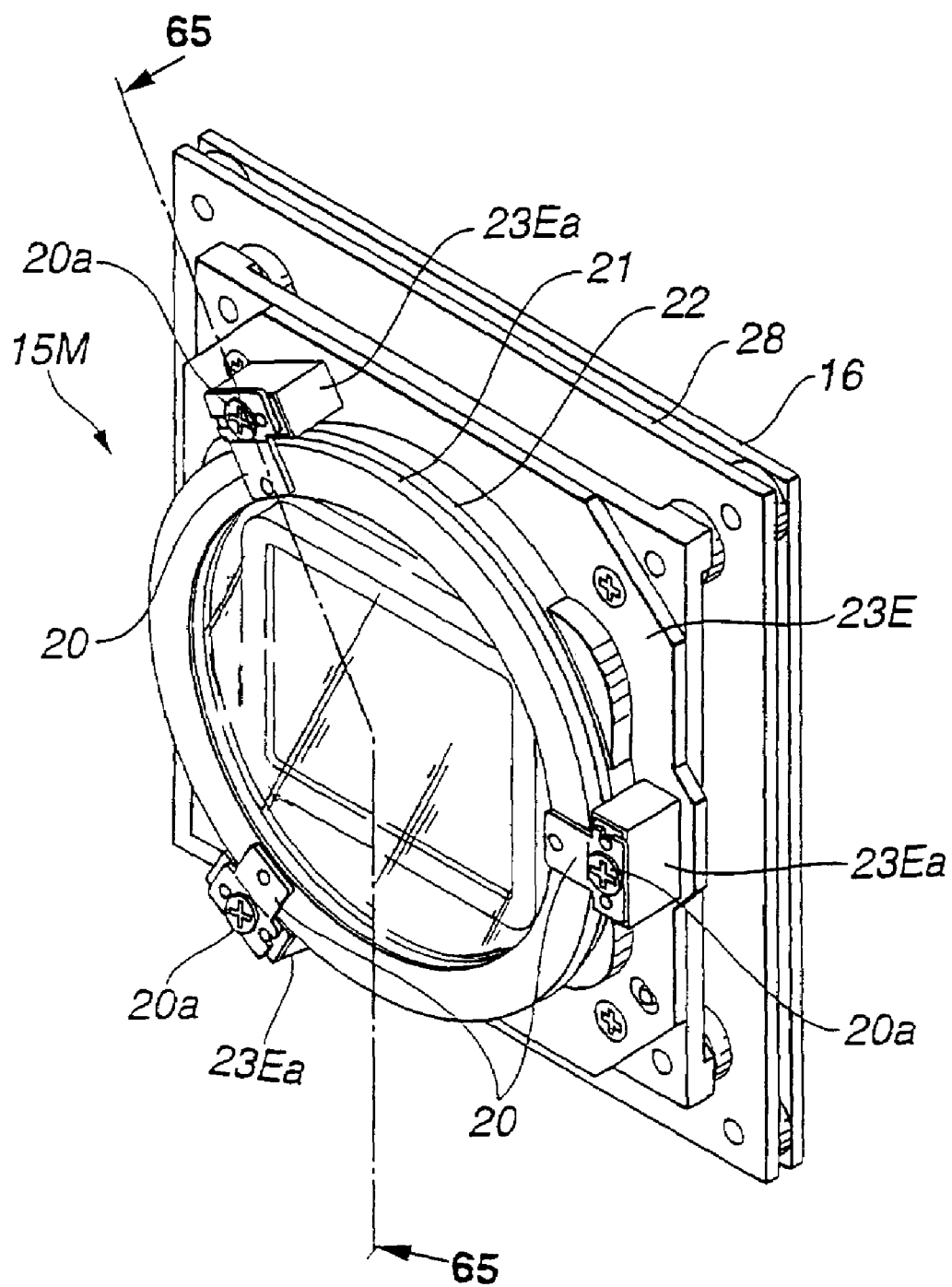
FIG. 64 is a perspective view showing an image pick-up device unit in a camera according to a twenty-third embodiment of the present invention.
Figure 65:
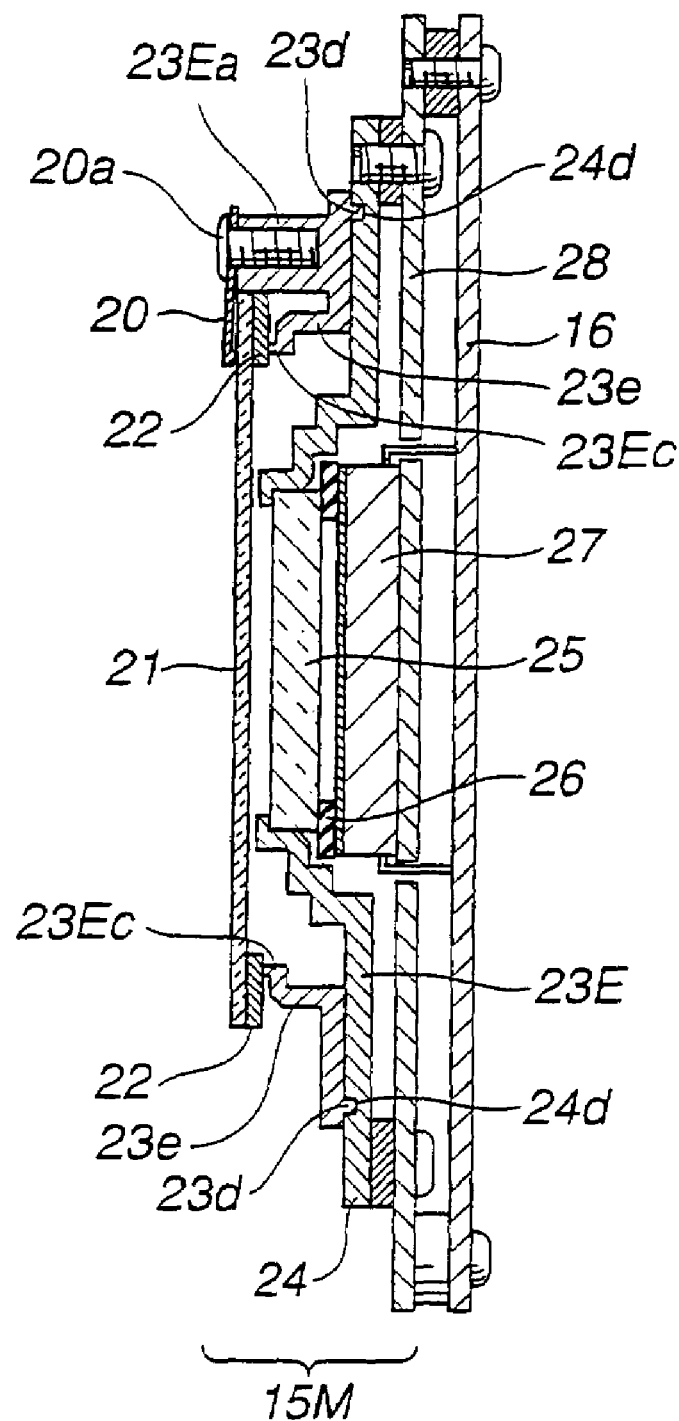
FIG. 65 is a sectional view along a line 65—65 shown in FIG. 64.
Figure 66:
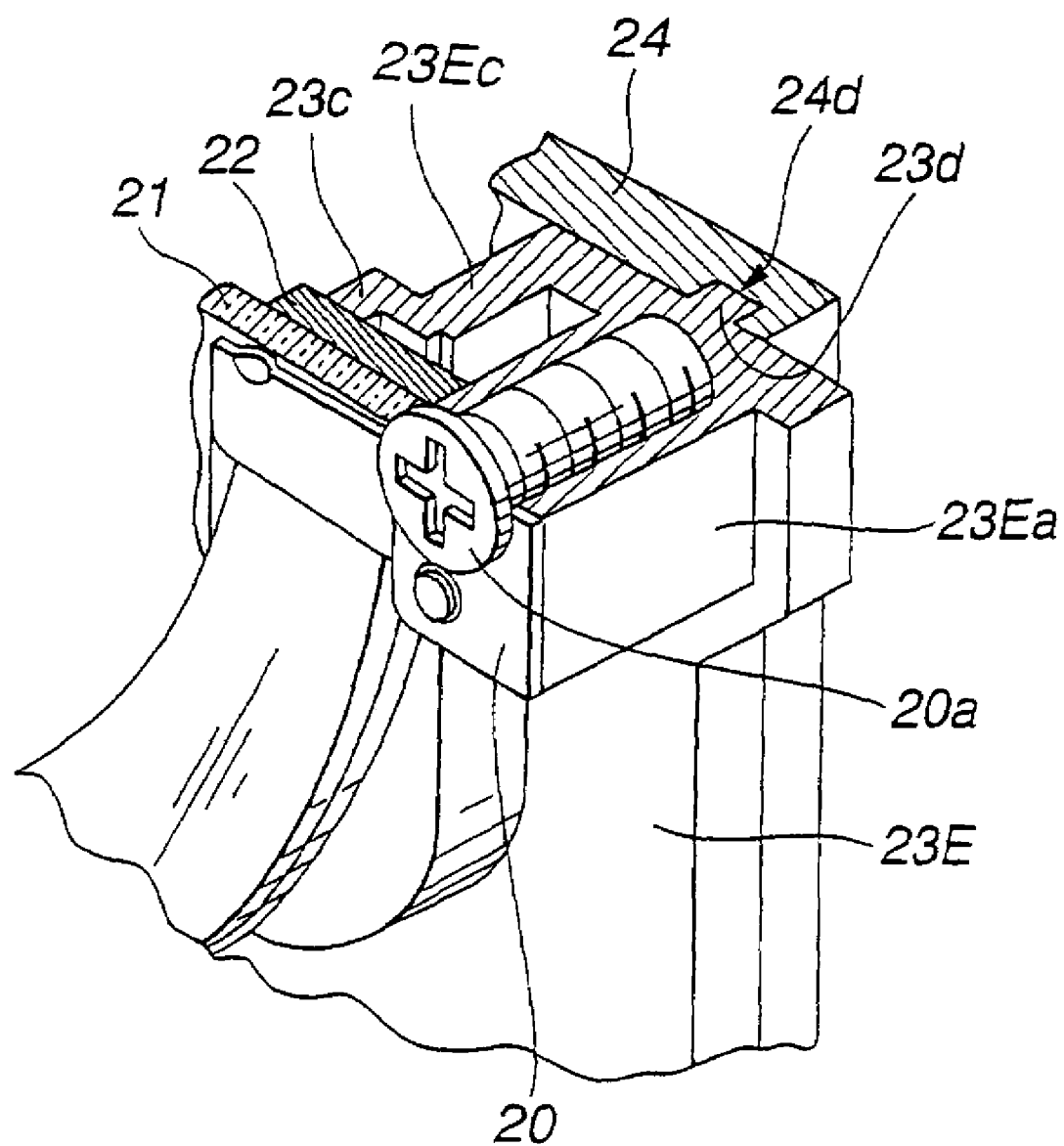
FIG. 66 is a perspective view of an enlarged portion near a contact portion between a main body of a sealing structure (dust-proofing filter supporting member) and a dust-proofing member (dust-proofing filter) in the image pick-up device unit shown in FIG. 64.

FIGS. 64 to 66 show the twenty-third embodiment of the present invention. FIG. 64 is a perspective view showing by extracting the image pick-up device unit in the camera according to the twenty-third embodiment. FIG. 65 is a sectional view along a line 65—65 as shown in FIG. 64. FIG. 66 is an enlarged perspective view showing the adjacent portion of the contact portion between the main body unit of the sealing structure (dust-proofing filter supporting member) and the dust-proofing member (dust-proofing filter) in the image pick-up device unit, including the cross section of the adjacent portion of the contact portion.

According to the twenty-third embodiment, basically, the structure is the same as that according to the twenty-first embodiment. However, according to the twenty-third embodiment, the soft member 61 according to the twenty-first embodiment is excluded and a dust-proofing filter supporting member 23E as the main body unit of the sealing structure functions as the soft member 61 according to the twenty-first embodiment. Therefore, the same structure as that according to the first embodiment is designated by the same reference numeral and is not described. The structure of the entire camera is not illustrated and is referred to FIGS. 1 and 2.

In an image pick-up device unit 15M according to the twenty-third embodiment, the dust-proofing filter supporting member 23E as the main body unit of the sealing structure is made of a soft material having the softness of hard rubber. Corresponding thereto, according to the twenty-first embodiment, the soft member 61 according to the twenty-first embodiment is excluded.

The dust-proofing filter 21 is supported with the softness via the piezoelectric element 22 interposed by the supporting portion 23c formed at the edge portion of the wall portion 23e of the dust-proofing filter supporting member 23E.

Other structure is the same as that according to the first embodiment.

Therefore, according to the twenty-third embodiment, the soft member 61 according to the twenty-first embodiment is removed and only the dust-proofing filter supporting member 23E itself is made of the soft material. Thus, the same advantages as those according to the twenty-first embodiment are obtained. This reduces the number of members and contributes to the simplification of the assembling process and to the reduction in manufacturing costs.

As means for supporting the dust-proofing filter 21 with the softness, the dust-proofing filter supporting member 23E is made of the soft material. In addition, at least the adjacent portion of the wall portion 23e and the supporting portion 23c in the dust-proofing filter supporting member 23E are made of the soft material. Thus, the same advantages are obtained.

Next, a description is given of an image pick-up device unit in a camera according to the twenty-fourth embodiment of the present invention.

Figure 67:
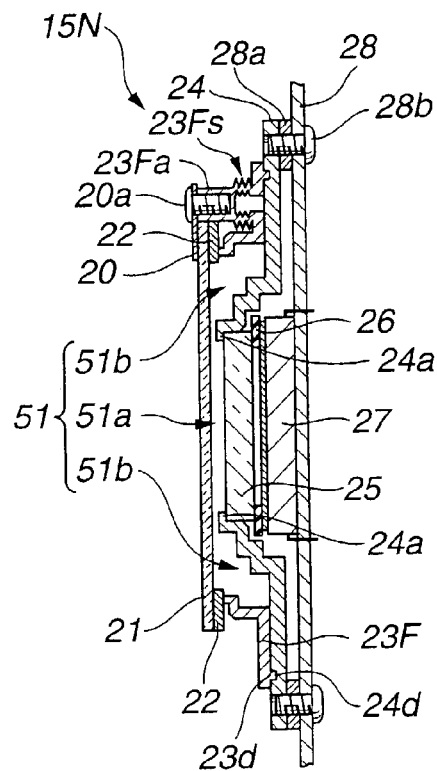
FIG. 67 is a sectional view of an image pick-up device unit in a camera according to a twenty-fourth embodiment of the present invention, specifically, a sectional view showing a normal status in which no voltage is applied to a piezoelectric element in the image pick-up device unit.
Figure 68:
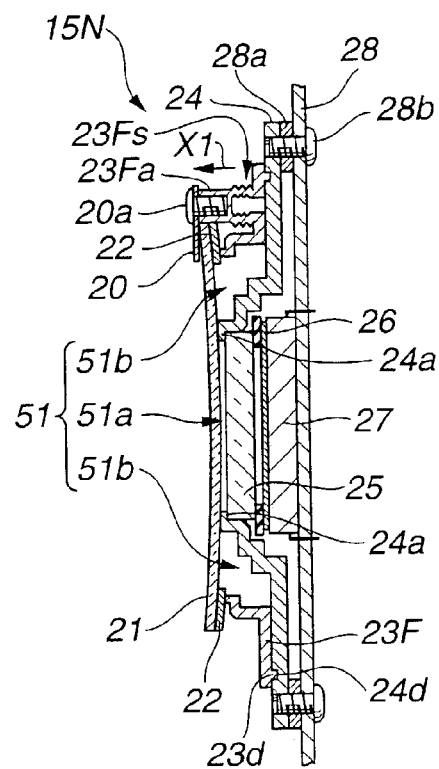
FIG. 68 is a sectional view showing the image pick-up device unit shown in FIG. 67, specifically, a sectional view showing a status in which either of a positive voltage or a negative voltage is applied to the piezoelectric element in the image pick-up device unit shown in FIG. 67.
Figure 69:
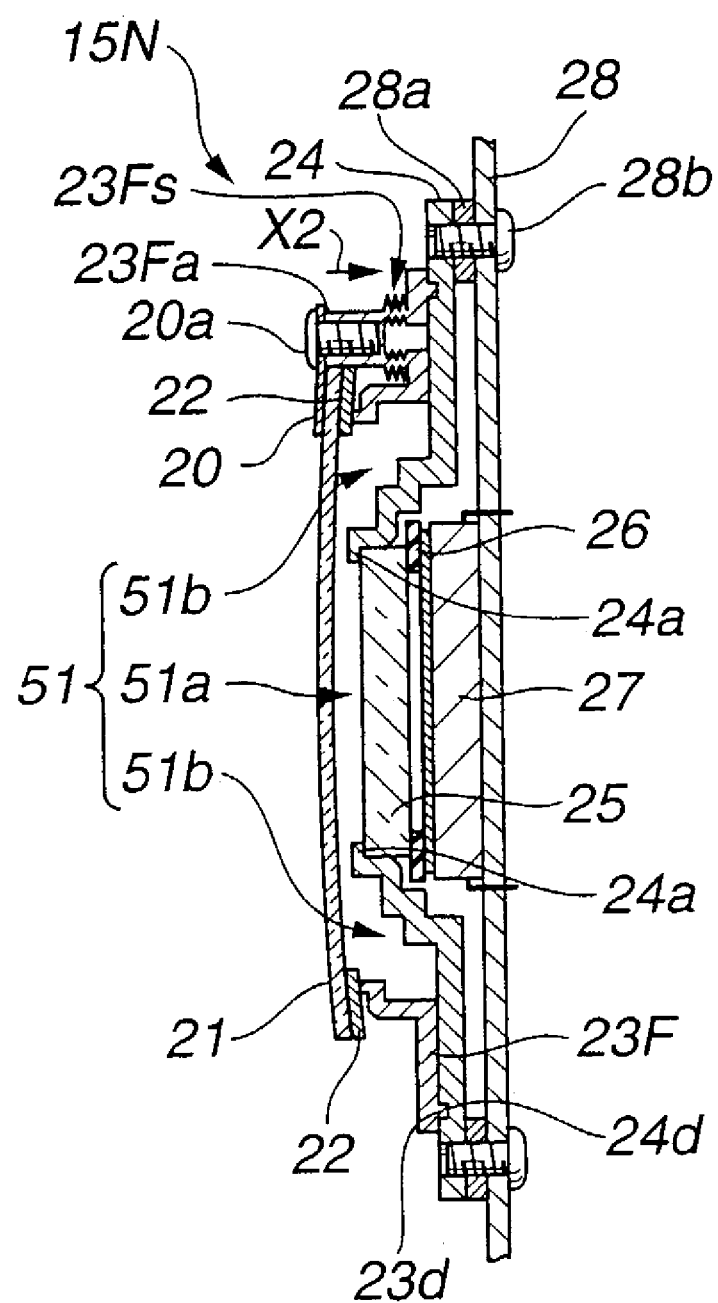
FIG. 69 is a sectional view showing an image pick-up device unit shown in FIG. 67, specifically, a sectional view showing a status in which either of the negative voltage or the positive voltage is applied to the piezoelectric element in the image pick-up device unit.

FIGS. 67 to 69 are sectional views of the image pick-up device unit according to the twenty-fourth embodiment of the present invention. FIG. 67 is a sectional view showing a normal status in which the voltage is not applied to the piezoelectric element in the image pick-up device unit. FIG. 68 is a sectional view showing a status in which the positive voltage or the negative voltage is applied to the piezoelectric element in the image pick-up device unit. FIG. 69 is a sectional view showing a status in which the negative voltage or the positive voltage is applied to the piezoelectric element.

The sectional views shown in FIGS. 67 to 69 show the cross section at a portion along a line 65—65 shown in FIG. 64 used for the description of the twenty-third embodiment.

According to the twenty-fourth embodiment, basically, the structure is the same as that according to the twenty-third embodiment. According to the twenty-fourth embodiment, only the structure of a dust-proofing filter supporting member 23F as the main body unit forming the sealing structuring in an image pick-up device unit 15N is slightly different. The same structure as that according to the twenty-third embodiment is designated by the same reference numeral and is not described in detail. The structure of the entire camera is not illustrated and is referred to FIGS. 1 and 2 used for the description of the first embodiment.

In the image pick-up device unit 15N in the camera according to the twenty-fourth embodiment, the sealing structure is provided for sealing the predetermined sealing space 51 at the peripheral portion of the image pick-up device unit 27 and the dust-proofing filter 21 so that the almost-sealed void portion 51a is structured at the opposed portion of the dust-proofing filter 21 and the image pick-up device 27.

Similarly to the above embodiments, the dust-proofing filter 21 is vibrated by applying a predetermined periodic voltage to the piezoelectric element 22.

According to the twenty-fourth embodiment, in the image pick-up device unit 15N, a base portion 23Fs of a projecting portion 23Fa is elastically formed for attaching the pressing member 20 of the dust-proofing filter supporting member 23F. Therefore, the base portion 23Fs of the projecting portion 23Fa is formed, for example, with concertinas, thus forming a retracting structure for retraction by a predetermined amount in the direction of arrows X1 and X2 shown in FIGS. 68 and 69.

Other structure is the same as that according to the twenty-third embodiment.

With the above-mentioned structure, the operation of the image pick-up device unit 15N of the camera according to the twenty-fourth embodiment is as follows.

First, in the normal status (the status shown in FIG. 67) in which the voltage is not applied to the piezoelectric element 22 in the image pick-up device unit 15N, the positive (+) voltage, for example, is applied to the piezoelectric element 22, thus to enter the status shown in FIG. 68.

In this status, the dust-proofing filter 21 is bent toward the image pick-up device 27 and the optical LPF 25. Thus, the adjacent portion of the center of the dust-proofing filter 21 is extremely in contact with the front surface of the CCD case 24. On the other hand, force acts in the direction of the arrow X1 shown in FIG. 68 near the peripheral portion of the dust-proofing filter 21.

The elastic force acts near the peripheral portion of the dust-proofing filter 21, whereas the dust-proofing filter 21 is directed toward the image pick-up device 27 and the optical LPF 25 by the pressing member 20. The base end portion of the pressing member 20 is fixed at a distal end portion of the projecting portion 23Fa by the fixing screw 20a. Therefore, the force acting near the peripheral portion of the dust-proofing filter 21 retracts the projecting portion 23Fa in the direction of the arrow X1 against the elastic force of the pressing member 20. The retraction of the projecting portion 23Fa suppresses the attenuation of the vibrations of the dust-proofing filter 20.

On the other hand, in the normal status (the status shown in FIG. 67) in which the voltage is not applied to the piezoelectric element 22 in the image pick-up device unit 15N or in the status shown in FIG. 68, the application of the voltage to the piezoelectric element 22 is reset and the status returns to that shown in FIG. 67. Then, for example, the negative voltage is applied to the piezoelectric element 22 in the image pick-up device unit 15N, thereby entering the status shown in FIG. 69.

In this status, the dust-proofing filter 21 is bent in the direction in which the dust-proofing filter 21 is leaving from the optical LPF 25. Thus, the adjacent portion of the center of the dust-proofing filter 21 is remote from the CCD case 24. On the other hand, the force acts in the direction of the arrow X2 shown in FIG. 69 near the peripheral portion of the dust-proofing filter 21.

In this case, the force acting near the peripheral portion of the dust-proofing filter 21 acts in the direction in which the projecting portion 23F is constricted in the direction of the arrow X2. Thus, the constriction of the projecting portion 23Fa suppresses the attenuation of the vibration of the dust-proofing filter 20.

According to the twenty-fourth embodiment, the same advantages as those according to the twenty-third embodiment are obtained. Further, in order to attach the pressing member 20, the base portion 23Fs of the projecting portion 23Fa arranged to the dust-proofing filter supporting member 23F can be elastic. Consequently, upon vibration of the dust-proofing filter 21 by the operation of the piezoelectric element 22, the attenuation of the vibrations is suppressed and the vibrations are stably ensured.

According to the twenty-first to twenty-fourth embodiments, the soft material forms the contact portion of the dust-proofing member (dust-proofing filter) or the member for vibration (piezoelectric element) and the main body unit of the sealing structure (dust-proofing filter supporting member) of the sealing structure, the dust-proofing member or the member for vibration is supported to the main body portion of the sealing structure with softness. However, the attenuation of the vibrations of the dust-proofing member (dust-proofing filter) is suppressed by using another means. Next, this example is described according to the twenty-fifth embodiment of the present invention.

Figure 70:
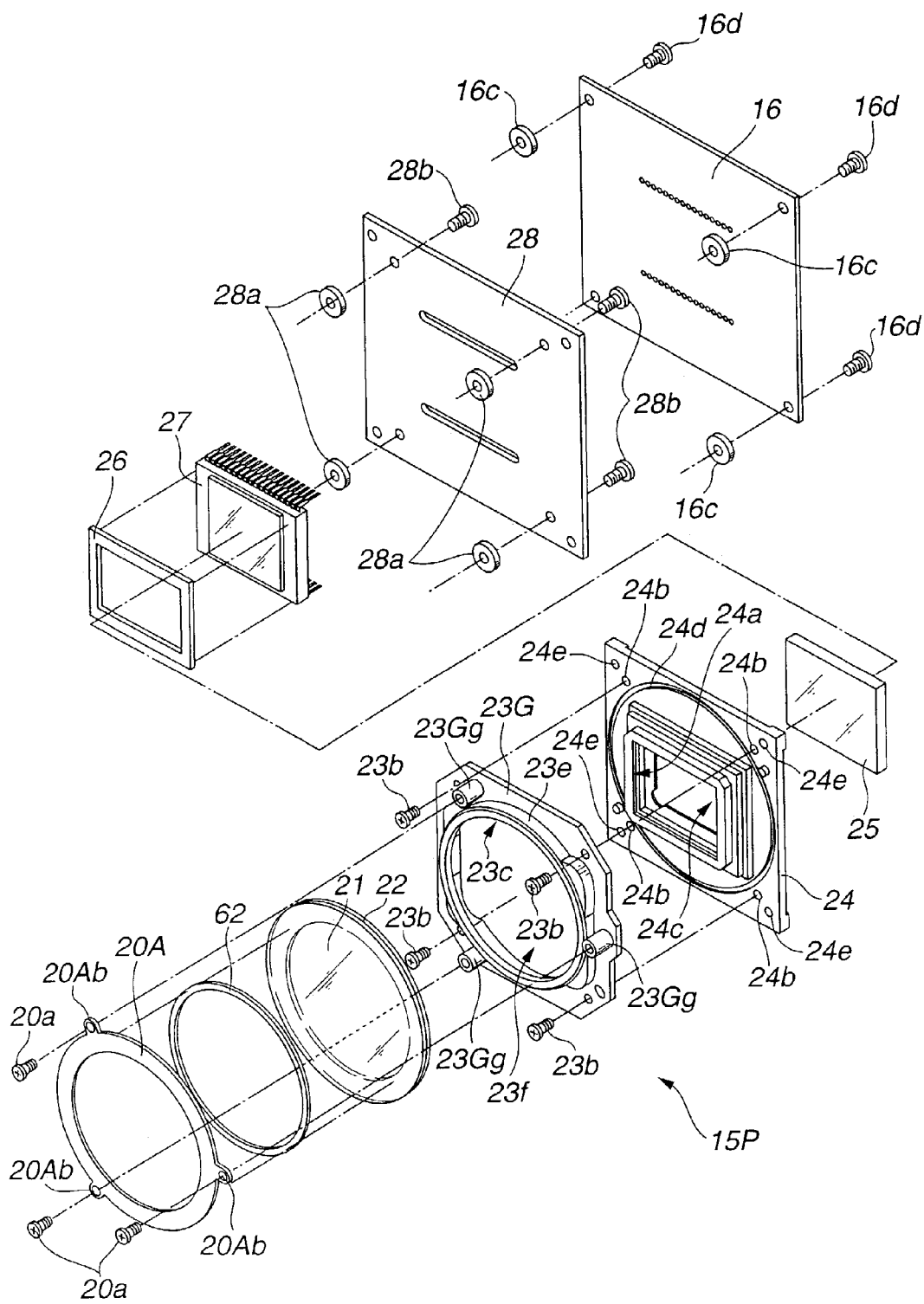
FIG. 70 is a main-part exploded perspective view showing a disassembled image pick-up device unit in a camera according to a twenty-fifth embodiment of the present invention.
Figure 71:
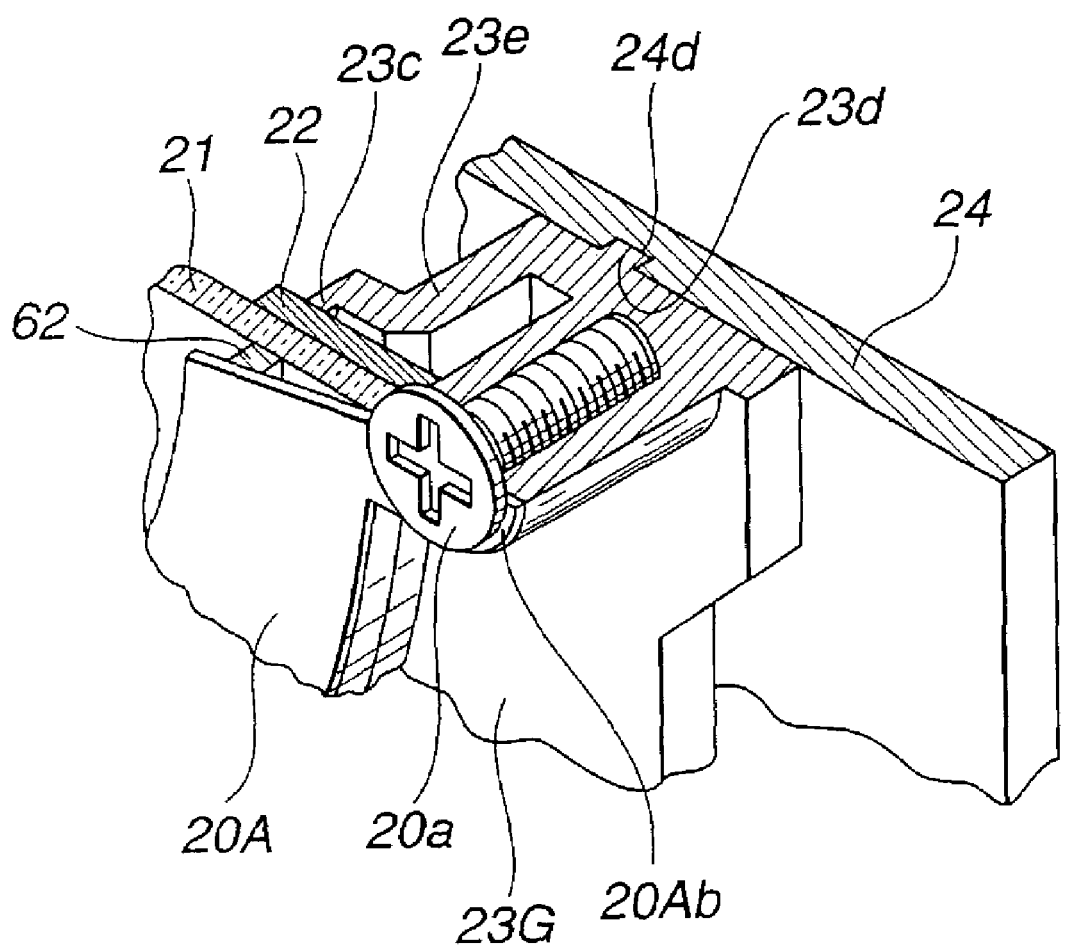
FIG. 71 is a perspective view showing an enlarged portion near a contact portion between a main body unit of a sealing structure (dust-proofing supporting member) and a dust-proofing member (dust-proofing filter) in the image pick-up device unit shown in FIG. 70.

FIGS. 70 and 71 are diagrams showing the twenty-fifth embodiment of the present invention. FIG. 70 is a main-part exploded perspective view showing a disassembled image pick-up device unit according to the twenty-fifth embodiment. FIG. 71 is an enlarged perspective view showing the adjacent portion of the contact portion of the main body unit in the sealing structure (dust-proofing filter supporting member) and the dust-proofing member (dust-proofing filter) in the image pick-up device unit, including the cross section thereof.

According to the twenty-fifth embodiment, the structure is basically the same as that according to the twenty-first embodiment. The dust-proofing filter supporting member 23G as the main body unit of the sealing structuring, the pressing member 20A for pressing the dust-proofing filter 21 as the dust-proofing member toward the dust-proofing filter supporting member 23G, and the arrangement position of the soft member 62 as the means for suppressing the attenuation of the vibration of the dust-proofing filter 21 are different from those according to the twenty-first embodiment. Other structure is the same as that according to the twenty-first embodiment. Therefore, the same structure as that according to the twenty-first embodiment is designated by the same reference numeral and is not described in detail. The structure of the entire camera is not illustrated and is referred to FIGS. 1 and 2 used for the description of the first embodiment.

According to the twenty-fifth embodiment, in an image pick-up device unit 15P, the dust-proofing filter supporting member 23G forming the main body unit of the sealing structure is fixed to the screw hole 24b of the CCD case 24 by using the screw 23b in front of the CCD case 24. In this case, referring to FIG. 71, the CCD case 24 and the dust-proofing filter supporting member 23G are airtightly fit to each other in an annular area by fitting the circumferential groove 24d formed in front of the CCD case 24 to the annular convex portion 23d formed at the back of the dust-proofing filter supporting member 23G, similarly to the case according to the twenty-first embodiment.

The dust-proofing filter supporting member 23G has an opening 23f which is circularly or polygonally pierced near the center thereof. The subject beams transmitted through the photographing optical system 12a pass through the opening 23f which is set to have a size large enough for the beams to irradiate the photoelectrically converting surface of the image pick-up device 27 arranged at the back.

The wall portion 23e projecting toward the front surface is substantially annular at the peripheral portion of the opening 23f. Further, the supporting portion 23c projecting toward the front surface is formed at the edge portion of the wall portion 23e.

On the other hand, a plurality of (according to the twenty-fifth embodiment, three) projecting portions 23Gg are formed projecting toward the front side, near an outer peripheral portion in the front of the dust-proofing filter supporting member 23G.

Referring to FIG. 70, the projecting portions 23Gg are formed to fix a pressing member 23A for fixing and holding the dust-proofing filter 21 by the screw. The pressing member 20A is fixed to the screw hole formed to the projecting portions 23Gg by fastening means such as the fixing screw 20a. The projecting portions 23Gg function as position regulating members for positioning upon adhering and arranging the dust-proofing filter 21 to the dust-proofing filter supporting member 23G.

The dust-proofing filter 21 is pressed toward the dust-proofing filter supporting member 23G for being fixed and held, by the pressing member 20A which is made of an elastic member such as a plate-shaped spring to airtightly be jointed to the dust-proofing filter supporting member 23G and which is circularly formed.

That is, the pressing member 20A is made of the elastic member such as the plate-shaped spring with a circular shape. A plurality of (three, according to the twenty-fifth embodiment) convex pieces 20Ab are projected toward the outside at the peripheral portion of the pressing member 20A. Piercing holes are set to the convex pieces 20Ab to penetrate the fixing screw 20a.

The dust-proofing filter 21 is arranged at a predetermined position of the dust-proofing filter supporting member 23G. Then, the pressing member 20A is fixed by using the screw. In this case, the dust-proofing filter 21 is easily arranged at the predetermined position of the dust-proofing filter supporting member 23G by moving the peripheral portion of the dust-proofing filter 21 in the optical direction along the projecting portions 23Gg.

The supporting portion 23c is abutted on the predetermined position (portion as a node upon vibration) of the dust-proofing filter 21 (actually, the piezoelectric element 22).

In this status, by overlapping and arranging the pressing member 20A to the dust-proofing filter 21, the dust-proofing filter 21 is sandwiched between the pressing member 20A and the supporting portion 23c of the dust-proofing filter supporting member 23G.

Further, the soft member 62 made of rubber, which is circularly formed at a predetermined position, is sandwiched between the pressing member 20A and the dust-proofing filter 21. The soft member 62 is adhered to a predetermined position (portion as a node for vibration of the dust-proofing filter 21) near the peripheral portion of the surface on the side of the photographing optical system 12a of the dust-proofing filter 21, or to a predetermined position on the side of one surface of a plain-plate portion of the pressing member 20A, that is, on the opposed side of the dust-proofing filter 21, by using the adhering means such as the adhesive or a two-sided tape.

In this status, by fixing the pressing member 20A to the screw holes of the projecting portions 23Gg by using the fixing screw 20a, a circular plate-shaped portion of the pressing member 20A is abutted on a predetermined portion of the dust-proofing filter 21 and presses the dust-proofing filter 21 toward the dust-proofing filter supporting member 23G by its elastic force.

In this case, a predetermined portion of the piezoelectric element 22 arranged at the peripheral portion at the back of the dust-proofing filter 21 is abutted on the supporting portion 23c, thereby regulating the positions of the dust-proofing filter 21 and the piezoelectric element 22 in the optical direction. Thus, the dust-proofing filter 21 is fixed and held to airtightly be jointed to the dust-proofing filter supporting member 23G via the piezoelectric element 22 interposed.

A holding structure for pressing the peripheral portion of the dust-proofing filter 21 to press and fix the dust-proofing filter 21 (dust-proofing member) to the dust-proofing filter supporting member 23G (sealing structure) comprises the pressing member 20A, the projecting portions 23Gg of the dust-proofing filter supporting member 23G, and the like.

Other structure is the same as that according to the twenty-first embodiment. The image pick-up device unit 15P in the camera according to the twenty-fifth embodiment is operated in the same manner as that according to the twenty-first embodiment and removes the dust and the like adhered to the surface of the dust-proofing filter 21.

As mentioned above, in the image pick-up device unit 15P according to the twenty-fifth embodiment, the same advantages as those according to the twenty-first embodiment are obtained.

According to the twenty-fifth embodiment, the soft member 62 is arranged at the predetermined position between the pressing member 20A and the dust-proofing filter 21, thereby easily suppressing the vibrations of the dust-proofing filter 21.

Next, a description is given of an image pick-up device unit in a camera according to the twenty-sixth embodiment of the present invention.

According to the twenty-sixth embodiment, basically, the structure is the same as that according to the twenty-fifth embodiment and only a part of the image pick-up device unit is slightly different. Therefore, the same structure as that according to the twenty-fifth embodiment is designated by the same reference numeral. The structure of the entire camera is referred to FIGS. 1 and 2 used for the description of the first embodiment.

Figure 72:
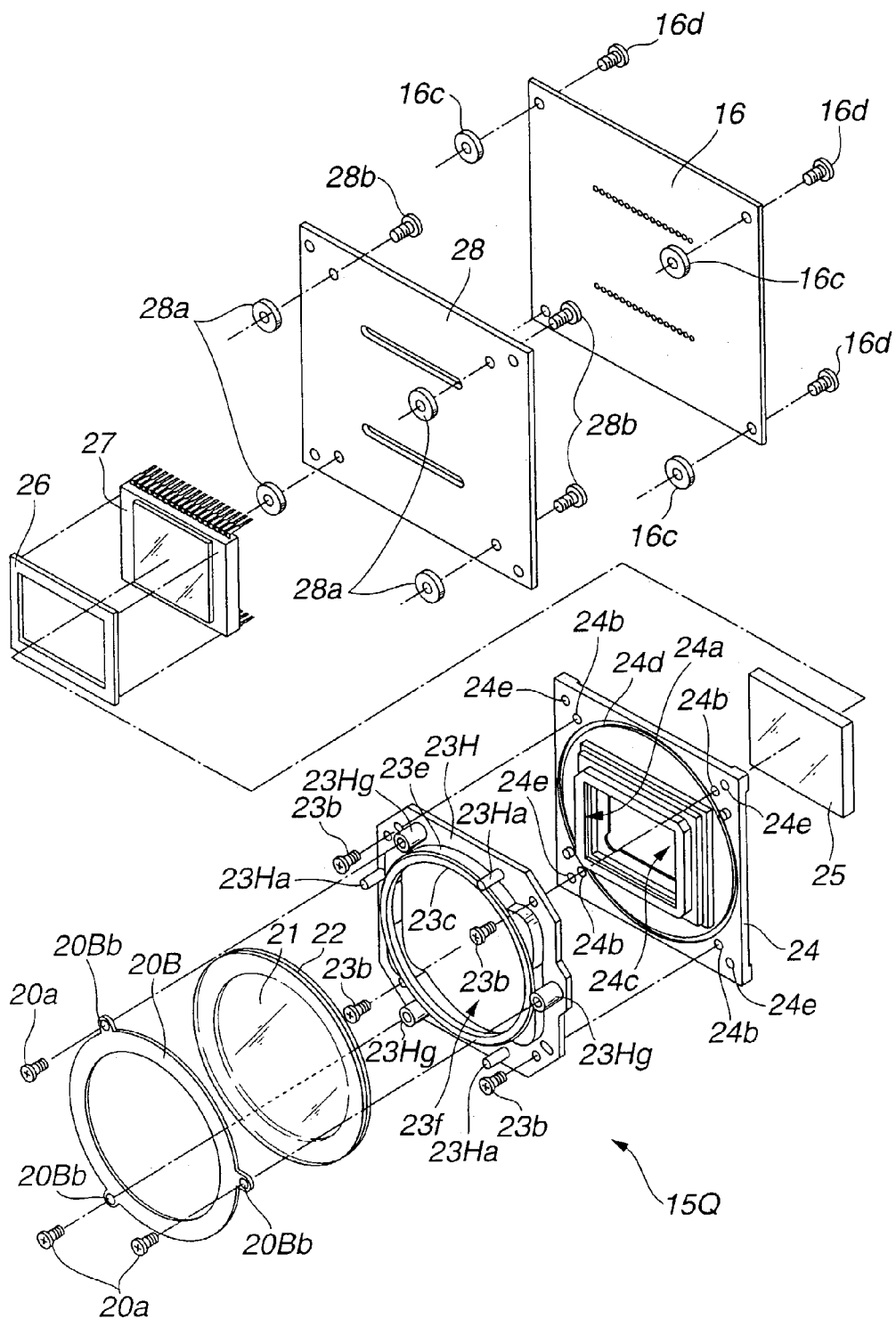
FIG. 72 is a diagram showing by extracting a part of an image pick-up device unit in a camera according to a twenty-sixth embodiment of the present invention, specifically, a main-part exploded perspective view showing the disassembled image pick-up device unit.
Figure 73:
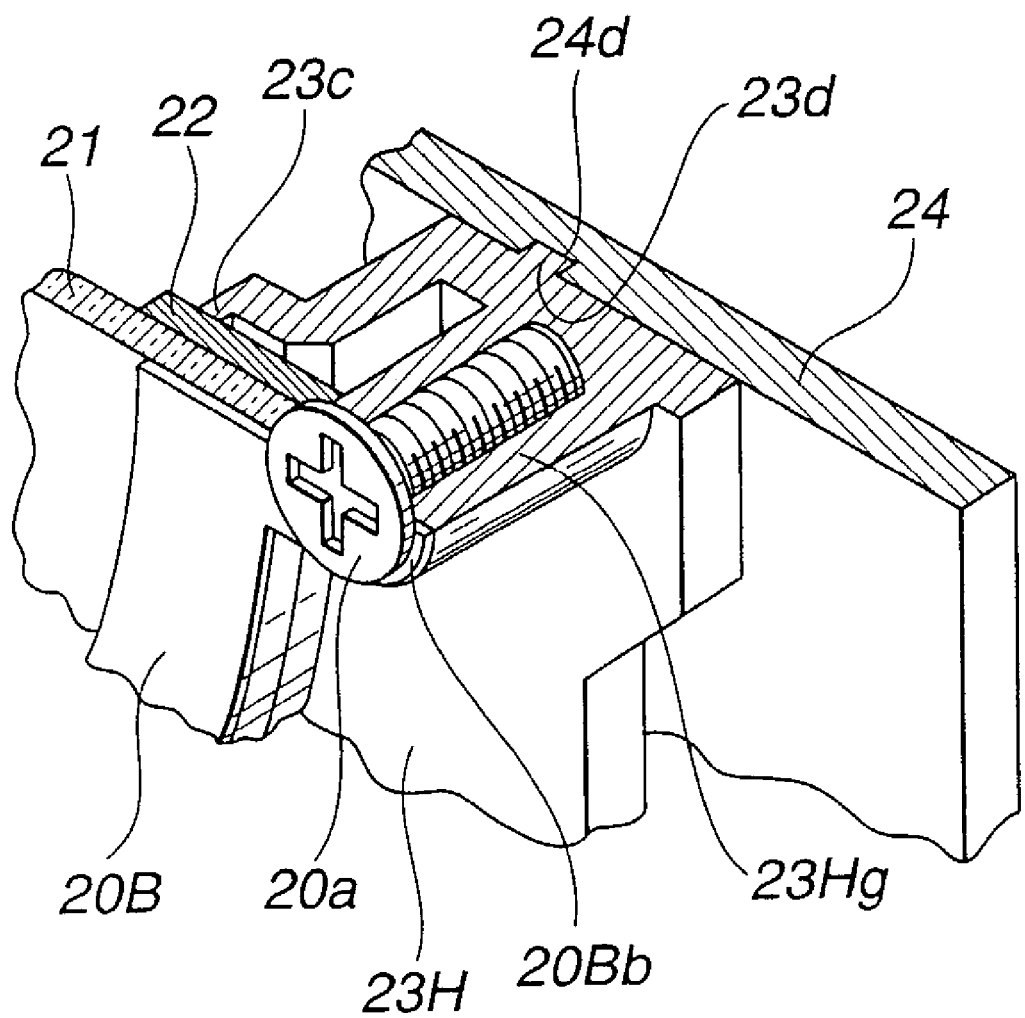
FIG. 73 is a main-part enlarged perspective view showing an enlarged part (an attaching portion of a pressing member and a dust-proofing member) in the image pick-up device unit shown in FIG. 72.

FIGS. 72 and 73 are diagrams showing by extracting a part of the image pick-up device unit in the camera according to the twenty-sixth embodiment of the present invention. FIG. 72 is a main-part exploded perspective view showing the disassembled image pick-up device unit. FIG. 73 is a main-part enlarged perspective view showing by extracting a part of the image pick-up device unit, including an enlarged portion of the dust-proofing member and an attaching portion of the pressing member.

According to the twenty-sixth embodiment, an image pick-up device unit 15Q in the camera comprises members including the shutter unit 14 according to the above-mentioned embodiments. However, referring to FIG. 72, only the main portion is illustrated and the shutter unit 14 is not illustrated. For the purpose of showing the positional relationship of the members, referring to FIG. 72, the main circuit board 16 provided near the image pick-up device unit 15Q is illustrated together. The main circuit board 16 is one of main circuit boards generally used for the conventional cameras, and a detailed description thereof is omitted.

A detailed description is given of the image pick-up device unit 15Q in the camera according to the twenty-sixth embodiment.

FIGS. 72 and 73 are diagrams showing by extracting a part of the image pick-up device unit in the camera according to the twenty-sixth embodiment. FIG. 72 is a main-part exploded perspective view showing the disassembled image pick-up device unit. FIG. 73 is a main-part enlarged perspective view showing by extracting a part of the image pick-up device unit, including an enlarged portion of the dust-proofing member and the attaching portion of the pressing member.

According to the twenty-sixth embodiment, the image pick-up device unit 15Q in the camera 1 comprises members including the shutter unit 14 as mentioned above. However, referring to FIG. 72, only the main portion is illustrated and the shutter unit 14 is not illustrated. For the purpose of showing the positional relationship of the members, referring to FIG. 72, the main portion is provided near the image pick-up device unit 15Q, the image pick-up device 27 is loaded. Further, the main circuit board 16 to which an image pick-up system electrical circuit containing the image signal processing circuit 16a and the work memory 16b is illustrated together. The main circuit board 16 is of a type generally used for conventional cameras, and a detailed description thereof is omitted.

The image pick-up device unit 15Q comprises: the image pick-up device 27 comprising the CCD and the like, which obtains the image signal corresponding to light transmitted through the photographing optical system 12a and irradiated to the photoelectrically converting surface; the image pick-up device fixing plate 28 comprising a thin-sheet member for fixing and supporting the image pick-up device 27; the optical low-pass filter (hereinafter, referred to as an optical LPF) 25 arranged on the side of the photoelectrically converting surface of the image pick-up device 27, as an optical device which is formed to remove high frequency components from the subject beams transmitted and irradiated through the photographing optical system 12a; the low-pass filter supporting member 26 provided in the periphery between the optical LPF 25 and the image pick-up device 27, which is made of substantially-frame-shaped elastic members; the image pick-up device accommodating case member (hereinafter, referred to as the CCD case) 24 which accommodates, fixes, and holds the image pick-up device 27, supports the optical LPF 25 (optical device) to be in contact with a peripheral portion and at an adjacent portion of the optical LPF 25 and which comes into closely contact with a dust-proofing filter supporting member 23H comprising a part of a sealing structure, which will be described later, at a predetermined portion; the dust-proofing filter supporting member 23H which is abutted on the dust-proofing filter 21 (dust-proofing member) arranged in the front of the CCD case 24 at a peripheral portion and an adjacent portion thereof and supports it; the dust-proofing filter 21 as an optical member and a dust-proofing member, opposed and arranged at a predetermined position having a predetermined interval to the optical LPF 25 in the front of the optical LPF 25 on the side of the photoelectrically converting surface of the image pick-up device 27, which is supported by the dust-proofing filter supporting member 23H; the piezoelectric element 22 arranged to the surface on the opposed side of the image pick-up device 27 at a peripheral portion of the dust-proofing filter 21, as a member for vibration for applying a predetermined vibration to the dust-proofing filter 21, comprising an electromechanical transducer such as piezoelectric ceramics; a plate-shaped pressing member 20B comprising an elastic member which joints the dust-proofing filter 21 to the dust-proofing filter supporting member 23 airtightly, and the like.

The image pick-up device 27 obtains the image signal corresponding to the subject image formed onto the photoelectrically converting surface thereof by receiving the subject beams transmitted through the photographing optical system 12a onto the photoelectrically converting surface thereof and by performing photoelectrically converting processing, and corresponds to, e.g., a charge coupled device (CCD).

The image pick-up device 27 is mounted at a predetermined position on the main circuit board 16 via the image pick-up device fixing plate 28 interposed. As mentioned above, the image signal processing circuit 16a and the work memory 16b, etc. are mounted on the main circuit board 16 so that an output signal from the image pick-up device 27, that is, the image signal obtained by the photoelectrically converting processing is transmitted to the image signal processing circuit 16a or the like.

As the signal processing in the image signal processing circuit 16a, the photographing optical system 12a held in the lens barrel 12 loaded to the photographing optical system mounting unit 11a converts the image signal obtained from the image pick-up device 27 to a signal matching the recording, corresponding to the image formed onto the photoelectrically converting surface of the image pick-up device 27. The above-mentioned signal processing is the same as processing for treating the digital image signal, usually performed in the general digital cameras. Therefore, a detailed description of various signal processing executed in the camera 1 is omitted.

The optical LPF 25 is arranged in front of the image pick-up device 27 while sandwiching the low-pass filter supporting member 26. The CCD case 24 is arranged to cover the optical LPF 25.

That is, an opening 24c which is rectangular substantially in the center is provided for the CCD case 24. The optical LPF 25 and the image pick-up device 27 are arranged from the back side at the opening 24c. The step portion 24a whose cross section is almost L-shaped is formed at an inner peripheral portion of the back side of the opening 24c (refer back to FIGS. 4 and 5).

As mentioned above, the low-pass filter supporting member 26 made of an elastic member or the like is arranged between the optical LPF 25 and the image pick-up device 27. In the peripheral portion in front of the image pick-up device 27, the low-pass filter supporting member 26 is arranged within a valid range of the photoelectrically converting surface, in other words, at a position for evacuating valid beams incident on the image pick-up device 27, and is abutted on an adjacent portion of the peripheral portion at the back of the optical LPF 25. The airtightness is substantially held between the optical LPF 25 and the image pick-up device 27. Thus, elastic force acts to the optical LPF 25 in the optical axis direction by the low-pass filter supporting member 26.

Then, the peripheral portion in front of the optical LPF 25 is airtightly abutted on the step portion 24a of the CCD case 24. Thus, the position of the optical LPF 25 in the optical axis direction is regulated against the elastic force generated by the low-pass filter supporting member 26, which tends to displace the optical LPF 25 to the optical axis direction.

In other words, the optical LPF 25 inserted from the back side in the opening 24c of the CCD case 24 is subjected to the position regulation in the optical direction by using the step portion 24a. Consequently, it is possible to prevent the optical LPF 25 from breaking away from the inside of the CCD case 24 towards the front side.

As mentioned above, after inserting the optical LPF 25 in the opening 24c of the CCD case 24 from the back side, the image pick-up device 27 is arranged at the back side of the optical LPF 25. In this case, the low-pass filter supporting member 26 is sandwiched between the optical LPF 25 and the image pick-up device 27 in the peripheral portion of the low-pass filter supporting member 26.

As mentioned above, the image pick-up device 27 is mounted on the main circuit board 16 while sandwiching the image pick-up device fixing plate 28. The image pick-up device fixing plate 28 is fixed to the screw holes 24e from the back of the CCD case 24 via the spacer 28a interposed by the screw 28b. The main circuit board 16 is fixed to the image pick-up device fixing plate 28 via the spacer 16c by the screw 16d interposed.

In front of the CCD case 24, the dust-proofing supporting member 23H is fixed to the screw holes 24b of the CCD case 24 by the screw 23b. In this case, the circumferential groove 24d is formed with a substantially annular shape at the predetermined position in front of the CCD case 24 in the peripheral side thereof. On the other hand, at the predetermined position at the back and the peripheral side of the dust-proofing filter supporting member 23H, the annular convex portion 23d (not shown in FIG. 72, refer to FIG. 73, and further refer back to FIGS. 4 and 5 according to the first embodiment) corresponding to the circumferential groove 24d of the CCD 24 is substantially annularly formed throughout the circumference. By fitting the annular convex portion 23d to the circumferential groove 24d, the CCD case 24 is fit to the dust-proofing filter supporting member 23H airtightly in an annular area, that is, in an area in which the circumferential groove 24d and the annular convex portion 24d are formed.

The dust-proofing filter 21 is circular or polygonal plate-shaped as a whole, and forms a transparent portion as at least an area having a predetermined spread in a radial direction from the center of the dust-proofing filter 21. The transparent portion is opposed and arranged in front of the optical LPF 25 at a predetermined interval.

At the peripheral portion of one surface (back surface according to the twenty-sixth embodiment) of the dust-proofing filter 21, the piezoelectric element 22 annularly formed by the electromechanical transducer, as a predetermined member for vibration for applying the vibrations to the dust-proofing filter 21, is integrally arranged by means of adhesion using an adhesive. The piezoelectric element 22 generates predetermined vibrations in the dust-proofing filter 21 by applying a predetermined driving voltage from the outside.

The dust-proofing filter 21 is fixed and held by the pressing member 20B made of the elastic member such as a plate-shaped spring so as to be airtightly jointed to the dust-proofing filter supporting member 23H.

The circular or polygonal opening 23f is pierced almost near the center of the dust-proofing filter supporting member 23H. The opening 23f has a size enough to transmit the subject beams which are transmitted through the photographing optical system 12a and to irradiate with the beams the photoelectrically converting surface of the image pick-up device 27 arranged at the back.

The wall portion 23e projecting in front is formed at a peripheral portion of the opening 23f. Further, the supporting portion 23c is formed so that it projects towards the front side at the edge of the wall portion 23e.

A plurality of projecting portions 23Ha and a plurality of pressing member fixing portions 23Hg (three projecting portions and three pressing member fixing portions according to the twenty-sixth embodiment) are formed, projecting toward the front side, near an outer peripheral portion in front of the dust-proofing filter supporting member 23H.

The projecting portions 23Ha function as position regulating members for positioning the dust-proofing filter 21 to the dust-proofing filter supporting member 23H to arrange the dust-proofing filter 21.

The pressing member fixing portions 23Hg are portions formed to fix the pressing member 20B for fixing and holding the dust-proofing filter 21 by the screw as shown in FIG. 73. The pressing member 20B is fixed by fastening means such as the fixing screw 20a to the screw hole formed to the pressing member fixing portion 23Hg.

FIG. 73 is a main-part enlarged sectional perspective view showing an enlarged adjacent portion of the pressing member fixing portion 23Hg used for fixing and holding a part of the image pick-up device unit 15Q, that is, the dust-proofing filter 21 and the pressing member 20B to the dust-proofing filter supporting member 23H.

As mentioned above, the pressing member 20B is made of the elastic member such as the plate-shaped spring and is circularly formed. A plurality of (three, according to the twenty-sixth embodiment) convex pieces 20Bb are projected toward the outside at the peripheral portion of the pressing member 20B. Piercing holes are set to the convex pieces 20Bb through which the fixing screw 20a penetrates.

The dust-proofing filter 21 is arranged at a predetermined position of the dust-proofing filter supporting member 23H. Then, the pressing member 20B is fixed by using the screw. In this case, the dust-proofing filter 21 is easily arranged at the predetermined position of the dust-proofing filter supporting member 23H by moving the peripheral portion of the dust-proofing filter 21 in the optical direction along the projecting portion 23Ha.

The supporting portion 23c is abutted on the predetermined position (portion as a node upon vibration) of the dust-proofing filter 21 (actually, the piezoelectric element 22).

In this status, by overlapping and arranging the pressing member 20B to the dust-proofing filter 21, the dust-proofing filter 21 is sandwiched between the pressing member 20B and the dust-proofing filter supporting member 23H. In this case, the pressing member 20B is fixed to the screw holes of the pressing member fixing portions 23Hg by the fixing screws 20a. Then, a plain circular-shaped portion of the pressing member 20B is abutted on a predetermined portion of the peripheral portion of the dust-proofing filter 21, thereby pressing the dust-proofing filter 21 toward the side of the dust-proofing filter supporting member 23H by the elastic force of the pressing member 20B.

In this case, by making the predetermined portion of the piezoelectric element 22 arranged at the peripheral portion at the back of the dust-proofing filter 21 abut on the supporting portion 23c, the positions of the dust-proofing filter 21 and the piezoelectric element 22 are regulated in the optical axis direction. Therefore, the dust-proofing filter 21 is fixed and held to airtightly be jointed to the dust-proofing filter supporting member 23H via the piezoelectric element 22 interposed.

In other words, the dust-proofing filter supporting member 23H is airtightly jointed to the dust-proofing filter 21 via the piezoelectric element 22 interposed by the elastic force caused by the pressing member 20B.

As mentioned above, the holding structure for pressing the peripheral portion of the dust-proofing filter 21 to press and fix the dust-proofing filter 21 (dust-proofing member) to the dust-proofing filter supporting member 23H (sealing structure) comprises the pressing member 20B, the projecting portions 23Hg of the dust-proofing filter supporting member 23H, and the like.

Between the dust-proofing filter supporting member 23H and the CCD case 24, the circumferential groove 24d is airtightly fit to the annular convex portion 23d. Further, the dust-proofing filter supporting member 23H is airtightly jointed to the dust-proofing filter 21 via the piezoelectric element 22 interposed by the pressing force of the pressing member 20B.

The optical LPF 25 arranged to the CCD case 24 becomes airtight between the peripheral portion in front of the optical LPF 25 and the step portion 24a of the CCD case 24.

Further, the image pick-up device 27 is arranged at the back of the optical LPF 25 via the low-pass filter supporting member 26 interposed. Between the optical LPF 25 and the image pick-up device 27, the airtightness is substantially held.

Therefore, with the foregoing structure, in the space formed by opposing the optical LPF 25 and the dust-proofing filter 21, a predetermined air gap portion is formed. A space portion is formed on the peripheral side of the optical LPF 25, that is, by the CCD case 24, the dust-proofing filter supporting member 23H, and the dust-proofing filter 21. The space portion is a sealed space formed, projecting toward the outside of the optical LPF 25.

In this case, the space portion is set to be wider than the air gap portion. A space containing the air gap portion and the space portion becomes a sealing space which is substantially airtightly sealed by the CCD case 24, the dust-proofing filter supporting member 23H, the dust-proofing filter 21, and the optical LPF 25 as mentioned above.

As described above, the image pick-up device unit 15Q in the camera according to the twenty-sixth embodiment comprises the sealing structure for forming the sealing space which is substantially sealed and is formed at the peripheral portion of the optical LPF 25 and the dust-proofing filter 21, including the air gap portion. The sealing structure is arranged at the outside position from the optical LPF 25 to the adjacent portion thereof.

In addition, according to the twenty-sixth embodiment, the sealing structure comprises the dust-proofing filter supporting member 23H for supporting the dust-proofing filter 21 in contact with the peripheral portion or the adjacent portion thereof, the CCD case 24 arranged for supporting the optical LPF 25 in contact with the peripheral portion or the adjacent portion thereof and for coming into contact with the dust-proofing filter supporting member 23H at its predetermined portion, and the like.

According to the twenty-sixth embodiment, with the foregoing structure, the dust-proofing filter 21 is opposed at the predetermined position to the front of the image pick-up device 27 and the sealing space for sealing a space formed at the photoelectrically converting surface of the image pick-up device 27 and at the peripheral portion of the dust-proofing filter 21 is formed. Thus, the adhesion of dust to the photoelectrically converting surface of the image pick-up device 27 is prevented.

Dusts adhered to the exposing surface in front of the dust-proofing filter 21 is removed by applying a periodic voltage to the piezoelectric element 22 arranged integrally with the peripheral portion of the dust-proofing filter 21 and by applying a predetermined vibration to the dust-proofing filter 21.

The soft member 62 used for the image pick-up device unit 15P according to the twenty-fifth embodiment is removed according to the twenty-sixth embodiment.

According to the twenty-sixth embodiment, the dust-proofing filter supporting member 23H as the sealing structure is airtightly jointed, fixed, and held to the dust-proofing filter 21 as the dust-proofing member arranged in front of the image pick-up device 27 by pressing the dust-proofing filter 21 to the dust-proofing filter supporting member 23H by using the elastic force of the pressing member 20B.

In this case, the plate-shaped pressing member 20B is formed with a circular shape. Therefore, the pressing member 20B uniformly presses the predetermined position near the peripheral portion of the dust-proofing filter 21. Thus, the dust-proofing filter 21 is stably and accurately fixed and held.

The pressing member 20B is formed with a simple shape and therefore the structure of the holding structure is simplified. Corresponding thereto, advantageously, the members are easily manufactured and the assembling process of the image pick-up device unit 15Q is simplified.

According to the twenty-sixth embodiment, the pressing member 20B made of the elastic member such as the plate-shaped spring, with the circular shape, is used as the member of the holding structure for airtightly jointing, fixing, and holding the dust-proofing filter 21 to the dust-proofing filter supporting member 23H by pressing the dust-proofing filter 21 thereto. In this case, the dust-proofing filter 21 is pressed within a predetermined range of a plate-shaped surface of the pressing member 20B.

However, the pressing member 20B is not limited to the above-description and may use different pressing member. Then, an example different from that according to the twenty-sixth embodiment is illustrated hereinafter.

The structure according to the twenty-seventh and twenty-eighth, basically, the structures are the same as that according to the twenty-sixth embodiment. Therefore, the same members are designated by the same reference numerals and are not described. Only different portions are described in detail.

First, a description is given of an image pick-up device unit according to the twenty-seventh embodiment of the present invention.

Figure 74:
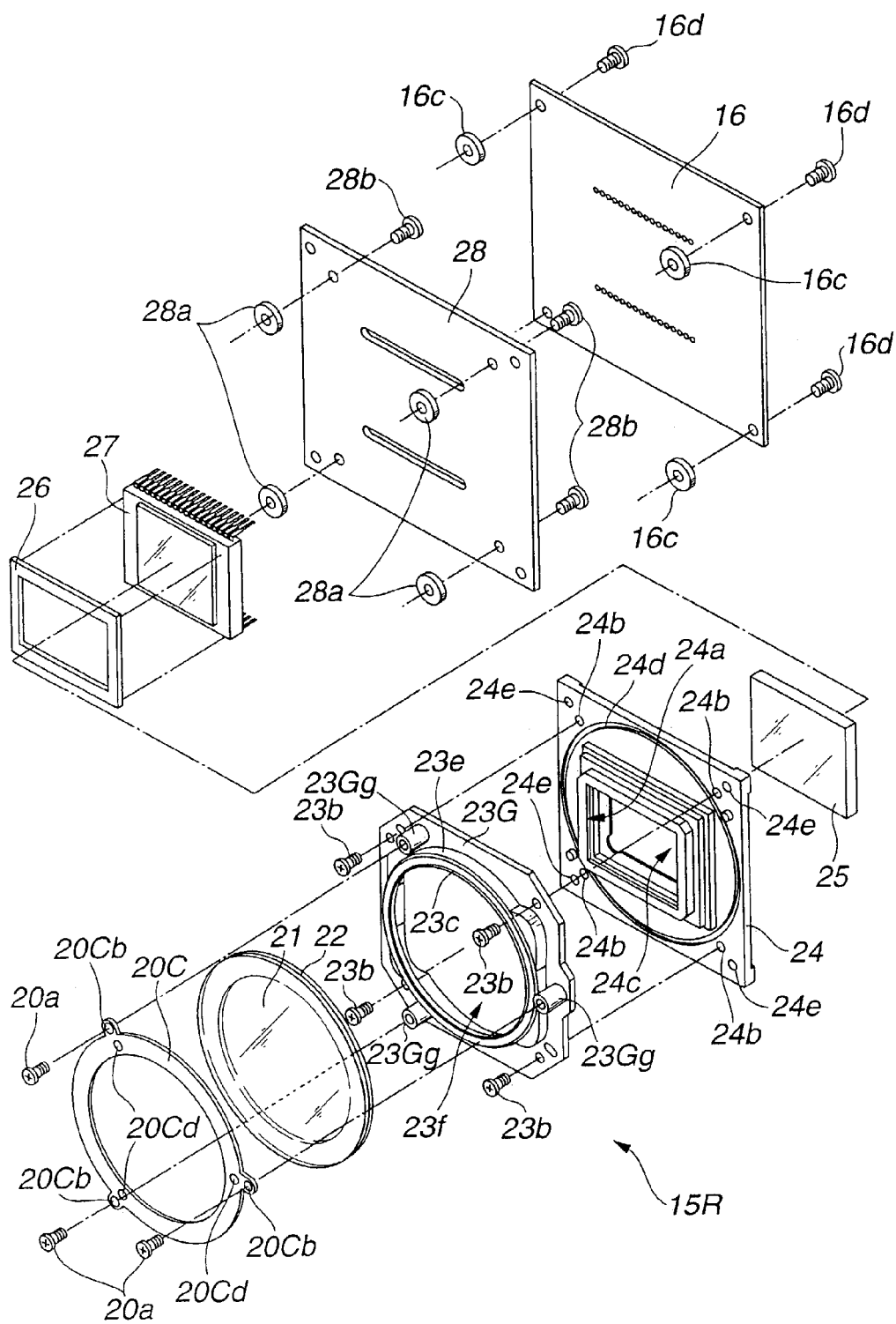
FIG. 74 is a main-part exploded perspective view showing a disassembled image pick-up device unit in a camera according to a twenty-seventh embodiment of the present invention.
Figure 75:
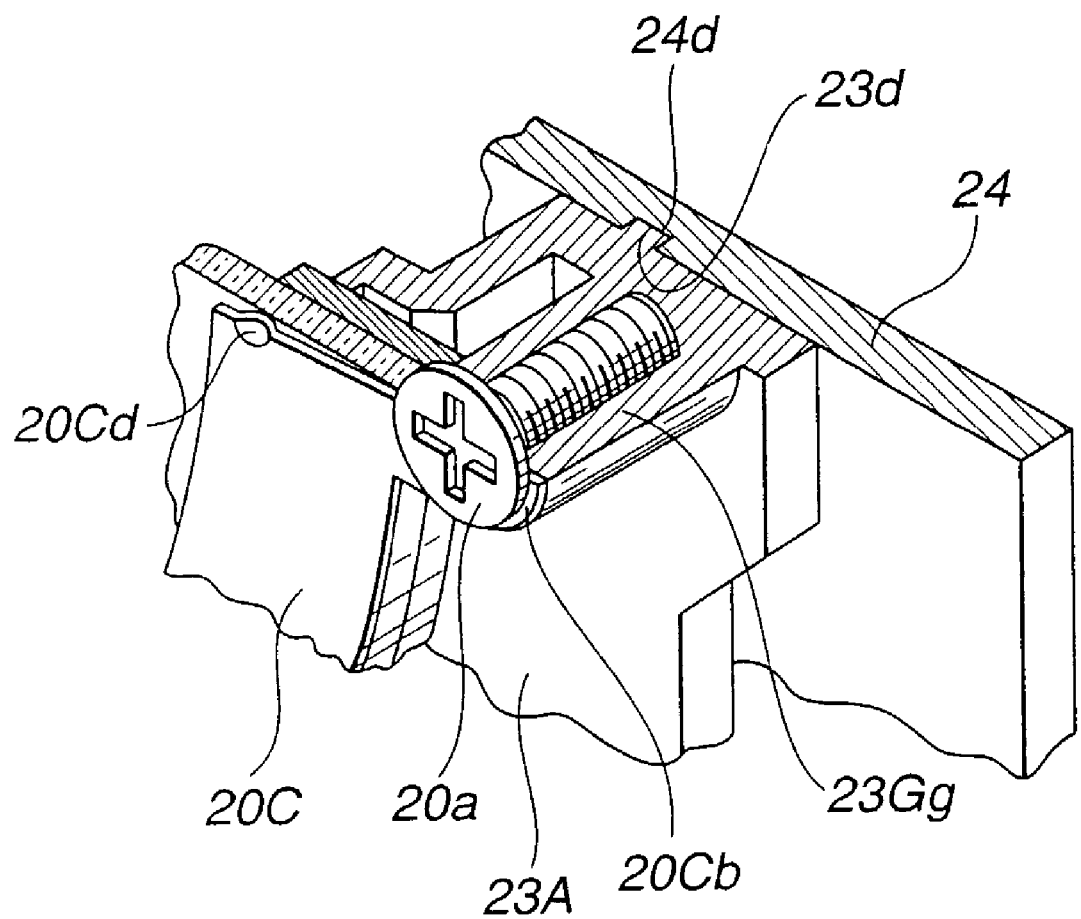
FIG. 75 is a main-part enlarged sectional perspective view showing an enlarged cross-section of a part (an attaching portion of a dust-proofing member and a pressing member) of the image pick-up device unit shown in FIG. 74.

FIGS. 74 and 75 are diagrams showing the twenty-seventh embodiment of the present invention. FIG. 74 is a main-part exploded perspective view showing the disassembled image pick-up device unit. FIG. 75 is a main-part enlarged sectional perspective view showing an enlarged part of the image pick-up device unit, namely showing the cross section and an enlarged attaching portion of the dust-proofing member and the pressing member.

According to the twenty-seventh embodiment, a pressing member 20C has a plurality of (three, according to the present embodiment) convex portions 20Cd on the surface onto which the dust-proofing filter 21 should be abutted. When the pressing member 20C is attached to an image pick-up device unit 15R, the convex portions 20Cd are arranged projecting toward the dust-proofing filter 21 by press working, etc.

Similarly to the case according to the twenty-sixth embodiment, the pressing member 20C is fixed to screw holes of the pressing member fixing portion 23Gg of the dust-proofing filter supporting member 23G via the dust-proofing filter 21 interposed by the fixing screws 20a. Thus, the edge portions of the convex portions 20Cd of the pressing member 20C are abutted onto the predetermined positions of the peripheral portion of the dust-proofing filter 21, thereby pressing the dust-proofing filter 21. Therefore, the pressing member 20C presses the peripheral portion of the dust-proofing filter 21 with point contact at the plurality of convex portions 20Cd.

According to the twenty-sixth embodiment, the projecting portion 23Ha is arranged to the dust-proofing filter supporting member 23H and, thus, the dust-proofing filter supporting member 23H functions as a position regulating member for positioning the dust-proofing filter 21 upon arranging the dust-proofing filter 21. However, this is omitted in the dust-proofing filter supporting member 23G according to the twenty-seventh embodiment.

That is, according to the twenty-seventh embodiment, the pressing member fixing portion 23Gg formed to fix the pressing member 20C for fixing and holding the dust-proofing filter 21 by the screw functions as the position regulating member of the dust-proofing filter 21.

Other structure is the same as that according to the twenty-sixth embodiment.

According to the twenty-seventh embodiment, the structure of the dust-proofing filter supporting member 23G is the same as that of the dust-proofing filter supporting member 23G according to the twenty-fifth embodiment and therefore is designated by the same reference numeral (refer to FIG. 70).

As mentioned above, according to the twenty-seventh embodiment, the convex portion 20Cd is arranged to the pressing member 20C, thereby pressing the dust-proofing filter 21 with point contact. According to the twenty-seventh embodiment, the same advantages as those according to the sixth embodiment are obtained. In addition, as compared with the structure in which the peripheral portion of the dust-proofing filter 21 is pressed by the plain surface according to the twenty-sixth embodiment, the peripheral portion of the dust-proofing filter 21 is pressed with the point contact, thereby preventing the obstruction of the pressing member 20C against the vibrations of the dust-proofing filter 21 and obtaining the stable vibrations of the dust-proofing filter 21.

Next, a description is given of an image pick-up device unit according to the twenty-eighth embodiment of the present invention.

Figure 76:
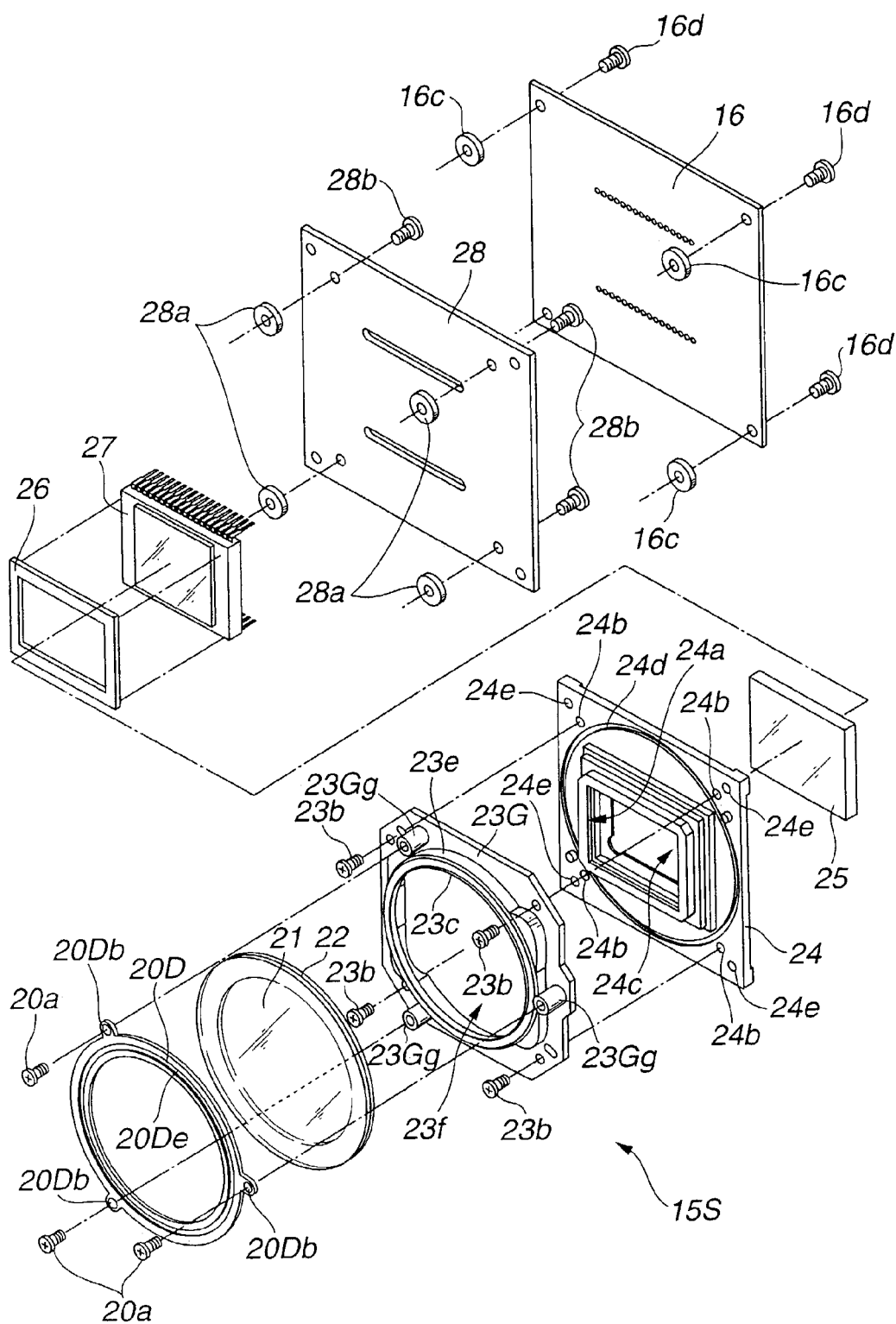
FIG. 76 is a main-part exploded perspective view showing a disassembled image pick-up device unit in a camera according to a twenty-eighth embodiment of the present invention.
Figure 77:
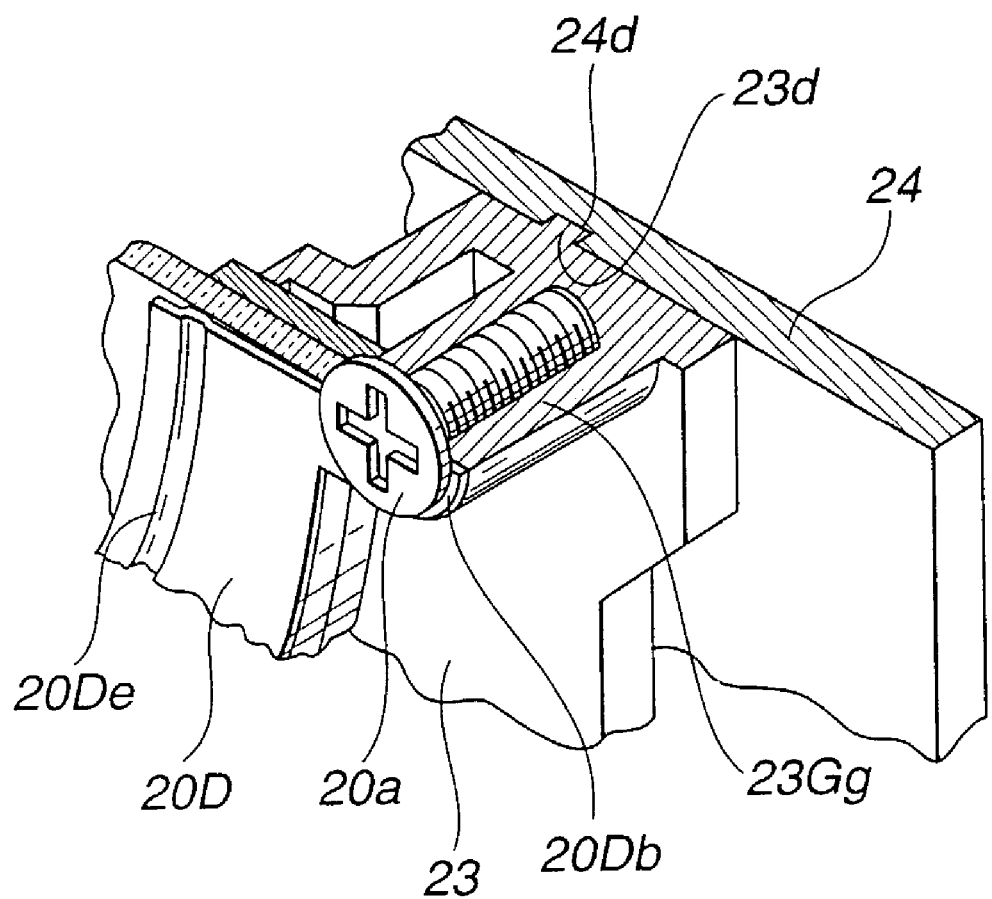
FIG. 77 is a main-part enlarged sectional perspective view showing an enlarged cross-section of a part (an attaching portion of a dust-proofing member and a pressing member) of the image pick-up device unit shown in FIG. 76.

FIGS. 76 and 77 are diagrams showing the twenty-eighth embodiment of the present invention. FIG. 76 is a main-part exploded perspective view showing the disassembled image pick-up device unit. FIG. 77 is a main-part enlarged sectional perspective view showing an enlarged part of the image pick-up device unit, namely showing the cross section and an enlarged attaching portion of the dust-proofing member and the pressing member.

According to the twenty-eighth embodiment, a pressing member 20D has a convex groove 20De which should be abutted onto the dust-proofing filter 21 in the circumferential direction thereof. When the pressing member 20D is attached to an image pick-up device unit 15S, the convex groove 20De is arranged projecting toward the dust-proofing filter 21 by press working, etc.

Similarly to the case according to the twenty-seventh embodiment, the pressing member 20D is fixed to the screw hole of the pressing member fixing portion 23Gg of the dust-proofing filter supporting member 23G via the dust-proofing filter 21 interposed by the fixing screw 20a. Thus, the edge portion of the convex groove 20De of the pressing member 20D is abutted to the predetermined portion of the peripheral portion of the dust-proofing filter 21, thereby pressing the dust-proofing filter 21. Therefore, the pressing member 20D presses a predetermined portion at the peripheral portion of the dust-proofing filter 21 with line contact by the convex groove 20De.

According to the twenty-eighth embodiment, the dust-proofing filter supporting member 23G is used similarly to the case according to the twenty-seventh embodiment. That is, the dust-proofing filter supporting member 23G obtained by omitting the projecting portion 23Ha according to the twenty-sixth embodiment from the dust-proofing filter supporting member 23Ha is used. The pressing member fixing portion 23Gg controls the position of the dust-proofing filter 21.

Other structure is the same as that according to the twenty-sixth or the twenty-seventh embodiment.

As mentioned above, according to the twenty-eighth embodiment, the convex groove 20De is arranged to the pressing member 20D, thereby pressing the dust-proofing filter with line contact.

Therefore, according to the twenty-eighth embodiment, the same advantages as those according to the twenty-sixth embodiment are obtained. In addition, as compared with the structure in which the peripheral portion of the dust-proofing filter 21 is pressed by the plain surface according to the twenty-sixth embodiment, the peripheral portion of the dust-proofing filter 21 is pressed with the line contact, thereby preventing the obstruction of the pressing member 20D against the vibration of the dust-proofing filter 21 and obtaining the stable vibration of the dust-proofing filter 21.

According to the twenty-sixth to twenty-eighth embodiments, so-called screw-fastening type fixing means using the fixing screw 20a is used as the means for fixing the pressing member (20B, 20C, or 20D) to the dust-proofing filter supporting member (23G or 23H).

However, the fixing means of the pressing member is not limited to the foregoing. The pressing member may be fixed and held to the dust-proofing filter supporting member via the dust-proofing filter 21 interposed.

Then, a description is given of an example using fixing means of the pressing member different from the screw-fastening type one according to the twenty-sixth to twenty-eighth embodiments.

The structure according to the twenty-ninth to thirty-first embodiments is basically the same as that according to the twenty-sixth embodiment. Therefore, the same components are not described and are designated by the same reference numerals. Only different portions are described in detail.

First, according to the twenty-ninth embodiment, an image pick-up device unit will be described.

Figure 78:
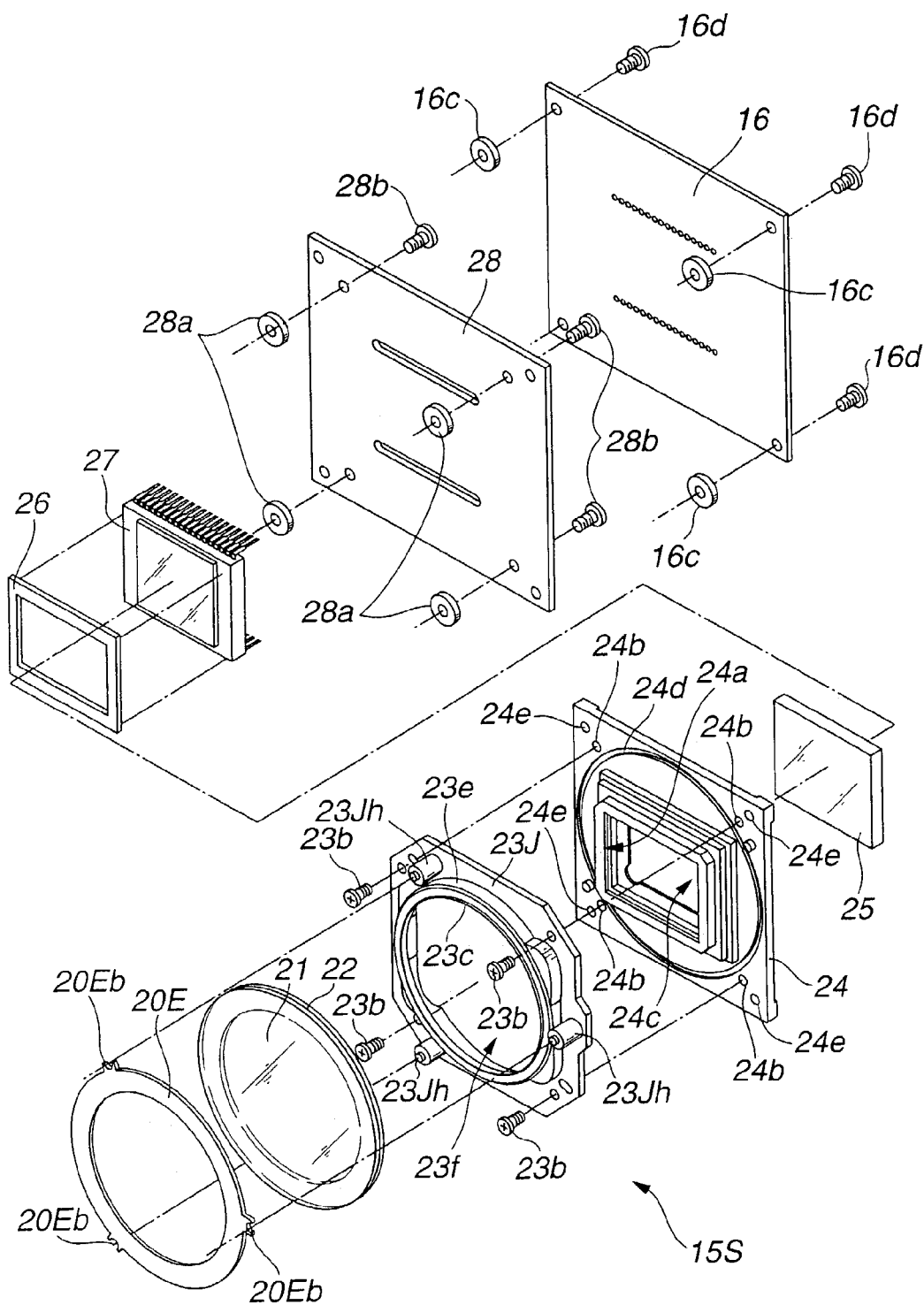
FIG. 78 is a main-part exploded perspective view showing a disassembled image pick-up device unit in a camera according to a twenty-ninth embodiment of the present invention.
Figure 79:
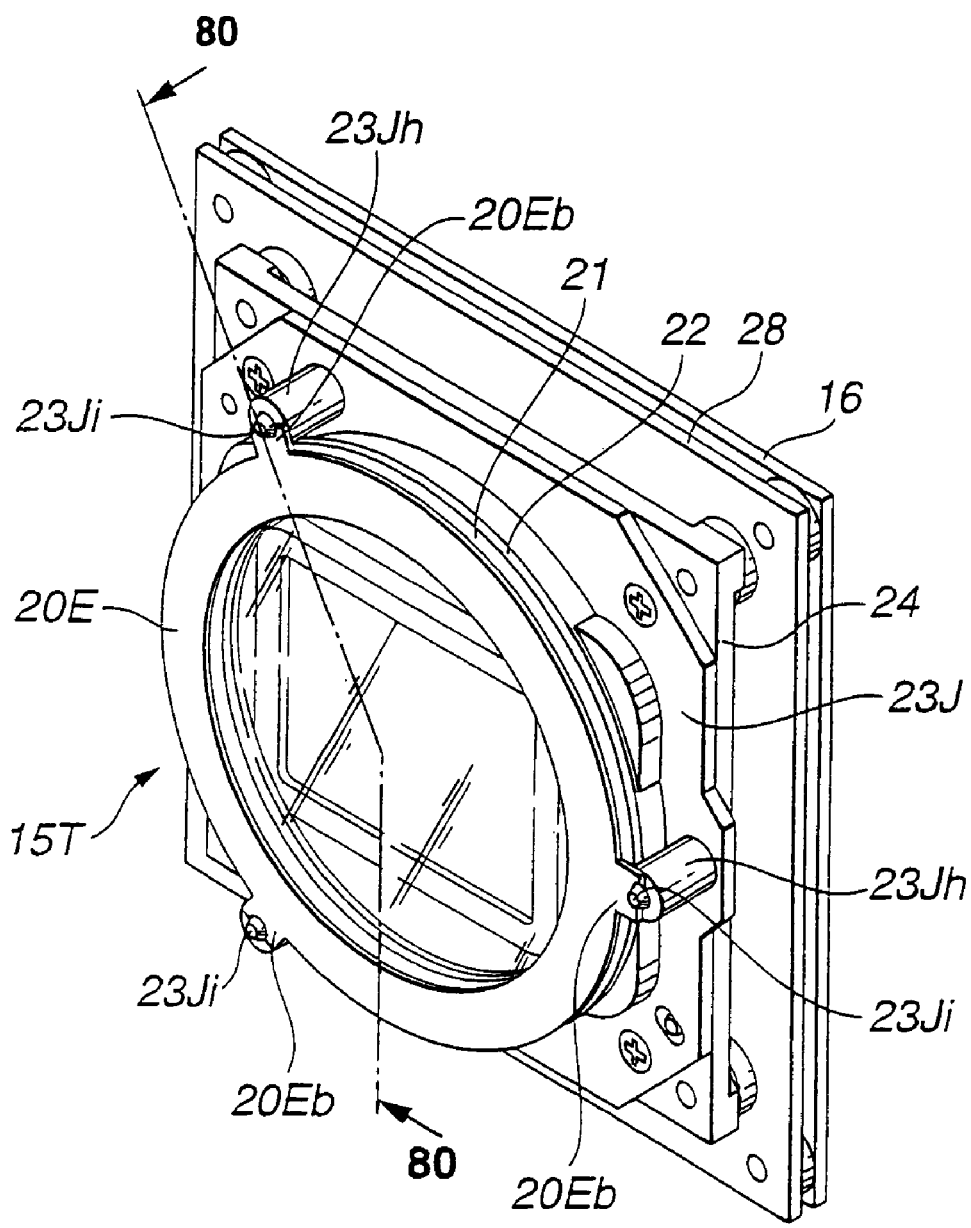
FIG. 79 is a perspective view showing an assembling status of the image pick-up device unit shown in FIG. 78.
Figure 80:
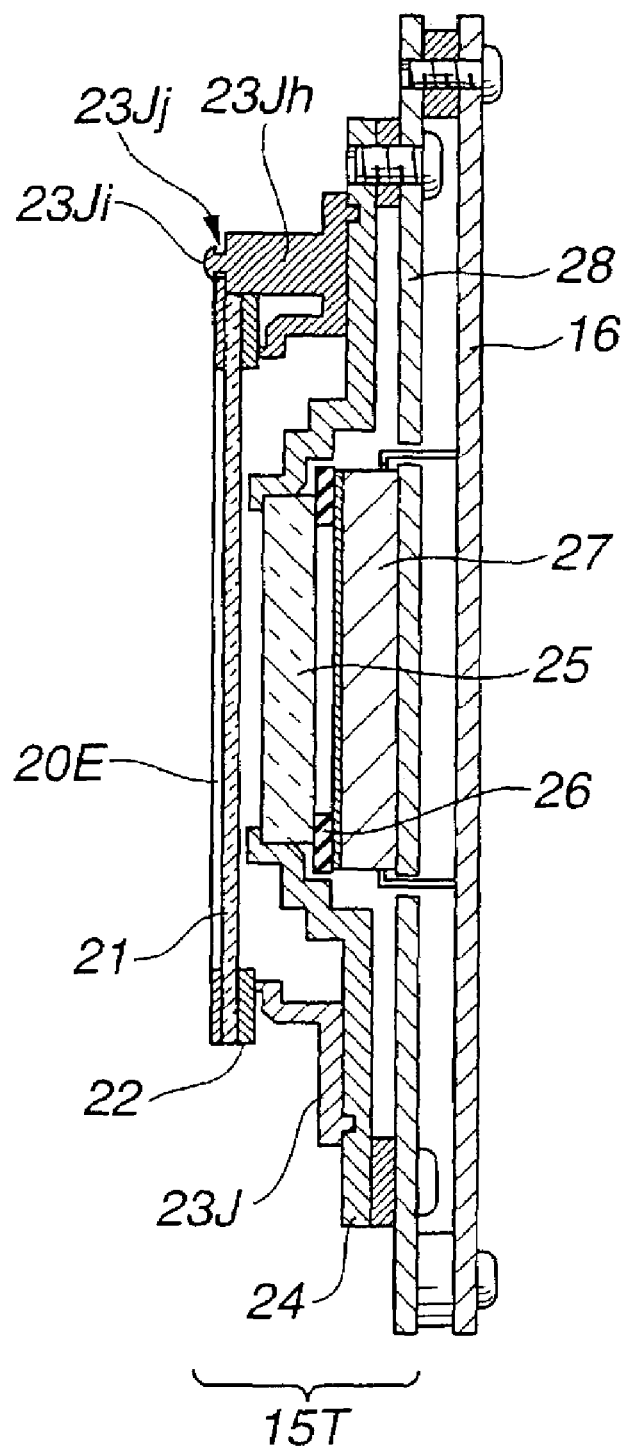
FIG. 80 is a sectional view along a line 80—80 shown in FIG. 79.
Figure 81:
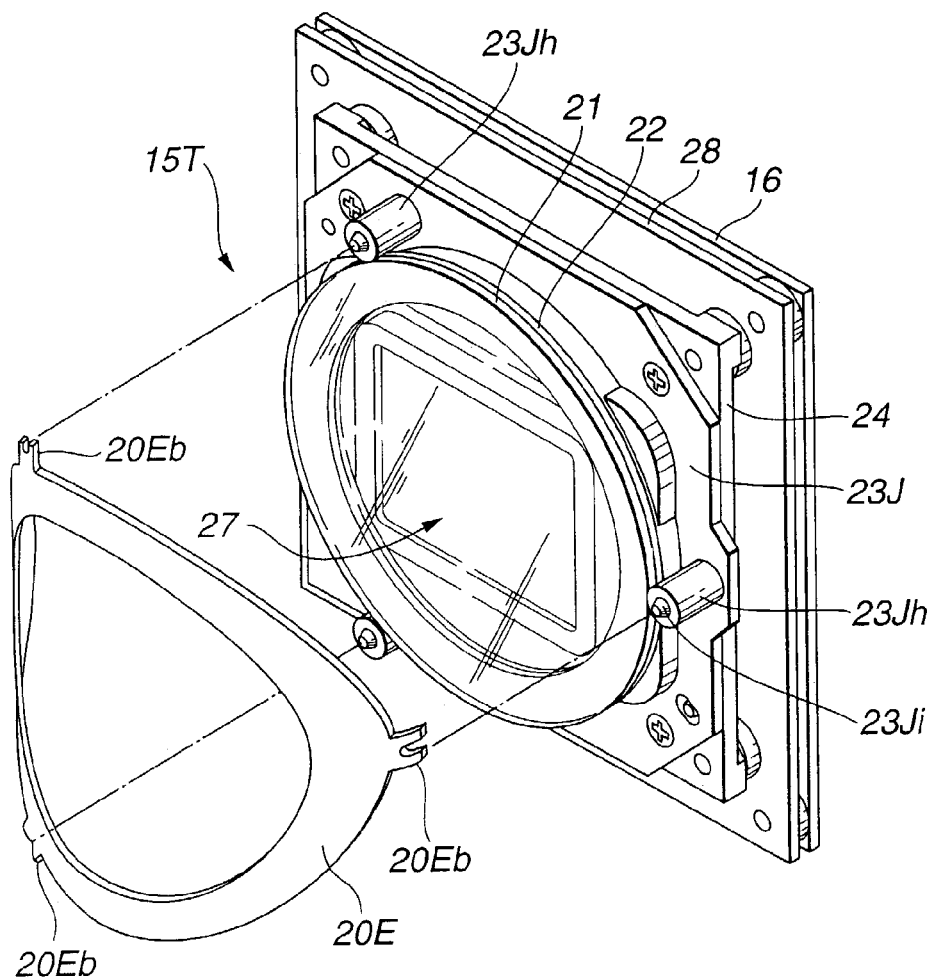
FIG. 81 is a perspective view showing a status of assembling a pressing member to the image pick-up device unit shown in FIG. 78.
Figure 82:
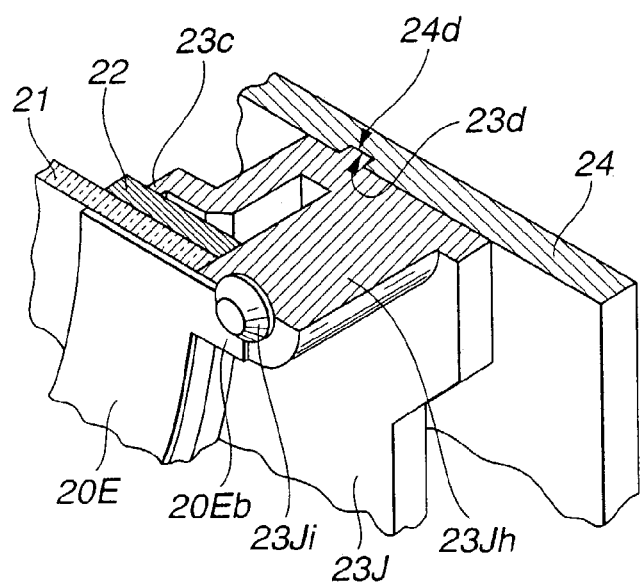
FIG. 82 is a main-part enlarged sectional perspective view showing an enlarged cross-section of a part (an attaching portion of a dust-proofing member and a pressing member) of the image pick-up device unit shown in FIG. 78.

FIGS. 78 to 82 are diagrams according to the twenty-ninth embodiment of the present invention. FIG. 78 is a main-part exploded perspective view showing the disassembled image pick-up device unit. FIG. 79 is a perspective view showing the assembled image pick-up device unit. FIG. 80 is a sectional view along a line 80—80 shown in FIG. 79. FIG. 81 is a perspective view showing a state of assembling the pressing member to the image pick-up device unit. FIG. 82 is a main-part enlarged sectional perspective view showing the cross section of an enlarged part of the image pick-up device, namely showing the dust-proofing member and an attaching portion of the pressing member.

According to the twenty-ninth embodiment, means for fixing a pressing member 20E in an image pick-up device unit 15T to a dust-proofing filter supporting member 23J is so-called fitting type fixing means using no screw. Thus, the pressing member 20E made of an elastic member such as a plate-shaped spring, with a circular shape, has a plurality of (three, according to the twenty-ninth embodiment) convex pieces 20Eb toward the outside at the peripheral portion thereof. Substantially semi-circular-shaped notches are formed at the edges of the convex pieces 20Eb.

On the other hand, according to the twenty-ninth embodiment, in place of the pressing member fixing portion 23Hg according to the twenty-sixth embodiment, a pressing member fixing portion 23Jh functioning as the pressing member fixing portion 23Hg is formed to the dust-proofing filter supporting member 23J. The pressing member fixing portion 23Jh has the same function as that of the projecting portion 23Ha according to the twenty-sixth embodiment, that is, has one function for regulating the position of the dust-proofing filter 21 and another function for fixing and holding the pressing member 20E. Therefore, according to the twenty-ninth embodiment, similarly to the cases according to the twenty-seventh and twenty-eighth embodiments, the projecting portion 23Ha according to the twenty-sixth embodiment is omitted.

A fitting convex portion 23Ji having a circumferential groove 23Jj (refer to FIG. 80) at the base portion is projected at the edge portion of the pressing member fixing portion 23Jh so as to fit a convex piece 20Eb of the pressing member 20E.

Thus, the semi-circular notch portions formed to the plurality of convex pieces 20Eb of the pressing member 20E are fit to the circumferential grooves 23Jj of the fitting convex portions 23Ji provided for a plurality of pressing member fixing portions 23Jh, thereby attaching the pressing member 20E to the dust-proofing filter supporting member 23J via the dust-proofing filter 21 interposed.

In a status in which the pressing member 20E is attached to the dust-proofing filter supporting member 23J, a circular-shaped plate portion of the pressing member 20E is abutted on a predetermined position of the peripheral portion of the dust-proofing filter 21 and presses the dust-proofing filter 21 toward the side of the dust-proofing filter supporting member 23J by the elastic force thereof.

The pressing member 20E is fit to the circumferential groove 23Jj of the fitting convex portion 23Ji arranged to the pressing member fixing portion 23Hj of the dust-proofing filter supporting member 23J by the following sequence.

That is, referring to FIG. 81, the pressing member 20E is bent with a convex shape in a predetermined direction against the elastic force thereof, namely, toward the outside from the front surface of the image pick-up device unit 15T. In this state, the plurality of convex pieces 20Eb of the pressing member 20E are arranged at positions for being fit to the circumferential grooves 23Jj of the fitting convex portions 23Ji. By releasing the force amount against the elastic force applied to the pressing member 20E in this state, the pressing member 20E is restored to a predetermined form by the elastic force thereof and the notch portions of the convex pieces 20Eb are fit to the circumferential grooves 23Jj of the fitting convex portions 23Ji.

Other structure is the same as that according to the twenty-sixth embodiment.

With the above-described structure, the same advantages as those according to the twenty-sixth embodiment are obtained. In addition, according to twenty-ninth embodiment, the pressing member 20E is the fitting-type fixing means and therefore the assembling process is simplified upon fixing the pressing member 20E at the predetermined position of the dust-proofing filter supporting member 23J. As compared with the screw-fastening type fixing means, working for attaching the pressing member 20E is simplified. Thus, the manufacturing process is made efficient and the productivity is improved. Further, this contributes to the reduction in manufacturing costs.

According to the twenty-ninth embodiment, the fitting type pressing member can easily be pressed at the peripheral portion of the dust-proofing filter 21 with point contact or with line contact similarly to the twenty-seventh and the twenty-eighth embodiments. An example of this structure will be described according to the thirtieth embodiment (refer to FIG. 83) and the thirty-first embodiment (refer to FIG. 84) of the present invention.

Figure 83:
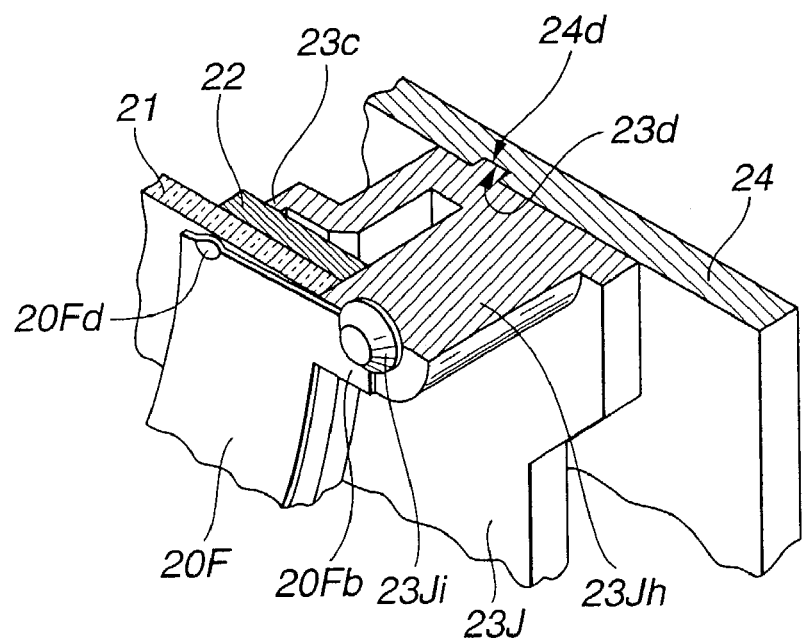
FIG. 83 is a main-part enlarged sectional perspective view showing an enlarged cross-section of a part (an attaching portion of a dust-proofing member and a pressing member) of an image pick-up device unit in a camera according to a thirtieth embodiment of the present invention.

FIG. 83 is a main-part enlarged sectional perspective view showing a cross section of an enlarged part of an image pick-up device unit according to thirtieth embodiment of the present invention, namely showing an attaching portion of the dust-proofing member and the pressing member.

According to the thirtieth embodiment, similarly to the case according to the twenty-seventh embodiment (refer to FIGS. 74 and 75), a pressing member 20F in the image pick-up device unit has a plurality of (three, in the present embodiment) convex portions 20Fd on the surface to be abutted on the dust-proofing filter 21. The convex portions 20Fd are formed similarly to the convex portions 20Cd of the pressing member 20C according to the twenty-seventh embodiment.

Similarly to the case according to the twenty-ninth embodiment, a convex piece 20Fb of the pressing member 20F is fit to the circumferential groove 23Jj of the fitting convex portion 23Ji of the pressing member fixing portion 23Jh of the dust-proofing filter supporting member 23J. Thus, the pressing member 20F is jointed to the dust-proofing filter supporting member 23J via the dust-proofing filter 21 interposed. As a result of the jointing, edge portions of a plurality of convex portions 20Fd of the pressing member 20F come into contact predetermined portions at the peripheral portion of the dust-proofing filter 21, thus to press the contact portions. Therefore, the pressing member 20F presses the peripheral portions of the dust-proofing filter 21 at a plurality of convex portions 20Fd with point contact.

According to the thirtieth embodiment, the projecting portion 23Ha of the dust-proofing filter supporting member 23H according to the twenty-sixth embodiment is omitted. A pressing member fixing portion 23Hh formed for fitting and fixing the pressing member 20F, which fixes and holds the dust-proofing filter 21, functions as the position regulating member of the dust-proofing filter 21.

Other structure is the same as that according to the twenty-sixth embodiment.

According to the thirtieth embodiment, with the above-described structure, the pressing member 20F is a fitting type member and the convex portions 20Fd are formed to the pressing member 20F, thereby pressing the dust-proofing filter 21 with point contact.

Consequently, according to the thirtieth embodiment, the same advantages as those according to the twenty-ninth embodiment are obtained. In addition, according to the thirtieth embodiment, the peripheral portions of the dust-proofing filter 21 are pressed with the point contact. As compared with the structure in which the peripheral portion of the dust-proofing filter 21 is pressed with the plain surface according to the twenty-ninth embodiment, the obstruction of the pressing member 20F against the vibrations of the dust-proofing filter 21 is suppressed and the vibrations of the dust-proofing filter 21 are stably obtained.

Figure 84:
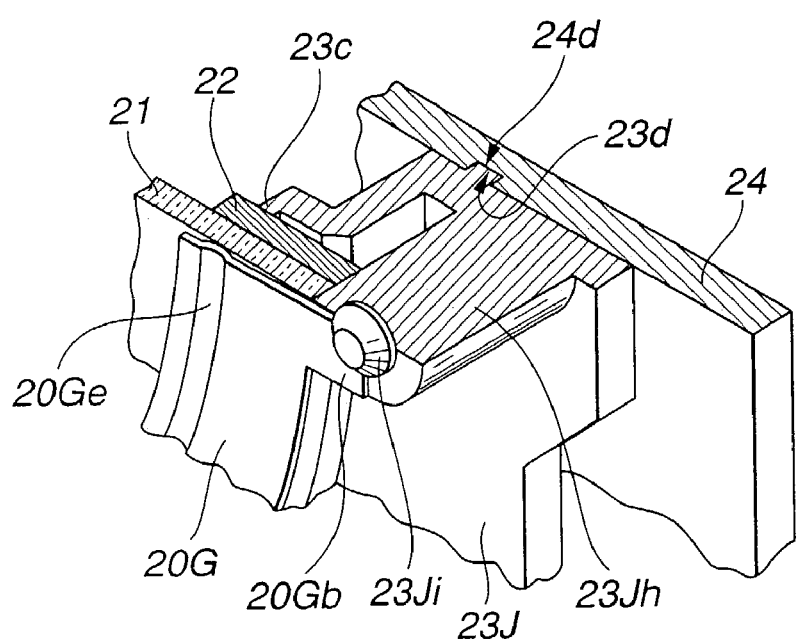
FIG. 84 is a main-part enlarged sectional perspective view showing an enlarged cross-section of a part (an attaching portion of a dust-proofing member and a pressing member) of an image pick-up device unit in a camera according to a thirty-first embodiment of the present invention.

FIG. 84 is a main-part enlarged sectional perspective view showing a cross section of an enlarged part of an image pick-up device unit according to thirty-first embodiment of the present invention, namely showing an attaching portion of the dust-proofing member and the pressing member.

According to the thirty-first embodiment, similarly to the case according to the twenty-eighth embodiment (refer to FIGS. 76 and 77), a pressing member 20G in the image pick-up device unit has a circular-shaped convex groove 20Ge along the circumferential direction on the surface which should be abutted on the dust-proofing filter 21. The convex groove 20Ge is formed substantially similarly to the convex groove 20De of the pressing member 20D according to the twenty-eighth embodiment.

Similarly to the twenty-eighth embodiment, the convex piece 20Gb of the pressing member 20G is fit to the circumferential groove 23Jj of the fitting convex portion 23Ji of the pressing member fixing portion 23Jh in the dust-proofing filter supporting member 23J. Thus, the pressing member 20G is jointed to the dust-proofing filter supporting member 23J via the dust-proofing filter 21 interposed. As a result of the jointing, edge portions of the convex groove 20Ge of the pressing member 20G are abutted onto predetermined portions at the peripheral portion of the dust-proofing filter 21, thus to press the contact portions. Therefore, the pressing member 20G presses the peripheral portion of the dust-proofing filter 21 at the convex groove 20Ge with line contact.

According to the thirty-first embodiment, the projecting portion 23Ha of the dust-proofing filter supporting member 23H according to the twenty-sixth embodiment is omitted. The pressing member fixing portion 23Jh formed for fitting and fixing the pressing member 20G for fixing and holding the dust-proofing filter 21 functions as the position regulating member of the dust-proofing filter 21.

Other structure is the same as that according to the twenty-sixth embodiment.

According to the thirty-first embodiment, with the above-described structure, the convex groove 20Ge is formed to the pressing member 20G, thereby pressing the dust-proofing filter 21 with line contact.

Consequently, according to the thirty-first embodiment, the same advantages as those according to the twenty-ninth embodiment are obtained. In addition, according to the thirty-first embodiment, the peripheral portion of the dust-proofing filter 21 is pressed with line contact. As compared with the structure in which the peripheral portion of the dust-proofing filter 21 is pressed with the plain surface according to the twenty-ninth embodiment, the obstruction of the pressing member 20G against the vibrations of the dust-proofing filter 21 is suppressed and the vibrations of the dust-proofing filter 21 are stably obtained.

The twenty-sixth to thirty-first embodiments use the example of applying the elastic member such as the plate-shaped spring with a circular shape, as the pressing member for pressing the dust-proofing filter 21 in the predetermined direction and for airtightly jointing, fixing, and holding the dust-proofing filter 21 to the dust-proofing filter supporting member 23. However, the shape of the pressing member is not limited to be circular and may be formed with another shape. Then, a description is given of another example of the shape of the pressing member in an image pick-up device unit.

First, an image pick-up device unit will be described hereinbelow according to the thirty-second embodiment of the present invention.

According to the thirty-second embodiment, basically, the structure is the same as that according to the first embodiment. According to the thirty-second embodiment, only shapes of the dust-proofing filter supporting member forming a part of the sealing structure and the pressing member for jointing, for fixing and holding, the dust-proofing filter (dust-proofing member) to the dust-proofing filter supporting member are different from those according to the first embodiment. Therefore, the same structure as that according to the first embodiment is described by using the same reference numeral. The structure of the entire camera is referred to FIGS. 1 and 2 used for the description of the first embodiment.

According to the thirty-second embodiment, with respect to the image pick-up device unit in the camera, mainly, the structures of the dust-proofing filter supporting member 23 and the pressing member 20 for fixing and holding the dust-proofing filter supporting member 23 are described in detail with reference to FIGS. 3 and 5 used for the description of the first embodiment.

Similarly to the image pick-up device units according to the above embodiments, in the image pick-up device unit 15 according to the thirty-second embodiment, the dust-proofing filter 21 is fixed and held to the dust-proofing filter supporting member 23 by a plurality of pressing members 20 made of the elastic member such as the plate-shaped spring to the dust-proofing filter supporting member 23. Thus, the dust-proofing filter 21 is airtightly jointed to the dust-proofing filter supporting member 23.

A plurality of (three, according to the thirty-second embodiment) projecting portions 23*a* as the pressing member fixing portions are projected toward the front side of the image pick-up device unit 15 at the predetermined position near the outer peripheral portion in front of the dust-proofing filer supporting member 23. The projecting portions 23*a* are formed for fixing the pressing member 20 which fixes and holds the dust-proofing filter 21. The pressing member 20 is fixed to edge portions of the projecting portions 23*a* by the fixing screw 20*a* as predetermined fastening means.

The pressing member 20 is made of an elastic member such as a plate-shaped spring, and is fixed to the projecting portion 23*a* at the base end portion thereof. A free end portion of the pressing member 20 is abutted onto an outer peripheral portion of the dust-proofing filter 21, thereby pressing the dust-proofing filter 21 to the side of the dust-proofing filter supporting member 23, that is, toward the optical axis direction.

A convex portion 20*d* similar to the convex portion 20C*d* of the pressing member 20C according to the twenty-seventh embodiment is formed near the edge portion of the pressing member 20 (refer to FIGS. 4 and 5).

That is, according to the thirty-second embodiment, convex portions 20*d* are formed to the surface on which a plurality of pressing members 20 should be abutted on the dust-proofing filter 21. Upon attaching the pressing members 20 to the image pick-up device unit 15, the convex portion 20*d* is formed by, e.g., press working, projecting toward the dust-proofing filter 21. The formation of the convex portion 20*d* to the pressing member 20 presses the dust-proofing filter 21 with point contact according to the thirty-second embodiment.

With the above-mentioned structure, in the image pick-up device unit 15, dust and the like adhered to the exposing surface in front of the dust-proofing filter 21 are removed by applying a periodic voltage to the piezoelectric element 22 arranged integrally with the peripheral portion of the dust-proofing filter 21 and by thus applying predetermined vibrations to the dust-proofing filter 21.

The same operations as those according to the first embodiment are obtained upon removing dust and the like adhered to the dust-proofing filter 21 by applying the periodic voltage to the piezoelectric element 22 and by thus applying the predetermined vibrations to the dust-proofing filter 21 (refer to FIGS. 6 to 11)

As mentioned above, according to the thirty-second embodiment, the same advantages as those according to the first embodiment are obtained.

Further, according to the thirty-second embodiment, the holding structure for pressing and fixing the dust-proofing filter 21 (dust-proofing member) to the dust-proofing filter supporting member 23 (sealing structure) comprises a plurality of pressing members 20, thus to press a plurality of portions of the peripheral portion of the dust-proofing filter 21.

In other words, the number of pressing portions of the dust-proofing filter 21 using the pressing member 20 are limited to a plural number. Upon vibrating the dust-proofing filter 21 by the operation of the piezoelectric element 22, as compared with the case of applying the pressing member comprising one member with a circular shape according to the twenty-sixth to thirty-first embodiments, the dust-proofing filter 21 is pressed toward the dust-proofing filter supporting member 23 in an accurate and stable state without the obstruction against the vibrations of the dust-proofing filter 21.

According to the thirty-second embodiment, a plurality of pressing members 20 are made of the elastic member such as the plate-shaped spring, and the convex portion 20*d* is formed to the surface thereof which is abutted onto the dust-proofing filter 21.

On the other hand, the convex portion 20*d* may be not formed to the plurality of pressing members 20. The plurality of pressing members 20 may use plain-shaped pressing members (similar to that according to the twenty-sixth embodiment). In place of the convex portion 20*d*, the plurality of pressing members 20 may use the pressing member having convex grooves (similar to that according to the twenty-eighth embodiment).

According to the thirty-second embodiment, the screw-fastening type fixing means using the fixing screw 20*a* is used as the means for fixing the plurality of pressing members 20 to the dust-proofing filter supporting member. However, another fixing means is considered. Hereinbelow, a description is given of a pressing member different from that according to the thirty-second embodiment.

According to the thirty-third to thirty-ninth embodiments, basically, the structure is the same as that according to the thirty-second embodiment. Therefore, the same components are designated by the same reference numerals and are not described. Only different portions are described in detail.

Hereinbelow, a description is given of an image pick-up device unit according to the thirty-third embodiment.

Figure 85:
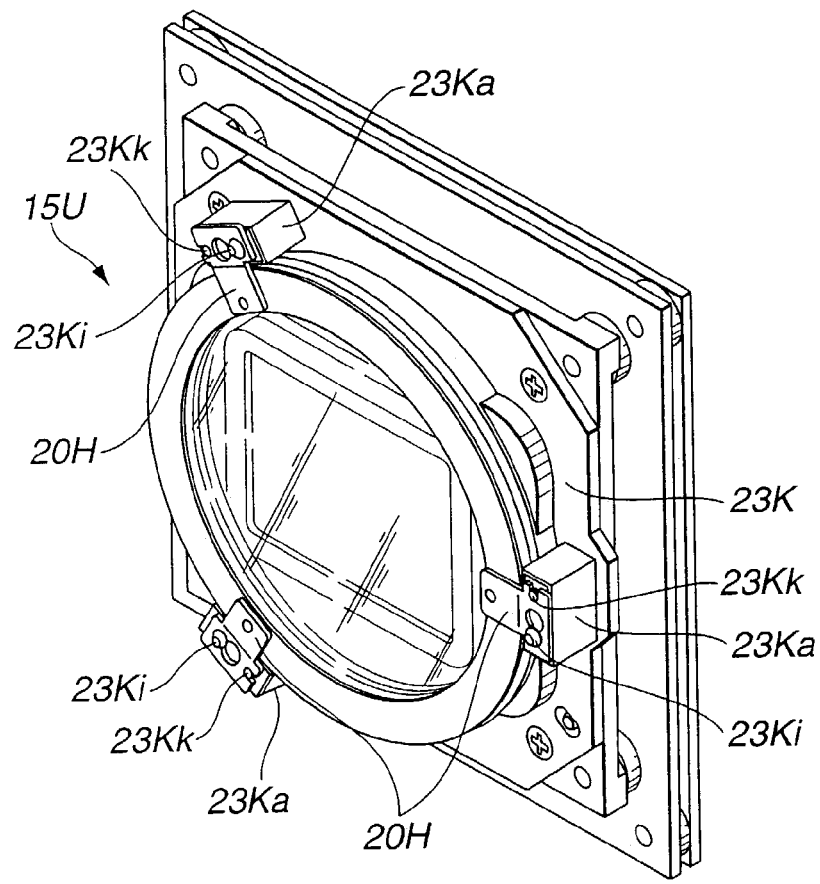
FIG. 85 is a perspective view schematically showing an image pick-up device unit in a camera according to a thirty-third embodiment of the present invention.
Figure 86:
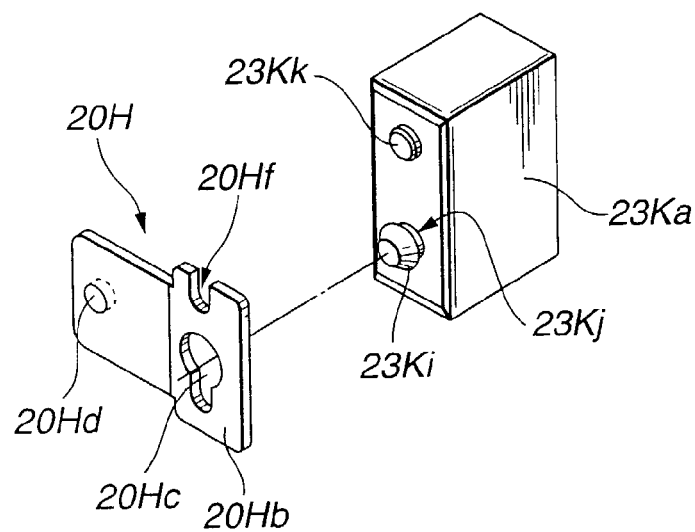
FIG. 86 is a main-part enlarged exploded perspective view showing an enlarged status of a pressing member and a pressing member fixing unit in the image pick-up device unit shown in FIG. 85.
Figure 87:
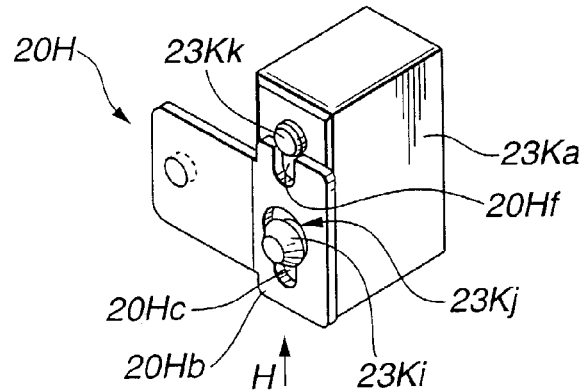
FIG. 87 is an operation diagram showing one procedure for attaching and fixing the pressing member to the pressing member fixing unit shown in FIG. 85.
Figure 88:
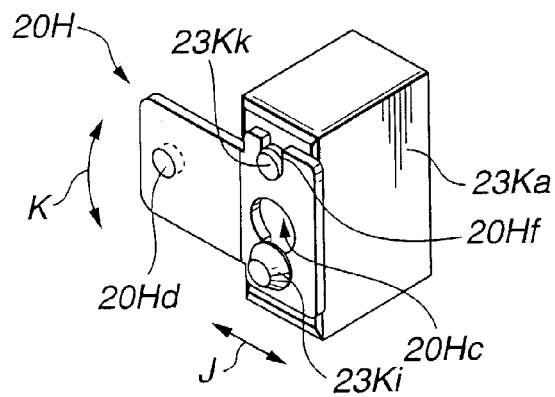
FIG. 88 is an operation diagram showing another procedure for attaching and fixing the pressing member to the pressing member fixing unit shown in FIG. 85.

FIGS. 85 to 88 show the thirty-third embodiment of the present invention. FIG. 85 is a perspective view schematically showing the image pick-up device unit according to the thirty-third embodiment. FIG. 86 is a main-part enlarged exploded perspective view showing enlarged parts of the pressing member and the pressing member fixing portion. FIGS. 87 and 88 are operational diagrams showing the sequence of attaching and fixing the pressing member to the pressing member fixing portion.

Referring to FIGS. 85 and 86, according to the thirty-third embodiment, a pressing member 20H has a convex portion 20Hd on the surface on which it should be abutted onto the dust-proofing filter 21. Upon attaching the pressing member 20H to an image pick-up device unit 15U, the convex portion 20Hd is formed by, e.g., press working, projecting toward the dust-proofing filter 21. A pear-shaped piercing hole 20Hc which is formed by connecting a large-diameter portion and a small-diameter portion and a notch portion 20Hf are formed at predetermined positions in a proximal end portion 20Hb of the pressing member 20H.

On the contrary, a plurality of (three, in the present embodiment) pressing member fixing portions 23Ka are formed, projecting toward the front side of a dust-proofing filter supporting member 23K, at predetermined positions near the outer peripheral portion in front of a dust-proofing filter supporting member 23K forming a part of the sealing structure of the image pick-up device unit 15U. The pressing member fixing portion 23Ka is formed for fixing a plurality of pressing members 20H which fixes and holds the dust-proofing filter 21.

Therefore, the pressing member fixing portion 23Ka has, onto the edge portion thereof, a fitting convex portion 23Ki having a circumferential groove 23Kj (refer to FIG. 86) for fitting the piercing hole 20Hc of the pressing member 20H at the base portion thereof and a projecting portion 23Kk engaged to the notch portion 20Hf of the pressing member 20H, for positioning the notch portion 20Hf.

Other structure is the same as that according to the thirty-second embodiment.

With the above-described structure, upon attaching the pressing member 20H to the pressing member fixing portion 23Ka of the dust-proofing filter supporting member 23K, the fitting convex portion 23Ki of the pressing member fixing portion 23Ka is fit to the large-diameter portion of the piercing hole Hc of the pressing member 20H, thereby entering a status shown in FIG. 87.

In this status, the pressing member 20H is slid in the direction shown by an arrow H in FIG. 87. Then, the small-diameter portion of the piecing hole 20Hc of the pressing member 20H is fit to the circumferential groove 23Kj of the fitting convex portion 23Ki in the pressing member fixing portion 23Ka. Further, by sliding the pressing member 20H in the direction shown by the arrow H, the notch portion 20Hf of the pressing member 20H is engaged to the fitting convex portion 23Ki of the pressing member fixing portion 23Ka, thereby entering the status shown in FIG. 88.

In this case, by fitting the small-diameter portion of the piercing hole Hc of the pressing member 20H to the circumferential groove 23Kj of the fitting convex portion 23Ki in the pressing member fixing portion 23Ka, the movement of the pressing member 20H in the direction shown by an arrow J in FIG. 88 is prevented. Further, by engaging the notch portion 20Hf of the pressing member 20H to the fitting convex portion 23Ki of the pressing member fixing portion 23Ka, the pressing member 20H regulates the rotation of the notch portion 20Hf in the direction shown by an arrow k with the fitting convex portion 23Ki of the pressing member fixing portion 23Ka as center. Thus, the pressing member 20H is accurately fixed to the pressing member fixing portion 23Ka.

As mentioned above, the convex portions 20Hd of the pressing members 20H press a plurality of predetermined portions at the peripheral portion of the dust-proofing filter 21 by fitting and fixing the pressing member 20H to the pressing member fixing portion 23Ka of the dust-proofing filter supporting member 23K via the dust-proofing filter 21 interposed. Consequently, the pressing member 20H presses the dust-proofing filter 21 at a plurality of portions at the peripheral portion thereof with point contact.

As mentioned above, according to the thirty-third embodiment, the means for fixing the plurality of pressing members 20H to the dust-proofing filter supporting member 23K is the so-called fitting-type fixing means without the screw or the like. Thus, the assembling process upon manufacturing is simplified and this contributes to the improvement in efficiency of the manufacturing process. Further, this contributes to the reduction in manufacturing costs.

Figure 89:
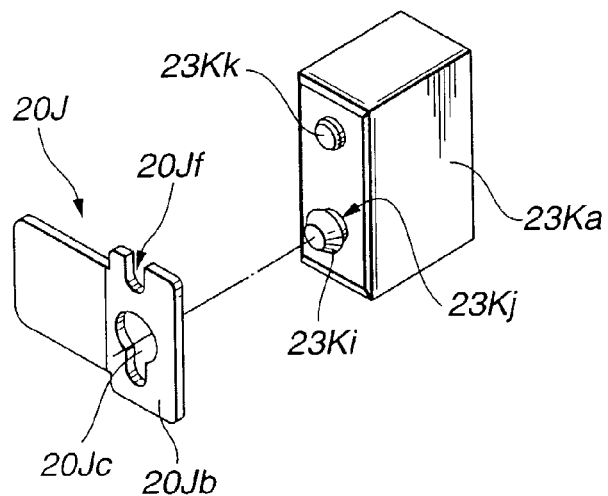
FIG. 89 is a main-part enlarged exploded perspective view showing a pressing member and a pressing member fixing unit according to a thirty-fourth embodiment of the present invention.

FIG. 89 is a main-part enlarged exploded perspective view showing by extracting a part of an image pick-up device unit in a camera according to the thirty-fourth embodiment of the present invention, namely showing an example of a pressing member 20J when the convex portions 20Hd are omitted from the pressing members 20H according to the thirty-third embodiment. Other structure is the same as that according to the thirty-third embodiment.

According to the thirty-fourth embodiment, the pressing member 20J is pressed to the dust-proofing filter 21 at a plurality of portions with plane contact. That is, the pressing member 20J presses the dust-proofing filter 21 with plane contact. However, as compared with the case of using the circular-shaped pressing member according to the twenty-sixth to thirty-first embodiments, the contact area becomes small. Therefore, a factor against the vibrations of the dust-proofing filter 21 is small.

Figure 90:
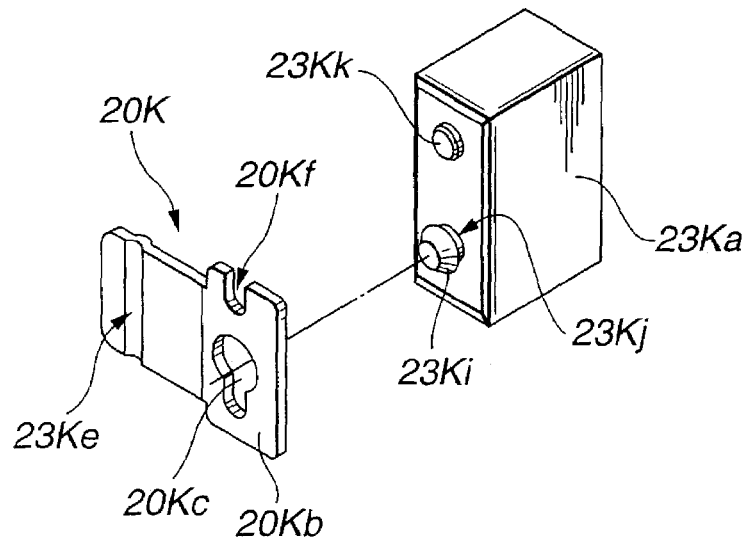
FIG. 90 is a main-part enlarged exploded perspective view showing a pressing member and a pressing member fixing unit according to a thirty-fifth embodiment of the present invention.

FIG. 90 is a main-part enlarged exploded perspective view showing by extracting a part of an image pick-up device unit in a camera according to the thirty-fifth embodiment of the present invention, namely showing an example of a pressing member 20K when a convex groove 20Ce is formed in place of the convex portion 20Hd of the pressing member 20H. Other structure is the same as that according to the thirty-third embodiment.

According to the thirty-fifth embodiment, the pressing member 20K presses the dust-proofing filter 21 with line contact at a plurality of positions.

According to the above embodiments, the pressing member is made of the elastic member such as the plate-shaped spring. In views of the elastic force and the intensity of the member necessary for pressing and fixing the pressing member to the dust-proofing filter supporting member (sealing structure), the material of the pressing member is generally made of metal.

However, when the pressing member is made of only a hard material such as metal, the vibrations of the dust-proofing filter are inhibited at the contact portion between the pressing member and the dust-proofing filter.

Then, it is considered that the pressing member is made of resin such as a plastic material or a soft material such as hard rubber.

Figure 91:
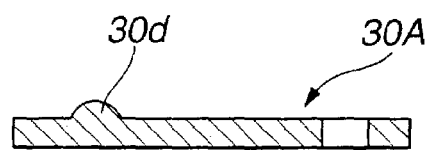
FIG. 91 a sectional view showing by extracting only a pressing member according to a thirty-sixth embodiment of the present invention.

For example, FIG. 91 is a sectional view showing only the pressing member in a camera according to the thirty-sixth embodiment of the present invention. According to the thirty-sixth embodiment, an example is given of formation integral with the convex portion 30d at a predetermined portion of the pressing member 30A.

According to the thirty-sixth embodiment, the pressing member 30A is made of resin such as a plastic material or a soft material such as hard rubber, having elastic force. In this case, the convex portion 30d of the pressing member 30A may be formed with the shape of the convex portion 20Hd (refer to FIG. 88) of the pressing member 20H according to the thirty-third embodiment or the shape of the convex portion 20Ke (refer to FIG. 90) of the pressing member 20K according to the thirty-fifth embodiment. In this case, the convex portion 30d of the pressing member 30A presses a predetermined circular-shaped area of the peripheral portion of the dust-proofing filter 21 with point contact or with the line contact.

Other structure is the same as that according to the thirty-second to thirty-fifth embodiments.

According to the thirty-sixth embodiment, the material of the pressing member 30A is changed. Thus, the pressing member 30A can be easily applied to the circular-shaped pressing member according to the twenty-sixth to thirty-first embodiments.

Depending on a pressing member, the elastic force is further necessary as compared with the pressing member 30A shown in FIG. 91. A pressing member shown in FIG. 92 is applied to one requiring the larger elastic-force.

Figure 92:
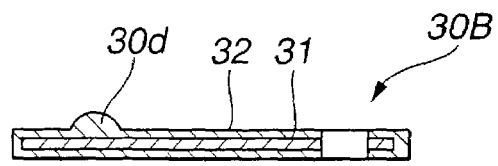
FIG. 92 is a sectional view showing by extracting only a pressing member according to a thirty-seventh embodiment of the present invention.

FIG. 92 is a sectional view showing only a pressing member according to the thirty-seventh embodiment of the present invention.

According to the thirty-seventh embodiment, the pressing member 30B has the member 32 made of the similar material as that of the pressing member 30A (refer to FIG. 91) according to the thirty-sixth embodiment with the similar shape around a plate-shaped metal member 31.

In other words, upon attaching the pressing member 30B to the dust-proofing filter supporting member (23C), a convex portion 30d is formed at a portion where the pressing member 30B should be abutted onto the dust-proofing filter 21.

As mentioned above, according to the thirty-sixth and thirty-seventh embodiments (refer to FIGS. 91 and 92), at least the portion which is abutted on the dust-proofing filter 21 in the pressing members 30A and 30B, namely, the convex portion 30d is made of the resin such as a plastic material or of hard rubber.

In the image pick-up device unit (15) using the thus-formed pressing member 30A or 30B, upon applying the predetermined vibrations to the dust-proofing filter 21 by applying the periodic voltage to the piezoelectric element 22 at a predetermined timing, it is suppressed that the vibration of the dust-proofing filter 21 is transmitted to the pressing member 30A or 30B itself.

The material to be vibrated for the purpose of the dust-proofing is only the dust-proofing filter 21 and another member does not need to be vibrated. However, the pressing members 30A and 30B absorb the vibration transmitted from the dust-proofing filter 21 by making the convex portion 30d of the pressing members 30A and 30B of the soft material.

Therefore, the pressing members 30A and 30B press the dust-proofing filter 21 toward the dust-proofing filter supporting member (23) and form a part of the holding structure for fixing and holding the dust-proofing filter 21 while holding the contact state between the dust-proofing filter 21 and the dust-proofing filter supporting member (23). Further, the pressing members 30A and 30B function as members for absorbing the vibrations which suppress the transmission of the vibrations to another member via the pressing members 30A and 30B interposed from the dust-proofing filter 21.

A pressing member also functioning as the member for absorbing the vibrations is considered as follows.

Figure 93:
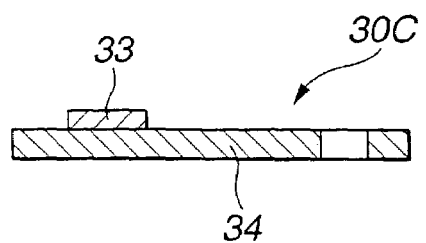
FIG. 93 is a sectional view showing by extracting only a pressing member according to a thirty-eighth embodiment of the present invention.
Figure 94:
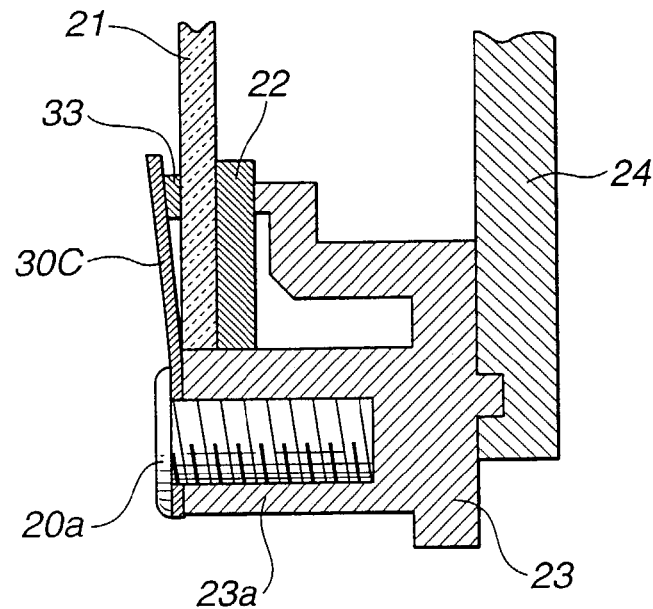
FIG. 94 is a main-part enlarged sectional view showing an enlarged part of an image pick-up device unit in which the pressing member shown in FIG. 93 is applied.

That is, FIGS. 93 and 94 are diagrams showing the thirty-eighth embodiment of the present invention. FIG. 93 is a sectional view showing by extracting only a pressing member. FIG. 94 is a main-part enlarged sectional view showing an enlarged part of an image pick-up device unit using the pressing member shown in FIG. 93.

According to the thirty-eighth embodiment, the pressing member 30C is made of a hard material such as metal, and comprises a plate-shaped spring member 34 having elastic force and a vibration absorbing member 33 arranged at a predetermined position of the plate-shaped spring member 34.

The vibration absorbing member 33 is made of a soft material, e.g., felt, urethane, soft plastic, or rubber, and is adhered to a predetermined position of the plate-shaped spring member 34 by an adhesive or a two-sided tape.

Referring to FIG. 94, in a state in which the pressing member 30C is fixed to the projecting portion 23a of the dust-proofing filter supporting member 23 by the fixing screw 20a, the vibration absorbing member 33 adhered to the pressing member 30C is set to be abutted on a portion as a node for the vibrations of the dust-proofing filter 21.

Other structure is the same as that according to the thirty-second embodiment.

As mentioned above, according to the thirty-eighth embodiment, the pressing member 30C is formed by adhering the vibration absorbing member 33 at the predetermined position of the plate-shaped spring member 34 as the plate-shaped hard member having the elastic force. Thus, as compared with the case in which the contact shape between the pressing member 30C and the dust-proofing filter 21 becomes a point or a line, the dust-proofing filter 21 is pressed with a slightly wide range. Therefore, the pressing operation is accurately performed and the vibrations are stably ensured without inhibiting the vibrations of the dust-proofing filter 21.

In addition, the pressing member 30C is made with an extremely simple structure and, therefore, this contributes to the improvement in efficiency of the manufacturing and to the reduction in manufacturing costs.

Meanwhile, according to the twenty-sixth embodiment, the pressing member 20B forming a part of the holding structure is formed with the circular shape. Thus, the peripheral portion of the dust-proofing filter 21 is pressed. Consequently, the peripheral portion of the dust-proofing filter 21 is covered with the pressing member 20A.

As mentioned above, the dust-proofing filter 21 is formed of an optical member opposed to the image pick-up device 27 in the front thereof at a predetermined interval. The dust-proofing filter 21 is arranged on the optical path of the subject beams which are transmitted through the photographing optical system 12a and reach the photoelectrically converting surface of the image pick-up device 27.

In this case, through the dust-proofing filter 21, laser beams (hereinafter, referred to as harmful beams) are transmitted, except for the laser beams contributing to the transmission through the photographing optical system 12a and to the formation of the subject image onto the photoelectrically converting surface of the image pick-up device 27. The harmful beams are mixed in a predetermined area on the photoelectrically converting surface, namely, an area where the image signal for display or recording operation is to be obtained and, then, flare, ghost, etc. are caused on the image formed based on the captured image signal. Further, the flare, ghost, etc. exert an adverse influence on the color, brightness, contrast, etc., thereby deteriorating the picture quality.

Means for solving the problems are described hereinbelow.

Figure 95:
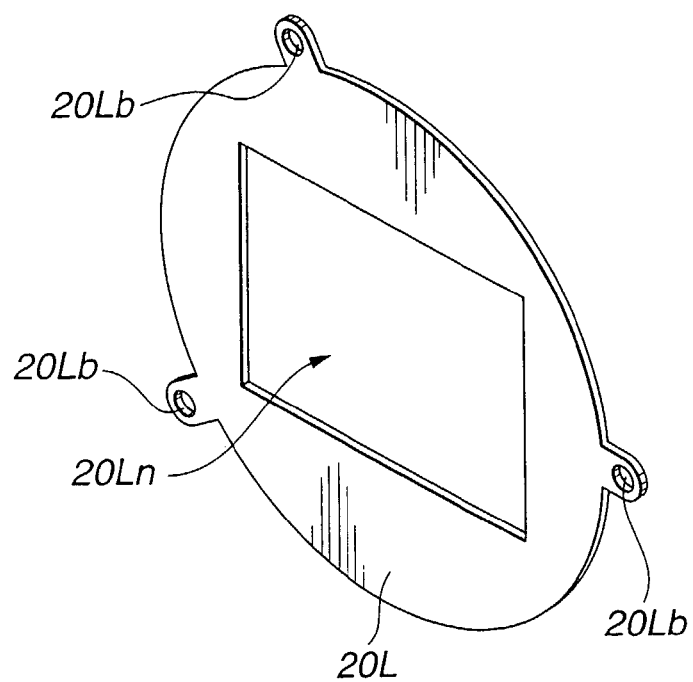
FIG. 95 is a perspective view showing by extracting only a pressing member according to a thirty-ninth embodiment of the present invention.

FIG. 95 is a perspective view showing only a pressing member used for an image pick-up device unit in a camera according to the thirty-ninth embodiment of the present invention.

According to the thirty-ninth embodiment, the circular-shaped pressing member is used and this structure is the same as that according to the twenty-sixth to thirty-first embodiments and only the pressing member is different. Therefore, the same structure as that according to the twenty-sixth embodiment is not illustrated and is not described in detail, only the different member (pressing member) is described hereinbelow.

According to the thirty-ninth embodiment, a pressing member 20L forming a part of a holding structure is made of an elastic member such as a plate-shaped spring, and has a rectangular-shaped opening 20Ln substantially in the center thereof. The opening 20Ln has a shape corresponding to a valid area of the photoelectrically converting surface of the image pick-up device 27, and the shape is set so that only the beams contributing to the formation of the subject image are transmitted.

In other words, according to the thirty-ninth embodiment, the pressing member 20L has a function for pressing the dust-proofing filter 21 toward the dust-proofing filter supporting member 23 and for fixing and holding the dust-proofing filter 21. In addition, according to the thirty-ninth embodiment, the pressing member 20L has a function for limiting the passage of transmitted beams upon transmitting the subject beams after being transmitted through the photographing optical system 12a, through the dust-proofing filter 21, and for stopping the beams reaching the photoelectrically converting surface of the image pick-up device 27.

That is, the pressing member 20L has a function for suppressing the reach of the harmful beams to the photoelectrically converting surface of the image pick-up device 27.

Other structure is the same as that according to the twenty-sixth embodiment.

As mentioned above, according to the thirty-ninth embodiment, the opening 20Ln of the pressing member 20L is formed with a rectangular shape corresponding to the photoelectrically converting surface of the image pick-up device 27. In this case, the pressing member 20L is formed with the shape for covering the adjacent portion of the peripheral portion of the dust-proofing filter 21 pressed by the pressing member 20L, namely, the portion other than the predetermined portion of the dust-proofing filter 21 corresponding to the opening 20Ln of the pressing member 20L. Therefore, the pressing member 20L has a stop function for limiting the passage of the beams other than the valid beams contributing to the formation of the image formed by the beams incident on the dust-proofing filter 21, that is, the passage of the harmful beams causing the flare, ghost, etc.

Consequently, the occurrence of the flare, ghost, etc. is suppressed and, a preferable image signal is displayed or is recorded. The image displayed based on the image signal assures a preferable picture quality.

According to the above embodiments, the example is given of the camera in which the image pick-up optical system is detachably attached to the main body unit of the camera, that is, the interchangeable single-lens reflex camera, and is described in detail. The configuration of the camera is not limited to the above description and the spirit of the present invention does not necessarily require this configuration.

It should be understood that the present invention is not limited to the precise disclosed embodiments, and various changes and modifications thereof can be made without departing from the spirit or scope of the invention.

What is claimed is:

1. A camera comprising:
an image pick-up device which obtains an image signal corresponding to beams irradiated onto a photoelectrically converting surface thereof;
an optical device arranged on a side of the photoelectrically converting surface of the image pick-up device;
a dust-proofing member having a substantially circular or polygonal plate-shape, and including a transparent portion at an area having at least a predetermined length in a radial direction from a center thereof, the transparent portion being provided just-in-front of the optical device at a predetermined interval;
a member for vibration which is arranged at a peripheral portion of the dust-proofing member, and which applies vibrations to the dust-proofing member;
a sealing structure which seals a space between the dust-proofing member and the optical device, said sealed space including a first space formed by opposing the dust-proofing member and the optical device, and a second space which communicates with the first space and is provided at least at a part of a periphery of the optical device outside of the photoelectrically converting surface of the image pick-up device; and
an image signal processing circuit which converts an image signal obtained from the image pick-up device, corresponding to an image formed onto the photoelectrically converting surface of the image pick-up device, into a signal suitable to recording;
wherein the optical device comprises an optical low-pass filter, and the sealing structure includes a first member which supports the dust-proofing member in contact with the peripheral portion or an adjacent portion thereof and a second member which supports the optical device in contact with a peripheral portion or an adjacent portion thereof and which is arranged closely in contact with the first member at a predetermined portion of the second member; and
wherein the first member and second member are airtightly fit to each other at an annular area on an outer peripheral side of the optical device.

2. A camera comprising:
an image pick-up device which obtains an image signal corresponding to beams irradiated onto a photoelectrically converting surface thereof;
an optical device arranged on a side of the photoelectrically converting surface of the image pick-up device;
a dust-proofing member having a substantially circular or polygonal plate-shape, and including a transparent portion at an area having at least a predetermined length in a radial direction from a center thereof, the transparent portion being provided just-in-front of the optical device at a predetermined interval;
a member for vibration which is arranged at a peripheral portion of the dust-proofing member, and which applies vibrations to the dust-proofing member;

a sealing structure which seals a space between the dust-proofing member and the optical device, said sealed space including a first space formed by opposing the dust-proofing member and the optical device, and a second space which communicates with the first space and is provided at least at a part of a periphery of the optical device outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the optical device comprises an optical low-pass filter, and the sealing structure includes a first member which supports the dust-proofing member in contact with the peripheral portion or an adjacent portion thereof and a second member which supports the optical device in contact with a peripheral portion or an adjacent portion thereof and which is arranged closely in contact with the first member at a predetermined portion of the second member; and wherein the second member airtightly comes into contact with the peripheral portion of the optical device at a predetermined step portion thereof so as to regulate a position of the optical device in an optical axis direction.

3. A camera comprising:

an image pick-up device which obtains an image signal corresponding to beams irradiated onto a photoelectrically converting surface thereof;

an optical device arranged on a side of the photoelectrically converting surface of the image pick-up device;

a dust-proofing member having a substantially circular or polygonal plate-shape, and including a transparent portion at an area having at least a predetermined length in a radial direction from a center thereof, the transparent portion being provided just-in-front of the optical device at a predetermined interval;

a member for vibration which is arranged at a peripheral portion of the dust-proofing member, and which applies vibrations to the dust-proofing member;

a sealing structure which seals a space between the dust-proofing member and the optical device, said sealed space including a first space formed by opposing the dust-proofing member and the optical device, and a second space which communicates with the first space and is provided at least at a part of a periphery of the optical device outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the sealing structure includes a first portion for supporting the dust-proofing member in contact with the peripheral portion or an adjacent portion thereof and a second portion for supporting the optical device in contact with a peripheral portion or an adjacent portion thereof, and the first portion and second portion are formed integrally with each other; and wherein the second portion airtightly comes into contact with the peripheral portion of the optical device at a predetermined step portion thereof so as to regulate a position of the optical device in an optical axis direction.

4. The camera according to claim 3, wherein the second portion regulates the position of the optical device against an elastic force which displaces the optical device at the step portion in the optical axis direction.

5. A camera comprising:

an image pick-up device which obtains an image signal corresponding to beams irradiated onto a photoelectrically converting surface thereof;

an optical device arranged on a side of the photoelectrically converting surface of the image pick-up device;

a dust-proofing member having a substantially circular or polygonal plate-shape, and including a transparent portion at an area having at least a predetermined length in a radial direction from a center thereof, the transparent portion being provided just-in-front of the optical device at a predetermined interval;

a member for vibration which is arranged at a peripheral portion of the dust-proofing member, and which applies vibrations to the dust-proofing member;

a sealing structure which seals a space between the dust-proofing member and the optical device, said sealed space including a first space formed by opposing the dust-proofing member and the optical device, and a second space which communicates with the first space and is provided at least at a part of a periphery of the optical device outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the sealing structure has a passage connecting an inside to an outside of the sealed space at a predetermined portion; and wherein the camera further comprises a sealing auxiliary member whose inner volume is changed depending on an inner pressure so that the passage airtightly covers an opening side which is connected to the outside of the sealed space.

6. The camera according to claim 5, wherein in the sealing auxiliary member, an elastic member is airtightly arranged at an annular area in the peripheral portion or the adjacent portion of the optical device in the sealing structure, excluding the passage.

7. A camera comprising:

an image pick-up device which obtains an image signal corresponding to beams irradiated onto a photoelectrically converting surface thereof;

an optical device arranged on a side of the photoelectrically converting surface of the image pick-up device;

a dust-proofing member having a substantially circular or polygonal plate-shape, and including a transparent portion at an area having at least a predetermined length in a radial direction from a center thereof, the transparent portion being provided just-in-front of the optical device at a predetermined interval;

a member for vibration which is arranged at a peripheral portion of the dust-proofing member, and which applies vibrations to the dust-proofing member;

a sealing structure which seals a space between the dust-proofing member and the optical device, said sealed space including a first space formed by opposing the dust-proofing member and the optical device, and a second space which communicates with the first space and is provided at least at a part of a periphery of the optical device outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the sealing structure has a flow passage for reducing resistance against air flow between a relatively narrow space portion and a relatively large space portion in the sealed space at a predetermined portion.

8. The camera according to claim 7, wherein the sealing structure comprises a first member which supports the dust-proofing member in contact with the peripheral portion or an adjacent portion thereof and a second member which supports the optical device in contact with a peripheral portion or an adjacent portion thereof and which is arranged closely in contact with the first member at a predetermined portion of the second member, and the flow passage has a notch at a part of a contact surface formed airtightly in contact with the peripheral portion of the optical device in the second member.

9. The camera according to claim 7, wherein the sealing structure includes a first portion which supports the dust-proofing member in contact with the peripheral portion or an adjacent portion thereof and a second portion which supports the optical device in contact with a peripheral portion or an adjacent portion thereof, the first portion and the second portion are formed integrally with each other, and the flow passage is formed by providing a notch at a part of a contact surface which is airtightly in contact with the peripheral portion of the optical device in the second portion.

10. The camera according to claim 7, wherein the passage is formed as a hole which is pierced to an area extending to an outer peripheral side of the optical device in the second member.

11. A camera comprising:
an image pick-up device which obtains an image signal corresponding to beams irradiated onto a photoelectrically converting surface thereof;
an optical device arranged on a side of the photoelectrically converting surface of the image pick-up device;
a dust-proofing member having a substantially circular or polygonal plate-shape, and including a transparent portion at an area having at least a predetermined length in a radial direction from a center thereof, the transparent portion being provided just-in-front of the optical device at a predetermined interval;
a member for vibration which is arranged at a peripheral portion of the dust-proofing member, and which applies vibrations to the dust-proofing member;
a sealing structure which seals a space between the dust-proofing member and the optical device, said sealed space including a first space formed by opposing the dust-proofing member and the optical device, and a second space which communicates with the first space and is provided at least at a part of a periphery of the optical device outside of the photoelectrically converting surface of the image pick-up device; and
an image signal processing circuit which converts an image signal obtained from the image pick-up device, corresponding to an image formed onto the photoelectrically converting surface of the image pick-up device, into a signal suitable to recording;
wherein the member for vibration comprises an electromechanical transducer, and a predetermined vibration is generated in the dust-proofing member by externally applying a predetermined driving voltage to the electromechanical transducer;
wherein the electromechanical transducer comprises a piezoelectric element, which is adhered to the dust-proofing member by an adhesive;
wherein the sealing structure includes a first portion which supports the dust-proofing member in contact with the peripheral portion or an adjacent portion thereof and a second portion which supports the optical device in contact with a peripheral portion or an adjacent portion thereof, and the second portion has a passage which connects an inside to an outside of the sealed space at a predetermined portion thereof;
wherein the passage is formed as a hole which is pierced at an area extending to an outer peripheral side of the optical device in the second portion.

12. A camera comprising:
an image pick-up device which obtains an image signal corresponding to beams irradiated onto a photoelectrically converting surface thereof;
a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;
a member for vibration which is arranged at a peripheral portion of the dust-proofing member, and which applies vibrations to the dust-proofing member;
a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and
an image signal processing circuit which converts an image signal obtained from the image pick-up device, corresponding to an image formed onto the photoelectrically converting surface of the image pick-up device, into a signal suitable to recording;
wherein the sealing structure includes a first member which supports the dust-proofing member in contact with the peripheral portion or an adjacent portion thereof and a second member which supports the image pick-up device in contact with a peripheral portion or an adjacent portion of the photoelectrically converting surface; and
wherein the first member and the second member are airtightly fit to each other at an annular area on an outer peripheral side of the photoelectrically converting surface of the image pick-up device.

13. A camera comprising:
an image pick-up device which obtains an image signal corresponding to beams irradiated onto a photoelectrically converting surface thereof;
a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the sealing structure includes a first member which supports the dust-proofing member in contact with the peripheral portion or an adjacent portion thereof and a second member which supports the image pick-up device in contact with a peripheral portion or an adjacent portion of the photoelectrically converting surface; and wherein the second member regulates a position of the dust-proofing member in an optical axis direction, airtightly in contact with the peripheral portion of the dust-proofing member at a predetermined step portion of the second member.

14. The camera according to claim 13, wherein the second member regulates the position of the dust-proofing member against an elastic force which displaces the dust-proofing member in the optical axis direction at the step portion.

15. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the sealing structure comprises a first portion for supporting the dust-proofing member in contact with the peripheral portion or an adjacent portion thereof and a second portion for supporting the image pick-up device in contact with a peripheral portion or an adjacent portion of the photoelectrically converting surface, and the first portion and the second portion are formed integrally with each other; and wherein the second portion airtightly comes into contact with the peripheral portion of the dust-proofing member at a predetermined step portion thereof and regulates a position of the dust-proofing in an optical axis direction.

16. The camera according to claim 15, wherein the second portion regulates the position of the dust-proofing member against an elastic force which displaces the dust-proofing member in the optical axis direction at the step portion.

17. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the sealing structure comprises a first member which supports the dust-proofing member in contact with the peripheral portion or an adjacent portion thereof and a second member which supports the image pick-up device in contact with a peripheral portion or an adjacent portion of the photoelectrically converting surface, and the second member has a passage connecting an inside to an outside of the sealed space at a predetermined portion thereof; and wherein the passage is formed as a hole pierced at an area extending to an outer peripheral side of the photoelectrically converting surface of the image pick-up device in the second member.

18. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the sealing structure comprises a first portion which supports the dust-proofing member in contact with the peripheral portion or an adjacent portion thereof and a second portion which supports the image pick-up device in contact with a peripheral portion or an adjacent portion of the photoelectrically converting surface, the first portion and the second portion are integrally formed with each other, and the second portion has a passage for connecting an inside to an outside of the sealed space at a predetermined portion thereof; and wherein the passage is formed as a hole pierced at an area extending to an outer peripheral side of the photoelectrically converting surface of the image pick-up device in the second portion.

19. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the sealing structure has a flow passage for reducing resistance against air flow between a relatively small space portion and a relatively large space portion in the sealed space at a predetermined portion.

20. The camera according to claim 19, wherein the sealing structure comprises a first member which supports the dust-proofing member in contact with the peripheral portion or an adjacent portion thereof and a second member arranged for supporting the image pick-up device in contact with a peripheral portion or an adjacent portion of the photoelectrically converting surface, and the flow passage is formed by providing a notch at a part of a contact surface portion formed airtightly in contact with the peripheral portion of the photoelectrically converting surface of the image pick-up device in the second member.

21. The camera according to claim 19, wherein the sealing structure comprises a first portion which supports the dust-proofing member in contact with the peripheral portion or an adjacent portion thereof and a second portion arranged for supporting the image pick-up device in contact with a peripheral portion or an adjacent portion of the photoelectrically converting surface, the first portion and the second portion are integrally formed with each other, and the flow passage is formed by providing a notch at a part of a contact surface portion formed airtightly in contact with the peripheral portion of the photoelectrically converting surface of the image pick-up device in the second portion.

22. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the dust-proofing member has a holding structure which presses the peripheral portion of the dust-proofing member so as to press and fix the dust-proofing member to the sealing structure; and wherein the holding structure has a stop function for shutting off harmful light.

23. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the dust-proofing member has a holding structure which presses the peripheral portion of the dust-proofing member so as to press and fix the dust-proofing member to the sealing structure; and wherein the holding structure is substantially circular.

24. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the dust-proofing member has a holding structure which presses the peripheral portion of the dust-proofing member so as to press and fix the dust-proofing member to the sealing structure; and wherein the holding structure is fastened to the sealing structure by a screw.

25. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

Wherein the dust-proofing member is adhered and fixed to the sealing structure over an entirety of the peripheral portion thereof.

26. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the dust-proofing member is adhered and fixed to the sealing structure; and wherein the surface of the dust-proofing member comprises a thin-film forming portion and a thin-film non-forming portion and the sealing structure is adhered and fixed to the thin-film non-forming portion.

27. The camera according to claim 26, wherein the thin film comprises one of an infrared cut-off film, ultraviolet cut-off film, reflection preventing film, and electrostatic charge preventing film.

28. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein a portion of the sealing structure in contact with the dust-proofing member or the member for vibration is made of a soft material;

wherein the soft material is rubber, which is arranged between a main body unit of the sealing structure and the dust-proofing member or the member for vibration;

wherein the sealing structure includes a member for pressing the peripheral portion of the dust-proofing member so as to press and fix the dust-proofing member to the main body unit of the sealing structure; and wherein the pressing member comprises a plate spring.

29. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device;

an image signal processing circuit which converts an image signal obtained from the image pick-up device, corresponding to an image formed onto the photoelectrically converting surface of the image pick-up device, into a signal suitable to recording; and a dust collector at an outer-peripheral portion of a surface of the dust-proofing member or at an adjacent portion thereof;

wherein the dust collector includes an adhesive member.

30. The camera according to claim 29, wherein the adhesive member comprises an adhesive tape.

31. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device;

an image signal processing circuit which converts an image signal obtained from the image pick-up device, corresponding to an image formed onto the photoelectrically converting surface of the image pick-up device, into a signal suitable to recording; and a dust collector at an outer-peripheral portion of a surface of the dust-proofing member or at an adjacent portion thereof;

wherein the dust collector comprises a needle-shaped electrode for ionizing dust and a dust collecting electrode for absorbing and collecting the ionized dust.

32. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device;

an image signal processing circuit which converts an image signal obtained from the image pick-up device, corresponding to an image formed onto the photoelectrically converting surface of the image pick-up device, into a signal suitable to recording; and a dust-receiver for receiving dust arranged near the peripheral portion of the dust-proofing member;

wherein the dust-receiver includes an adhesive.

33. A camera comprising:

an image pick-up device which obtains an image signal corresponding to beams irradiated onto a photoelectrically converting surface thereof;

a dust-proofing member having a substantially circular or polygonal plate-shape, and including a transparent portion at an area having at least a predetermined length in a radial direction from a center thereof, the transparent portion being provided just-in-front of the image pick-up device at a predetermined interval;

a member for vibration which is arranged at a peripheral portion of the dust-proofing member, and which applies vibrations to the dust-proofing member;

a sealing structure which seals a space between the dust-proofing member and the photoelectrically converting surface of the image pick-up device, said sealed space including a first space formed by opposing the dust-proofing member and the photoelectrically converting surface, and a second space which communicates with the first space and is provided at least at a part of a periphery of the photoelectrically converting surface outside of the photoelectrically converting surface of the image pick-up device; and an image signal processing circuit which converts an image signal obtained from the image pick-up device, corresponding to an image formed onto the photoelectrically converting surface of the image pick-up device, into a signal suitable to recording;

wherein the member for vibration comprises an electromechanical transducer, and predetermined vibrations are applied to the dust-proofing member by externally applying a predetermined driving voltage to the electromechanical transducer; and wherein the sealing structure comprises a conductive portion and the conductive portion of the sealing structure is abutted onto a conductive member formed on a the surface of the electromechanical transducer.

34. The camera according to claim 33, wherein the conductive member includes a first conductive member which is formed along a surface and a side surface of the dust-proofing member in the electromechanical transducer and a second conductive member which is formed on a surface opposed to the surface of the dust-proofing member in the electromechanical transducer, and wherein the first conductive member is formed extending to the surface opposed to the surface of the dust-proofing member in the electromechanical transducer, and comprises an insulating portion between the first conductive member and the second conductive member on the opposed surface.

* * * * *